United States Patent [19]

Shaw et al.

[11] 4,303,978

[45] Dec. 1, 1981

[54] INTEGRATED-STRAPDOWN-AIR-DATA SENSOR SYSTEM

[75] Inventors: Jack C. Shaw, Kirkland; John F. Gilbert, Des Moines; Guy R. Olbrechts; Melville D. McIntyre, both of Bellevue, all of Wash.

[73] Assignee: The Boeing Company, Seattle, Wash.

[21] Appl. No.: 142,135

[22] Filed: Apr. 18, 1980

[51] Int. Cl.³ ................ G06F 15/50; G05D 1/00
[52] U.S. Cl. .................... 364/453; 244/177; 364/454
[58] Field of Search ........... 364/434, 450, 453, 454; 244/177

[56] References Cited

U.S. PATENT DOCUMENTS

| 3,636,323 | 1/1972 | Salisbury et al. | 364/453 |
| 3,940,597 | 2/1976 | DiMatteo | 364/454 X |
| 4,085,440 | 4/1978 | Hose | 364/454 |
| 4,212,443 | 7/1980 | Duncan et al. | 244/177 |
| 4,254,465 | 3/1981 | Land | 364/453 |

Primary Examiner—Jerry Smith
Attorney, Agent, or Firm—Christensen, O'Connor, Johnson & Kindness

[57] ABSTRACT

A plurality of inertial measuring unit (IMU) modules (41A, B, C and D) each comprising gyros and accelerometers (61, 65 and 67) for sensing inertial information along two orthogonal axes, are strapdown mounted in an aircraft, preferably such that the sense axes of the IMUs are skewed with respect to one another. Inertial and temperature signals produced by the IMU modules, plus pressure signals produced by a plurality of pressure transducer modules (43A, B and C) and air temperature signals produced by total air temperature sensors (45A and B) are applied to redundant signal processors (47A, B and C). The signal processors convert the raw analog information signals into digital form, error compensate the incoming raw digital data and, then, manipulate the compensated digital data to produce signals suitable for use by the automatic flight control, pilot display and navigation systems of the aircraft. The signal processors include: an interface system comprising a gyro subsystem (47), an accelerometer and air calibration data subsystem (50) and an air data and temperature subsystem (52); a computer (54); an instruction decoder (56); and, a clock (58). During computer interrupt intervals raw digital data is fed to the computer (54) by the interface subsystems under the control of the instruction decoder (56). The computer includes a central processing unit that compensates raw digital gyro and accelerometer data to eliminate bias, scale factor, dynamic and temperature errors, as necessary. The central processing unit also modifies the gyro and accelerometer data to compensate for relative misalignment between the sense axes of the gyros and accelerometers and for the skewed orientation of these sense axes relative to the yaw, roll and pitch axes of the aircraft. Further, accelerometer data is transformed from body coordinate form to navigational coordinate form and the result used to determine the velocity and position of the aircraft. Finally, the central processing unit develops initializing alignment signals and develops altitude, speed and corrected temperature and pressure signals.

62 Claims, 54 Drawing Figures

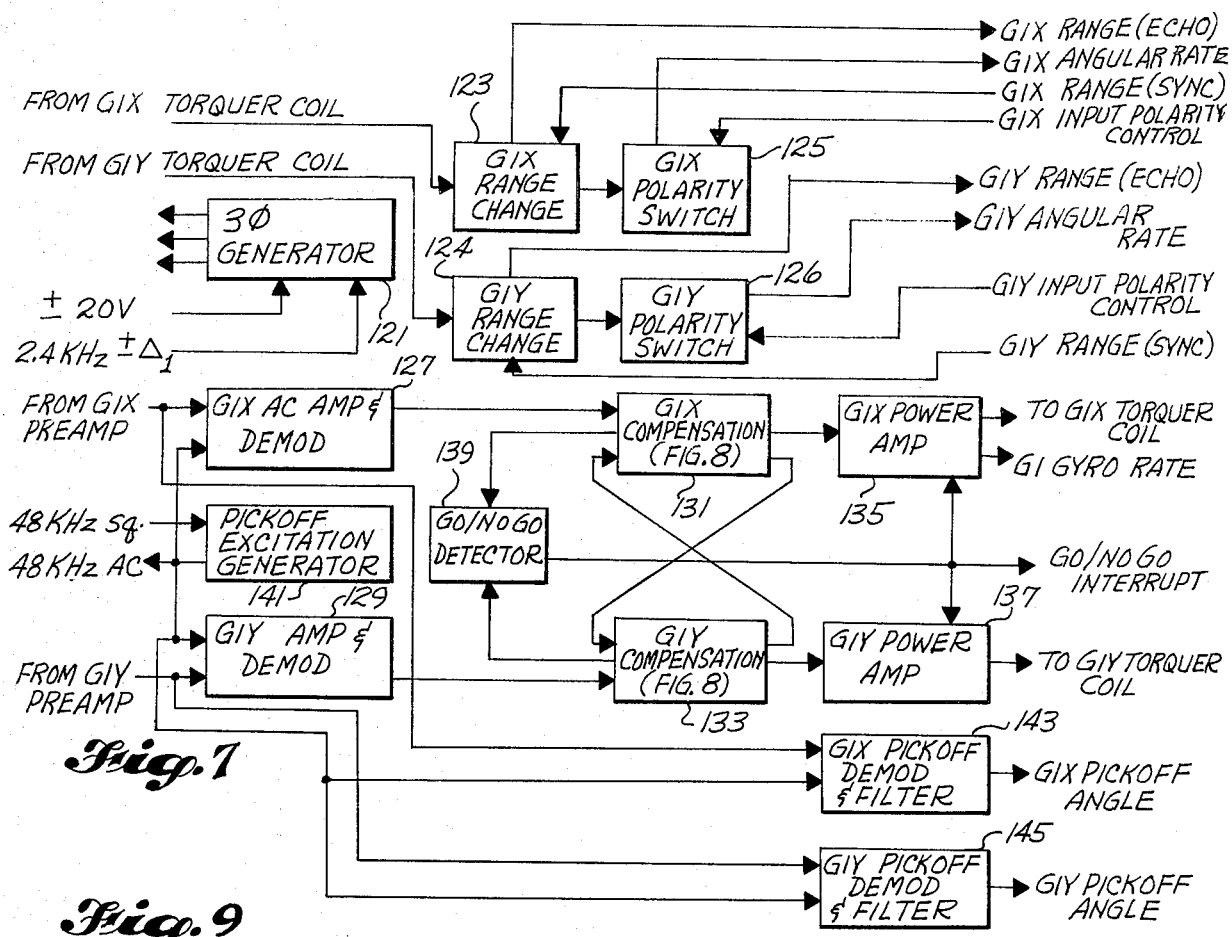
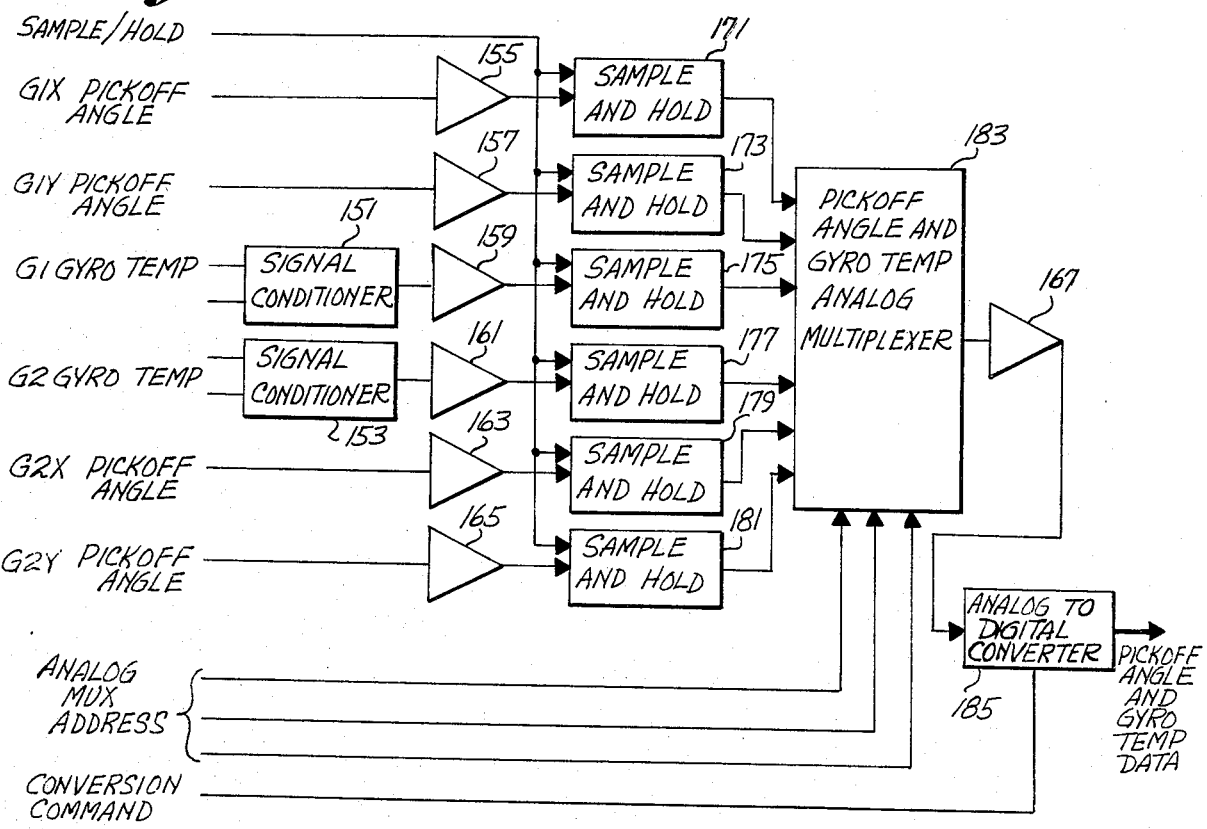

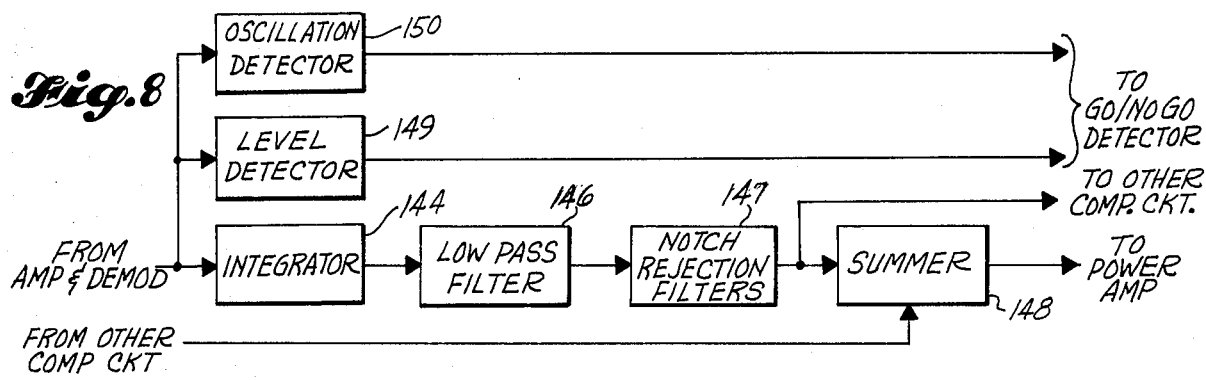
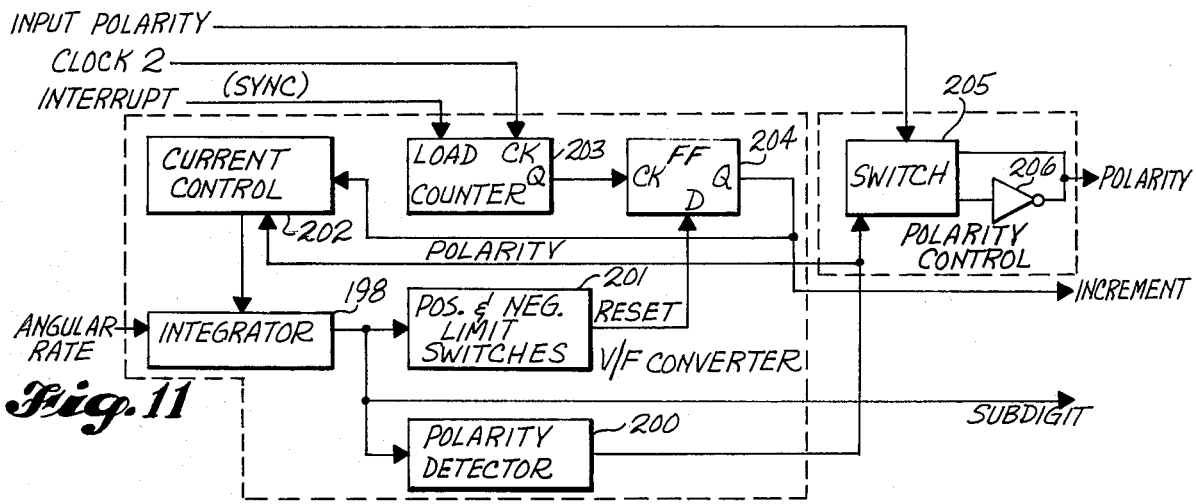
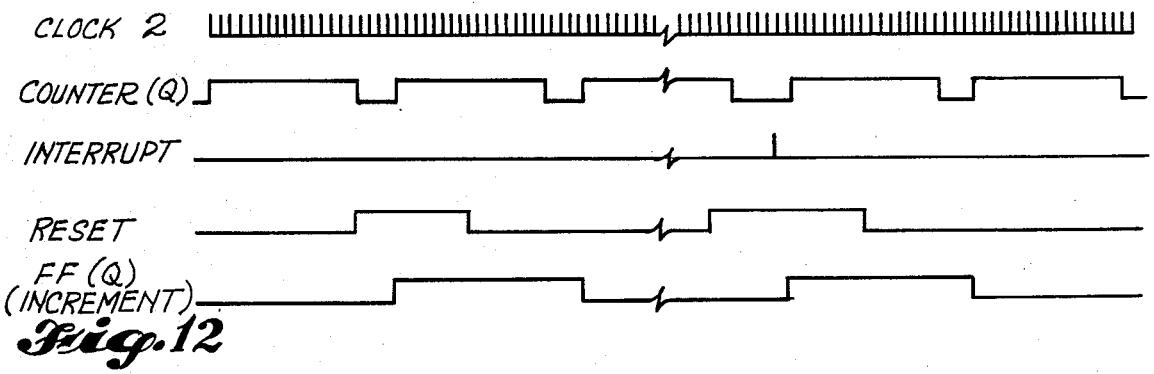
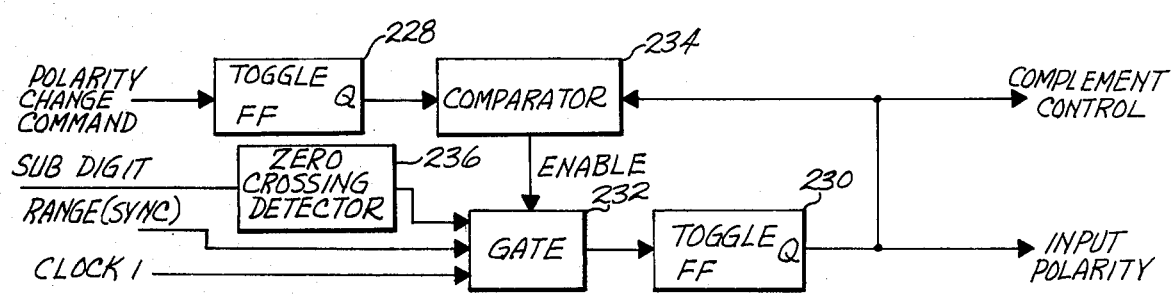

Fig. 26

| OUTPUT BUS (OPB) LINES 0-23 | Description |
|---|---|
| 0 0 0 0 0 0 0 0 0 0 — — — — — — — — — — — — — 0 | READ G1X |
| 0 0 0 0 0 0 0 0 0 1 — — — — — — — — — — — — — 0 | READ G1Y |
| 0 0 0 0 0 0 0 0 1 0 — — — — — — — — — — — — — 0 | READ G2X |
| 0 0 0 0 0 0 0 0 1 1 — — — — — — — — — — — — — 0 | READ G2Y |
| 0 0 0 0 0 0 0 1 0 0 — — — — — — — — — — — — — 0 | READ AIR CAL. DATA TRANSDUCER No.1 |
| 0 0 0 0 0 0 0 1 0 1 — — — — — — — — — — — — 1 0 | READ AIR CAL. DATA TRANSDUCER No.2 |
| 0 0 0 0 0 0 0 1 1 0 — — — — — — — — — — — — — 0 | READ A1X |
| 0 0 0 0 0 0 0 1 1 1 — — — — — — — — — — — — — 0 | READ A1Y |
| 0 0 0 0 0 0 0 0 1 1 — — — — — — — — — — — — — 0 | READ A2X |
| 0 0 0 0 0 0 1 1 0 0 — 0 1 — — — — — — — — — — — 0 | READ GYRO SERVO LOOP DATA |
| 0 0 0 0 0 0 1 1 0 0 — 1 0 — — — — — — — — — — — 0 | READ GYRO SUBDIGIT DATA |
| 0 0 0 0 0 0 1 0 0 — 1 1 □ □ □ □ □ □ □ □ □ □ — 0 | READ PROM DATA (□ = ADDRESS) |
| 0 0 0 0 0 0 1 0 0 1 — — — — — — — — — — — — — 0 | READ PS 1 |
| 0 0 0 0 0 0 1 0 1 0 — — — — — — — — — — — — 1 0 | READ PT 1 |
| 0 0 0 0 0 0 1 0 1 1 — — — — — — — — — — — — — 0 | READ PS 2 |
| 0 0 0 0 0 0 1 1 0 0 — — — — — — — — — — — — 1 0 | READ PT 2 |
| 0 0 0 0 0 0 1 1 0 1 — — — — — — — — — — — — — 0 | READ AIR TEMP. SENSOR DATA |
| 0 0 0 0 0 1 0 — — — — — — — — — — — — □ □ □ — 0 | SELECT ANALOG, CHAN. & DIGITIZE (□ = ADDRESS) |
| 0 0 0 0 0 1 1 — — — — — — — — — — — — — — — □ 0 | SELECT RANGE GYRO X1 AXIS □ = RANGE |
| 0 0 0 0 0 1 1 — — — — — — — — — — — — — — — □ 0 | SELECT RANGE GYRO Y1 AXIS (0 = LOW; |
| 0 0 0 0 0 1 1 — — — — — — — — — — — — — — — □ 0 | SELECT RANGE GYRO X2 AXIS  1 = HIGH) |
| 0 0 0 0 0 1 1 — — — — — — — — — — — — — — — □ 0 | SELECT RANGE GYRO Y2 AXIS |
| 0 0 0 0 0 1 1 — — — — — — — — — — — — — — — — 0 | SET ALIGN OR NAV MODE (□ = 0 ALIGN; = 1 NAV) |
| 0 0 0 0 0 1 1 — — — — — — — — — — — — — — — 1 0 | TRIGGER WATCH DOG TIMER |
| 0 0 0 0 0 1 1 — — — — — — — — — — — — — — — □ 0 | SET SAMPLE OR HOLD MODE (□ = 0 HOLD; = 1 SAMPLE) |

NOTE: — = BIT STATUS IRRELEVANT

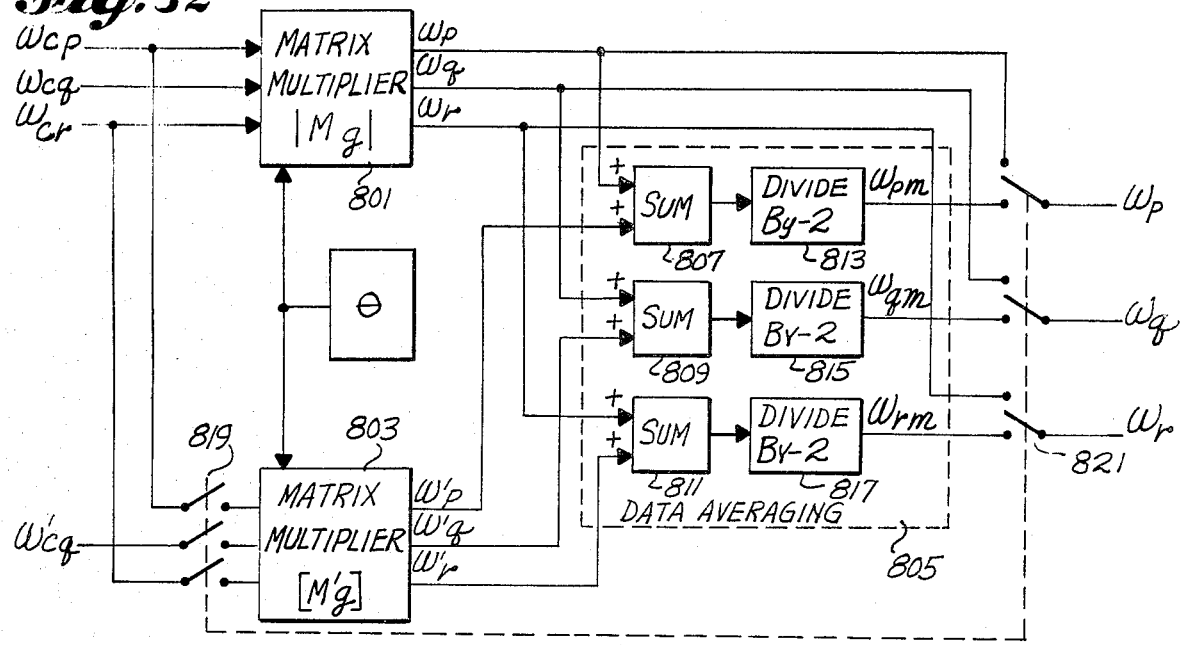
Fig. 32
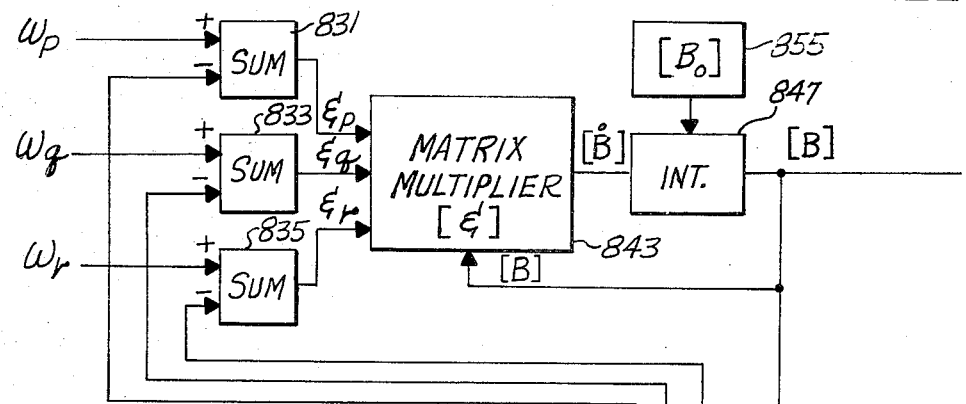
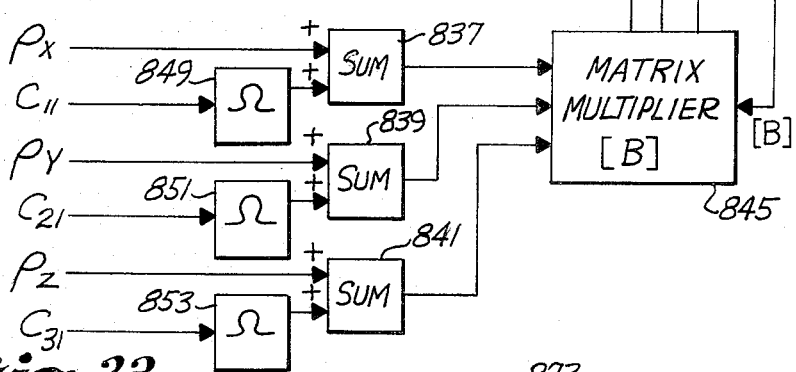
Fig. 33
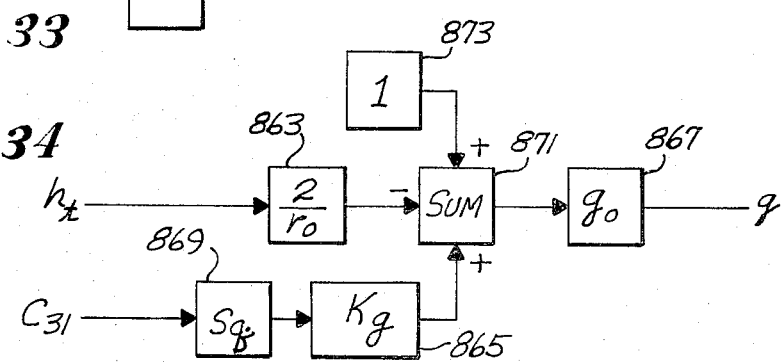
Fig. 34

INTEGRATED-STRAPDOWN-AIR-DATA SENSOR SYSTEM

TECHNICAL FIELD

This invention is directed to avionic systems and, more particularly to apparatus for producing signals suitable for controlling the automatic flight control, pilot display and navigation subsystems of an aircraft.

BACKGROUND OF THE INVENTION

Modern aircraft automatic flight control, pilot display and navigation subsystems require redundant air data and inertially derived data to perform functions such as aircraft stability augmentation, ride comfort enhancement, autothrottle control, control wheel steering, all-weather landing, long-range over water navigation, terminal area guidance and operation in advanced air traffic control areas. The inertial data necessary to perform these aircraft functions is presently furnished by body-mounted rate gyros, accelerometers, vertical gyros, directional gyros and platform inertial navigation systems (INSs). In many aircraft, INSs are not included because, while the inertial data available from platform INSs is highly desirable, the cost of producing such data cannot be justified by the function the aircraft is to perform. That is, platform INSs are expensive systems to produce and maintain. Because they are expensive, their costs must be justified based on the function an aircraft is to perform. If the function of the aircraft cannot justify the expense of procuring and maintaining a platform INS in view of available alternative systems, such as ground controller systems, an INS is not included. This result often occurs when the aircraft is only intended for operation over the landmass of a highly technological country, such as the United States.

As will be readily appreciated by those skilled in the inertial navigation art, a platform INS is expensive because it includes a number of gyros and accelerometers mounted close together on a small platform, which is rotationally decoupled from the structure of the aircraft by a set of at least three gimbal pivots. The gimbals allow the platform to be held in any preferred orientation (e.g., local level) independent of the angular motion of the vehicle. Not only do platform INSs have the disadvantage of being individually very expensive to produce and maintain but because of the redundancy requirements of many aircraft (such as commercial transport aircraft), not they have the further disadvantage that one but several expensive INS systems are normally required. As a result, the total INS costs are increased by the number of INSs required in a particular type of aircraft.

In view of the costs associated with platform INSs, proposals have been made to produce strapdown INSs (i.e., INSs wherein the sensing accelerometers and gyros are affixed to the vehicle) suitable for use in aircraft. However, while strapdown INSs have found widespread use in missiles, in the past for various reasons they have not been found acceptable for use onboard aircraft. In general, missile systems have been found to be unsuitable for use onboard aircraft because the navigation requirements of aircraft and missiles are substantially different. For example, aircraft INSs must remain reliable over long periods of continuous use, whereas missile INSs only require short lived precision. In this regard, INS errors are a direct function of time and distance. More specifically, INS errors are usually defined in terms of miles of position error per hour of travel. Because INS error is a function of time, an INS used on a vehicle (aircraft) that travels at a relatively low speed compared to other vehicles (missiles) must be substantially more accurate. As a result, strapdown INSs usable on missiles are generally unsuitable for use on aircraft.

Therefore, it is an object of this invention to provide a new and improved aircraft avionic system.

It is a further object of this invention to provide a strapdown INS suitable for use on an aircraft.

It is another object of this invention to provide a strapdown INS suitable for producing data similar to that produced by a platform INS and of equal or better accuracy and reliability.

It is also an object of this invention to provide an INS that includes a plurality of strapdown gyros and accelerometers whose sense axes are skewed to achieve higher effective redundancy and, thereby, higher reliability at lower cost.

Another difficulty with prior art avionic systems that include one or more INSs is that the INSs are not integrated with other aircraft sensing systems, such as air data sensors and temperature sensors, even though the information produced by these sensors is often used by the automatic flight control, pilot display and navigation systems of the aircraft in conjunction with the inertial information produced by INSs. It would be desirable to integrate these sensor systems together in order for the electronic subsystems (both interface and data processing) to be used in the most efficient manner so that overall costs are reduced.

Therefore, it is a still further object of this invention to provide an avionic system that integrates INS information with the information produced by other aircraft sensors.

It is yet a further object of this invention to provide a new and improved aircraft avionic system that includes a strapdown INS and integrates the information produced by the strapdown INS with information produced by other aircraft sensors in a manner such that a common set of sensors supply data to various aircraft subsystems and unnecessary duplication of sensors resulting from the inclusion of subsystem dedicated sensors is avoided.

SUMMARY OF THE INVENTION

In accordance with this invention, an integrated-strapdown-air-data sensor (ISADS) system is provided. The preferred form of an ISADS system formed in accordance with the invention comprises a plurality of inertial measuring unit (IMU) modules, a plurality of air data sensor (pressure transducer) modules and a plurality of total air temperature (TAT) sensors selectively connected to a plurality of independent signal processors. Each IMU module includes gyros and accelerometers for sensing the angular rate and linear acceleration of the aircraft in which the system is mounted. The accelerometers and gyros are strapped down (i.e., affixed to the aircraft). Preferably, each IMU module includes a two-degree-of-freedom (TDF) gyro, such as a dry, tuned-rotor gyro, or two orthogonally mounted single-degree-of-freedom (SDF) gyros, such as laser gyros, and two orthogonally mounted SDF accelerometers. The signal processors receive the raw inertial data (and temperature data) produced by the IMU modules, the pressure data produced by the pressure transducer modules and the temperature data produced by the TAT sensors. The signal processors each include an interface that produces necessary control signals for the IMU modules. The signal processor interfaces also convert data produced by the IMU modules, the pressure transducer modules and the TAT sensors, into common digital form; and, multiplex the digital information with stored data related to the error creating idiosyncrasies of the IMU modules—gyro mass unbalance data, for example. The data conversion and multiplexing functions of each signal processor are controlled by an instruction decoder, which in turn is controlled by a computer, both of which form part of the signal processor. Each computer includes a central processing unit that compensates the raw inertial data for various sources of error and produces signals suitable for use by automatic flight control, pilot display navigation subsystems. More specifically, in addition to the inertial, pressure and temperature data, the central processing unit receives data from a memory that stores constants and other data that are also needed to error compensate the raw gyro/accelerometer data. In this regard, the raw gyro data is compensated for scale factor, dynamic, bias, and mass unbalance errors. In addition, the raw gyro data is compensated for errors caused by temperature variations. The accelerometer data is error compensated for bias and scale factor errors, and for temperature variations. Further, the central processing unit compensates the gyro and accelerometer data for misalignment errors, i.e., errors created by misalignment between the relative orientation of the sense axes of the gyros and accelerometers and for the skewed orientation of these sense axes relative to the pitch, roll and yaw axes of the aircraft. The central processing unit also transforms accelerometer data from body coordinate form to navigational coordinate form; and, determines the velocity of the aircraft in navigational coordinates. Further, the central processing unit continually determines the attitude and position of the aircraft; and, produces output signals suitable for use by the automatic flight control, pilot display and navigational subsystems of the aircraft. In particular, the central processing unit produces roll, pitch, heading, longitude, latitude and wander azimuth signals, as well as body oriented angular rate signals (based on gyroscope information) and body oriented acceleration signals (based on accelerometer information).

In addition to error compensating and manipulating the raw inertial data, the central processing unit, during a self-alignment sequence occurring prior to takeoff, determines the values of the elements of a matrix, identified as the [B] matrix, that relates body and navigational coordinate information. Further, if desired, the latitude of the aircraft can be determined during the self-alignment sequence, provided the aircraft is a predetermined distance from the equator. Alternatively, or if the aircraft is too near the equator, the latitude value is inserted by the pilot.

The central processing unit also error compensates the raw pressure data; and, manipulates the compensated pressure data to produce altitude, indicated airspeed, mach and corrected static and dynamic pressure signals that are applied to the automatic flight control, pilot display and navigational subsystems, as required. Finally, the central data processing unit error compensates the raw total air temperature data and produces a compensated total air temperature signal that is applied to the automatic flight control, pilot display and navigational subsystems, as necessary.

It will be appreciated from the foregoing summary that an ISADS system formed in accordance with the invention has a number of advantages. Specifically, using a strapdown INS, rather than a platformm INS, and allowing the inertial instrument (gyro and accelerometer) sense axes of the IMUs to be skewed relative to each other results in the low cost generation of inertial data. A skewed axis system requires 50 percent fewer gyros and accelerometers than a conventional orthogonal-axis system, yet achieves a higher equivalent level of redundancy. In addition to the cost reduction attendant to the use of a fewer number of gyros and accelerometers (and the elimination of a gimballed platform), the use of fewer inertial instruments results in an electronic interface cost reduction and lower overall maintenance costs. Further, the use of IMU modules allows the Federal Aviation Administration (FAA) requirement of physically separate instrument modules to be readily met. That is, the FAA requires that transport aircraft include dual independent sources of attitude and heading information. The use of physically separated IMU modules allows this requirement to be easily met even though the requirement for rigid alignment between modules places some practical limitations on physical separation.

Not only is a low-cost INS provided by the invention, the utilization of strapdown gyros and accelerometers allows the same inertial instruments to be used to produce flight control and display signals, as well as navigation display and guidance signals, whereby duplicate sensors and interfaces are eliminated.

Further, the modular approach of the ISADS system of the invention results in cost reduction because modules can be standardized. Standardization results in decreased costs by increasing the competition and production volume of standardized parts. As a result, purchasers need not become "locked in" to one supplier of expensive sophisticated inertial equipment. Further, inventory costs drop because low-cost standard modules can be stocked, rather than a variety of different and costly complete inertial systems. While each module may differ slightly, as noted above, such idiosyncrasy data is compensated for in the central processing unit. In this regard, preferably, module idiosyncrasy data is stored in module related memories such as programmable read-only memories (PROMs). A module related PROM may form part of the module or may form a separate element. If combined with the module, idiosyncrasy data is automatically made available to the computer when the module is installed. If in a separate unit, the separate unit must be installed at the same time as the module in order for the idiosyncrasy data to be available along with the module data.

Preferably, the IMU modules do not contain temperature controlled environments. Rather, as noted above, IMU module temperature is sensed and the sensed information is utilized by the central processing unit to temperature compensate the raw inertial data produced by the IMU modules. If this preferred approach is used, quicker self-alignment is provided because instrument warm-up time is eliminated. In addition, the mean time between failure (MTBF) of the inertial module electronics is improved because junction operating temperatures are reduced. Also, costs are reduced because inertial module heaters and forced cooling air systems are not required. In addition, the bearing life of tuned rotor gyros (if used) is improved because of the lower average operating temperature that occurs.

In addition to the foregoing, the ISADS system has the advantage that an elaborate control display unit (CDU) normally supplied as part of a platform INS is not needed. Such a CDU is not needed because neither initial longitude nor initial latitude information have to be manually inserted in many instances. If latitude information must be inserted such as when the aircraft is near the equator, an uncomplicated input switch system can be used. Further, a CDU is also not needed because neither the air data nor the basic inertial navigation alignment and navigation computation format are subject to missionoriented changes. The elimination of the CDU is advantageous because valuable space in the usually all-too-congested flight deck is not taken up by a CDU. The ISADS system also results in making compass system hardware unnecessary because a computed magnetic heading can be provided by the ISADS system based on true heading and magnetic variation, which is a function of the present position of the aircraft. In other words, compass system information is provided by the ISADS system, but at a fraction of the cost of a compass system. Moreover, computed magnetic heading is unaffected by magnetic storms or local magnetic anomalies.

Integrating the air data with inertial data, particularly where the air data is provided by module air data transducers, has a number of advantages. As will be readily recognized by those skilled in the art, air data and certain inertially derived data (i.e., aircraft attitude and heading) are dispatch-required functions, requiring dual redundant systems on commercial transport aircraft. Integrating the air data with the inertial data eliminates at least two small computers from present aircraft, and significantly improves the air data. For example, barometric altitude rate ($\dot{H}_b$) is typically a very noisy air data signal, despite the best efforts of central air data computer manufacturers. In a typical digital central air data computer system, both the air data transducer counter resolution and the maximum computer iteration rate are dictated by $\dot{H}_b$ performance requirements. In order for $\dot{H}_b$ to meet the requirements of flight control systems, flight control systems often include a body-mounted normal accelerometer that is used to improve $\dot{H}_b$ by complementary filtering. Because the ISADS system includes strapdown sensors that make redundant measurements of vertical acceleration, a complementary filtered altitude rate ($\dot{H}_c$) can be furnished without additional accelerometers, if desired. Air data and inertial data integration also reduces the maximum air data computation rate and the air data transducer counter resolution requirements. Thus improved air data performance is obtained from an ISADS system at approximately half the cost of a typical digital central air data computer furnishing the same air data derived information.

The ISADS can also be utilized to eliminate the errors in standard vertical-rate-of-climb indicators caused by the inability of the indicator's selfcontained accelerometer to differentiate between vertical acceleration and the centripetal acceleration produced during a co-ordinated turn.

The use of pressure transducer modules, which produce an electrical signal output in digital form and which can be installed near pitotstatic probes, has the advantage that the many feet of pneumatic tubing presently used in aircraft can be replaced with electrical wire at a weight saving of approximately one-half the replaced tubing weight. Also dozens of different types of clips normally used in tubing installations are eliminated. Further, relatively short tubing links between the probes and the modules alleviate the air data water ingestion problem that presently exists. Moreover, the data lag associated with mass flow is reduced because the transmission of electrical signals is substantially faster than the transmission of information through a pneumatic tube.

Finally, the ISADS computer can use conventional digital data buses to transmit information to and receive information from the computer. The utilization of digital data buses minimizes aircraft wiring and the weight associated therewith.

It will be appreciated from the foregoing summary that an ISADS system formed in accordance with the invention eliminates many of the disadvantages of prior art avionic systems directed to providing the same information plus has additional advantages that cannot be achieved by such systems. Because the ISADS integrates air data and inertial data, many independent sensing and calculating devices can be eliminated. As a result, costs are substantially reduced. Moreover, the elimination of such items, plus the utilization of electrical wires in place of tubes, reduces weight. Reductions in weight, of course, increase the payload that can be carried by the aircraft. In essence, the ISADS produces inertial navigation information, plus all of the information normally produced in aircraft that do not now include an INS at approximately the same cost as the non-INS inertial hardware that is replaced. That is, in essence, INS information is provided at no additional cost when an ISADS system is incorporated in an aircraft, such as a commercial transport aircraft.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 7 is a block diagram of a gyro servo-loop network suitable for use in the gyro subsystem illustrated in FIG. 4;

FIG. 8 is a block diagram of a compensation circuit suitable for use in the gyro servo-loop network illustrated in FIG. 7;

FIG. 9 is a block diagram of a gyro interface multiplexer suitable for use in the gyro subsystem illustrated in FIG. 4;

FIG. 11 is a block diagram of a V/F converter and polarity control suitable for use in the gyro control and signal converter network illustrated in FIG. 10;

FIG. 12 is a timing diagram used to illustrate the operation of a portion of the V/F converter illustrated in FIG. 11;

FIG. 13 is a block diagram of one channel of a V/F input polarity switching control suitable for use in the gyro control and signal converter network illustrated in FIG. 10;

FIG. 26 is a table illustrating a suitable code for instructing the instruction decoder illustrated in FIG. 25;

FIG. 32 is a functional block diagram of a gyro misalignment compensation and averaging of redundant data network forming part of the inertial data processor illustrated in FIG. 27;

FIG. 33 is a function block diagram of an attitude matrix update network forming part of the inertial data processor illustrated in FIG. 27;

FIG. 34 is a functional block diagram of a gravity compensation network forming part of the inertial data processor illustrated in FIG. 27;

DESCRIPTION OF THE PREFERRED EMBODIMENT

ISADS System

Figure 1:
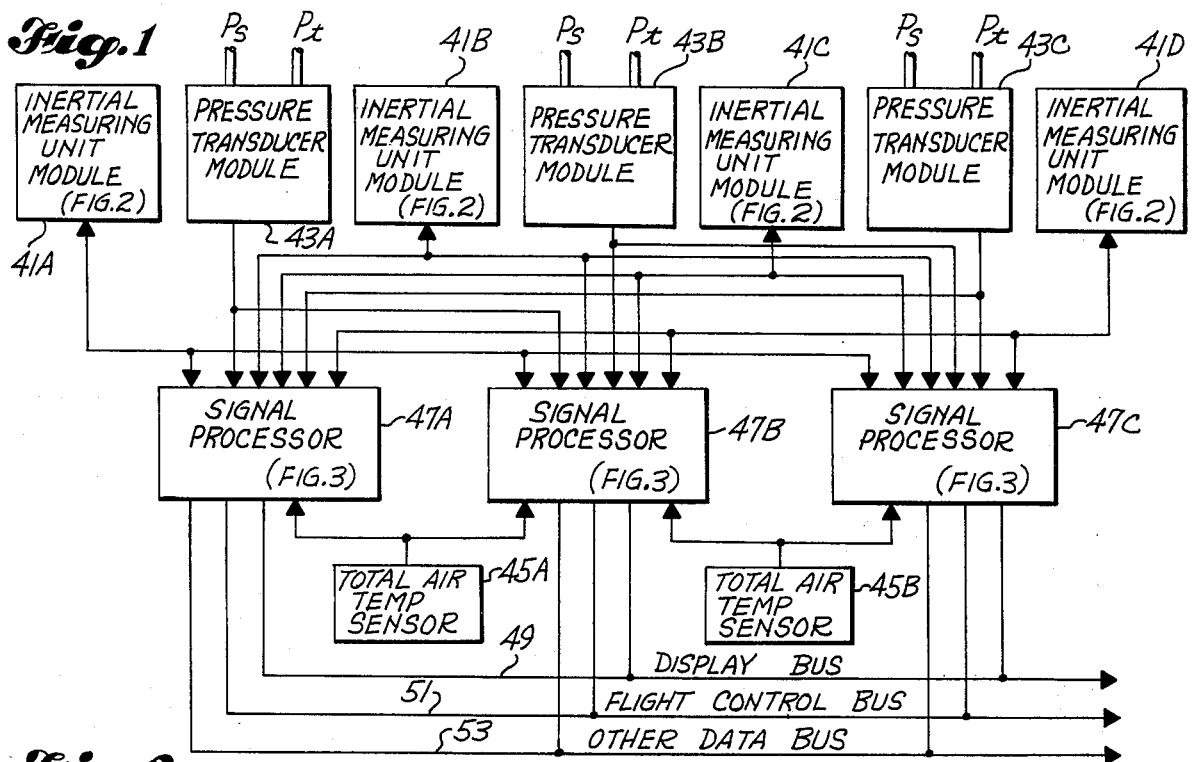
FIG. 1 is a block diagram of a triple redundant, modular, skewed axis, Integrated-Strapdown-Air-Data-Sensor (ISADS) system formed in accordance with the invention.

FIG. 1 is a block diagram of a triple redundant, modular, skewed axis, Integrated-Strapdown-Air-Data-Sensor (ISADS) system formed in accordance with the invention. That is, FIG. 1 illustrates an ISADS system having three redundant signal processing channels each of which receives inertial, pressure and air temperature data signals from different sources. The redundant system illustrated in FIG. 1 has the capability (via a "voting" arrangement, not shown) of comparing received and/or processed data in order to eliminate data that is clearly erroneous. While FIG. 1 illustrates a triple redundant, modular, skewed axis ISADS system, only a single channel ISADS system is illustrated in the remaining figures and described in detail. The invention is described in this manner in order to make the invention more easily understandable by eliminating unnecessary detail and to illustrate that the invention will also function as a single channel ISADS system. In this regard, rather than being triple redundant, if desired, a dual redundant ISADS system can be provided in accordance with the invention.

The triple redundant, modular, skewed axis ISADS system illustrated in FIG. 1 comprises: four inertial measuring unit (IMU) modules 41A, 41B, 41C, and 41D; three pressure transducer modules 43A, 43B, and 43C; two total air temperature sensors 45A and 45B; and, three signal processors 47A, 47B, and 47C.

As will be better understood from the following discussion, the IMU modules each include accelerometers and gyros, preferably two accelometers and one two-degree-of-freedom gyro or two single-degree-of-freedom gyros. The IMU modules 41A, 41B, 41C and 41D are illustrated as connected to all of the signal processors 47A, 47B and 47C. As described in more detail hereinafter, each signal processor receives acceleration and gyro data along three orthogonal axes that are nominally related to the pitch, roll and yaw axes of the aircraft within which the invention is mounted. While nominally related to the pitch, roll and yaw axes of the aircraft, preferably, the actual orientation of the sense axes of the IMU modules are skewed with respect to one another. As necessary, the signal processors apply control signals and power to the IMUs. In this regard, while single signal wires are illustrated in FIG. 1 as connecting the IMUs to the signal processors, as will be better understood from the following description, the single wires are used to avoid making the drawing unnecessarily complicated and actually a plurality of interconnecting wires are used to make the necessary connections. In this same regard, only the IMUs actually providing data to a signal processor need be connected to a specific signal processor, unless the actual system is designed such that a signal processor can receive data from any IMU chosen to provide data.

The first pressure transducer module 43A is connected to the first and second signal processors 47A and 47B. The second pressure transducer module 43B is connected to the second and third signal processors 47B and 47C. And, the third pressure transducer module 43C is connected to the first and third signal processors 47A and 47C. The first total air temperature sensor 45A is connected to the first and second signal processors and the second total air temperature sensor 45B is connected to the second and third signal processors 47B and 47C. Again, these connections are only exemplary and can be varied as necessary. Each pressure transducer module includes two pressure transducers. One pressure transducer receives static (Ps) pressure information and the other receives total (Pt) pressure information in a manner well known in the aircraft air data system art. The analog pressure information is converted into pulse train form by the pressure transducers. That is, the pressure transducers convert the pressure information they receive into electrical signal form (specifically pulse train electrical signal form) at the location of the pressure transducer modules. Pressure transducers suitable for detecting static or total pressure and converting the detected pressures into pulse form are sold by the French Company Crouzet, whose United States distributor is Jeteca U.S.A.-France, 150 S. Los Robles Ave., Pasadena, CA., under the product identication Type 44. The total air temperature sensors, as is also well known in the aircraft display and control art sense the temperature of the air at the skin of the aircraft and provide an output in analog form.

The outputs of the signal processors are connected to three data buses denoted DISPLAY BUS 49, FLIGHT CONTROL BUS 51 and OTHER DATA BUS 53. These buses are connected to the various display, flight control and other data utilizing systems of the aircraft within which the ISADS system is mounted.

In operation, the IMU modules, pressure transducer modules and total air temperature sensors produce inertial, air and temperature data that is processed by the signal processors. Each signal processor includes an interface system that conditions the received data and puts it into a form suitable for use by the central processing unit of a computer as will be better understood from the following description. The computer via an instruction decoder controls the receipt of data and the central processing unit processes the received inertial, air and temperature data and produces aircraft usable signals. The produced signals are used to control pilot navigational displays, and other displays, as well as certain aircraft functions, in a manner similar to the manner that signals produced by inertial, air and temperature sensors are presently used.

IMU Module

Figure 2:
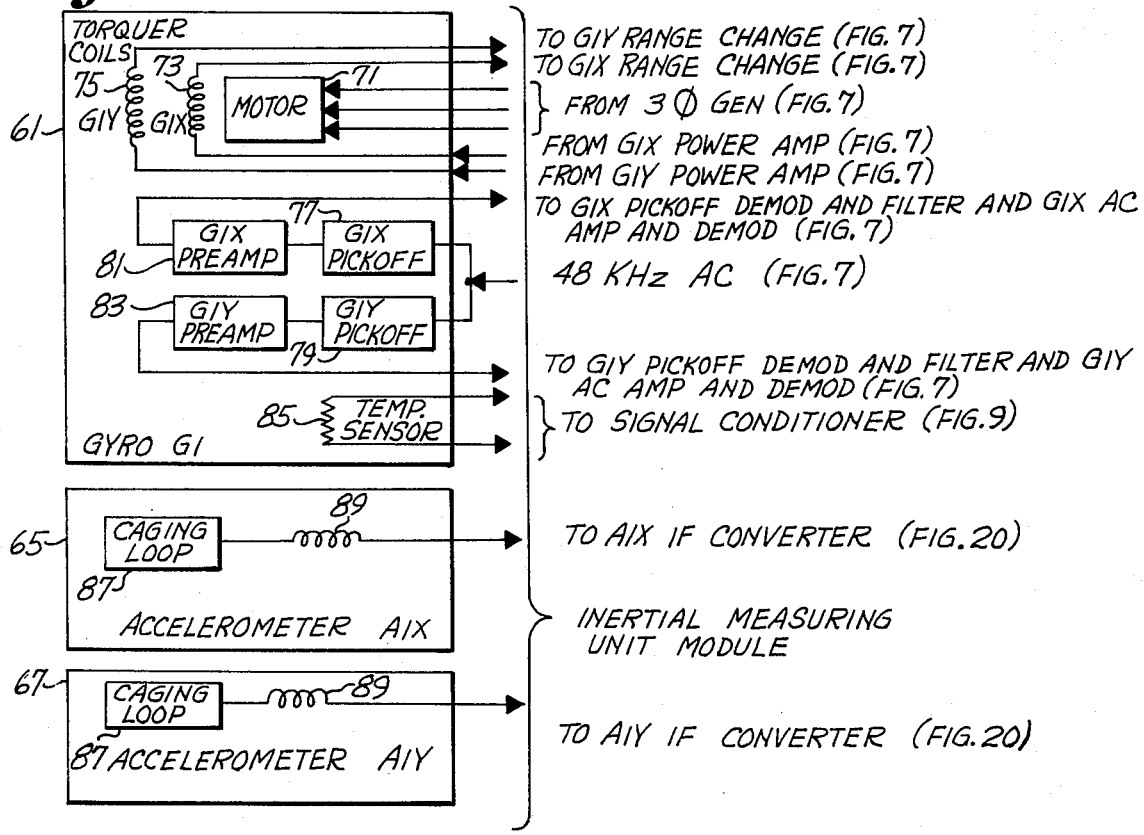
FIG. 2 is a partially block and partially schematic diagram of an inertial measuring unit (IMU) module suitable for use in the ISADS system illustrated in FIG. 1.

FIG. 2 is a partially block and partially schematic diagram of an IMU module and comprises: a dry, tuned-rotor two-degree-of-freedom gyroscope 61 designated G1 for signal identification purposes; and, two accelerometers 65 and 67 designated A1X and A1Y for signal identification purposes. The gyro 61 includes: a three phase motor 71; a first axis torquer coil 73 designated G1X for information identification purposes; a second axis torquer coil 75 designated G1Y for information identification purposes; G1X and G1Y pickoff coils 77 and 79; G1X and G1Y preamplifiers 81 and 83; and, a temperature sensor 85. Each of the accelerometers include a caging loop 87 and a rebalance coil 89. Preferably the accelerometers are mounted so as to sense acceleration along a corresponding sense axis of the gyro. As a result, since the gyro sense axes are orthogonal, the accelerometer sense axes are orthogonal, i.e., X-Y.

With respect to information identification, in this and the IMU related portion of the signal processor interface parts of this description a letter-number-letter code is used. The first letter identifies the nature of the IMU information, i.e., gyro (G) or accelerometer (A). The number identifies the module, i.e., first (1), second (2), etc. The second letter identifies the sense axis, i.e., X or Y. Thus, G1X stands for an information sensed along the X axis of the gyro of the first IMU module. When the letter-number-letter identification is used in conjunction with a circuit or subsystem, the circuit or subsystem acts on, or in some other way relates to, the information denoted by the letter-number-letter identification code. Contrariwise, in the inertial data processor portion of this description, the foregoing nomenclature is changed to one wherein the inertial signals are identified in accordance with the nominal aircraft axes to which they are related.

The three phase motor 71 of the gyor 61 receives power from a three phase generator illustrated in FIG. 7 and hereinafter described. The G1X axis torquer coil 73 is powered by a G1X power amplifier and the G1Y axis torquer coil 75 is powered by a G1Y power amplifier, both illustrated in FIG. 7 and hereinafter described. Signals denoting the magnitude of the currents applied to the G1X and G1Y axis torquer coils 73 and 75 are applied to C1X and G1Y range change circuits also illustrated in FIG. 7 and hereinafter described. In this regard the "line" diagram of the application of power to the torquer coils of FIG. 2 is descriptive and not intended to show the exact manner of connection, which is well known to those familiar with dry, tuned-rotor type gyroscopes.

The G1X and G1Y pickoff coils 77 and 79 receive an AC signal at a suitably frequency, such as 48 KHz. A generator suitable for producing an AC signal of the appropriate frequency is illustrated in FIG. 7 and hereinafter described. The output of the G1X pickoff coil 77 is applied to the G1X preamplifier 81 and the output of the G1X preamplifier 81 is applied to a G1X AC amplifier and demodulator and to a G1X pickoff demodulator and filter, both illustrated in FIG. 7. The output of the G1Y pickoff coil 79 is applied to the G1Y preamplifier 83 and the output of the G1Y preamplifier is applied to a G1Y Ac amplifier and demodulator and to a G1Y pickoff demodulator and filter, also illustrated in FIG. 7. The temperature sensor 85, which may, for example, comprise a temperature sensitive resistor is connected to a signal conditioner illustrated in FIG. 9 and hereinafter described.

Since the operation of dry, tuned-rotor two-degree-of-freedom gyros is well-known, to those familiar with such gyros, only a brief description of their operation is presented here. In this regard, in a conventional manner, the three-phase power produced by the three-phase generator causes the motor 71 to spin the gyro mass at a predetermined rate. When torque is applied to the gyro mass along one of its sense axes, the related G1X and G1Y pickoff coil senses the precession of the gyroscope and modulates the 48 KHz signal. The modulated signal is amplified by the related preamplifier and, via the control system illustrated in FIG. 7 and hereinafter described, causes a counteracting torque to be applied by the torques coils, G1X and G1Y. The power applied to create the counteracting torque is directly proportional to the torque applied along the sense axis and, of course, inversely proportional to the angular momentum of the spinning mass of the gyroscope. An example of a suitable two-degree-of-freedom gyroscope is the Model SDG-5, sold by Teleydyne Systems Inc. of Northridge, California. As an alternative, the two-degree-of-freedom gyro could be replaced by two single-degree-of-freedom gyroscopes. Such gyros could take the form of laser gyros, for example.

The accelerometers are also conventional and may take a variety of forms. For example, they may be a Model 4841 sold by the Systron Donner Corporation of Concord, California. The accelerometers each include a movable siesmic mass. When the seismic mass moves as a result of an acceleration along the sensing axis of the accelerometer, compensating power is applied to a rebalance coil 89. The rebalance coil current is, thus, directly related to the acceleration applied to the seismic mass. A caging loop 87 creates the rebalance coil current and includes a pickoff that detects seismic mass movement. The pickoff, in turn, controls the application of rebalance current to the rebalance coil 89.

As noted above, the sensing axes of the various IMU modules are, preferably, skewed with respect to one another. That is, the IMU module sense axes do not lie along (or parallel to) each other, even though each senses along orthogonal X-Y axes. Rather, the IMU module sense axes are skewed with respect to one another. A skewed axis system is preferable to an orthogonal module axis system because a skewed axis system requires 50 percent fewer gyros than an orthogonal axis system, i.e., a system wherein the sensing axes are parallel, yet achieves a higher equivalent level of redundancy. Because fewer inertial instruments are required, less electronics, fewer interfaces, lower maintenance costs and substantially lower initial costs are required. The reduction in inertial instruments is of particular significance in the present invention because the gyroscopes and the associated electronics and computer system for manipulating the electronics are the dominant costs in an ISADS system.

Signal Processor

Figure 3:
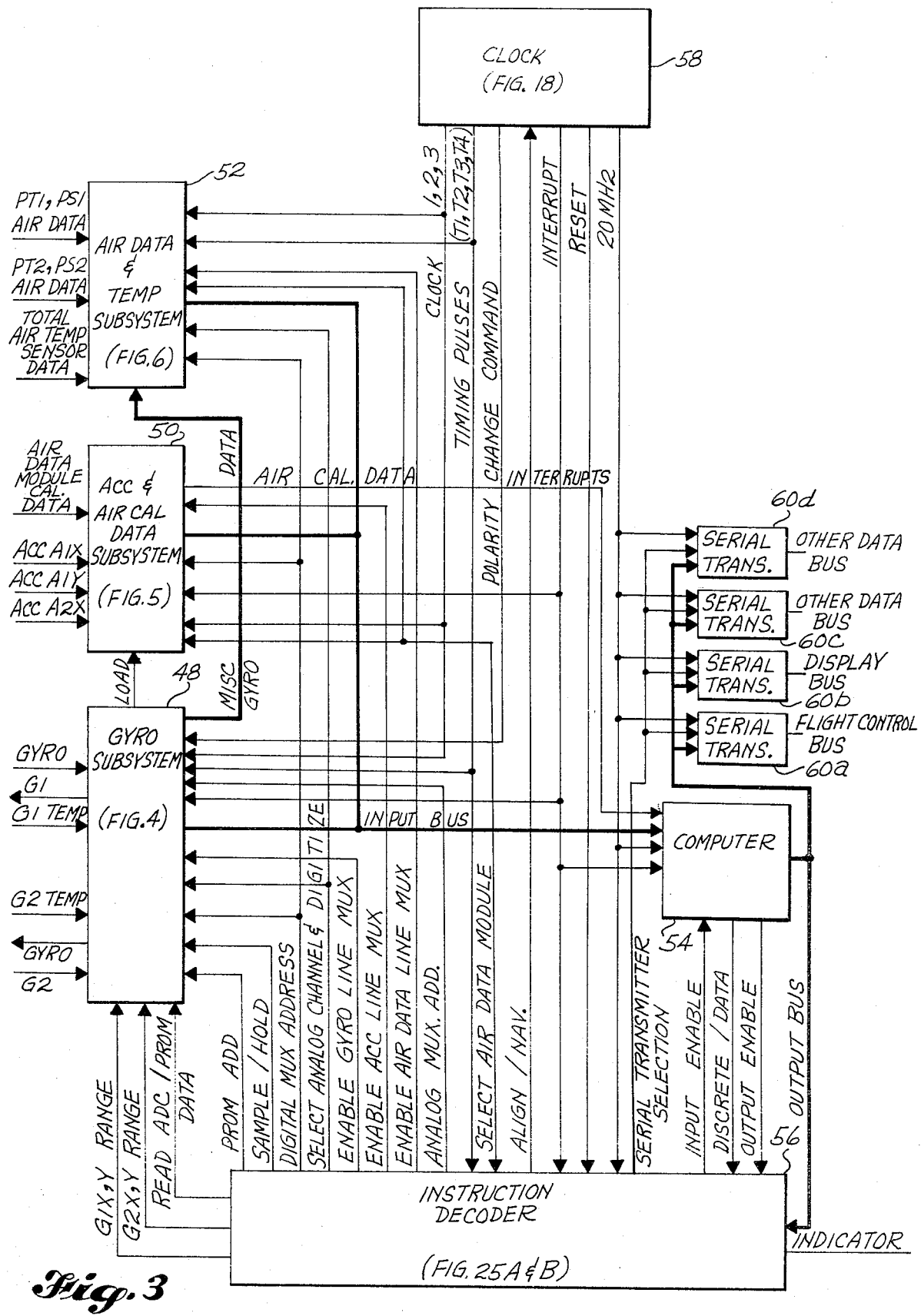
FIG. 3 is a block diagram of a signal processor suitable for use in the ISADS system illustrated in FIG. 1.

FIG. 3 is a block diagram of a single signal processor suitable for use in forming an ISADS system in accordance with the invention and comprises: a gyro subsystem 48; an accelerometer and air data subsystem 50; an air data and temperature subsystem 52; a computer 54; an instruction decoder 56; a clock 58; and, four serial transmitters 60a, b, c and d. In essence, the gyro subsystem 48, the accelerometer and air calibration data subsystem 50 and the air data and temperature subsystem 52, plus the instruction decoder 56, form a signal processor interface system that converts raw analog and other data into digital form and transfers this data plus calibration and idiosyncrasy data to the computer in accordance with instructions produced by the computer. The clock 58 provides necessary system timing. The computer 54, in addition to controlling the flow of data it receives, includes a central processing unit that error compensates the raw data and manipulates the compensated data to produce signals on an output bus. The parallel output bus signals are converted into serial signals (by the serial transmitters) that are suitable for use by the automatic flight control, pilot display and navigation systems of the aircraft. The following description sets forth in detail how these results are accomplished.

Gyro Subsystem

Figure 4:
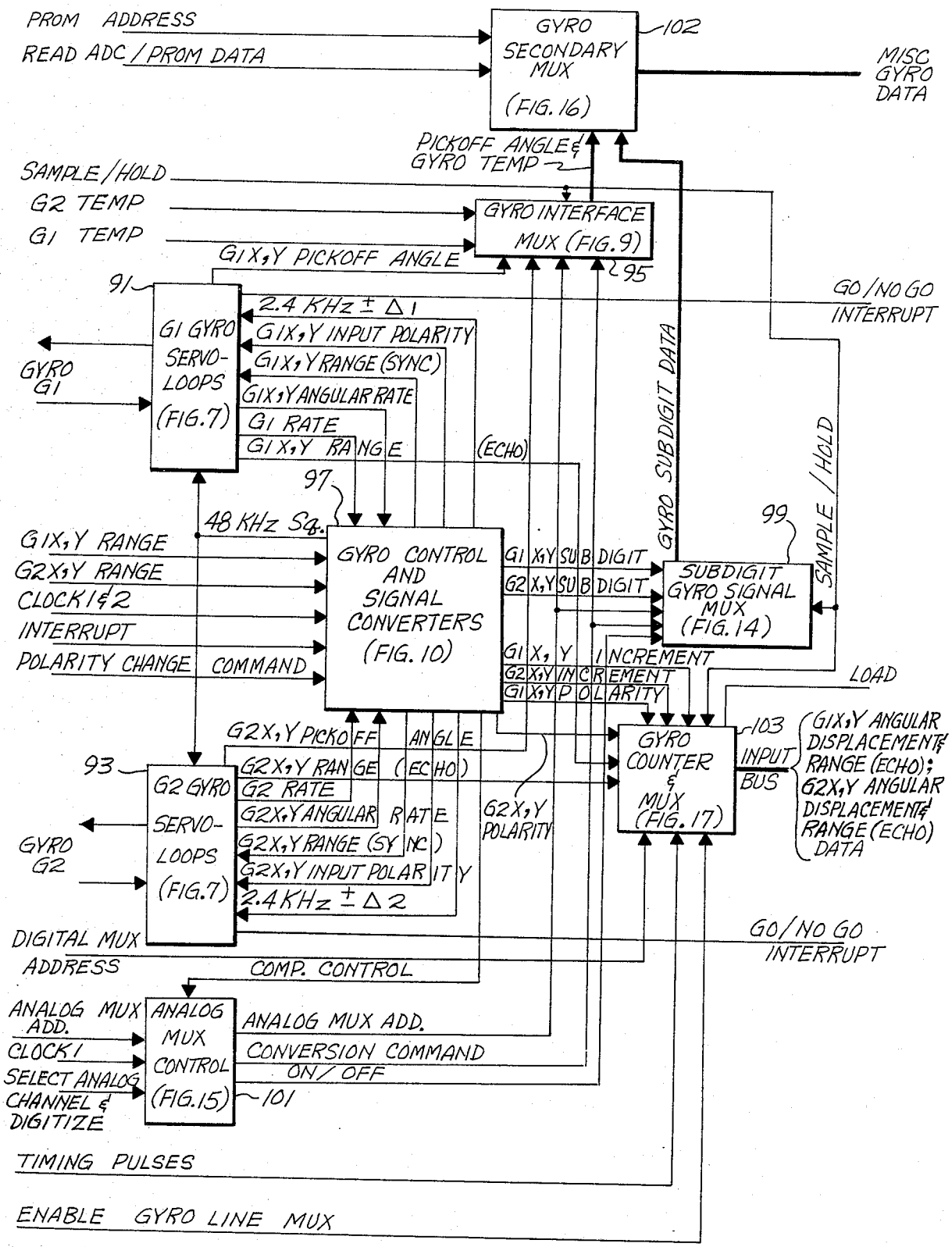
FIG. 4 is a block diagram of a gyro subsystem suitable for use in the signal processor illustrated in FIG. 3.

A gyro subsystem suitable for use in the signal processor illustrated in FIG. 3 is illustrated in FIG. 4 in detail and comprises: first and second gyro servo-loop networks 91 and 93; a gyro interface multiplexer 95; a gyro control and signal converter network 97; a subdigit gyro signal multiplexer 99; an analog multiplexer control 101; a gyro secondary multiplexer 102; and, a gyro counter and multiplexer 103. All of these subsystems are described below and illustrated in the various figures noted in their respective blocks in FIG. 4. Prior to describing these subsystems in detail a summary description of the operation of the gyro subsystem (and the accelerometer and air calibration data and the air data and temperature subsystems) is set forth.

The gyro servo-loop networks 91 and 93 (FIG. 7) provide power to and function as interfaces between the gyros G1 and G2, respectively, and other circuits of the gyro subsystem illustrated in FIG. 4. In this regard, the gyro servo-loop networks 91 and 93 apply power to the three-phase motors and torquer coils of their respective gyros; and, receive signals from the torquer coils and the gyro preamplifiers. The torquer coil signals (G1X, G1Y, G2X and G2Y) have their range and polarity controlled by suitable range change and polarity switch circuits forming part of the gyro servo-loop networks. The networks 91 and 93 produce torquer angular rate signals and range signals denoting the range of the torquer angular rate signals, which are applied to the gyro control and signal converter network 97 and the gyro counter and multiplexer 103, respectively. Also, the gyro preamplifier signals are demodulated by the servo-loop networks and used to control the power applied to the gyro torquer coils. In addition, pickoff angle signals are applied to the gyro interface multiplexer 95.

The gyro interface multiplexer 95 (FIG. 9) also receives temperature signals generated by the temperature sensors of the gyros. The gyro interface multiplexer multiplexes its analog input signals, digitizes the result and applies the digital multiplexed result to the gyro secondary multiplexer 102.

The gyro control and signal converter network 97 (FIG. 10) converts the torquer angular rate signals produced by the gyro servo-loop networks 91 and 93, which are in voltage analog form, into digital signals (increment pulses) having a frequency related to the current of the angular rate signals. In addition, the gyro control and signal converter network 97 receives control signals from the instruction decoder 56 and timing signals from the clock 58 and, in accordance therewith, synchronizes and controls the range and polarity switchings of the range change and polarity switch circuits of the first and second gyro servo-loop networks 91 and 93. The gyro control and signal converter network also synchronizes other subsystems; and, includes wheel speed modulation circuits that produce signals adapted to control the three phase generators that power the motors of the gyroscopes, as hereinafter described in more detail.

The subdigit gyro signal multiplexer 99 (FIG. 14) merely multiplexes subdigit (overflow) gyro angular rate data, which is in analog form. The multiplexed subdigit data is also converted into digital data by the subdigit gyro signal multiplexer.

The analog multiplexer control 101 (FIG. 15) addresses and controls the operation of the analog multiplexers, which include the gyro interface multiplexer 95 and the subdigit gyro signal multiplexer 99. In the case of the subdigit gyro signal multiplexer, the analog multiplexer control also controls whether or not the produced digital data is forwarded as produced or in complement form. The addressing and control action determines the identity of the signals on the output lines of the multiplexers and is based on control signals received from the instruction decoder 56.

The gyro secondary multiplexer 102 (FIG. 16) receives the digital, multiplexed pickoff angle and gyro temperature data produced by the gyro interface multiplexer 95 and the digital, multiplexed subdigit data produced by the gyro signal multiplexer 99. This gyro data is multiplexed with digital data stored in a programmable read only memory (PROM) and the resultant MISCELLANEOUS GYRO DATA is applied to the air data and temperature subsystem 52 where it is multiplexed with other data. The PROM data relates to conversion constants and other "individualizing" data (generally referred to hereinafter as idiosyncrasy data) related to the particular gyros and accelerometers of the IMU modules producing the signals being forwarded to the computer.

The gyro counter and multiplexer 103 (FIG. 17) receives the digitized gyro torquer angular rate (increment) signals and their related polarity and range (echo) signals. The increment and polarity signals are utilized to control the state of up/down counters. The outputs of the up/down counters are combined with the range (echo) signals and the resultant digital data is multiplexed and applied to the computer 54 via its input bus.

Accelerometer and Air Calibration Data Subsystem

Figure 5:
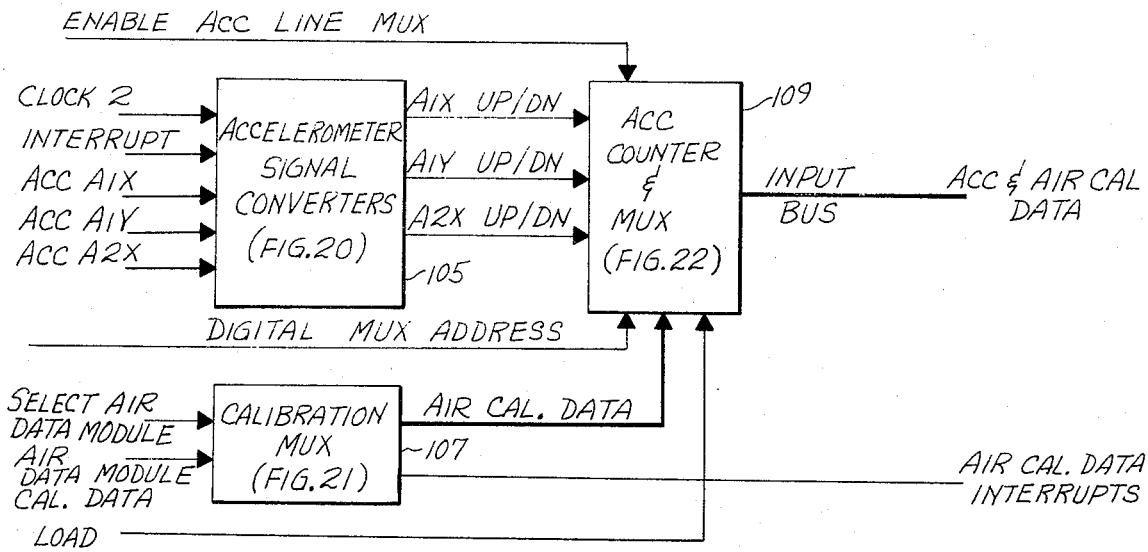
FIG. 5 is a block diagram of an accelerometer and air calibration data subsystem suitable for use in the signal processor illustrated in FIG. 3.

An accelerometer and air calibration data subsystem suitable for use in the signal processor illustrated in FIG. 3 is illustrated in FIG. 5 and comprises: accelerometer signal converters 105; a calibration multiplexer 107; and, an accelerometer counter and multiplexer 109. Illustrations of preferred embodiments of these circuits are set forth in FIGS. 20, 21 and 22, respectively, and described below in detail. Only a brief description of the general operation of these circuits is set forth here.

The accelerometer signal converters 105 (FIG. 20) receive the accelerometer current rebalance signals. These accelerometer signals are converted from analog form into pulse form and the results are applied to the accelerometer counter and multiplexer 109 (FIG. 22) wherein the pulses control the state of up/down counters. The outputs of the up/down counters are multiplexed with data produced by the calibration multiplexer 107 (FIG. 21). The calibration multiplexer 107 merely multiplexes digital calibration data received from the air data (pressure) modules, which is hereinafter described in more detail in the following description of the air and temperature data processor illustrated in FIG. 45. In addition, the calibration multiplexer produces AIR CALIBRATION DATA interrupts also hereinafter described in detail. The multiplexed output of the accelerometer counter and multiplexer 109 is applied to the computer 54 via its input bus.

Air Data and Temperature Subsystem

Figure 6:
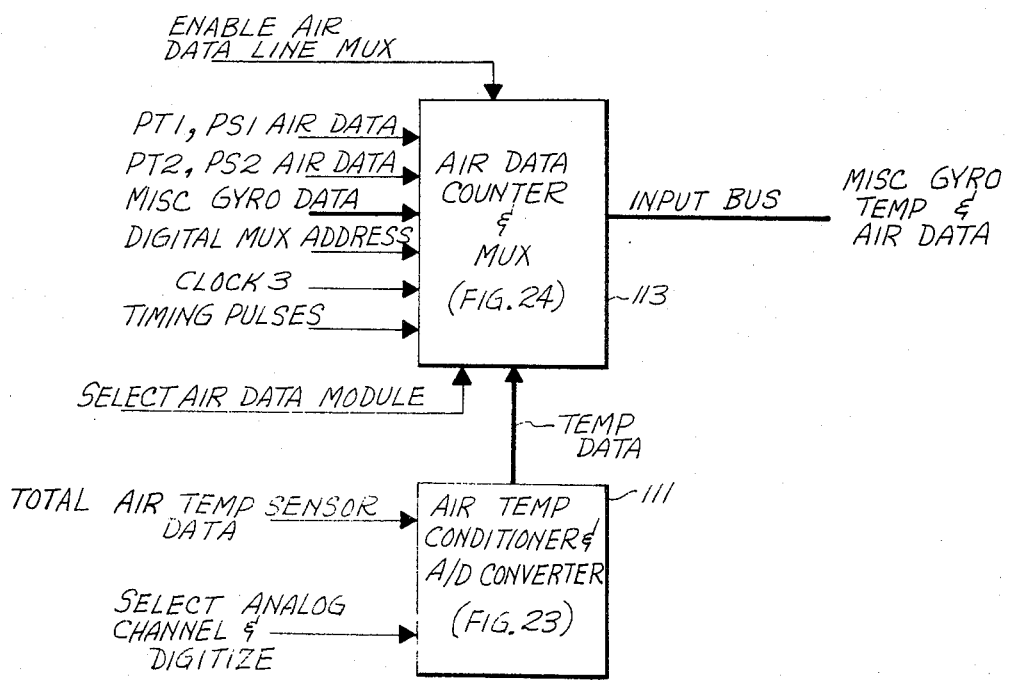
FIG. 6 is a block diagram of an air data and temperature subsystem suitable for use in the signal processor illustrated in FIG. 3.

An air data and temperature subsystem suitable for use in the signal processor illustrated in FIG. 3 is illustrated in FIG. 6 and comprises: an air temperature conditioner and analog-to-digital converter 111; and, an air data counter and multiplexer 113. Block diagrams of preferred embodiments of these circuits are set forth in FIGS. 23 and 24, respectively, and described below in detail. Only brief description of the general operation of these circuits is set forth here.

The air temperature conditioner and analog-to-digital converter 111 (FIG. 23) receives the total air temperature data produced by one of the total air temperature sensors 45A or 45B and, in accordance with control signals produced by the instruction decoder 56, converts the analog temperature data into digital data. The digital data is applied to the air data counter and multiplexer 113 (FIG. 24), which also receives the PT1, PS1, PT2, and PS2 digital air pressure data produced by the related pressure transducer modules. The digital pulses produced by the pressure transducer modules are counted and multiplexed with the MISCELLANEOUS GYRO DATA produced by the gyro secondary multiplexer and the temperature data produced by the air temperature conditioner and A/D converter. The resultant multiplexed digital data is applied to the computer 54 via its input bus.

Instruction Decoder, Computer and Clock

The instruction decoder 56 (FIG. 25A and B) receives instructions from the computer 54 via its output bus and, in accordance therewith, produces a variety of control signals including multiplexer address signals, G1X, Y and G2X, Y range signals, polarity change command signals, etc., more fully described hereinafter. These signals in combination with timing signals produced by the clock 58 control the flow of data from the gyro subsystem 48, the accelerometer and air calibration data subsystem 50 and the air data and temperature subsystem 52 to the computer along a common input bus. That is, the instruction decoder sets up paths that determine what information is to be placed on the common input bus based on computer instructions. These paths are set up during a regularly occurring interrupt period hereinafter described.

The computer receives digital data from the gyro counter and multiplexer 103, the accelerometer counter and multiplexer 109 and the air data counter and multiplexer 113. This digital data is manipulated by a central processing unit, illustrated for ease of description as an inertial data processor (FIG. 27) and a temperature and air data processor (FIG. 45), forming part of (or formed by) the computer to develop output signals suitable for use by aircraft display systems, aircraft navigation systems and other aircraft subsystems. These signals include body angular rate, roll, pitch, heading, longitude, latitude, wander azimuth, body acceleration, velocity, altitude, indicated airspeed, mach, corrected static and total pressure and corrected total air temperature signals and are forwarded to the appropriate display, navigation etc. subsystems via the serial transmitters, 60a, b, c and d.

Gyro Servo-Loop Networks

FIG. 7 is a detailed block diagram of a gyro servo-loop network suitable for use in the gyro subsystem illustrated in FIG. 4 as either the first or second gyro servo-loop network 91 or 93, respectively. Thus, while the letters used in describing FIG. 7 correspond to the first gyro servo-loop network, by suitably changing the letters, the description can be readily "keyed" to the second gyro servo-loop network, which is not separately described.

The gyro servo-loop network illustrated in FIG. 7 comprises: a three phase (3φ) generator 121; G1X and G1Y range change circuits 123 and 124; G1X and G1Y polarity switches 125 and 126; G1X and G1Y AC amplifier and demodulator circuits 127 and 129; G1X and G1Y compensation circuits 131 and 133; G1X and G1Y power amplifiers 135 and 137; a go/no-go detector 139; a pickoff excitation generator 141; and, G1X and G1Y pickoff demodulator and filter circuits 143 and 145.

The three-phase generator 121 receives DC power at some nominal value, such as ±20 V from a suitable power source. The three-phase generator also receives an AC control signal at some predetermined frequency, such as a 2.4 KHz, plus or minus some delta ($\Delta_1$) value. In accordance therewith, the three-phase generator produces three phase power signals at a frequency equal to, or a multiple of, the predetermined frequency plus or minus the delta value. The predetermined frequency plus or minus the delta value control signal is produced by a wheel speed modulation circuit that forms a part of the gyro control and signal converter network illustrated in FIG. 10 and hereinafter described. This control signal is nominally at the predetermined frequency, e.g., 2.4 KHz. When the aircraft within which the IMU module is mounted is stable, the gyro mass is driven at a speed controlled by the nominal value of the predetermined frequency. When the aircraft moves about the spin axis of the gyro mass, the movement is compensated for by a slight (delta) variation in the nominal value of the frequency. As a result, the speed of the gyro mass remains constant in inertial space. A better understanding of the reasons for varying the speed of a gyro mass to maintain it constant in inertial space is set forth in U.S. Pat. No. 4,258,579, entitled "Gyroscope Wheel Speed Modulator" by Guy R. Olbrechts, filed Dec. 19, 1977, which is incorporated herein by reference to the extent necessary to understand the instant invention.

The G1X and G1Y range change circuits 123 and 124 receive the analog angular rate signals produced by the G1X and G1Y torquer coils of the G1 gyro in current form and convert them into voltage form. In addition, the range change circuits may change the range of the received data. The range change circuits are controlled by G1X and G1Y RANGE (SYNC) control signals produced by the gyro control and signal converter network 97 based on instructions from the instruction decoder 56, as hereinafter described. In accordance therewith, the range change circuits produce G1X and G1Y ANGULAR RATE signals, which are applied to the G1X and G1Y polarity switches 125 and 126, respectively, and G1X and G1Y RANGE (ECHO) data signals, which are applied to the gyro control and signal converter network 97, illustrated in FIG. 10 and hereinafter described. More specifically, the RANGE (SYNC) control signals control the range of the G1X and G1Y angular rate signals forwarded to the polarity switches. The RANGE (SYNC) control signals may, for example, cause a range change to occur when a gyro sensed angular rate passes 10°/sec, for example. A range change takes place by adding a resistance in circuit (for removing a resistance) so as to change the angular rate signal being forwarded by some scaled amount, such as ten (10). In essence, the RANGE (SYNC) control signals control a switch whose state (open or closed) determines whether or not the scaler resistor is in or out of the circuit. Switching to an upper range, of course, results in a loss of resolution. Thus, a range change only occurs during rapid aircraft direction changes, which occur seldom. The RANGE (ECHO) data signals confirm the range of the angular rate signal being forwarded. Range changes are synced to the beginning of computation changes, as will be better understood from the following discussion of the gyro control and signal converter network illustrated in FIG. 10 and the instruction decoder illustrated in FIG. 25.

INPUT POLARITY control signals produced by the gyro control and signal converter network 97 (FIG. 10) control the polarity of the G1X and G1Y ANGULAR RATE signals. That is, the INPUT POLARITY control signals control whether or not the G1X and G1Y ANGULAR RATE signals received from the G1X and G1Y range change circuits are forwarded with the same polarity as they are received or with the opposite polarity. In this regard, as noted above, the torquer coil angular rate signals are in current form and the G1X and G1Y angular rate signals forwarded are in voltage form. Conversion from current to voltage form takes place in the range change circuits by passing the currents through precision resistors. Polarity switching may occur by electronically "flipping" the resistors, i.e., passing the currents through the resistors in the opposite direction. Range changing, as noted above, is accomplished by changing the value of the resistors. Thus, the range change and polarity switch circuits could be formed by common elements, to some degree. Polarity switching is done on regular intervals, such as 50 or 250 sec., depending upon whether the ISADS system is in an alignment or navigational mode (see the following description of the instruction decoder illustrated in FIG. 25), to average out bias in the V/F converters illustrated in FIG. 10 and hereinafter described.

Figure 10:
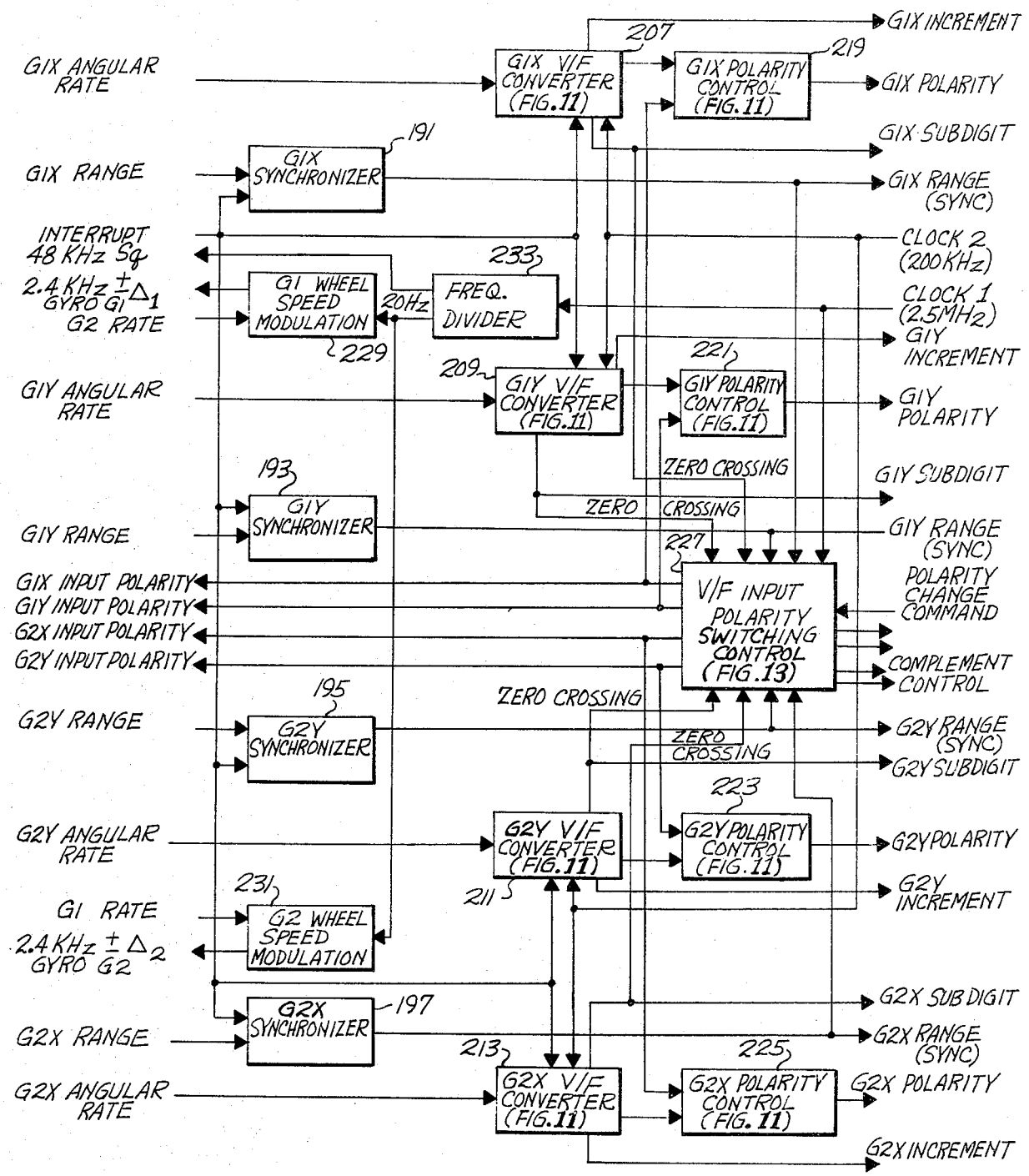
FIG. 10 is a block diagram of a gyro control and signal converter network suitable for use in the gyro subsystem illustrated in FIG. 4.

The G1X and G1Y AC amplifier and demodulator circuits 127 and 129 receive the G1X and G1Y preamplifier signals produced by the G1X and G1Y preamplifiers of the G1 gyro, respectively. The preamplifier signals are demodulated at a fixed AC modulation frequency, such as 48 KHz. More specifically, the pickoff excitation generator 141 receives a fixed frequency, e.g., 48 KHz, square wave input, produced by a frequency divider forming a part of the gyro control and signal converter network (FIG. 10). In accordance therewith, the pickoff excitation generator 141 produces a fixed frequency AC modulation signal, which is applied to the G1X and G1Y pickoffs, as previously described. The same AC modulation signal is applied to the G1X and G1Y AC amplifier and demodulator circuits 127 and 129. As a result, the G1X and G1Y preamplifier signals are demodulated at the same frequency as the pickoffs were modulated. Hence the output signals produced by the G1X and G1Y AC amplifier and demodulator circuits contain only gyro pickoff data (and noise). The output of the G1X AC amplifier and demodulator circuit 127 is applied to an input of the G1X compensation circuit 131. Similarly, the output of the G1Y AC amplifier and demodulator circuit 129 is applied to the input of the G1Y compensation circuit 133.

An output of the G1X compensation circuit is connected to an input of the G1Y compensation circit and an output of the G1Y compensation circuit is connected to an input of the G1X compensation circuit. These connections are better illustrated in FIG. 8 and hereinafter described. the G1X and G1Y compensation circuits also produce output control signals that are applied to the G1X and G1Y power amplifiers, respectively. These compensation circuit signals control the levels of the power produced by the power amplifiers. Finally, the G1X and G1Y compensation circuits 131 and 133 apply go/no-go signals to the go/no-go detector 139.

As is known to those familiar with dry, tuned-rotor gyroscopes of the type noted above, the compensation circuits provide the gyro servo-loop with the desired frequency response characteristic and, among other things, eliminate unwanted information (noise) from the demodulated output of the AC amplifier and demodulator circuits. In addition, the compensation circuits combine data from the other sense axis with the principal axis data and use the combined data to control the power applied to the torquer coils so as to maintain the gyro mass in balance. Finally, the compensation circuits test the demodulated pickoff signals to determine if these signals are "in range". A generalized block diagram of a compensation circuit that produces these results is illustrated in FIG. 8 and hereinafter described.

The compensation circuit illustrated in FIG. 8 comprises: an integrator 144; a low pass filter 146; notch rejection filters 147; a summer 148; a level detector 149; and, an oscillation detector 150. The output of the related amplifier and demodulator is applied to the inputs of the integrator 144, the level detector 149 and the oscillation detector 150. The output of the integrator is applied to the input of the low pass filter and the output of the low pass filter is applied to the notch rejection filters 147. The output of the notch rejection filters is applied to one input of the summer. The other input of the summer receives the output of the notch rejection filters of the other compensation circuit. Similarily, the output of the notch rejection filters of the illustrated compensation circuit goes to the summer of the other compensation circuit. Finally, the outputs of the level detector and the oscillation detector go to the go/no-go detector.

In operation, the integrator integrates the demodulated output of the amplifier and demodulator; and, the low pass filter (which preferably has a cut-off frequency of 70 Hz) removes high frequency components from the integrated signal. The notch rejection filters remove selected frequency components that are not entirely rejected by the low pass filter because of their magnitude. These components have known frequency values, such as 100 Hz and 300 Hz, and relate to known sources of error, such as the wobble frequency of the gyro mass. The resultant "clean" signal is combined with the "clean" signal from the other compensation circuit in the summer 148, the levels of the "clean" signals being scaled as necessary prior to being summed. As will be readily appreciated by those familiar with gyros, particularly those of the type denoted above, summing of cross channel signals is necessary because of the unbalanced positioning of the G1X-G1Y torquer coils.

The level and oscillation detectors 149 and 150 are exemplary of damage detectors, i.e., detectors adapted to detect a gyro condition that could be destructive of the gyro, and, thus, should not be considered as limiting. That is, a detector could be provided for any other "dangerous condition" that can be electronically detected. The level detector is designed to detect when the pickoff output rises above a predetermined level. The predetermined level is determined by the saturation level of the gyro, i.e., the maximum rate sensing level of the gyro. The oscillation detector detects oscillations in the pickup signal, which denote that the gyro is "hunting". When either of these undesirable conditions occur, i.e., the gyro is saturated or hunting, an appropriate signal is applied to the go/no-go detector. In response thereto, the go/no-go detector reduces significantly the maximum power that can be applied to the torquer coils by the power amplifiers and advises the computer by a suitably conditioned GO/NO-GO INTERRUPT signal that the information being produced by the gyro is incorrect and, therefore, unusable.

The G1X and G1Y pickoff demodulator and filter circuits 143 and 145 receive the G1X and G1Y preamplifier signals, respectively. In addition, each pickoff demodulator and filter circuit receives the 48 KHz AC signal produced by the pickoff excitation generator 141. The G1X and G1Y pickoff demodulator and filter circuits demodulate the G1X and G1Y preamplifier signals at the modulation frequency and filter the resultant demodulated signals. The output of the G1X and G1Y pickoff demodulator and filters 143 and 145 are, thus, demodulated PICKOFF ANGLE signals. The signals are applied to the gyro interface multiplexer (FIG. 9).

Gyro Interface Multiplexer

FIG. 9 is a block diagram of a gyro interface multiplexer suitable for use in the gyro subsystem illustrated in FIG. 4 and comprises: two signal conditioners 151 and 153; seven buffer amplifiers 155, 157, 159, 161, 163, 165 and 167; six sample and hold circuits 171, 173, 175, 177, 179 and 181; a pickoff angle and gyro temperature analog multiplexer 183; and, an analog-to-digital converter 185.

A SAMPLE/HOLD control signal produced by the instruction decoder 56 (FIG. 25) is applied to the control inputs of each of the six sample and hold circuits 171, 173, 175, 177, 179 and 181. The SAMPLE/HOLD control signal has two states, a sample state and a hold state. When in the sample state, the sample and hold circuits are conditioned to follow (e.g., sample) the signals applied to their signal inputs. When in the hold state, the sample and hold circuits "hold" the last signal "sampled". Preferably, the sample state is the true or binary one state of the SAMPLE/HOLD control signal and the false or binary zero state is the hold state, as illustrated in the last line of FIG. 26 and hereinafter described.

The G1X PICKOFF ANGLE signal produced by the G1X pickoff demodulator and filter circuit 143 of the first (G1) gyro servo-loop network 91 in the manner previously described is applied through the first buffer amplifier 155 to the signal input of the first sample and hold circuit 171. Similarly, the G1Y PICKOFF ANGLE signal produced by the G1 gyro servo-loop network is applied through the second buffer amplifier 157 to the signal input of the second sample and hold circuit 173. The G1 gyro temperature sensor 95 is connected to the input of the first signal conditioner 151. The first signal conditioner conditions (e.g., filters, scales, etc.) the temperature data sensed by the G1 gyro temperature sensor and the conditioned signal is applied through the third buffer amplifier 159 to the signal input of the third sample and hold circuit 175. The G2 gyro temperature sensor is connected to the input of the second signal conditioner 153 wherein the G2 temperature data is conditioned. The conditioned temperature signal output of the second signal conditioner 153 is applied through the fourth buffer amplifier 161 to the signal input of the fourth sample and hold circuit 177. The G2X PICKOFF ANGLE signal produced by the second (G2) gyro servo-loop network 93 is applied through the fifth buffer amplifier 163 to the signal input of the fifth sample and hold circuit 179. Similarly, the G2Y PICKOFF ANGLE signal produced by the G2 gyro servo-loop network 93 is applied through the sixth buffer amplifier 165 to the signal input of the sixth sample and hold circuit 181. The outputs of the six sample and hold circuits are each applied to a separate signal input of the pickoff angle and gyro temperature analog multiplexer 183.

ANALOG MUX ADDRESS signals produced by the analog multiplexer control 101 illustrated in FIG. 15 and hereinafter described are applied to the multiplexer address inputs of the pickoff angle and gyro temperature analog multiplexer. The ANALOG MUX ADDRESS signals are digital signals carried by three wires. The high/low states of the digital signals denote which of the pickoff angle and gyro temperature analog multiplexer inputs is connected to the output of the multiplexer. The output of the pickoff angle and gyro temperature analog multiplexer 183 is applied through the seventh buffer amplifier 167 to the signal input of the analog-to-digital converter 185. The enable input of the analog-to-digital converter 185 receives a control signal denoted CONVERSION COMMAND from the analog multiplexer control 101 (FIG. 15), produced in the manner hereinafter described.

In operation, the sample and hold circuits follow (sample) their respective inputs until instructed to hold or store the received information. Thus, the first, second, fifth and sixth sample and hold circuits 171, 173, 179 and 181, sample and hold the G1X, G1Y, G2X and G2Y PICKOFF ANGLE signals. The third and fourth sample and hold circuits 175 and 177 sample and hold G1 and G2 temperature data. The stored signal data is muliplexed by the pickoff angle and gyro temperature analog multiplexer upon the receipt of suitable ANALOG MUX ADDRESS signals. The multiplexed analog signals are converted into digital signals when the CONVERSION COMMAND signal triggers the analog-to-digital converter 185. The result is multiplexed PICKOFF ANGLE AND GYRO TEMPERATURE digital data. The digital output of the analog-to-digital converter 185 is in parallel form, as denoted by the heavy output line. This data is applied to the gyro secondary multiplexer 102 (FIG. 16) wherein it is multiplexed with other data, as herein described.

Gyro Control and Signal Converter

FIG. 10 is a block diagram of a gyro control and signal converter network suitable for use in the gyro subsystem illustrated in FIG. 4 and comprises: G1X, G1Y, G2Y and G2X synchronizers 191, 193, 195 and 197; G1X, G1Y, G2Y and G2X voltage-to-frequency (V/F) converters 207, 209, 211 and 213; G1X, G1Y, G2Y and G2X polarity controls 219, 221, 223 and 225; a V/F input polarity switching control 227; G1 and G2 wheel speed modulation circuits 229 and 231; and, a frequency divider 233.

G1X, G1Y, G2Y and G2X RANGE signals produced by the instruction decoder 56 are applied to the signal input of the related G1X, G1Y, G2Y and G2X synchronizers 191, 193, 195 and 197. In addition, an INTERRUPT pulse signal, produced by the clock 58, is applied to the synchronization input of each of the synchronizers. The synchronizers synchronize range changes such that range changes occur only when an INTERRUPT pulse is produced. As will be better understood from the following discussion an INTERRUPT pulse is produced at regular known intervals, such as 5 ms intervals. Each time an INTERRUPT pulse occurs the computer receives data. It is at this time that range change commands are forwarded to the range change circuits (FIG. 7) previously described. In this regard, the output of the G1X synchronizer 191 is the G1X RANGE (SYNC) signal. Similarly, the outputs of the G1Y, G2Y, and G2X, synchronizers are the G1Y RANGE (SYNC), G2Y RANGE (SYNC) and G2X RANGE (SYNC) signals, respectively.

The G1X, G1Y, G2Y and G2X ANGULAR RATE signals are applied to their respective G1X, G1Y, G2Y and G2X V/F converters 207, 209, 211 and 213. The V/F converters convert the ANGULAR RATE signals from voltage form into frequency form. Each V/F converter receives the INTERRUPT pulse signal and a clock signal, denoted CLOCK 2, having a fixed frequency, such as 200 KHz, for example. Each V/F converter produces a square wave INCREMENT control signal having a high-low transition rate related to the voltage value of the ANGULAR RATE signal being converted. The INCREMENT control signals are applied to the gyro counter and multiplexer 103 and control the incrementing and decrementing of up/down counters, as hereinafter described. Further, each V/F converter produces a SUBDIGIT signal whose zero crossing is sensed by the V/F input polarity switching control 227. The SUBDIGIT DATA signals are analog signals and are applied to the subdigit gyro signal multiplexer 99 (FIG. 14) wherein they are multiplexed and converted into digital form. As will be better understood from the following discussion SUBDIGIT DATA signals represent remainder data.

G1X, G1Y, G2Y and G2X INPUT POLARITY control signals produced by the V/F input polarity switching control 227 in the manner hereinafter described are applied to the control inputs of the G1X, G1Y, G2Y and G2X polarity controls 219, 221, 223 and 225, respectively. The signal inputs of the polarity controls are connected to receive polarity signals from their related V/F converters. As will be better understood from the following discussion of an example of a suitable V/F converter and polarity control illustrated in FIG. 11, the INPUT POLARITY control signals cause the polarity controls to either pass their polarity input signals directly or invert them depending upon the nature of their respective INPUT POLARITY control signal. The end results are G1X, G1Y, G2X and G2Y POLARITY signals whose state denotes whether or not the related G1X, G1Y, G2X or G2Y polarity switch (FIG. 7) is or is not inverting the polarity of the related G1X, G1Y, G2X or G2Y ANGULAR RATE signal.

FIG. 11 is a block diagram of both a V/F converter and a polarity control suitable for use in the gyro control and signal converter network illustrated in FIG. 10. The V/F converter illustrated in FIG. 11 is bidirectional and based on the Bidirectional Reset Integrator Converter described in U.S. Pat. No. 3,989,961 issued to C. Johan Masreliez on Nov. 2, 1976. As will be readily understood by those familiar with V/F converters, from viewing FIG. 11 and the following discussion, the differences between the FIG. 11 V/F converter and the converter disclosed in the foregoing patent relate to the control system for controlling the operation of the converter such that it is compatible with the present invention; and, to the need to convert the ANGULAR RATE signals from voltage form to current form prior to integration by inserting a resistor in series with the input of the integrator, as described in that patent. As necessary to the understanding of the operation of the V/F converter illustrated in FIG. 11, the information contained in U.S. Pat. No. 3,989,961 is incorporated herein by reference.

The combined V/F converter and polarity control illustrated in FIG. 11 comprises: an integrator 198; a polarity detector 200; positive and negative limit switches 201; a current control 202; a counter 203; a D flip-flop (FF) 204; a switch 205; and, an inverter 206. The ANGULAR RATE signal to be converted is applied to the input of the integrator 198. The integrator integrates the received voltage and applies its integrated output to the polarity detector 200 and to the positive and negative limit switches 201. When the output of the integrator 198 reaches a predetermined level (limit) in one direction or the other, the output of the positive and negative limit switches produces a reset request. This request occurs regardless of the polarity of the output of the integrator 198.

Each reset request is applied to the D input of the D flip-flop 204. Clocking of reset requests into the D flip-flop is controlled by the counter 203. More specifically, the counter counts CLOCK 2 pulses (produced by the clock 58 in the manner hereinafter described) and produces a square wave output having some predetermined duty cycle value. In this regard attention is directed to FIG. 12, which depicts the timing of an exemplary counter/D flip-flop arrangement. The exemplary arrangement assumes the counter 203 is a 20 pulse count counter having an 80% duty cycle, i.e., the chosen output is high for 80% (16 pulse counts) and low for 20% (4 pulse counts) of the total cycle. Moreover, the D flip-flop is clocked on the leading edge (low-high shift) of the 80% or high portion of the cycle. Assuming CLOCK 2 has a 200 KHz pulse rate and 20 pulses are counted, the frequency of the square wave output of the counter is 10 KHz.

In addition to the foregoing, the counter 203 is adapted to be preset to a predetermined vaue by each INTERRUPT pulses. That is, INTERRUPT pulses are applied to a load input of the counter 203. Each time an INTERRUPT pulse occurs, the counter is loaded or preset to a predetermined value as hereinafter discussed in more detail.

As noted above, INTERRUPT pulses occur at regular intervals, such as 5 ms. As will be better understood from the following description of the clock 58 (FIG. 18), INTERRUPT and CLOCK 2 pulses are derived from the same timing source. Thus, INTERRUPT and CLOCK 2 pulses are synchronized and the INTERRUPT pulses, except for an initializing INTERRUPT pulse, can be chosen to occur during the 20% portion of the duty cycle of the counter 203.

The first or initializing INTERRUPT pulse presets the counter to the previously mentioned predetermined value, which is preferably in the middle of the gap of the 80% duty cycle wave—an eighteen (18) count for the foregoing example. Thus, the leading edge of the next 80% duty cycle wave, which occurs 2 pulse counts later, clocks the D flip-flop. If at this time a limit switch reset request is present, the Q output of the D flip-flop shifts high and remains high until the leading edge of the next 80% duty cycle wave, regardless of when the reset request ends. In this regard, attention is again directed to FIG. 12. The upper line of FIG. 12 illustrates the CLOCK 2 pulse chain and the second line illustrates the 80% duty cycle of the Q output of the counter 203. The third line illustrates the occurrence of INTERRUPT pulses. The fourth line illustrates examples of the state of the reset request output of the positive and negative limit switches; and, the fifth line illustrates the state of the Q output of the D flip-flop 204 for the conditions denoted above.

The left side of FIG. 12 illustrates the normal situation i.e., the situation when no INTERRUPT pulse occurs. In the normal situation, the Q output of the counter 203 switches back and forth, between high and low, in accordance with its 80% duty cycle. Each rise in this waveform clocks the D flip-flop 204. If the reset request output of the limit switches 201 is low, the Q output of the D flip-flop is set low. If, however, the reset request output is high, indicating that the output of the integrator 198 has surpassed the level of one of the limit switches, the Q output of the D flip-flop 204 is set high. In either case the clocking of the output of the limit switches into the D flip-flop only occurs at the leading edge of the 80% duty cycle wave. Thus, when the output of the D flip-flop 204 shifts high, it remains high for a precise period of time (one entire 80% duty cycle wave) regardless of when the high on the reset request output of the limit switches ends.

The Q output of the flip-flop is applied to the current control 202. The current control also receives a polarity signal from the polarity detector 200. The current control causes the charge on the capacitor of the integrator 198 to be reduced in an absolute sense during the period of time the Q output of the D flip-flop is high, as described in U.S. Pat. No. 3,989,961, noted above. Since the D flip-flop is set (Q output high) for a precise period of time (between leading edges of the 80% duty cycle wave), a precise amount of charge reduction occurs.

In summary, a charge reduction does not immediately start when the output of the positive and negative limit switches (reset request) shifts high. Rather charge reduction starts at the leading edge of the next 80% duty cycle wave. When the charge reduction reduces the integrator output to below the limit level of the positive and negative limit switches, the reset request ends. Normally reset requests terminate before the leading edge of the next 80% duty cycle wave, whereby the leading edge of the next wave causes the D flip-flop to be reset (Q output goes low). However, should a reset request still exist at this time, the Q output of the D flip-flop remains high.

Since INTERRUPT pulses, as previously described, cause the counter 203 to be preloaded to the midpoint of the gap in the 10 KHz wave, they do not effect the just described normal operation of the V/F converter. All the INTERRUPT pulses do is initialize the start of the operation of the overall subsystem. Only if synchronization is lost do further INTERRUPT pulses have any effect.

As will be appreciated from the foregoing description, the frequency of the square wave signal formed at the Q output of the D flip-flop is directly related to the magnitude of the ANGULAR RATE signal being converted. These square waves form the INCREMENT control signals applied to the gyro counter and multiplexer 103 (FIG. 17) wherein they are used to control the rate of pulse counting by UP/DN counters, as hereinafter described in detail.

The output of the polarity detector 200 is also applied to the polarity control, which comprises the switch 205 and the inverter 206. The switch 205 is a two state switch that is controlled by the state of the related INPUT POLARITY signal produced by the V/F input polarity switching control 227 in the manner hereinafter described. The switch 205 either applies the polarity signal directly to an output terminal or to the inverter 206, wherein it is inverted. The inverted polarity signal is also applied to the output terminal. The signal on the output terminal is denoted POLARITY. The polarity control circuit counteracts the effects of the INPUT POLARITY signal. The state of the POLARITY signal is thus, independent of the state of the INPUT POLARITY signal and reflects solely whether the gyro senses a rate in one direction, or in another direction, independent of whether the angular rate fed to the V/F converter is fed directly to it, or inverted by the INPUT POLARITY signal. The POLARITY signals are applied to the gyro counter and multiplexer wherein they control whether pulses (whose application rate is controlled by the related INCREMENT control signals) are applied to the up or down inputs of a related UP/DN counter.

Any integrator charge present on the output of integrator between INCREMENT controlled counting is denoted as a SUBDIGIT signal. These signals are in analog form and are sampled, held, multiplexed, converted into digital form and forwarded by the subdigit gyro signal multiplexer (FIG. 14) during a data transmission sequence as hereinafter described. In this way remainder, as well as digit data is forwarded to the computer.

Returning now to FIG. 10, in addition to receiving a zero crossing (SUBDIGIT) signal from each V/F converter, the V/F input polarity switching control 227 also receives the G1X RANGE (SYNC), G1Y RANGE (SYNC), G2Y RANGE (SYNC), and G2X RANGE (SYNC) signals produced by the G1X, G1Y, G2Y and G2X synchronizers, respectively. Further, the V/F input polarity switching control 227 receives a POLARITY CHANGE COMMAND control signal produced by the instruction decoder 56, illustrated in FIG. 25 and hereinafter described, and a fixed frequency CLOCK signal produced by the clock 58 and denoted CLOCK 1. CLOCK 1 may have a frequency of 2.5 MHz, for example. In accordance with these signals, the V/F input polarity switching control 227 controls the state of the G1X, G1Y, G2Y and G2X INPUT POLARITY signals previously described.

Basically, the V/F input polarity switching control is a synchronizing circuit that requires that certain conditions be met before a POLARITY CHANGE COMMAND will create an INPUT POLARITY change. Preferably, the V/F input polarity control comprises four channels, each of which controls the state of, or produces, one of the INPUT POLARITY signals. An example of one such channel is illustrated in FIG. 13.

The V/F input polarity switching control channel illustrated in FIG. 13 comprises: two toggle flip-flops 228 and 230; a four-input AND gate 232; a comparator 234; and, a zero crossing detector 2236. As will be readily appreciated by those skilled in the art, toggle flip-flops are flip-flops that change states (toggle) when they are clocked. An example of such an arrangement is a JK flip-flop with the J and K inputs connected high and the clock input connected to receive the actuating (clock) signal.

In FIG. 13, the POLARITY CHANGE COMMAND control signal (e.g., a pulse) is periodically applied to the actuating input of the first toggle flip-flop. Thus, each time a POLARITY CHANGE COMMAND pulse occurs, the first toggle flip-flop toggles, whereby its Q output changes state. The Q output of the first toggle flip-flop is connected to one input of the comparator 234.

The related RANGE (SYNC) signal is applied to one input of the AND gate 232. The SUBDIGIT signal derived from the V/F converter related to the particular channel of the V/F input polarity switching control is applied to the input of the zero crossing detector 236. When the SUBDIGIT signal is at or very near zero, the output of the zero crossing detector goes high. This output is applied to the second input of the AND gate 232. The CLOCK 1 signal, which is a pulse train at 2.5 MHz, is applied to a third input of the AND gate 232. The output of the AND gate is applied to the actuating input of the second toggle flip-flop 230. Thus, the second toggle flip-flop toggles each time a pulse occurs on the output of the AND gate.

The Q output of the second toggle flip-flop forms the INPUT POLARITY signal and is applied to the second input of the comparator 234. This same signal forms a COMPLEMENT CONTROL signal which is applied to the analog multiplexer control 101 (FIG. 15) and used in the manner hereinafter described to control the complementing of GYRO SUBDIGIT DATA, when necessary. The output of the comparator is applied to the fourth (enable) input of the AND gate 232. The output of the comparator is low when its inputs are the same and high when its inputs are different.

In operation, when a POLARITY CHANGE COMMAND pulse occurs, the output of the comparator shifts high (assuming that previously the inputs to the comparator were the same). Thus, the AND gate is enabled. However, an INPUT POLARITY signal reversal does not immediately take place. Rather, the AND gate output remains low until: (1) the SUBDIGIT signal from the related V/F converter goes through zero; and (2) a CLOCK 1 pulse occurs. Further, the AND gate output only shifts high if RANGE (SYNC) is in a low range state. If RANGE (SYNC) is in a high range state polarity switching does not take place. In this regard, as noted above, RANGE (SYNC) is normally in a low range state (which means it is high in binary language). A high range state (binary low) is abnormal and only occurs when the aircraft makes a rapid attitude change. In any event, when RANGE (SYNC) is in a low range state, the comparator output is high, a zero crossing is detected and a CLOCK 1 pulse occurs, a pulse is formed on the output of the AND gate. This pulse toggles the second toggle flip-flop. As a result the Q output of the second toggle flip-flop changes state, whereby the INPUT POLARITY signal changes state. As a consequence, the inputs of the comparator become the same and the AND gate 232 is disabled. The next POLARITY CHANGE COMMAND causes this sequence to be repeated.

Returning now to FIG. 10, the frequency divider 233 also receives the CLOCK 1 pulse train. The frequency divider divides the CLOCK 1 pulse train into the fixed frequency (e.g., 48 KHz) square wave signal applied to the pickoff excitation generators 141 of the G1 and G2 gyro servo-loop networks 91 and 93, previously described.

The frequency divider 233 also produces a low, fixed frequency signal, such as 20 Hz, which is applied to the G1 and G2 wheel speed modulation circuits 229 and 231. The wheel speed modulation circuits also receive a gyro rate signal produced by a power amplifier of the opposite gyro interface. That is, a G2 RATE signal is applied to the G1 wheel speed modulation circuit and a G1 RATE signal is applied to the G2 wheel speed modulation circuit. The G2 RATE signal is produced by the G2X power amplifier, and the G1 RATE signal is produced by the G1X power amplifier as generally illustrated in FIG. 7. These X axis gyro rate signals are used because of the way the gyros are mounted. In this regard, the X torquer coils of one gyro (e.g., G1) are mounted so as to sense movement along the spin axis of the other gyro (e.g., G2). Contrariwise, the gyros could be mounted such that the Y axis of one gyro could be aligned so as to sense movement along the spin axis of the other gyro.

In accordance with its inputs, the wheel speed modulation circuits produce the 2.4 KHz$\pm\Delta$ signals applied to the three-phase generators of their respective gyro interfaces 91 and 93. The sensed spin axis movement creates the delta ($\Delta$) variation in the 2.4 KHz signal in a manner that compensates for movement along the spin axis of the sensing gyro, as discussed in detail in a companion patent application, Ser. No. 861,898 entitled "Gyroscope Wheel Speed Modulator" filed Dec. 19, 1977 by Guy R. Olbrechts. The information contained in that application is incorporated herein by reference, as noted above.

Subdigit Gyro Signal Multiplexer

Figure 14:
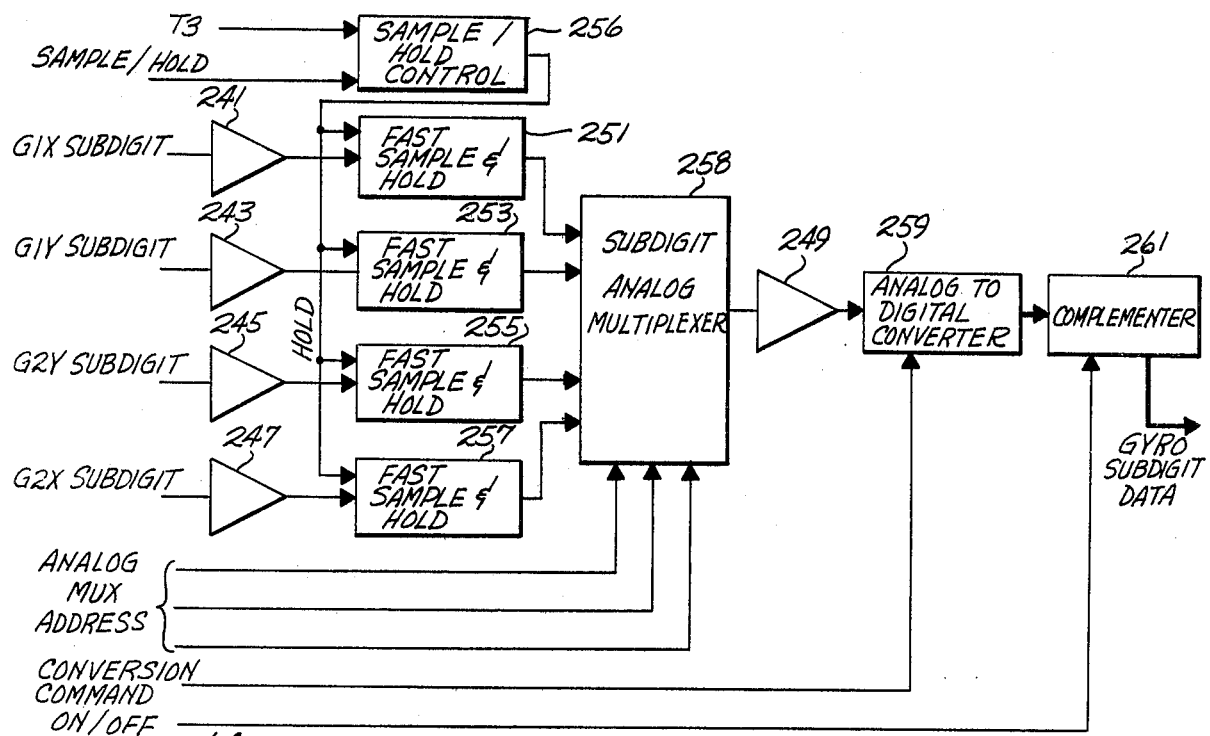
FIG. 14 is a block diagram of a subdigit gyro signal multiplexer suitable for use in the gyro subsystem illustrated in FIG. 4.

FIG. 14 is a block diagram of a subdigit gyro signal multiplexer 99 suitable for use in the gyro subsystem illustrated in FIG. 4 and comprises: five buffer amplifiers 241, 243, 245, 247 and 249; four fast sample and hold circuits 251, 253, 255 and 257; a sample/hold control 256; a subdigit analog multiplexer 258; an analog-to-digital converter 259; and, a complementer 261.

The SAMPLE/HOLD control signal produced by the instruction decoder 56 is applied to a control input of the sample/hold control 256. A synchronizing signal denoted T3 and produced by the clock 58 (hereinafter described) is applied to a synchronizing input of the sample/hold control. The output of the sample/hold control is applied to control inputs of the four fast sample and hold circuits 251, 253, 255 and 257. The G1X SUBDIGIT signal produced by the G1X V/F converter 207 of the gyro control and signal converter network 97, illustrated in FIG. 10 and previously described, is applied through the first buffer amplifier 241 to the signal input of the first fast sample and hold circuit 251. Similarly, the G1Y SUBDIGIT, G2Y SUBDIGIT and G2X SUBDIGIT signals produced by the related G1Y, G2Y and G2X V/F converters 209, 211 and 213 of the gyro control and signal converter network 97 are applied through the second, third and fourth buffer amplifiers 243, 245 and 247, respectively, to the signal inputs of the second, third and fourth fast sample and hold circuits 253, 255, and 257, respectively. The outputs of the first, second, third and fourth fast sample and hold circuits are each applied to a separate signal input of the subdigit analog multiplexer 258. The fast sample and hold circuits are enabled by the sample/hold control to sample and hold SUBDIGIT signals during each data acquisition interrupt. Thus, the charge on the integrators 198 of the V/F converters existing at the end of a charge reduction (reset) sequence occurring just prior to an interrupt is sampled and held. This residual charge forms the SUBDIGIT signal and represents remainder data, as noted above. As will be better understood from the following description of the instruction decoder, the SAMPLE/HOLD input to the sample/hold control 256 shifts from a sample state to a hold state during an interrupt. Thereafter, the next occurring T3 pulse causes this shift to be applied to the fast sample and hold circuits, causing these circuits to sample and hold the data on their data inputs.

ANALOG MUX ADDRESS signals are applied to the address inputs of the subdigit analog multiplexer 258. As with the gyro interface multiplexer (FIG. 9), the ANALOG MUX ADDRESS signals are carried by three parallel wires and are produced by the analog multiplexer control illustrated in FIG. 15 and hereinafter described. In accordance with the received address signals, the subdigit analog multiplexer 258 applies one of its four inputs to its output. As the address signal changes states the selected input changes. As a result, the SUBDIGIT signals are multiplexed.

The multiplexed analog output of the subdigit analog multiplexer 258 is applied through the fifth buffer amplifier 249 to the analog input of the analog-to-digital converter 259. A CONVERSION COMMAND signal, also produced by the analog multiplexer control 101 (FIG. 15), is applied to the enable input of the analog-to-digital converter 259. The output of the analog-to-digital converter is a parallel digital data signal that is applied to the signal input of the complementer 261. The complementer is controlled by an ON/OFF control signal produced by the analog multiplexer control 101. In accordance with the binary state (e.g., high or low) of this signal, the complementer either passes the digital output of the analog-to-digital converter (when the control signal state is low or off) or inverts the output of the analog-to-digital converter (when the control signal state is high or on). In the latter situation the complement of the output of the analog-to-digital converter is produced. Thus, the complementer produces either the same data as the data produced by the analog-to-digital converter 259, or the complementary form of that data. The output of the complementer, denoted GYRO SUBDIGIT DATA, is applied to the gyro secondary multiplexer illustrated in FIG. 16 and hereinafter described.

Analog Multiplexer Control

Figure 15:
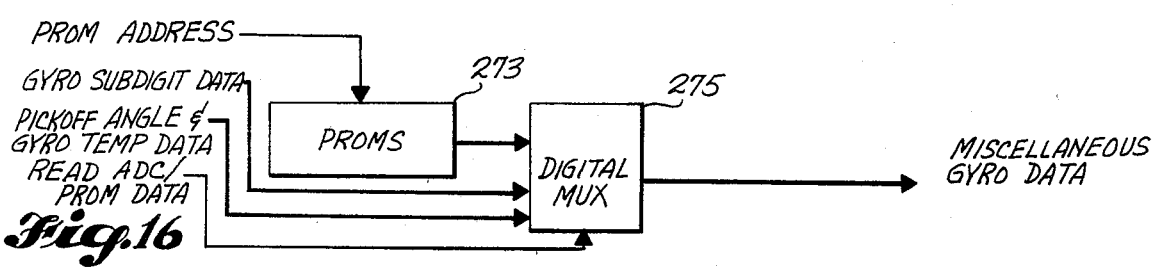
FIG. 15 is a block diagram of an analog multiplexer control suitable for use in the gyro subsystem illustrated in FIG. 4.

An analog multiplexer control suitable for use in the gyro subsystem illustrated in FIG. 4 is illustrated in FIG. 15 and comprises: an analog multiplexer address storage register 277; complement control storage registers 278; a complementer multiplexer 279; and, a delay 281. An ANALOG MUX ADDRESS signal produced by the instruction decoder 56 (FIG. 25) is applied to the input of the analog multiplexer address storage register 277. An enable signal, denoted SELECT ANALOG CHANNEL AND DIGITIZE, also produced by the instruction decoder 56, is applied to the enable input of the analog multiplexer address storage register. The ANALOG MUX ADDRESS signal is stored by the analog multiplexer address storage register, and causes a predetermined ANALOG MUX ADDRESS to be produced, when the analog multiplexer address storage register is enabled by the SELECT ANALOG CHANNEL AND DIGITIZE signal. The ANALOG MUX ADDRESS signals are transmitted on three wires connected to the address inputs of the pickoff angle and gyro temperature multiplexer 183 (FIG. 9) and the subdigital analog multiplexer 258 (FIG. 14) and, as previously described, control the multiplexing action of those multiplexers. The ANALOG MUX ADDRESS signals are also applied to address inputs of the complementer multiplexer 279.

The four COMPLEMENT CONTROL signals (one for each channel) produced by the V/F input polarity switching control 227 (FIG. 10) are applied to the complement control storage registers 278, which stores these signals. The registers are selected and enabled by the nature of the ANALOG MUX ADDRESS signal produced by the instruction decoder. As previously discussed, the state of the COMPLEMENT CONTROL signals denote whether the incoming angular rate information is being forwarded directly (i.e., without being inverted) or is being forwarded in inverted form. The four outputs of the complement control storage registers (which may comprise four separate registers) are each related to the nature of one of the COMPLEMENT CONTROL signals. These outputs are each applied to one of the signal inputs of the complementer multiplexer. When the complementer multiplexer receives an address signal relative to a particular SUBDIGIT signal, such as the G1X SUBDIGIT signal, the same address causes the complementer multiplexer to apply the related (e.g., G1X channel of the V/F input polarity switching control) COMPLEMENT CONTROL signal stored in the complement control storage register 278 to the output of the complementer multiplexer. The output of the complementer multiplexer is the ON/OFF control signal that controls the complementer 261 of the subdigit gyro signal multiplexer (FIG. 14). Thus, if a particular INPUT POLARITY signal (e.g., G1X INPUT POLARITY signal) is in a state that is causing related SUBDIGIT signal to be inverted by the related polarity switch (e.g., G1X polarity switch 125), the inverted subdigit data is "corrected" by the complementer. As a result, the GYRO SUBDIGIT DATA that is forwarded is in the correct polarity form, i.e., if data was "inverted", it is "complemented"; if it was not "inverted", it is not "complemented".

The SELECT ANALOG CHANNEL AND DIGITIZE enable signal is also applied to one input of the delay 281. The delay also receives CLOCK 1 pulses. The delay produces the CONVERSION COMMAND signal applied to the enable inputs of the analog-to-digital converters of the gyro interface multiplexer 95 (FIG. 9) and the subdigit gyro signal multiplexer 99 (FIG. 14). In essence, the delay delays the production of a CONVERSION COMMAND enable signal for one or more CLOCK 1 pulse periods, after a SELECT ANALOG CHANNEL AND DIGITIZE enable signal is produced. The amount of delay (i.e., the number of CLOCK 1 pulses counted before the CONVERSION COMMAND pulse occurs) is dependent upon the "settling" time of the related multiplexer.

Gyro Secondary Multiplexer

Figure 16:
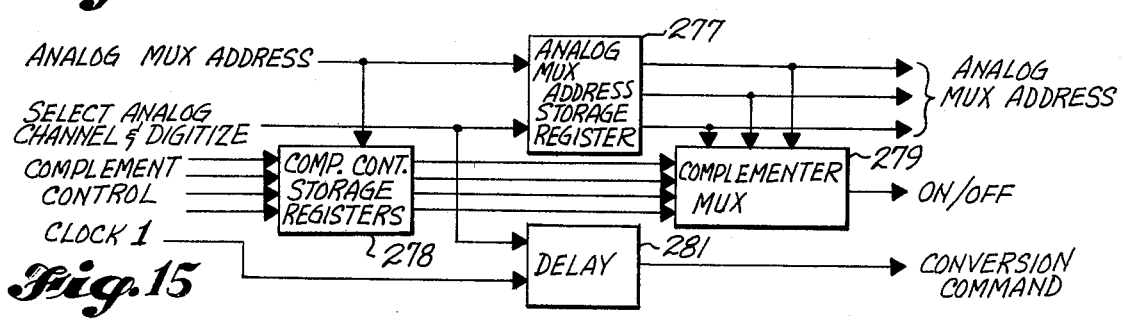
FIG. 16 is a block diagram of a gyro secondary multiplexer suitable for use in the gyro subsystem illustrated in FIG. 4.

A gyro secondary multiplexer suitable for use in the gyro subsystem illustrated in FIG. 4 is illustrated in FIG. 16 and comprises: programmable read only memories (PROMs) 273; and, a digital multiplexer 275. The PROMs store idiosyncrasy data related to the gyros and accelerometers. That is, the gyros and accelerometers are not absolutely identical; rather, each is unique and possesses certain measurable peculiarities, such as unbalance of the rotation mass of the gyros, for example. Because precise inertial data is needed, it is necessary to compensate received or raw inertial data in order to eliminate errors caused by the gyro and accelerometer idiosyncrasies, which are discussed hereinafter in more detail in the description of the inertial data processor. Compensation is accomplished by storing in the PROMs data related to the pertinent idiosyncrasies of each gyro and accelerometer. This data is transmitted to a memory in the computer (when the system is switched on) and used by the insertial data processor to "correct" the accelerometer and gyro data as hereinafter discussed. In this regard, PROM ADDRESS signals produced by the decoder 56 are applied to the address inputs of the PROMs 273. The output of the PROMs is connected to one input of the digital multiplexer 275. The digital multiplexer 275 also receives the GYRO SUBDIGIT DATA produced by the subdigital gyro signal multiplexer 99 (FIG. 14) and the PICKOFF ANGLE AND GYRO TEMPERATURE data produced by the gyro interface multiplexer 95 (FIG. 9). In addition, an address signal denoted READ ADC OR PROM DATA produced by the instruction decoder 56 is applied to the address input of the digital multiplexer 275. Depending upon the nature of the READ ADC OR PROM DATA address signal produced by the instruction decoder, and digital multiplexer 275 applies one of its inputs to its output, which is denoted MISCELLANEOUS GYRO DATA. This data is applied to the air data counter and multiplexer illustrated in FIG. 24 and hereinafter described, wherein it is multiplexed with air data and forwarded to the computer.

Gyro Counter and Multiplexer

Figure 17:
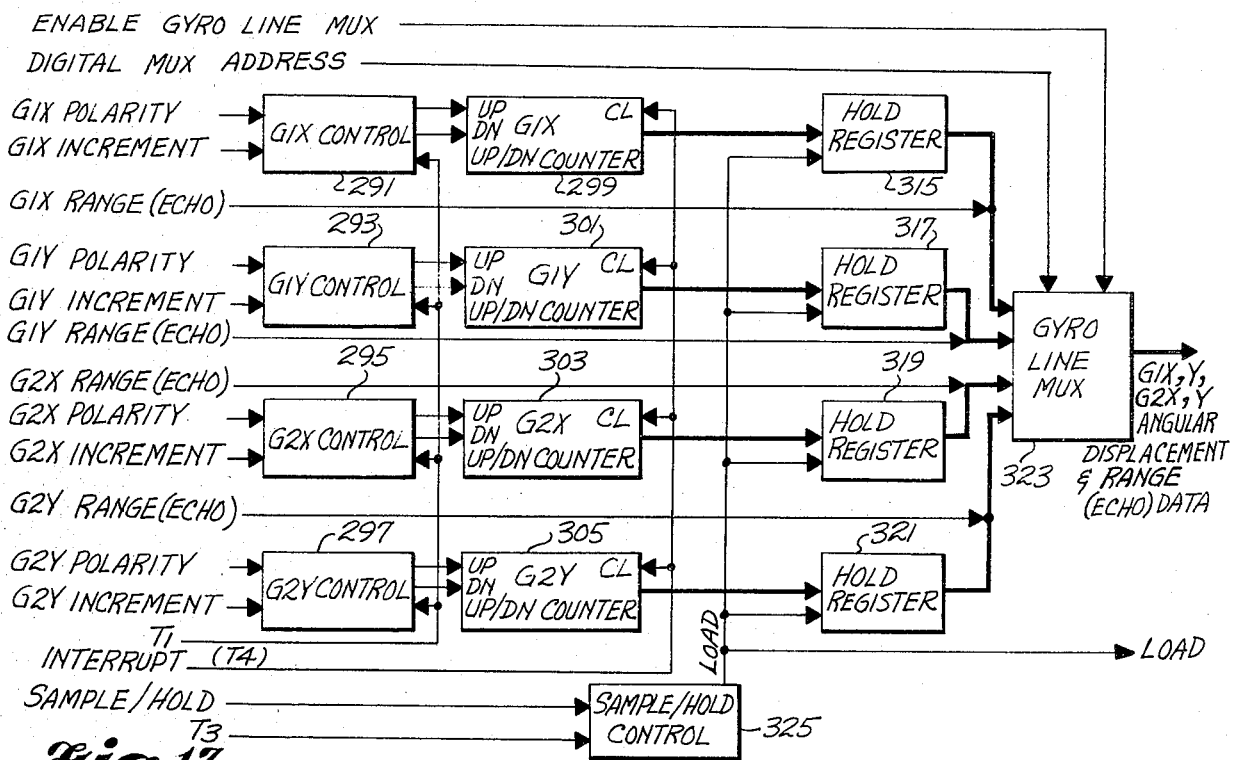
FIG. 17 is a block diagram of a gyro counter and multiplexer suitable for use in the gyro subsystem illustrated in FIG. 4.

FIG. 17 is a block diagram of a gyro counter and multiplexer 103 suitable for use in the gyro subsystem illustrated in FIG. 4 and comprises: G1X, G1Y, G2X and G2Y controls 291, 293, 295 and 297; G1X, G1Y, G2X and G2Y up/down counters 299, 301, 303 and 305; four hold registers 315, 317, 319 and 321; a gyro line multiplexer 323; and, a sample/hold control 325.

The G1X POLARITY and G1X INCREMENT signals produced by the G1X V/F converter and the G1X polarity control, respectively, of the gyro control and signal converter network 97 (FIG. 10) are each applied to a separate input of the G1X control 291. Similarly, the G1Y POLARITY and G1Y INCREMENT signals, the G2X POLARITY and G2X INCREMENT signals and the G2Y POLARITY and G2Y INCREMENT signals are applied to separate inputs of the G1Y control 293, the G2X control 295 and the G2Y control 297, respectively. Timing pulses denoted T1 produced by the clock 58 are applied to a timing input of each of the G1X, G1Y, G2X and G2Y controls 291, 293, 295, and 297. The G1X, G1Y, G2X and G2Y controls produce up and down count control signals, which are applied to the up and down inputs of the G1X, G1Y, G2X and G2Y UP/DN counters, respectively. In addition, the INTERRUPT signal is applied to the clear (CL) inputs of the UP/DN counters.

The parallel output of the G1X UP/DN counter 299 is connected to the signal input of the first hold register 315; the parallel output of the G1Y UP/DN counter 301 is connected to the signal input of the second hold register 317; the parallel output of the G2X UP/DN counter 303 is connected to the signal input of the third hold register 319; and, the parallel output of the G2Y UP/DN counter is connected to the signal input of the fourth hold register 321.

The sample/hold control 325 receives a timing pulse denoted T3 produced by the clock 58. The sample/hold control 325 also receives the SAMPLE/HOLD control signal produced by the instruction decoder 56. The sample/hold control 325 applies an enable or load control signal to the load inputs of the first, second, third and fourth hold registers 315, 317, 319 and 321. The output of the sample/hold control 325, denoted LOAD, is also applied to the accelerometer counter and multiplexer illustrated in FIG. 22 and hereinafter described.

The parallel outputs of the first, second, third and fourth hold registers are each connected to a separate signal input of the gyro line multiplexer 323. In addition, the G1X RANGE (ECHO) signal is applied to the same signal input of the gyro line multiplexer as the output of the first hold register 315. The G1Y RANGE (ECHO) signal is applied to the same signal input of the gyro line multiplexer 323 as the output of the second hold register 317. The G2X RANGE (ECHO) signal is applied to the same signal input of the gyro line multiplexer 323 as the output of the third hold register 319. And, the G2Y RANGE (ECHO) signal is applied to the same signal input of the gyro line multiplexer 323 as the output of the fourth hold register 321. In this regard, as stated above, and denoted by the wide lines in FIG. 14, rather than a single serial output, the hold registers have a plurality of parallel outputs, twelve, for example. The RANGE (ECHO) signal inputs increase the gyro line multiplexer inputs by one, i.e., to thirteen parallel inputs.

A DIGITAL MUX ADDRESS signal produced by the instruction decoder 56 is applied to the address input of the gyro line multiplexer 323 and an enable signal denoted ENABLE GYRO LINE MUX also produced by the instruction decoder is applied to the enable input of the gyro line multiplexer. In accordance with the changing nature of the address signals, when enabled by a suitable ENABLE GYRO LINE MUX signal, the gyro line multiplexer applies one of its inputs to its output. Which input is selected is determined by the nature of the DIGITAL MUX ADDRESS signal. The output of the gyro line multiplexer is denoted G1X,Y; G2X,Y ANGULAR DISPLACEMENT AND RANGE (ECHO) DATA. This gyro data is applied to the computer 54 via its input bus.

Figure 19:
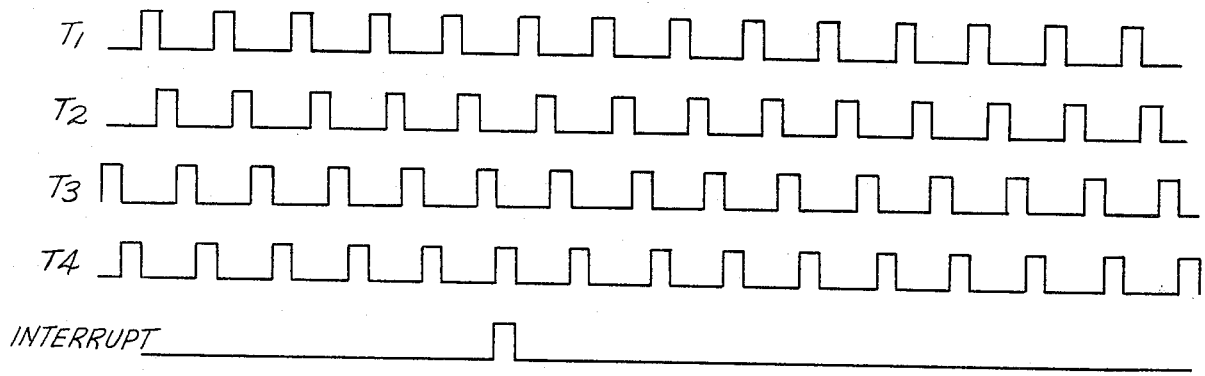
FIG. 19 is a timing diagram used to assist in the understanding of the operation of the clock illustrated in FIG. 18.

Prior to describing the operation of the gyro counter and multiplexer illustrated in FIG. 17 in detail, a discussion of the relationship between T1, T3 and other timing pulses (T2 and T4) plus the INTERRUPT pulses is set forth. In this regard, attention is directed to FIG. 19. T1, T2, T3 and T4 are each square waves having the same frequency and a 25% duty cycle. When one wave is high all the other waves are low. As illustrated in FIG. 19, T1 is high for the first 25% of a cycle and T2, T3 and T4 are low. T2 is high for the second 25%; T3 is high for the third 25%; and, T4 is high for the fourth 25%. Preferably the frequency or repetition rate of T1, T2, T3 and T4 is 1 MHz. As noted above, preferably, INTERRUPT pulses occur at 5 ms intervals; whereby, the INTERRUPT frequency is 200 Hz. INTERRUPT pulses, as illustrated in FIG. 15 are equal to, and coincident with certain T4 pulses. Based on the foregoing numbers an INTERRUPT pulse occurs at the same time as each 5000th T4 pulse occurs.

Turning now to a discussion of the operation of the gyro counter and multiplexer illustrated in FIG. 17; the G1X, G1Y, G2X and G2Y controls are, in essence, synchronized pulse directing circuits. More specifically, the nature of the POLARITY inputs to these circuits determines whether the states of the INCREMENT signals cause T1 pulses to be directed to the UP or DN inputs of the UP/DN counters. For example, a high POLARITY input may cause the UP input to be selected and a low POLARITY input may cause the DN input to be selected. A control circuit suitable for directing T1 pulses in accordance with the nature of POLARITY and INCREMENT signals may comprise a pair of three-input AND type gates and an inverter, for example. The INCREMENT signal is applied to one input of each gate and the POLARITY signal is applied to another input of the first gate and through an inverter to another input of the second gate. The third input of each gate receives the T1 pulses. Which gate is enabled is dependent upon the state of the POLARITY signal. A circuit of this general type (without the T1 input) is included in the accelerometer signal converter network illustrated in FIG. 20 and hereinafter described. In summary, the POLARITY signal determines which gate is enabled; the INCREMENT signal controls gate enablement; and, the T1 pulses cause counter incrementing or decrementing. The INCREMENT signal and the T1 pulses are synchronized because they are controlled by the same clock source (as shown in FIG. 11 and discussed above INCREMENT pulse occurrence is controlled by CLOCK 2 pulses). Further, the control circuit is formed such that a single T1 pulse is counted each time an INCREMENT pulse occurs. This can be accomplished, for example, by driving monostable multivibrators with the previously discussed gate outputs and applying the outputs of the monostables to the up and down inputs of the UP/DN counters.

Normally the hold registers 315, 317, 319 and 321 follow or track the count of the UP/DN counters. More specifically, normally the SAMPLE/HOLD control signal is in a sample (load) state. As a result the hold registers track the UP/DN counters. When the SAMPLE/HOLD signal shifts to a hold state, the sample/hold control is conditioned to cause the hold registers to stop tracking (loading data) so that the increment pulse data (which is actually gyro angular rate data) can be forwarded. The shift of the hold registers from a tracking mode to a hold mode actually occurs when the next T3 pulse occurs, i.e., the T3 pulse occurring after the shift of the SAMPLE/HOLD signal from a sample state to a hold state. After this action occurs, the "held" data is forwarded via the gyro line multiplexer 323. Immediately after the hold registers are conditioned to hold data, an INTERRUPT pulse occurs. (As will be recalled, INTERRUPT pulses are coincident with T4 pulses, which follow T3 pulses.) The INTERRUPT pulse clears the UP/DN counters. Thereafter the cycle is repeated. That is, the UP/DN counters are incremented or decremented; and, the hold registers track the UP/DN counter counts. This sequence of operation continues until the SAMPLE/HOLD control signal next shifts to a hold state and a T3 pulse occurs. Thereafter, held data is multiplexed and the UP/DN counters cleared.

Accelerometer Signal Converter

Figure 20:
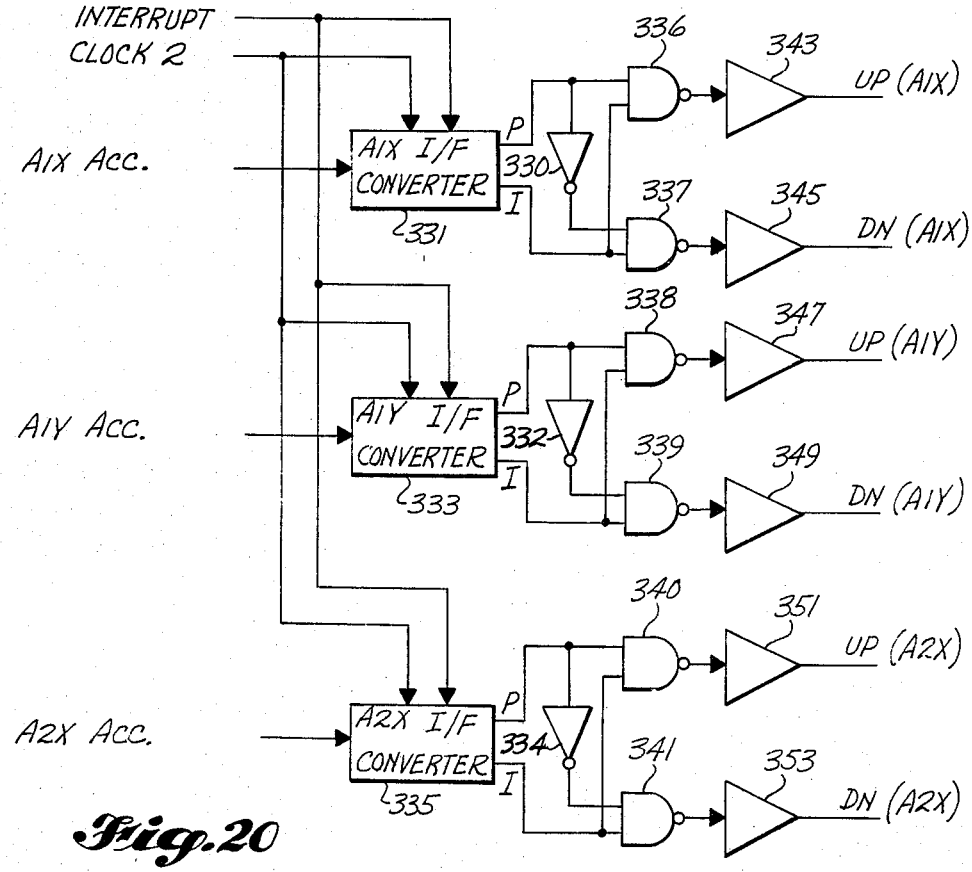
FIG. 20 is a block diagram of an accelerometer signal converter network suitable for use in the accelerometer and air calibration data subsystem illustrated in FIG. 5.
Figure 21:
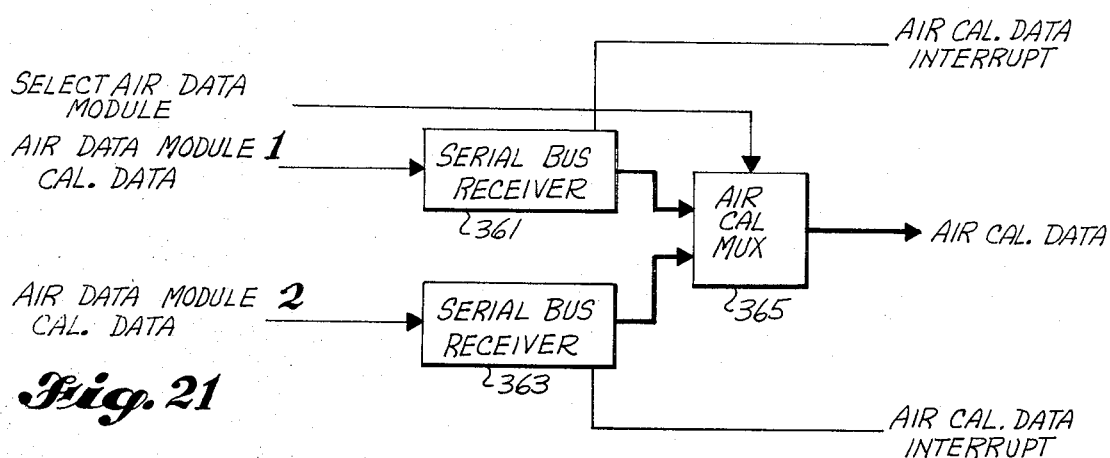
FIG. 21 is a block diagram of a calibration multiplexer suitable for use in the accelerometer and air calibration data subsystem illustrated in FIG. 5.

FIG. 20 is a block diagram of an accelerometer signal converter network 105 suitable for use in the accelerometer and air calibration data subsystem illustrated in FIG. 5 and comprises: A1X, A1Y and A2X current-to-frequency (I/F) converters 331, 333 and 335; three inverters 330, 332 and 334; six two-input NAND gates 336, 337, 338, 339, 340 and 341; and, six buffer amplifiers 343, 345, 347, 349, 351 and 353. The INTERRUPT signal is applied to the A1X, A1Y and A2X I/F converters 331, 333 and 335. The A1X, A1Y and A2X I/F converters also receive the CLOCK 2 pulse train (200 KHz). The rebalance coil current of the A1X accelerometer 65 is applied to the current input of the A1X I/F converter 331; the rebalance coil current of the A1Y accelerometer 67 is applied to the current input of the A1Y I/F converter 333; and, the rebalance coil current of an A2X accelerometer is applied to the current input of the A2X I/F converter 335. The I/F converters are substantially identical to the V/F converters illustrated in FIG. 11. (The only significant difference is that in the preferred embodiment of the invention, the frequency of operation of the I/F converters is twice that of the V/F converters. That is, the counters are preset to 9, rather than 18, and the complete cycle is 10 CLOCK 2 pulses, rather than 20.) Thus, the I/F converters receive current inputs and, in accordance therewith produce square wave INCREMENT or I control signals. The frequency of the INCREMENT control signal is related to the magnitude of the received current. In addition, the I/F converters produce polarity signals whose state depends upon the polarity or direction of the input integrated current. This information is used to control the state of the POLARITY or P output of the I/F converters. A high P output indicates an integrated current flow in one direction and a low P output indicates an integrated current flow in the other direction.

The P output of the A1X I/F converter is connected to one input of the first NAND gate 336 and through the first inverter 330 to one input of the second NAND gate 337. The I or INCREMENT output of the A1X I/F converter is connected to the second inputs of the first and second NAND gates. The P output of the A1Y I/F converter is connected to one input of the third NAND gate 338 and through the second inverter 332 to one input of the fourth NAND gate. The I output of the A1Y I/F converter is connected to the second inputs of the third and fourth NAND gates. The P output of the A2X I/F converter is connected to one input of the fifth NAND gate 340 and through the third inverter 334 to one input of the sixth NAND gate 341. The I output of the A2X I/F converter is connected to the second inputs of the fifth and sixth NAND gates.

The three inverter/two NAND gate combinations form directing circuits that direct INCREMENT signals through one or the other of the NAND gates depending upon the state of the POLARITY signal. That is, the state of the POLARITY signal determines which of the NAND gates is enabled and which is disabled. The enabled NAND gate passes INCREMENT signals and the disabled NAND gate rejects INCREMENT signals. As with the V/F converters the INCREMENT signals are high for a precise period of time.

The output of the first NAND gate 336 is connected to the input of the first buffer amplifier 343; the output of the second NAND gate 337 is connected to the input of the second buffer amplifier 345, etc., through the sixth NAND gate 341 and the sixth buffer amplifier 353. The output of the first buffer amplifier is denoted UP (A1X); the output of the second buffer amplifier is denoted DN (A1X); the output of the third buffer amplifier is denoted UP (A1X); the output of the fourth buffer amplifier is denoted DN (A1Y); the output of the fifth buffer amplifier 351 is denoted UP (A2X); and, the output of the sixth buffer amplifier 353 is denoted DN (A2X). The state of these UP and DN signals control the incrementing and decrementing of accelerometer UP/DN counters illustrated in FIG. 22 and hereinafter described. For example, if UP is high (and DN is low)

the related counter is incremented, whereas if DN is high (and UP is low) the related counter is decremented.

As will be appreciated from the foregoing description, the UP/DN control signals are related to the direction and magnitude of acceleration along the sense axis of the particular accelerometer to which they relate; and, have a transition rate related to the rate of acceleration. More specifically, if an up increment, e.g., UP (A1X) pulse is produced, acceleration is in one direction. If a down increment, e.g., DN (A1X) pulse is produced, acceleration is in the opposite direction. The magnitude of the acceleration is related to the rate or frequency of the increment pulse chain.

Calibration Multiplexer

FIG. 21 is a block diagram of a calibration multiplexer 107 suitable for use in the accelerometer and air data calibration subsystem illustrated in FIG. 5 and includes: first and second serial bus receivers 361 and 363; and, an air calibration multiplexer 365. Calibration data from a first pressure transducer module, e.g., 43A, is applied to the input of the first serial bus receiver 361 and calibration data from a second pressure transducer module, e.g., 43C, is applied to the input of the second serial bus receiver 363. The serial bus receivers store the calibration data they receive in serial digital form from the pressure transducer modules and output the same data in parallel digital form. The parallel outputs of the first and second serial bus receivers 361 and 363, are applied to data inputs of the air calibration multiplexer 365. A SELECT AIR DATA MODULE control signal is applied to the address input of the air data calibration multiplexer. The SELECT AIR DATA MODULE control signal is produced by the instruction decoder 56 (FIG. 25) in the manner hereinafter described. When this signal is a true or binary one state, one input of the air calibration multiplexer is connected to its output and when this signal is in a false or binary zero state, the other input is connected to the output. The digital output of the air calibration multiplexer is denoted AIR CALIBRATION DATA and is applied to the accelerometer counter and multiplexer 109 (FIG. 22) wherein it is multiplexed with accelerometer data, as hereinafter described.

The air calibration data received by the serial bus receivers 361 and 363 includes both idiosyncrasy data and continuously changing data. The idiosyncrasy data is fixed and forwarded to the computer at startup. Continuously changing data is continuously forwarded to the computer. However, both types of data are continuously received by the serial bus receivers 361 and 363. Each time a data word is received, regardless of its nature, the related serial bus receiver produces an AIR CALIBRATION DATA interrupt pulse, which is forwarded to the computer. Upon receipt of such a pulse, the computer, via the instruction decoder causes the air calibration multiplexer to place the data from the related serial bus receiver on its output, whereby that data is placed on the input bus of the computer, in the manner herein described. The computer then determines whether the air calibration data is idiosyncrasy data or continuously changing data. Preferably, the data is identified by the state of the most significant bit of the data word. A low state may identify idiosyncrasy data and a high state may identify continuously changing data. As noted above at start up, both types of data are received by the computer. Thereafter, the computer only "reads" air calibration data when it is interrupted by an AIR CALIBRATION DATA interrupt pulse, if the data is continuously changing data, which is determined by the computer initially only looking at the most significant bit of the air calibration data word.

Accelerometer Counter and Multiplexer

Figure 22:
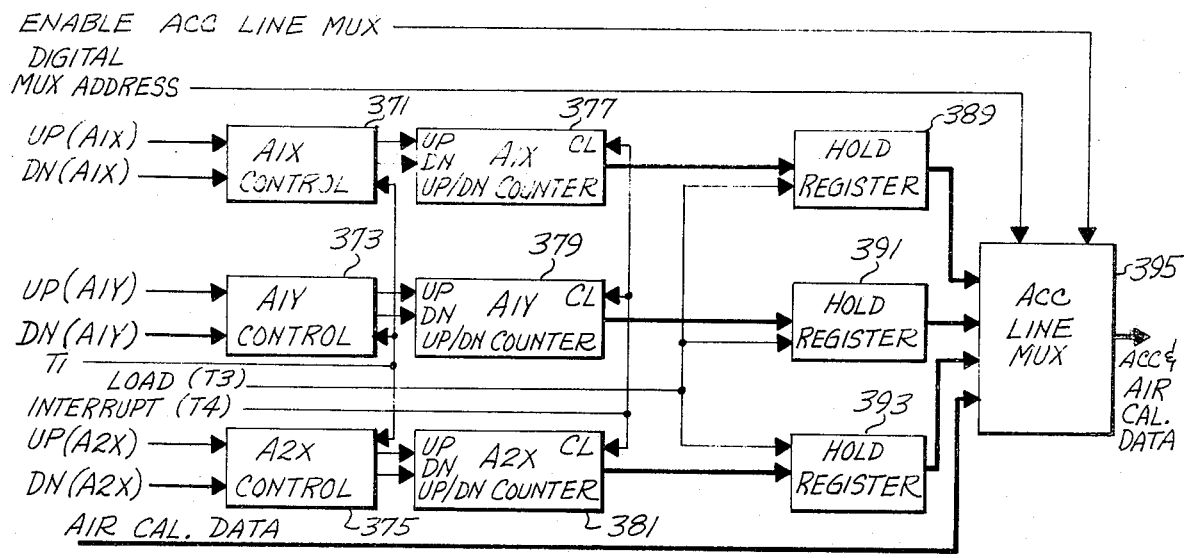
FIG. 22 is a block diagram of an accelerometer counter and multiplexer suitable for use in the accelerometer and air calibration data subsystem illustrated in FIG. 5.

FIG. 22 is a block diagram of an accelerometer counter and multiplexer 109 suitable for use in the accelerometer and air calibration data subsystem illustrated in FIG. 5 and comprises: A1X, A1Y and A2X controls 371, 373 and 375; A1X, A1Y and A2X UP/DN counters 377, 379 and 381; first, second and third hold registers 389, 391 and 393; and, an accelerometer line multiplexer 395.

The UP (A1X) and DN (A1X) control signals produced by the accelerometer signal converter network 105 (FIG. 20) are applied to the inputs of the A1X control 371. The A1X control also receives T1 sync pulses. In accordance therewith the A1X control applies a T1 pulse to either the UP or DN input of the A1X UP/DN counter for each control signal shift. That is, the T1 pulse occurring after an UP or DN control signal shift is applied to the appropriate input of the related UP/DN counter. For example, the next T1 pulse occurring after an UP (A1X) low-high shift is applied to the UP input of the A1X counter. (As will be understood from the previous discussion of FIG. 20 UP (A1X) pulse occurs when the related INCREMENT is high and the related POLARITY is in the appropriate state.) Regardless of when UP (A1X) returns low, no additional T1 pulses are applied to the UP input of the A1X UP/DN counter 377 until after the next low-high shift. Thus, a single T1 pulse is applied to the UP input of the A1X UP/DN counter for each INCREMENT pulse produced by the A1X I/F converter 331 (FIG. 20). Similarly, when DN (A1X) shifts high, a T1 pulse is applied to the down input of the A1X UP/DN counter. In the same manner, the UP (A1Y) and DN (A1Y) signals produced by the accelerometer signal converter control the application of T1 pulses to the up and down inputs of the A1Y UP/DN counter 379; and, the UP (A2Y) and DN (A2X) signals produced by the accelerometer signal converter 105 control the application of T1 pulses to the up and down inputs of the A2X UP/DN counter 381. The A1X, A1Y and A2X controls may be formed, for example, by a pair of two input AND type gates, one input of each gate being connected to receive T1 pulses and the other input of each gate connected to be enabled by one or the other of the UP/DN signals, driving retriggerable monostables that prevent more than one T1 pulse from being counted during a single INCREMENT pulse period.

The parallel output of the A1X UP/DN counter 377 is applied to the signal input of the first hold register 389; the parallel output of the A1Y UP/DN counter 379 is applied to the signal input of the second hold register 391; and, the parallel output of the A2X UP/DN counter 381 is applied to the signal input of the third hold register 393. The LOAD signal produced by the sample/hold control 325 of the gyro counter and multiplexer 103, illustrated in FIG. 17 and previously described, is applied to the enable inputs of the first, second and third hold registers. Further, INTERRUPT signals are applied to the clear (CL) inputs of the A1X, A1Y, and A2X UP/DN counters 377, 379 and 381. Since the operation of UP/DN counters illustrated in FIG. 22 and the transfer of data to the hold registers is identical to the operation of the UP/DN counters illustrated in FIG. 17 and the transfer of data to hold registers, a similar description is not set forth here.

The parallel outputs of the first, second and third hold registers are each applied to a separate signal input of the accelerometer line multiplexer 395. A fourth signal input of the accelerometer line multiplexer 395 receives the AIR CALIBRATION DATA produced by the calibration multiplexer 107 illustrated in FIG. 21 and previously described. The address input of the accelerometer line multiplexer 395 is connected to receive the DIGITAL MUX ADDRESS signal produced by the instruction decoder 56. The accelerometer line multiplexer also receives an ENABLE ACC LINE MUX enable signal from the instruction decoder 56 produced in the manner hereinafter described. When enabled, the accelerometer line multiplexer 395 multiplexes its input signals based on the nature of the DIGITAL MUX ADDRESS signal. That is, the nature of the DIGITAL MUX ADDRESS signal denotes which input of the accelerometer line multiplexer is to be connected to its output; and, the connection is made if the ENABLE ACC LINE MUX signal is in an enable state. The output of the accelerometer line multiplexer is denoted ACC. & AIR CAL. DATA and is applied to the computer 54 via its input bus.

Air Temperature Conditioner and A/D Converter

Figure 23:
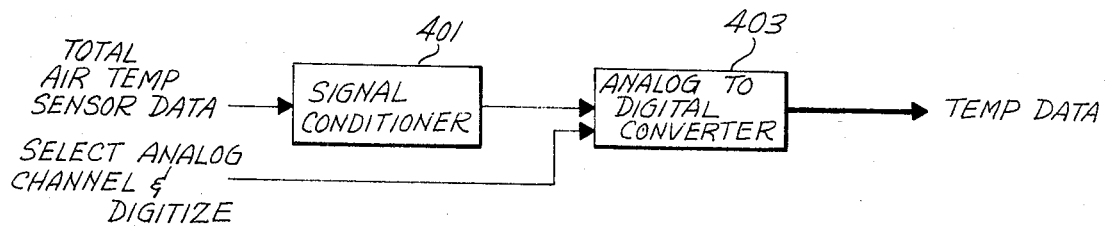
FIG. 23 is a block diagram of an air temperature conditioner and analog-to-digital converter suitable for use in the air data and temperature subsystem illustrated in FIG. 6.

FIG. 23 is a block diagram of an air temperature conditioner and A/D converter suitable for use in the air data and temperature subsystem illustrated in FIG. 6 and comprises: a signal conditioner 401; and, an analog-to-digital converter 403. The total air temperature data received from a total air temperature sensor, e.g., 45A (FIG. 1) is applied to the input of the signal conditioner 401. The signal conditioner conditions (filters, scales etc.) the sensor data and places it in a form suitable for conversion by the analog-to-digital converter 403. The analog-to-digital converter also receives an enable signal denoted SELECT ANALOG CHANNEL AND DIGITIZE produced by the instruction decoder 56. When the analog-to-digital converter 403 is enabled, it converts the analog output of the signal conditioner 401 into parallel digital data. The digital data is denoted TEMP DATA and is applied to the air data counter and multiplexer 113 illustrated in FIG. 24 and hereinafter described.

Air Data Counter and Multiplexer

Figure 24:
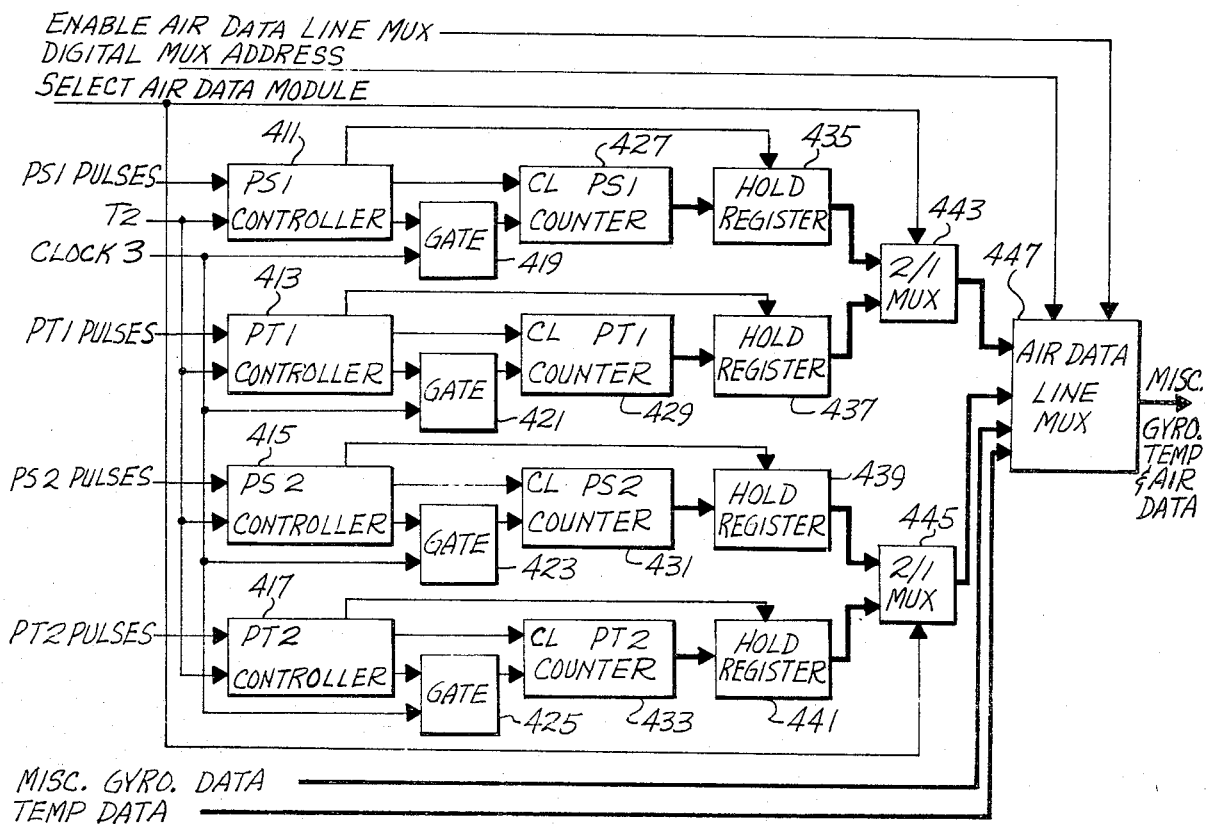
FIG. 24 is a block diagram of an air data counter and multiplexer suitable for use in the air data and temperature subsystem illustrated in FIG. 6.

FIG. 24 is a block diagram of an air data counter and multiplexer 113 suitable for use in the air data and temperature subsystem illustrated in FIG. 6 and comprises: PS1, PT1, PS2 and PT2 controllers 411, 413, 415 and 417; four two-input AND gates 419, 421, 423 and 425; PS1, PT1, PS2 and PT2 counters 427, 429, 431 and 433; four hold registers 435, 437, 439 and 441; two 2/1 multiplexers 443 and 445; and, an air data line multiplexer 447.

As previously noted, the air data modules produce pulse chains representative of the static (PS) and dynamic (PT) pressures sensed. The PS1 pulses are applied to the PS1 controller; the PT1 pulses are applied to the PT1 controller; the PS2 pulses are applied to the PS2 controller; and, the PT2 pulses are applied to the PT2 controller. In addition, each controller is synchronized by a T2 timing signal produced by the clock 58 illustrated in FIG. 18 and hereinafter described. In essence, the PS1, PT1, PS2 and PT2 controllers are counters that count a predetermined number of PS and PT pulses, the counting being synchronized by T2 pulses, i.e., a count is only made if T2 is high. During the count period, which may comprise 16 or 32 PS or PT pulses, the controllers enable a related gate. Specifically, the PS1 controller enables the first gate 419; the PT1 controller enables the second gate 421; the PS2 controller enables the third gate 423; and, the PT2 controller enables the fourth gate 425. Each gate also receives clock pulses, denoted CLOCK 3, at some predetermined frequency rate, such as 10 MHz. The outputs of the first, second, third and fourth gates are connected to the count inputs of the PS1, PT1, PS2 and PT2 counters, respectively. Thus, the PS1, PT1, PS2 and PT2 counters count CLOCK 3 pulses during the period of time their respective gates are enabled.

At the end of a predetermined count sequence, e.g., when the PS1 controller counts to 16 or 32 PS1 pulses, the related gate is disabled. Thereafter, a LOAD pulse is applied to the related hold register. In this regard, the first hold register 435 is connected to the count output of the PS1 counter; the second hold register 437 is connected to the count output of the PT1 counter; the third hold register 439 is connected to the count output of the PS2 counter; and, the fourth hold register 441 is connected to the count output of the PT2 counter. Upon receipt of a LOAD pulse from the related controller, the hold register reads and stores the parallel output of its related PS or PT counter. After the pulse count is transferred from the counter to the hold register, the counters are cleared by a clear pulse produced by the related controller. Thereafter, the controller enables its related gate and the cycle is repeated.

The parallel outputs of the first and second hold registers 435 and 437 are each applied to an input of the first 2/1 multiplexer and the outputs of the third and fourth hold registers 439 and 441 are each applied to an input of the second 2/1 multiplexer. An input selection signal denoted SELECT AIR DATA module, produced by the instruction decoder 56 in the manner hereinafter described, is applied to the address inputs of the first and second 2/1 multiplexers. When this signal is in one binary state (e.g., high or true), one input of each of the 2/1 multiplexers is applied to the output of the multiplexers. When the SELECT AIR DATA MODULE signal is in the other binary state (e.g., low or false), the other input of each of the 2/1 multiplexers is applied to the output of the multiplexers. The output of the first 2/1 multiplexer 443 is applied to one input of the air data line multiplexer 447 and the output of the second 2/1 multiplexer 445 is applied to the second input of the air data line multiplexer 447.

The air data line multiplexer is a four input multiplexer. The third input of the air line multiplexer 447 is connected to receive the MISC GYRO DATA produced by the gyro main multiplexer 102 (FIG. 16) in the manner heretofore described. The fourth input of the air data line multiplexer 447 receives the TEMP DATA produced by the air temperature conditioner and A/D converter 111 (FIG. 23) in the manner heretofore described. The address input of the air data line multiplexer 447 receives the DIGITAL MUX ADDRESS signal produced by the instruction decoder 56. The air data line multiplexer also receives an enable signal denoted ENABLE AIR DATA LINE MUX from the instruction decoder. When in an appropriate state this signal enables the air data line multiplexer. When enabled, the air data line multiplexer applies one of its input signals to its output. Which input signal is applied is determined by the binary nature of the DIGITAL MUX ADDRESS signal. The output of the air data line multiplexer is denoted MISC GYRO, TEMP AND AIR DATA and is applied to the computer 54 via its input bus.

Clock

Figure 18:
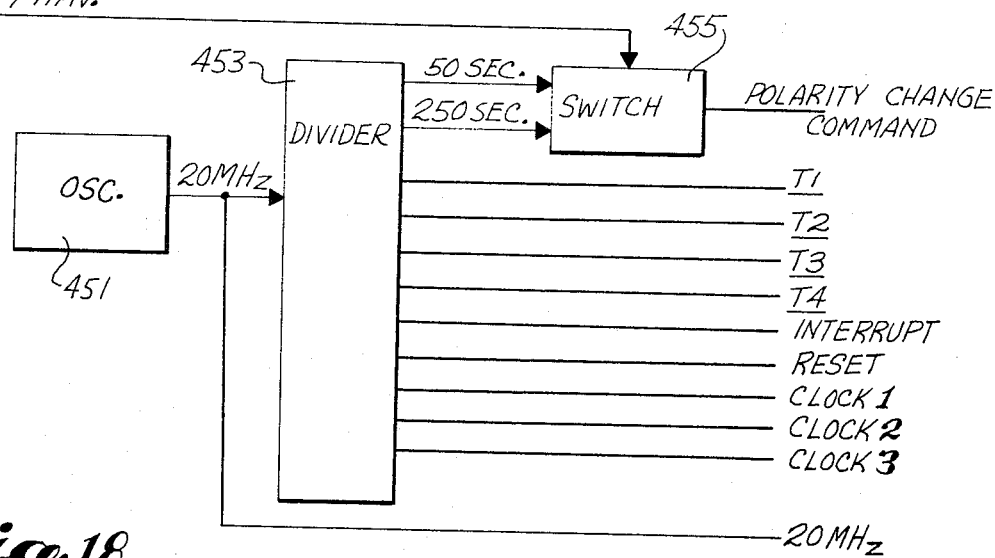
FIG. 18 is a block diagram of a clock suitable for use in the signal processor illustrated in FIG. 3.

FIG. 18 is a block diagram of a clock 58 suitable for use in the signal processor illustrated in FIG. 3 and comprises: an oscillator 451; a divider 453 (which may be formed by a series of dividers); and, a switch 455. The oscillator produces a pulse chain at a predetermined frequency, such as 20 MHz, for example. The output of the oscillator is connected to the divider 453, which divides the oscillator frequency and produces the T1, T2, T3, T4 (all 1 MHz 25% duty cycle shifted by 90° with respect to one another as illustrated in FIG. 19), clock 1 (2.5MHz), clock 2 (200 KHz), clock 3 (10 MHz), INTERRUPT (every 5 ms, coincident with T4) pulse chains previously discussed. The divider outputs also include a RESET pulse that occurs 3 ms after each INTERRUPT pulse; and, 50 and 250 sec pulse chains. The 50 and 250 sec pulse chains are each applied to an input of the switch 455. The switch control input is connected to an output of the instruction decoder 56 denoted ALIGN/NAV. Depending upon the state of this signal, either the 50 sec pulse chain or the 250 sec pulse chain is applied to the output of the switch. Whichever switch input signal is applied to its output that signal forms the POLARITY CHANGE COMMAND signal applied to the gyro subsystem 48 (FIG. 4) as previously described; whereby polarity changes occur at either 50 or 250 second intervals.

Instruction Decoder

Figure 25A:
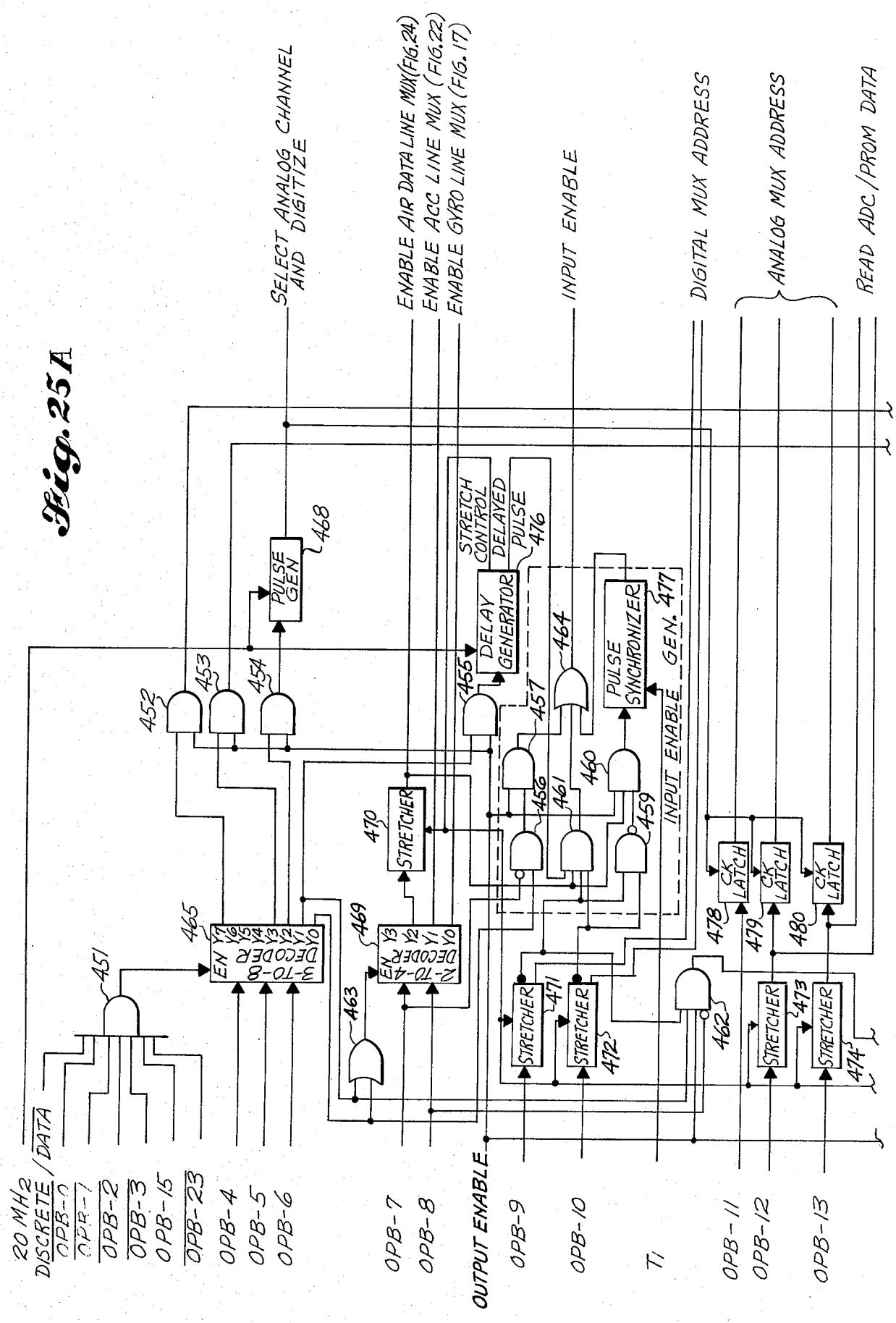
FIGS. 25A and B comprise a logic block diagram of an instruction decoder suitable for use in the signal processor illustrated in FIG. 3.
Figure 25B:
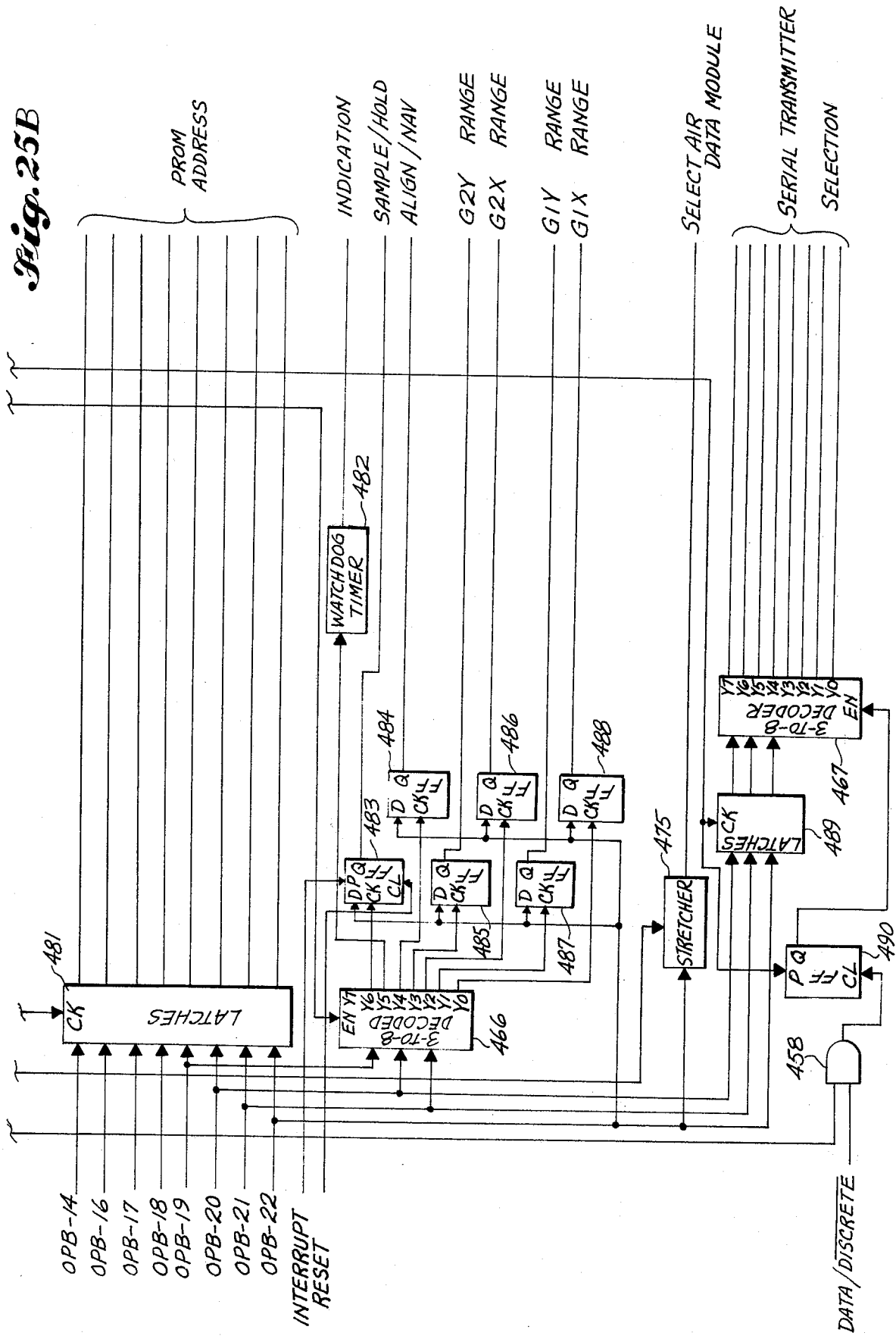

FIG. 25A-25B is a block diagram of an instruction decoder 56 suitable for use in the signal processor of FIG. 3.

The instruction decoder 56 decodes instructions produced by the computer on an output bus and, in accordance therewith, controls the flow of raw inertial air and temperature data to the computer and the flow of automatic flight control, pilot display and navigational signals from the computer to downstream systems via the serial transmitters 60a, b, c, and d. In addition to receiving raw inertial, air and temperature data, the computer receives clock signals from the clock 58, specifically the interrupt and 20 MHz signals. The computer of the preferred embodiment of the invention herein described has 24 data output lines, which form an output data bus (OPB). In addition, the output of the computer includes a 25th line—denoted discrete/data—and an output enable line. The input bus of the computer also includes 24 lines. Further, the computer receives input enable pulses from the instruction decoder via an input enable line. In addition to the commands and addresses previously described, the instruction decoder produces (when appropriate) SERIAL TRANSMITTER SELECTION signals. The SERIAL TRANSMITTER SELECTION signals are applied to the serial transmitters 60a, b, c and d illustrated in FIG. 3 and control which transmitter is to be enabled to receive data on the output bus in parallel form, convert that data to serial form and transmit it to downstream subsystems.

The 24 OPB lines are driven by an internal computer bus. This internal bus carries varying information all the time. Most of the time this information is not directed to the outside world. That is, the information is neither directed to the instruction decoder or the serial transmitters. Rather, most of the information carried by the OPB bus is for the internal operation of the computer. This information includes such things as data going in and out of the computer memory or data moving in and out of the computer arithmetic unit. In order to discriminate between data that is relevant or irrelevant to the outside world, relevant data is accompanied by an OUTPUT ENABLE pulse on the output enable line. In essence, the data/discrete line is a 25th data line. It is labeled separately because it is intended to carry special purpose information as hereinafter described.

When the computer wants to transfer command or numerical data to the outside world, it executes either an OUT instruction or an OUT* instruction. When the instruction is an OUT instruction, the data/discrete line carries a "false" level voltage (data mode) and when the instruction is an OUT* instruction, this line carries a "true" level voltage (discrete mode). OUT* instructions occur when the computer wants to issue a command to the outside world (for instance, SELECT ANALOG CHANNEL AND DIGITIZE or READ G1X data). OUT instructions occur when the computer wants to transfer numerical data to the outside world (e.g., a latitude value). Consequently, the nature of the signal on the data/discrete line tells the outside world whether the bit pattern on the 24 OPB lines should be used as numerical data (a number) or whether these bits should be interpreted as commands and, therefore, that the discrete bit pattern should be decoded by the instruction decoder and cause the production of related commands on the outputs of the instruction decoder.

In the case of both OUT and OUT* instructions, an OUTPUT ENABLE pulse on the output enable line (which may be 250 nsec wide for example) tells the outside world that the relevant information on the OPB lines has settled to the intended value. This pulse can be used as a strobe pulse to load data into registers, for instance.

Data from the outside world enters the computer via an input register (not shown) located inside of the computer and connected to the input bus. Preferably, this register consists of 24 D-flip-flops whose data inputs are driven by 24 input bus lines coming from the outside world, e.g., from the gyro subsystem 48, the acceleration and air calibration data subsystem 50 and the air data and temperature subsystem 52. The clock (load) inputs of these flip-flops are driven in parallel by an INPUT ENABLE pulse on the input enable line.

The outside world can load data into the input register at all times by creating a desired bit pattern on the 24 input data bus lines, and developing an INPUT ENABLE pulse on the input enable line, after the data lines have settled to their intended value. However, for orderly operation of the system, the outside world will only load data into the input register when it has been told to do so by the computer itself. OUT* instructions are used for this purpose.

The OUT* instructions used by the preferred embodiment of an ISADS system formed in accordance with the invention are classified in three groups:

pure commands to the outside world such as "switch gyro axis G2Y to high-range" or "select analog channel corresponding to Gyro 1 temperature sensor and digitize the signal"

requests for data from the outside world, for instance "load G1Y up/down counter data into the computer input register"

selection of a particular system output channel for the computer to subsequently transfer data to. For instance, "select the second serial transmitter 60b". Such a command connects the computer data output lines to the output device specified by the OUT* instruction is then followed by an OUT instruction which causes the desired data to be placed on the output bus and, thus, applied to the designated serial transmitter. The external hardware automatically disconnects the output data path from the selected transmitter at the end of the OUTPUT ENABLE pulse occurring during the OUT instruction.

Turning now to a more detailed description of the various OUT and OUT* instruction groups; the 24 OPB lines provide for the potential generation of $2^{24}$ or more than 16 million different OUT* commands. Obviously, all these possible combinations are not needed by the ISADS system. Therefore, the state of six of these bits is arbitrarily selected and kept the same for all the OUT* instructions to be used. As will be better understood from the following description of FIGS. 25 (A and B) and 26, the OPB lines related to these six bits (OPB-0, OPB-1, OPB-2, OPB-3, OPB-15 and OPB-23), together with the data/discrete line, are applied to the inputs of an AND gate. The output of this AND gate is true only if the OUT* instruction is directed to one of the gyro subsystems 48, the accelerometer and air calibration data subsystem 50 or the air data and temperature subsystem 52.

Out of the eighteen remaining data lines, either (OPB-14 and OPB-16–OPB-22) are used mainly to select addresses of the PROMs 273. Three of these same eight lines (OPB-19–OPB-21) are also used to generate pure commands, and another one of these eight (OPB-22) is used to select either one or the other of the two air data modules. The remaining ten lines are used to select multiplexers and submultiplexers as well as the input channels to the selected multiplexer(s).

When an OUT* instruction is used to command the external world to send data to the computer, the last ten bits mentioned above are partially decoded and set up a path from the selected data source (i.e., an analog-to-digital converter, or a gyro up/down counter) to the input bus and, thus, to the computer input register. For this class of OUT* instructions, an INPUT ENABLE pulse must be applied to the computer input register once the data on the input bus has settled.

The data from some data sources, such as the gyro or accelerometer up/down counters, settles on the input bus a very short time after the data bits on the OPB lines have settled to the pattern corresponding to the OUT* instruction. In these cases the OUTPUT ENABLE pulse, which preferably occurs a couple of hundred nanoseconds after the OUT* instruction data bits have settled, forms the INPUT ENABLE pulse. More specifically, as will be better understood from the following description of FIGS. 25 (A and B) and 26 in this case, a special decoder (input enable generator) looks at a few relevant bits of the OUT* instruction. When this decoder finds that the OUT* instruction is selecting an instantaneously available data source, it sends the OUTPUT ENABLE pulse received from the computer right back to the computer as an INPUT ENABLE pulse.

The data from other data sources, such as PROM data, settle on the input bus after the leading edge of the OUTPUT ENABLE enable pulse (for instance the PROM gives valid output data about 1 microsecond after the corresponding address—which is determined by the nature of the eight bits of the OUT* instruction discussed above—has been applied to the PROM input). Analog-to-digital converter (ADC) data falls in the same category because ADC data has to go through several multiplexers, line drivers and receivers before it reaches the input data bus. In these types of cases the special decoder mentioned in the preceding paragraph generates a delayed INPUT ENABLE pulse. More specifically, as will also be better understood from the following description of FIGS. 25 (A and B) and 26, the OUTPUT ENABLE pulse associated with such instructions starts a counter driven by the 20 MHz output of the clock 58. After a delay of 1.4 microseconds, for example, this counter initiates the generation of a short pulse, such forms the INPUT ENABLE pulse.

The data from a third class of data sources is only valid at welldefined times, corresponding to the T1 pulses. Air data counter data falls in this class because, as discussed above, the air data counters are incremented at particular T times, during which they should not be read. In these cases, the special decoder, after it has determined that the OUT* instruction falls in this class, waits after the leading edge of the OUTPUT ENABLE pulse, until the leading edge of the next T1 pulse and, then, sends this T1 pulse to the computer as the INPUT ENABLE pulse.

In cases where the OUT* instruction does not request data, but issues a command, such as a gyro range change command, the special decoder does not generate an INPUT ENABLE pulse.

Preferably, the OUT* instructions last about 1.5 microseconds. When an instruction ends, the bit pattern on the OPB lines change. This presents a problem for the OUT* instructions calling for a delayed INPUT ENABLE pulse. More specifically, in essence, the bit pattern of the OUT* instruction controls the data path from the desired data source to the computer input register. If this bit pattern disappears before the delayed INPUT ENABLE pulse can reach the computer input register, the desired data source is deselected before the desired data is loaded into the input register. If this result were allowed to occur, either no data or, more likely, irrelevant data would be loaded into the computer input register. In order to prevent this result from occurring, the relevant computer OPB lines (such as the eight PROM address lines) do not drive the multiplexer address inputs directly. Rather, special latches memorize the bit patterns during the OUTPUT ENABLE pulse period following the OUT* instructions. The latches remain in their latched state until the next OUT* instruction occurs. At this time, the latches are updated. In this fashion, the chosen data path from a selected data source to the computer input register stays open until the next OUT* instruction occurs, which occurrence does not happen before the data has been loaded into the computer input register and this register has been read by the computer. This arrangement will be better understood from the following detailed description of FIGS. 25 (A and B) and 26.

OUT instructions are used right after an OUT* instruction when it is desired to transmit data from the computer to downstream navigational, automatic flight control, pilot display, etc., subsystems. The OUT* instruction sets up a data path from the OPB lines to a selected serial transmitter. A subsequent OUT instruction causes the desired data to be applied to the selected serial transmitter. The combination of the OUTPUT ENABLE pulse which accompanies each OUT instruction, and the status of the data/discrete line, which is in the "data" state, loads the data into the previously selected serial transmitter. Preferably, the trailing edge of the OUTPUT ENABLE pulse automatically disables the data path to the selected serial transmitter so that subsequent OUT instructions are not loaded into a nonselected serial transmitter.

In the preferred embodiment of the invention, data is loaded into the serial transmitters in two operations because output data comprises 32 bits and there are only 24 OPB lines. One operation loads an eight-bit (label) word into the most significant section of the selected serial transmitter using an OUT*-OUT sequence. Then the sequence is repeated using anothe OUT* instruction to select the least significant section of the serial transmitter, and a subsequent OUT instruction to load the least significant 24 bits (data) into that section. Besides loading the data into the serial transmitter, the OUTPUT ENABLE pulse accompanying the second OUT instruction also triggers the transmission of the 32-bit word by the now fully loaded serial transmitter.

FIGS. 25A and B form a composite logic diagram of an instruction decoder, formed in accordance with the invention, suitable for use in the signal processor illustrated in FIG. 3 and FIG. 26 is a table corresponding to FIGS. 25A and B that illustrates the OUT* instruction bit pattern creating the control and selection signals that are applied to the gyro subsystem 48, the accelerometer and air calibration data subsystem 50 and the air data and temperature subsystem 52 illustrated in FIGS. 3. The instruction decoder illustrated in FIGS. 25A and B comprises: a seven-input AND gate 451; seven two-input AND gates 452–458; a two-input NAND gate 459; a three-input AND gate 460; two four-input AND gates 461 and 462; a two-input OR gate 463; a three-input OR gate 464; three 3-to-8 decoders 465, 466 and 467; a pulse generator 468; a 2-to-4 decoder 469; six pulse stretchers 470–475; a pulse delay generator 475; a pulse synchronizer 477; a set of three latches 478, 479 and 480; an eight latch set 481; a watchdog timer 482; six D flip-flops 483–488; a three latch set 489; and an enable flip-flop 490.

As noted above, the 24 computer output lines forming the output data bus are labelled OPB-0 (most significant bit) through OPB-23 (least significant bit). In FIGS. 25A and B, when a bar is shown over any of these data lines, e.g., $\overline{OPB-1}$, it means that the related signal must be in its false or binary zero state to activate the driven device. Contrariwise, the lack of an overhead bar means that the related signal must be in its true or binary one state to activate the related device.

In order to activate any subcircuit illustrated in FIGS. 25A and B, the seven input AND gate 451 must be activated. The seven-input AND gate is connected to the DISCRETE/DATA line and to output bus lines $\overline{OPB-0}$, $\overline{OPB-1}$, $\overline{OPB-2}$, $\overline{OPB-3}$, OPB-15 and $\overline{OPB-23}$. This connection means that the seven-input AND gate is activated when the OUT* instruction is such that the DISCRETE/DATA line is in the "discrete" state (i.e., it is true), and OPB-0=OPB-1=OPB-2=OPB-3=OPB-23=0 and OPB-15=1.

Any OUT* instruction which presents a bit pattern which activates the seven-input AND gate 451 causes the output of that gate to go true. This true signal enables the first 3-to-8 decoder 465, which functions as a main instruction decoder. The first 3-to-8 decoder decodes the bits on OPB-4, OPB-5 and OPB-6. The pattern of these three bits determines the main class of OUT* instructions that is being applied to the instruction decoder illustrated in FIGS. 25A and B. There are eight possible classes of data input commands, but only four of these are used. These classes are determined by which one of the four used outputs of the first 3-to-8 decoder goes true. The used outputs are identified as the $Y_0$, $Y_1$, $Y_2$ and $Y_3$ outputs of the first 3-to-8 decoder 465. (The $Y_7$ output is also used, but not for data input command purposes. Rather, the $Y_7$ output is used to enable the selection of a serial transmitter, as hereinafter described.) The following description describes the four classes of instruction decoder outputs enabled by the four used data input command outputs of the first 3-to-8 decoder.

The first class of instruction decoder outputs enabled by the first 3-to-8 decoder 465 enables the reading of either gyro data, accelerometer data or air data. This class occurs when OPB-4=OPB-5=OPB-6=0, resulting in the $Y_0$ output of the first 3-to-8 decoder being true. $Y_0$ being true enables the 2-to-4 decoder 469. (The 2-to-4 decoder 469 is also enabled when the $Y_1$ output of the first 3-to-8 decoder goes true.) The 2-to-4 decoder 469 decodes OPB-7 and OPB-8. When OPB-7=OPB-8=0 the $Y_0$ output of the 2-to-4 decoder goes true and enables the gyro line mux 323 (FIG. 17). This enabling signal connects the output line of the gyro line mux to the input bus of the computer and, thus, to the input register of the computer. As previously discussed, the gyro line mux 323 receives accumulated gyro angular displacement data from four different gyro axes (via hold register numbers 315, 317, 319 and 321). Which one of the four gyro axes is selected for connection to the output of the gyro line mux depends on the bit pattern present on OPB-9 and OPB-10 at the time the OUT* instruction is issued by the computer. More specifically, OPB-9 and OPB-10 are applied to the second and third pulse stretchers 471 and 472. When enabled, the second and third pulse stretchers store the state of their input bits so that these states are preserved after the OUT* instruction disappears, as previously described. In the present situation, the storage capability of the pulse stretchers is not used. More specifically, the second and third pulse stretchers are, preferably, formed by Dflip-flops. The clock inputs of these flip-flops are connected to a STRETCH CONTROL output of the delay generator 476. In its quiescent state the STRETCH CONTROL output of the delay generator conditions the clock or control input of the pulse stretchers such that their outputs follow or track their inputs. When the delay generator is triggered as hereinafter described, the control input of the pulse stretchers change and the pulse stretchers store the then present input until the STRETCH CONTROL signal reverts to its quiescent state. Preferably, this is accomplished by forming the delay generator from a pulse counter held in a zero state until triggered. When triggered, the pulse counter is preset to a predetermined number from which it counts down to zero at a 20 MHz rate. When the pulse counter (e.g., delay generator) is triggered, the STRETCH CONTROL signal shifts states and remains in the shifted state until the pulse counter reaches zero. In the class of instruction decoder outputs presently being discussed (e.g., $Y_0$ output of the first 3-to-8 decoder equals zero), the delay generator is not triggered, hence the second and third pulse stretchers merely track their inputs. However, in this case pulse stretching is not needed because the gyro axis data is essentially immediately available.

The OPB-9 and OPB-10 signals flowing through the second and third pulse stretchers 471 and 472 form the DIGITAL MUX ADDRESS signals applied to the address inputs of the gyro line mux 323. (The DIGITAL MUX ADDRESS signal was shown as a single line in the previous figures to avoid unnecessarily complicating those figures.) The OPB-9 and OPB-10 bits are decoded by the gyro line mux and, as a result, one of the four hold registers 315 through 321 is connected through the enabled gyro line mux to the input bus and, thus, to the computer input register. Simultaneously, OPB-9 and OPB-10 (in parallel) also select input channels of the accelerometer line mux 395 (FIG. 22) and the air data line mux 447 (FIG. 24). However, these multiplexers do not connect the selected input to their outputs because they are not enabled by the 2-to-4 decoder 469, at this time.

As discussed above, in order to load gyro line mux data into the computer input register, an INPUT ENABLE pulse must be generated by the instruction decoder. Since the hold register data is always available, such data appears at the input of the computer input register a very short time after the DIGITAL MUX ADDRESS bit pattern selects the desired hold register. The OUTPUT ENABLE pulse, which accompanies the OUT* instruction occurs immediately after the data settling time has elapsed and is used to create the INPUT ENABLE pulse. This function is performed by a special decoder called an input enable generator and illustrated in the center of FIG. 25A.

The input enable generator comprises: the fifth and sixth two-input AND gates 456 and 457; the three-input AND gate 460; the first four-input AND gate 461; the two-input NAND gate 459; the three-input OR gate 464; and, the pulse synchronizer 477. All of the gates are enabled on true inputs, except for one input of the fifth AND gate 456, which is enabled on a false input.

The false input of the fifth two-input AND gate 456 receives the signal on OPB-7. The true input of the fifth two-input AND gate 456 is connected to the $Y_0$ output of the first 3-to-8 decoder 465. The output of the fifth two-input AND gate 456 is connected to one input of the sixth two-input AND gate 457. The output enable line is connected to the second input of the sixth two-input AND gate 457 and to one input of the three-input AND gate 460. The output of the sixth two-input AND gate 457 is applied to one input of the three-input OR gate 464.

An output of the delay generator, denoted the DELAYED PULSE output, is connected to one input of the first four-input AND gate 461. Inverted outputs of the second and third pulse stretchers 471 and 472 are each connected to one of the other inputs of the first four-input AND gate 461. The output of the first pulse stretcher 470 is connected to the fourth input of the first four-input AND gate 461. The output of the first four-input AND gate is connected to a second input of the three-input OR gate 464.

The inverted outputs of the second and third pulse stretchers 471 and 472 are also each connected to an input of the two-input NAND gate 459. The output of the two-input NAND gate is connected to a second input of the three-input AND gate 460. The output of the first pulse stretcher 470 is connected to the third input of the three-input AND gate 460. The output of the three-input AND gate 460 is connected to the signal input of the pulse synchronizer 477. T1 is applied to the synchronizing input of the pulse synchronizer 477. The output of the pulse synchronizer 477 is connected to the third input of the three-input OR gate 464. The output of the three-input OR gate 464 is connected to the input enable line of the computer.

As noted above, the input enable generator (special decoder) produces an INPUT ENABLE pulse immediately following the receipt of an OUTPUT ENABLE pulse when the gyro line mux data is being read because this data is always available. In this case, the fifth two-input AND gate 456 is enabled because OPB-7=0 (false) and the $Y_0$ output of the first 3-to-8 decoder=1 (true). As a result, the output of the fifth two-input AND gate is true, whereby the sixth two-input AND gate 457 is enabled. Because the sixth two-input AND gate is enabled, the OUTPUT ENABLE pulse flows through this gate and the three-input OR gate 464, and forms an INPUT ENABLE pulse.

The operation of the instruction decoder is substantially the same when accelerometer data is to be transmitted to the computer as when gyro data is transmitted. The only difference is that the bit on OPB-8 equals one (true), rather than zero (false). As a result, the $Y_1$ output of the 2-to-4 decoder goes true, rather than the $Y_0$ output. The $Y_1$ output of the 2-to-4 decoder is connected to the enable input of the accelerometer line mux 395 (FIG. 22), whereby this multiplexer is enabled. That is the $Y_1$ output of the 2-to-4 decoder is the ENABLE ACC LINE MUX enabling signal. The bit pattern on the OPB-9, OPB-10 lines (which forms the DIGITAL MUX ADDRESS signal) then determines which one of the three hold register 389, 391 and 393 and the air calibration mux 365 (FIG. 21) inputs is to be applied to the output of the accelerometer line mux. If the air calibration mux input is chosen, which of the two air module calibration data signals is to be forwarded is determined by the output of the sixth pulse stretcher 475, which forms the SELECT AIR DATA MODULE. More specifically, the signal input of the sixth pulse stretcher is connected to OPB-22. As with the other pulse stretchers, preferably the sixth pulse stretcher is a D flip-flop having its clock input connected to the stretch control output of the delay generator 476. Normally, the sixth pulse stretcher tracks its input. Since air calibration data is always immediately available, the sixth pulse stretcher does not actually stretch its input pulse during the air calibration data module selection process. Rather, it merely transfers the selection data on OPB-22 to the address input of the air calibration multiplexer 365. When the signal on OPB-22 is true, one of the two serial bus receivers 361 and 363 (FIG. 21) is chosen and when the signal on OPB-22 is false, the other is chosen, as previously described. As noted above, air calibration data is only selected subsequent to one of the serial bus receivers sending an AIR CALIBRATION interrupt pulse to the computer. Thereafter, the pulse producing serial register is selected in the manner just described.

As with the reading of gyro data, the OUTPUT ENABLE pulse, which accompanies the OUT* instruction designating that acceleration data is to be read, is reformed immediately as an INPUT ENABLE pulse. More specifically, in this case, the $Y_0$ output of the first 3-to-8 decoder is still true. Further, the signal on OPB-7 is false. As a result, the fifth two-input AND gate 456 is enabled, whereby the sixth two-input AND gate is enabled. As a result, the OUTPUT ENABLE pulse passes through the sixth two-input AND gate 457 and the three-input OR gate, and forms the INPUT ENABLE pulse.

The second class of instruction decoder outputs enabled by the first 3-to-8 decoder 465 cover the reading of ADC data, PROM data or air data pressures. In this class the OPB-4, OPB-5 and OPB-6 bit pattern is such that the $Y_1$ output of the first 3-to-8 decoder 465 is true. The preferred bit pattern is OPB-4=OPB-5=0 and OPB-6=1. As in the case of the $Y_0$ output of the first 3-to-8 decoder being true, when the $Y_1$ output is true, the 2-to-4 decoder 469 is enabled. (This is accomplished by applying both the $Y_0$ and $Y_1$ outputs to the enable input of the 2-to-4 decoder through the two-input OR gate 463.) For this group of OUT* instructions, the OPB-7, OPB-8 bit pattern of the 2-to-4 decoder is true and false, respectively. This results in $Y_2$ output of the 2-to-4 decoder being true. This $Y_2$ signal is stored by the first pulse stretcher 470, whose output is applied to the enable input of the air data line mux 447 (FIG. 24). That is, the $Y_2$ output of the 2-to-4 decoder 469 forms the ENABLE AIR DATA LINE MUX enable signal applied to the enable input of the air data line multiplexer. As in the preceding gyro and accelerometer line multiplexer cases, the OPB-9 and OPB-10 bits form the DIGITAL MUX ADDRESS signal applied to the address input of the air data line mux. In this case, this bit pattern controls the selection of either pressure data, calibration data stored in a PROM, or various digitized analog data (ADC data). Further, in this case, it is important that the bit pattern on OPB-9 and OPB-10 be stretched by the secod and third pulse stretchers because of the previously described delay in such data settling on the input bus and, thus, being available to the computer input register.

When OPB-9=OPB-10=0, the MISC GYRO DATA input of the air data line mux 447 is selected for connection to the input data bus. As illustrated in FIG. 16 and previously described MISC GRYO DATA includes PROM data, gyro subdigit data and pick off angle and gyro temperature data, the latter two being ADC data. Which of these data sources is selected is determined by the nature of the READ ADC/PROM DATA signal applied to the digital mux 275 shown in FIG. 16. That is, the selection of which input is to be connected to the output of the digital mux 275 is determined by the nature (bit pattern) of the READ ADC/PROM DATA signal, which is determined by the bit pattern on OPB-12 and OPB-13. More specifically, OPB-12 is connected to the signal input of the fourth pulse stretcher 473 and OPB-13 is connected to the signal input of the fifth pulse stretcher 474. These pulse stretchers are controlled by the stretch control output of the delay generator 476 and, as with the other pulse stretchers, are preferably formed by D flip-flops. In any event, the outputs of the fourth and fifth pulse stretchers track (when their control inputs are in one state) and store (when their control inputs are in the opposite state) the signals on OPB-12 and OPB-13. Further, the outputs of the fourth and fifth pulse stretchers 473 and 474 form the READ ADC/PROM DATA address signal. As illustrated in FIG. 26, when OPB-12=0 and OPB-13=1, the pick off angle and gyro temperature (gyro servo-loop) data output of the ADC 185 of the gyro interface mux (FIG. 9) is selected. When OPB-12=1 and OPB-13=0, the gyro subdigit data output of the ADC 259 of the subdigit gyro mux shown in FIG. 14 is selected. Finally, when OPB-12=OPB-13=1, the digital mux 275 illustrated in FIG. 16 selects the calibration data stored in PROMs. In the latter case, locations within the PROMs are selected by means of OPB-14 and OPB-16 through OPB-22. More specifically, OPB-14 and OPB-16 through OPB-22 are each connected to one input of the eight latch set 481 (which may comprise eight separate latches). The clock input of the eight latch set is connected to the output of the second four-input AND gate 462. The second four-input AND gate has one false input and three true inputs. The false input is connected to OPB-8; one true input is connected to the false output of the second pulse stretcher 471; another true input is connected to the $Y_1$ output of the first 3-to-8 decoder 465; and, the third true input is connected to receive OUTPUT ENABLE pulses. Thus, the second four-input AND gate is enabled when OPB-8=0; OPB-9=0; and the $Y_1$ output of the first 3-to-8 decoder=1. When enabled, the second four-input AND gate passes a subsequently occurring OUTPUT ENABLE pulse, which clocks the eight latch set 481, causing it to store the OPB-14 and OPB-16 through OPB-22 bit pattern present at that time. The output of the eight latch set 481 forms the PROM address signal applied to the PROMs 273 shown in FIG. 16. As will be appreciated, the second four-input AND gate 42 is only enabled when PROM data is to be forwarded to the computer input register.

When OPB-9=0 and OPB-10=1, the air data line mux 477 (FIG. 24) selects air data pressure data from one of the pressure transducer modules. The state of the SELECT AIR DATA MODULE signal (OPB-22) which is applied to both 2/1 multiplexers 443 and 445 illustrated in FIG. 24, determines whether static pressure data or total pressure data is to be forwarded to the computer input register. Similarly, the other pressure transducer module is selected for forwarding pressure data when OPB-9=1 and OPB-10=0, with the state of the SELECT AIR DATA MODULE signal determining whether static or total pressure is to be forwarded.

Finally, when OPB-9=OPB-10=1, digitized data from the total air temperature conditioner and A/D converter (FIG. 23) is selected for forwarding by the air data line multiplexer 447.

Data forwarded by the air data line multiplexer takes a significant amount of time to settle after the foregoing selections are made (due to the number of multiplexers and because PROM data production is slow). As a result, the OUTPUT ENABLE pulse following a suitable OUT* instruction cannot be immediately sent back as an INPUT ENABLE pulse. Instead, a delayed INPUT ENABLE pulse must be generated. The generation of such a delayed INPUT ENABLE pulse by the input enable generator is next described.

When the air data line mux 447 is addressed to forward gyro servo-loop, subdigit gyro or PROM data, as previously described, OPB-9=0 OPB-10=0 and the $Y_2$ output of the 3-to-8 decoder=1. As a result, the first four-input AND gate 461, which forms a part of the input enable generator is enabled. Further, the $Y_1$ output of the first 3-to-8 decoder=1, whereby the fourth twoinput AND gate 455 is enabled. The latter enablement causes the OUTPUT ENABLE pulse following an OUT* instruction to trigger the delay generator 476. This action causes the stretch control signal to change states, whereby the various pulse stretchers shift from a track mode to a store mode of operation. Thus, the instructions controlling the forwarding of data through the air data line mux are held fixed. In addition, the delay generator 476 generates a suitable width (e.g., 180 nanosecond) pulse a suitable period of time (e.g., 1.4 microseconds) after the OUTPUT ENABLE pulse which accompanies the OUT* instruction. This delayed pulse passes through the enabled first four-input AND gate 461 to the three-input OR gate 464 and forms the INPUT ENABLE pulse. Thus, the INPUT ENABLE PULSE is delayed for a period of time to allow the requested data to settle on the input bus.

When the air data line mux is addressed to forward pressure data (e.g., PT1, PT2, PS1 or PS2 data) OPB-9=0 and OPB-10=1. This bit pattern causes the input enable generator to generate an INPUT ENABLE pulse in a manner that is synchronized with $T_1$ pulses. This is done because the INPUT ENABLE pulse should occur at a time that the PS1, PS2, PT1, PT2 counter data is stable. Because of the synchronous operation of these counters, their data is always stable at $T_1$. Therefore the input enable generator is formed such that a $T_1$ pulse causes an INPUT ENABLE pulse when pressure data is to be read. Synchronization is accomplished by the pulse synchronizer 477 forming part of the input enable generator. More specifically, the three-input AND gate 460 is enabled when the $Y_2$ output of the 2-to-4 decoder is true and the output of the two-input NAND gate 459 is true. The latter situation exists when either OPB-9 or OPB-10 (or both) are high. That is, the latter condition exists as long as both OPB-9 and OPB-10 are not true simultaneously. As can be seen above, this is the case when either pressure data or air temperature sensor data is being forwarded. The air temperature sensor data is instantaneously available and the OUTPUT ENABLE pulse could be used as an INPUT ENABLE pulse. However, it is simpler in the instruction decoder to generate an INPUT ENABLE pulse synchronized with $T_1$ in this case also, rather than implementing another path in the input enable generator. In any event, when the three-input AND gate 460 is enabled, the OUTPUT ENABLE pulse is applied to the pulse synchronizer where it is synchronized with the next $T_1$ pulse. The resulting synchronized pulse flows through the three-input OR gate 464 and forms the INPUT ENABLE pulse.

The third class of instruction decoder outputs used to control the transmission of data to the input register, enabled by the first 3-to-8 decoder, does not per se result in the transmission of data to the computer. Rather this class is used to issue analog-to-digital conversion commands to the ADCs and occurs when OPB-4=OPB-6=0 and OPB-5=1. More specifically, this OPB-4, OPB-5 and OPB-6 bit pattern causes the $Y_2$ output of the first 3-to-8 decoder to shift high. The $Y_2$ output is connected to one input of the third two-input AND gate 454, whereby that gate is enabled when $Y_2$ shifts high. The following OUTPUT ENABLE pulse, which is applied to the second input of the two-input AND gate 454, passes through that gate and triggers the pulse generator 468. The output of the pulse generator is connected to the clock inputs of the set of three latches 478, 479 and 480. The data inputs of the latches are connected to receive OPB-11, OPB-12 and OPB-13 signals. These signals form the ANALOG MUX ADDRESS signal used to select the analog inputs of both the pickoff angle and gyro temperature analog multiplexer 183 (FIG. 9) and the subdigit analog multiplexer 258 (FIG. 14) via the analog mux address storage register 277 (FIG. 15). The special storage of the three address bits in the set of three latches 478, 479 and 480 is needed because it takes the ADCs a predetermined period of time, e.g., 15 microseconds, to do a data conversion and, during that time, the desired analog signal source must remain connected to the ADC input.

In addition to clocking the set of three latches, the pulse produced by the pulse generator 468 forms the SELECT ANALOG CHANNEL AND DIGITIZE signal that triggers all of the ADCs in parallel. More specifically, the SELECT ANALOG CHANNEL AND DIGITIZE SIGNAL triggers the ADC 403 of the air temperature conditioner and A/D converter 111 illustrated in FIG. 23. In addition, the SELECT ANALOG CHANNEL AND DIGITIZE SIGNAL, after being delayed by the delay 281 of the analog multiplexer control illustrated in FIG. 15, as previously described, causes a CONVERSION COMMAND pulse that triggers the ADC 185 of the gyro interface mux (FIG. 9) and the ADC 259 of the subdigit gyro signal mux (FIG. 14).

The ADCs are built in such a way that they start a conversion at the trailing edge of the trigger (SELECT ANALOG CHANNEL AND DIGITIZE) pulse which is applied to them. Contrariwise, address loading into the set of three latches occurs on the leading edge of their trigger (clock) pulse, which is also the SELECT ANALOG CHANNEL AND DIGITIZE pulse. This gives a delay equal to the length of the pulse produced by the pulse generator between the time that an analog signal is selected and the time that A-to-D conversion starts. This delay insures that the analog signal has settled at the input of the ADCs by the time conversion starts.

The fourth class of instruction decoder outputs used to control the transmission of data to the computer, enabled by the four outputs of the first 3-to-8 decoder 465, also does not per se result in the transmission of data. Rather, this class controls the issuance of various commands to various subsystems. This class occurs when OPB-4=0 and OPB-5=OPB-6=1, which causes the $Y_3$ output of the first 3-to-8 decoder 465 to go true. The output of the first 3-to-8 decoder $Y_3$ is combined with the OUTPUT ENABLE pulse in the second two-input AND gate 453, whose output is connected to the enable input of the second 3-to-8 decoder 466. Inputs to the second 3-to-8 decoder comprise the OPB-19, OPB-20 and OPB-21 signals.

When an OUT* instruction causing the fourth class of instruction decoder outputs to be operative is executed, the OPB-19, OPB-20 and OPB-21 bit pattern causes one of the seven used outputs, $Y_0$ through $Y_6$, of the second 3-to-8 decoder 466 to go true. Six of these outputs ($Y_0$ through $Y_4$ and $Y_5$) drive the clock inputs of the six D flip-flops 483-488 and the other enables the watchdog timer 482. The D flip-flops read the signal on OPB-22.

The last four D flip-flops 485-488 are connected to the $Y_0$-$Y_3$ outputs of the second 3-to-8 decoder and control the range setting of the gyros. That is, when the second 3-to-8 decoder is enabled and a suitable code occurs on OPB-19, OPB-20 and OPB-21 one of the $Y_0$-$Y_3$ outputs goes true. This output clocks one of the last four D flip-flops causing its Q output to be set on OPB-22. Depending on the state of that signal, the range of the related gyro axis will be set either high or low.

The first D flip-flop 483, which is connected to the $Y_6$ output, determines whether the various sample/hold circuits should be in the sample (tracking) mode or the hold mode. Normally, the sample and hold modes are controlled automatically by the clock 58, which puts the first D flip-flop 483 in hold every five milliseconds, just before the computer starts reading the data sources, and puts it back in the tracking mode 3 milliseconds later. This is accomplished by applying the 5 ms INTERRUPT pulses produced by the clock to the preset (P) input of the first D flip-flop and the 3 ms after INTERRUPT or RESET pulses produced by the clock to the clear (CL) input. Control of the first D flip-flop 483 by the second 3-to-8 decoder is merely included for special test purposes, i.e., if the computer decides to control the sample/hold mode it produces a suitable OPB-19, OPB-20 and OPB-21 code to clock the first D flip-flop 483 causing it to read that state of OPB-22. As noted, computer control of the sample/hold mode is the abnormal situation. Normally, the sample/hold mode is controlled by the INTERRUPT and RESET pulses produced by the clock.

The second D flip-flop 484, which is connected to the $Y_4$ output of the second 3-to-8 decoder 466, controls the placing of the system in either the align mode or the nav mode. The output of this flip-flop is used mainly to select either a fast (e.g., every 50 seconds) or slow (e.g., every 250 seconds) polarity switching rate for the gyro V/Fs. The fast rate is used in an align mode of operation and the slow rate is used in the navigation mode of operation. The flip-flop state is also used to control a visual indication of the mode of operation of the system (e.g., align or nav).

A remaining output of the second 3-to-8 decoder 466 ($Y_5$) does not clock a flip-flop. Rather this output triggers the watchdog timer 482. The watchdog timer is a suitably timed (e.g., ten millisecond) pulse generator, which may be formed by a retriggerable one-shot. The watchdog timer drives an indicator. When the system operates normally, the one-shot is triggered once per iteration (e.g., every 5 milliseconds) and never gets the opportunity to return to its quiescent state. The active state of the one-shot lights the indicator to denote that the system is functioning correctly. When either the computer softeware fails to operate or the computer software detects a failure, the one-shot is not triggered. If this occurs, ten milliseconds later, the one-shot returns to its quiescent state and extinguishes the indicator light.

As noted above, the $Y_7$ output of the first 3-to-8 decoder is used to enable the selection of a serial transmitter. In this regard, as described above and illustrated in FIG. 3, the computer transmits data to four serial transmitters 60a, b, c and d. The serial transmitters, in turn, place data on the display bus, flight control bus and other data bus shown in FIG. 1. Which serial transmitter is enabled to receive and transmit data is determined by the instruction decoder 56. In the preferred embodiment of the invention, the computer loads a 32-bit data word into the selected transmitter via the output data bus. Because the output data bus has only 24 lines (OPB-0 through OPB-23), a selected transmitter must be loaded in two operations. First, an eight-bit "label" is loaded in the selected transmitter, next 24 bits of numerical data are loaded in the same transmitter. (The label is an identifier which indicates the nature of the following 24 bits of numerical data, e.g., latitude, north, velocity, etc.) The operation which loads the 24 bits of numerical data also acts as the command to serialize the 32 bits of information and put them on the related display, flight control or other data bus.

To perform the foregoing operations, an OUT* instruction is produced by the computer, which places the $Y_7$ output of the first 3-to-8 decoder 465 in a true state. The $Y_7$ output is combined with the OUTPUT ENABLE pulse in the first two-input AND gate 452 and the resulting pulse is applied to the clock input of the three latch set 489, whose data input is connected to OPB-20, OPB-21 and OPB-22. Thus, at this time the OPB-20, OPB-21 and OPB-22 bit pattern is loaded into the three latch set. The three latch set drives the third 3-to-8 decoder 467. For a given pattern of these three OPB bits, one of the eight outputs of the third 3-to-8 decoder is true. These outputs are used to enable the "label" or "data" inputs of the four serial bus transmitters. That is, one of the eight outputs is connected to either an enable "label" or an enable "data" input of one of the serial transmitters 60a, b, c or d. Subsequent data on the OPB lines is then received by the enabled portion of the selected serial transmitter.

The enable flip-flop 490 is included to prevent unrelated OUT instructions from causing the loading of erroneous data into a serial transmitter. More specifically, the enable flip-flop is connected to the enable input of the third 3-to-8 decoder 467. The enable flip-flop is set whenever a serial transmitter selecting OUT* instruction is issued by the computer. The enable flip-flop is cleared by the trailing edge of the OUTPUT ENABLE pulse which accompanies the first OUT instruction following this OUT* instruction. More specifically, the preset (P) input of the enable flip-flop 490 is connected to the output of the first two-input AND gate 452. Since this AND gate output goes true when an OUT* instruction commanding that selection of a serial transmitter occurs, the enable flip-flop is set when the three latch set 489 is clocked. As a result, the third 3-to-8 decoder is enabled. The first OUT instruction following this OUT* instruction (which is a label or data signal) applies data to the serial register. The trailing edge of the OUTPUT ENABLE pulse accompanying this OUT instruction resets the enable flip-flop 490, whereby the third 3-to-8 decoder is disabled. Disabling is accomplished by applying the OUTPUT ENABLE pulse to one input of the seventh two-input AND gate 458 and a $\overline{\text{DATA/DISCRETE}}$ signal (which is the complement of DATA/DISCRETE) to the other input. Since DATA/DISCRETE is only true when data is being produced (as opposed to instructions), a pulse only occurs on the output of the seventh two-input AND gate when data is on the OPB lines. Such pulses are applied to the clear (CL) input of the enable flip-flop, which is cleared on the trailing edge of such pulses, as noted above. The foregoing method of operation insures that a selected serial transmitter is still enabled by the decoder when data is produced, but disabled as soon as data is received.

In summary, a complete serial bus transmitter loading operation is executed as follows: (1) the label portion of the desired serial transmitter is selected by means of the appropriate OUT* instruction; (2) the binary value of the label is loaded with an OUT instruction; (3) the data portion of the desired transmitter is selected by means of an appropriate OUT* instruction; and (4) the binary value of the data portion is loaded by means of an OUT instruction. Besides loading data, the latter OUT instruction causes the transmitter to serially transmit the just loaded label and data bits.

It is pointed out that the foregoing description has proceeded backward in the sense that the forwarding of data from the gyro line multiplexer 323, the accelerometer line multiplexer 395 and the air data line multiplexer 447 was described prior to the description of the issuance of instruction commands, such as sample/hold mode control, analog-to-digital conversion control, etc. This approach was used to make the nature and operation of the instruction decoder easier to understand. However, it is to be understood that necessary control instructions must be issued prior to the transfer of data. For example, the hold registers 315, 317, 319 and 321 of the gyro counter and multiplexer (FIG. 17) must be placed in a hold state before the gyro data can be forwarded to the computer. Similarly, SUBDIGIT data (FIG. 14) must be held prior to being converted from analog form to digital form. Thus, the sample/hold output of the instruction decoder shifts from a sample state to a hold state prior to data being converted and forwarded. Similarly, as will be apparent, other instructions must be issued prior to other types of data being forwarded. These instructions will be better understood from the following discussion of the format of the data forwarded to the computer.

Data Format at the Computer Input

As will be appreciated from the foregoing description, there are eight different sources of data available to the computer. The sources include: angular rate data from the gyros; pick-off angle data from the gyros; temperature data from the gyros; linear acceleration data from the accelerometers; gyro and accelerometer idiosyncrasy data from the PROMs; pressure data from the pressure transducer modules; air calibration data from the pressure transducer modules; and, temperature data from the total air temperature probe. Some of this data is forwarded to the computer during each interrupt and other data is forwarded at other intervals, i.e., only at start up, once each N number of intervals in the case of air calibration data, or upon receipt of an external interrupt. The following description describes the general formats of the data received from the different data sources and when the data is forwarded to the computer.

The main portion of the angular rate data is obtained from the G1X, G1Y, G2X and G2Y up/down counters 299, 301, 303 and 305 (FIG. 17). The received data relates to the angular displacement that has occurred during the immediately preceding iteration period (which equals the time between two INTERRUPT pulses—5 ms) and is obtained during each interrupt (200 times per second). Prior to each interrupt pulse, the sample/hold output of the instruction decoder shifts to a hold state. As previously described, the next T3 pulse causes the hold registers 315, 317, 319 and 321 of the gyro counter and multiplexer to hold the outputs of the G1X, G1Y, G2X and G2Y UP/DN counters. Then the computer sequentially issues OUT* instructions that causes the gyro line multiplexer to be addressed such that the held gyro data is sequentially forwarded to the input register of the computer. The data is in the form of a 12-bit, two's complement word, which is loaded into the twelve most significant bit positions of the input register. A 13th bit (next to the least significant bit of angular displacement data) carries the RANGE (ECHO) data. Preferably, the RANGE (ECHO) bit is a binary zero (false) when the related gyro axis was in the low range during the iteration period and a binary one (true) when the related gyro axis was in the high range during the iteration period. Further, range changes are commanded only at the beginning of an iteration period. Zeros are loaded into the remaining eleven bit positions of the input register. Assuming the twelve bit angular displacement value is an integer, preferably, each count of this number corresponds to an angular displacement of four (4) arc-seconds when the gyro axis is in the low range and forty (40) arc-seconds when the gyro axis is in the high range.

Additional angular displacement resolution is provided by the SUBDIGIT data signals. As noted above, these signals represent the residual charge on the V/F converter. Additional angular displacement resolution is obtained by comparing the values of related SUBDIGIT data at the beginning and end of each iteration period.

After the sample/hold output of the instruction decoder shifts to its hold mode at the beginning of an iteration period, a suitable SELECT ANALOG CHANNEL AND DIGITIZE command and a suitable bit pattern on OPB-11, OPB-12 and OPB-13 created by a suitable computer produced OUT* instruction causes the analog multiplexer storage register 277 (FIG. 15) to produce an ANALOG MUX ADDRESS that selects one of the fast sample and hold inputs to the subdigit analog multiplexer 25 (FIG. 14). The selected signal is applied to the analog-to-digital converter 259, which is commanded to digitize its input. Approximately 50 microseconds later conversion is complete and the SUBDIGIT data is forwarded to the computer's input register as the result of the computer instructing such forwarding in the manner previously described. Preferably, the resulting data is in the form of a 12-bit, two's complement word. Zeros are loaded into the other 12-bit positions of the input register.

The computer always stores the SUBDIGIT data reading from the previous iteration period in memory. To obtain the actual subdigit data value, the computer subtracts the preceding value from the present value and multiplies the resulting integer by 1/256 to obtain subdigit data expressed in arc-seconds. The result is added to the angular displacement value obtained from the related axis up/down counter. The final result is the total angular displacement occurring during the last complete iteration period.

As previously described, an OUT* instruction that causes a SELECT ANALOG CHANNEL AND DIGITIZE command and a suitable OPB-11, OPB-12 and OPB-13 bit pattern causes the gyro interface multiplexer (FIG. 9) to convert PICKOFF ANGLE data (or GYRO TEMPERATURE data) from analog form to digital form, as well as causing the conversion of SUBDIGIT data. If PICKOFF ANGLE data is desired, the computer issues an OUT* instruction causing the desired PICKOFF ANGLE data to be converted to digital form. Fifty-eight microseconds thereafter, the PICKOFF ANGLE data, which is a 12-bit word is ready for forwarding to the computer. At this time, the computer issues an OUT* instruction that causes the desired data to flow through the gyro secondary multiplexer 102 (FIG. 16) and the air data counter and multiplexer (FIG. 24) to the input register of the computer. The resulting data is loaded into the twelve most significant bit positions of the input register. Preferably, the PICKOFF ANGLE data signals are scaled such that a full scale reading (±2048 counts) corresponds to a pick-off angle error of 7 milliradians. PICKOFF ANGLE data for each gyro axis is forwarded to the computer each time an INTERRUPT pulse occurs.

Gyro temperature data is also digitized by the gyro interface multiplexer (FIG. 9), as previously described. Again, a suitable OUT* instruction causes a SELECT ANALOG CHANNEL AND DIGITIZE command and creates a suitable OPB-11, OPB-12 and OPB-13 bit pattern. Fifty-eight microseconds after such an instruction the GYRO TEMPERATURE data is ready for forwarding. This data which follows the same path as the PICKOFF ANGLE data, is a 12-bit two's complement word that is inserted into the twelve most significant bit positions of the input register of the computer. Preferably, the gyro temperature value is obtained from the formula $T=(EN+F)/(C-N)$; where: T equals the gyro temperature in degrees Farenheit; N equals the value of the 12-bit integer determined by the number of counts of the signal received from the analog-to-digital converter; E equals $-3,200$; F equals $-6,850,000$; and, C equals $-86,000$. Preferably, the forwarding of gyro temperature data is only instructed by the computer once a second, i.e., once every 200 iteration periods.

Accelerometer data is forwarded to the computer at the end of each iteration period. First, the hold registers 389, 391 and 393 of the accelerometer counter and multiplexer (FIG. 22) are placed in a hold state when the sample/hold output of the instruction decoder is placed in a hold state by an INTERRUPT pulse coming from the clock 58. Thereafter, during the interrupt period, the accelerometer line multiplexer is enabled and addressed by the instruction decoder. In this way, data accumulated by the up/down counters 377, 379 and 381 in the manner previously described is forwarded to the computer. Preferably, each pulse accumulated by the up/down counters over an iteration period corresponds to a change in linear velocity of 0.02 feet per second. Also, preferably, as with previously described data, the pulse counts are 12-bit, two's complement integers and are applied to the twelve most significant bit positions of the input register of the computer.

As noted above, the PROM's 273 (FIG. 16) contain correction factors for the gyro and accelerometer data. Whenever the system is turned on the computer reads the data from the PROMs and uses the data, along with other data to correct the gyro and accelerometer data in the manner hereinafter described. In this regard, the computer produces OUT* instructions that cause the instruction decoder to sequentially address the PROMs and forward the data stored therein to the computer input register via the digital multiplexer 275 of the gyro secondary multiplexer (FIG. 16) and the air data line multiplexer 447 of the air data counter and multiplexer (FIG. 24). Preferably, the PROM data comprises 256 eight-bit data words; and, each word comprises seven (7) data bits and an odd parity bit.

As previously described, the pressure transducer modules produce data in the form of variable pulse trains. The pulse trains are transformed into suitable digital form by the air data counter and multiplexer (FIG. 24), which counts the cycles of a suitable (e.g., 10 MHz) clock to measure the time between 32 pulses of the variable frequency pulse trains produced by the pressure transducer modules. The count value, which lies between 96,000 and 224,000 is used to compute the altitude of the aircraft, Mach number, and air speed as hereinafter described.

The pressure data is forwarded to the computer when the computer produces an OUT* instruction that causes the instruction decoder to enable the air data line multiplexer 447 and address it such that one of the pressure transducer inputs is selected, plus produces a SELECT AIR DATA MODULE command that suitably addresses one of the 2/1 multiplexers 443 and 445. Preferably, the data forwarded comprises 20 bits which are applied to the twenty most significant bit positions of the input register. Also, preferably, pressure data is forwarded to the computer once each second, i.e., once each 200 iteration periods.

As noted above, AIR CALIBRATION data is continuously generated. As each new complete data word is received by one of the serial bus receivers 361 and 363 (FIG. 21) an AIR CALIBRATION DATA INTERRUPT pulse is produced. Thereafter, the computer looks at the data word by issuing an OUT* instruction that causes the instruction decoder to produce a suitable SELECT AIR DATA MODULE output, and address and enable the accelerometer line multiplexer 395 (FIG. 22). At start up, all of the AIR CALIBRATION data is forwarded to the computer input register. Thereafter, as previously described, only continuously changing data (such as pressure transducer module temperature data) is forwarded to the computer. Preferably, AIR CALIBRATION data is in the form of eight-bit data words which are received by the eight most significant bit positions of the computer intput register.

As illustrated in FIG. 23 and previously described, air temperature sensor data is digitized each time a SELECT ANALOG CHANNEL AND DIGITIZE command is issued by the instruction decoder as a result of a suitable OUT* instruction being produced by the computer. If the computer wants air temperature sensor data, it issues an OUT* instruction that suitably addresses, and enables, the air data line multiplexer 447 (FIG. 24). The computer can read air temperature data from 50 microseconds, for example, after the beginning of an iteration period until the next iteration. Preferably, the air temperature sensor data is requested by the computer once each second (e.g., every 200th INTERRUPT pulse) and comprises a 12-bit, two's complement word, which is forwarded to the twelve most significant bit positions of the input register of the computer.

Computer—General

The computer 54 processes the inertial, pressure and temperature data received from the gyro subsystem 48, the accelerometer and air calibration data subsystem 50 and the air data and temperature subsystem 52. The received inertial, pressure and temperature data passes through the input register and is stored at memory locations until updated. The stored data is processed by the computer. The results of the processing are a variety of inertial, air and temperature data signals that are applied by the serial transmitters to the flight control, display and other data buses. These signals are used by downstream flight control, display and other subsystems to control the aircraft and provide suitable pilot navigation and other displays, in a conventional manner.

Preferably, the computer is a preprogrammed digital data processor. Because such computers can be programmed in a variety of well known ways. depending upon their nature, in order to better understand the operation of the computer, this description illustrates the data processing program in functional block form. In this regard, the description of the central processing unit of the computer is broken into two subdescriptions, one generally directed to the processing of inertial data (FIGS. 27-38 and the other generally directed to the processing of air and temperature data (FIGS. 45-51). In between the two descriptions is a description of the self-alignment process performed by the computer (illustrated in functional block form in FIGS. 40-44).

Data Processor—Inertial Data

Figure 27:
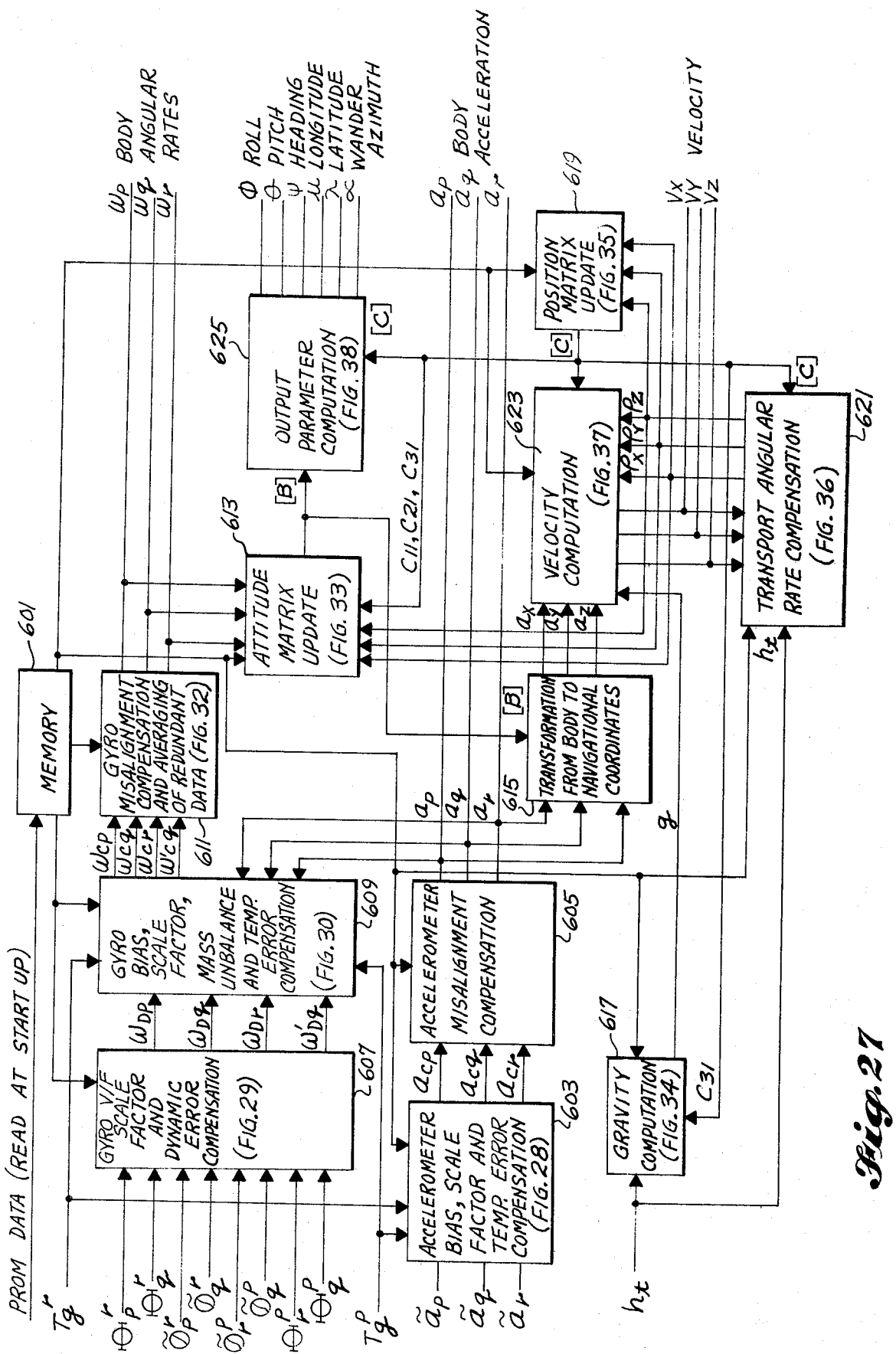
FIG. 27 is a functional block diagram of an inertial data processor forming part of (or formed by) the computer illustrated in FIG. 3.

FIG. 27 is a functional block diagram of the major subsystems of the computer 54 necessary for the processing of inertial data. In order to reduce the complexity of the description and because various rates can be used, the timing of the operation of the illustrated subsystems is not described except in a general manner. That is, as will be readily appreciated by those skilled in the data processing art, calculations performed by a data processor are time controlled in accordance with a timing format. The inertial data processor illustrated in FIG. 27 operates in accordance with such a timing format. However, because various formats could be used and because such formats are well known, a particular format is not discussed. In addition, as will be appreciated by those skilled in the data processing art, preferably, even though the various discrete networks illustrated in FIG. 27 are actually "formed" by a suitably programmed general purpose data processor, they could be formed by discrete dedicated circuitry, if desired.

Prior to describing the data processor, it is pointed out that the nomenclature used to identify the inertial signals is changed from the letter-number-letter form previously used to a superscript/subscript form relating the signals to the nominal axes of the aircraft to which they relate. That is, even though the axes of the gyros and accelerometers may be skewed with respect to the pitch, roll and yaw axes of the aircraft, they are nominally related to these axes. This change is made because the inertial data processor will be more easily understood using nominal axes terminology. Further, POLARITY, INCREMENT, SUBDIGIT and RANGE (ECHO) signals related to a particular gyro sense axes are combined into single signal form since these elements are all part of a combined information signal. In this regard, for a particular gyro sense axis, the POLARITY signal defines the direction of angular displacement sensed by the gyro; the INCREMENT signal defines the major portion of the magnitude of the movement; the SUBDIGIT signal defines the remaining portion of the magnitude of the movement; and, the RANGE (ECHO) signal is a scale factor that defines whether the sensed movement should be considered as a large change or a small change. The following table sets forth how the nomenclature used herein may be related:

| | |
|---|---|
| G1X POLARITY, INCREMENT, SUBDIGIT, RANGE (ECHO) | $\tilde{\phi}_p^r$ |
| G1Y POLARITY, INCREMENT, SUBDIGIT, RANGE (ECHO) | $\tilde{\phi}_q^r$ |
| G2X POLARITY, INCREMENT SUBDIGIT, RANGE (ECHO) | $\tilde{\phi}_r^p$ |
| G2Y POLARITY, INCREMENT SUBDIGIT, RANGE (ECHO) | $\tilde{\phi}_q^p$ |
| G1X PICKOFF ANGLE | $\theta_p^r$ |
| G1Y PICKOFF ANGLE | $\theta_q^r$ |
| G2X PICKOFF ANGLE | $\theta_r^p$ |
| G2Y PICKOFF ANGLE | $\theta_q^p$ |
| G1 TEMPERATURE | $T_g^r$ |
| G2 TEMPERATURE | $T_g^p$ |
| A1X | $\tilde{a}_p$ |
| A1Y | $\tilde{a}_q$ |
| A2X | $\tilde{a}_r$ |

As usual in aircraft nomenclature, r denotes the yaw axis of the aircraft, p denotes the roll axis, and q denotes the pitch axis. With respect to the gyro signals, the superscript denotes the nominal orientation of the spin axis of the gyro and the subscript denotes the nominal orientation of the sense axis related to a particular signal. The g subscript of the temperature signals denote that the signals are gyro temperature signals. Finally, the subscripts of the accelerometer signals denote the nominal orientation of the sense axis related to a particular signal.

The inertial data processor illustrated in FIG. 27 comprises: a memory 601; an accelerometer bias, scale factor, and temperature error compensation network 603; an accelerometer misalignment compensation network 605; a gyro V/F scale factor and dynamic error compensation network 607; a gyro bias, scale factor, mass unbalance and temperature error compensation network 609; a gyro misalignment compensation and averaging of redundant data network 611; an attitude matrix update network 613; a transformation from body to navigational coordinate network 615; a gravity computation network 617; a position matrix update network 619, a transport angular rate compensation network 621; a velocity computation network 623; and, an output parameter computation network 625.

The memory 601 receives and stores the data stored in the PROMs 273 (FIG. 16). More specifically, as previously described, when the invention is turned on prior to an aircraft flight, the memory 601 reads the data stored in the PROMs 273. As also previously described, the data stored in the PROMs are idiosyncrasy data related to the gyros and accelerometers. In the preferred form of the invention, a PROM is associated with each gyro and accelerometer (IMU) module and contains the idiosyncrasy data related to the gyros and accelerometers forming that module. As a result, if an IMU module is changed or replaced for any reason, the idiosyncrasy data related to the new IMU module is automatically read into the computer when the system is turned on after IMU module replacement.

In addition to receiving and storing data from the PROMs 273, the memory 601 also stores certain fixed data for use by the various networks of the data processor. The specific fixed data is described hereinafter in detail as part of the detailed descriptions of the various networks of the data processor. However, in general, the stored fixed data includes various constants, such as the ellipticity of a polar cross-section of the earth (e), the acceleration due to gravity in the equatorial plane at mean sea level ($g_o$) and the equatorial radius of the earth at mean sea level ($r_o$), for examples.

The data stored in the memory is automatically located, read out and applied to the various networks, as called for during the calculation sequence of a particular network. In this regard, the memory applies data to the accelerometer bias, scale factor and temperature error compensation network 603; the accelerometer misalignment compensation network 605; the gyro V/F scale factor and dynamic error compensation network 607; the gyro bias, scale factor, mass unbalance and temperature error compensation network 609; the gyro misalignment compensation and averaging of redundant data network 611; the attitude matrix update network 613; the gravity computation network 617; the position matrix update network 619; the transport angular rate compensation network 621; and, the velocity computation network 623.

Figure 28:
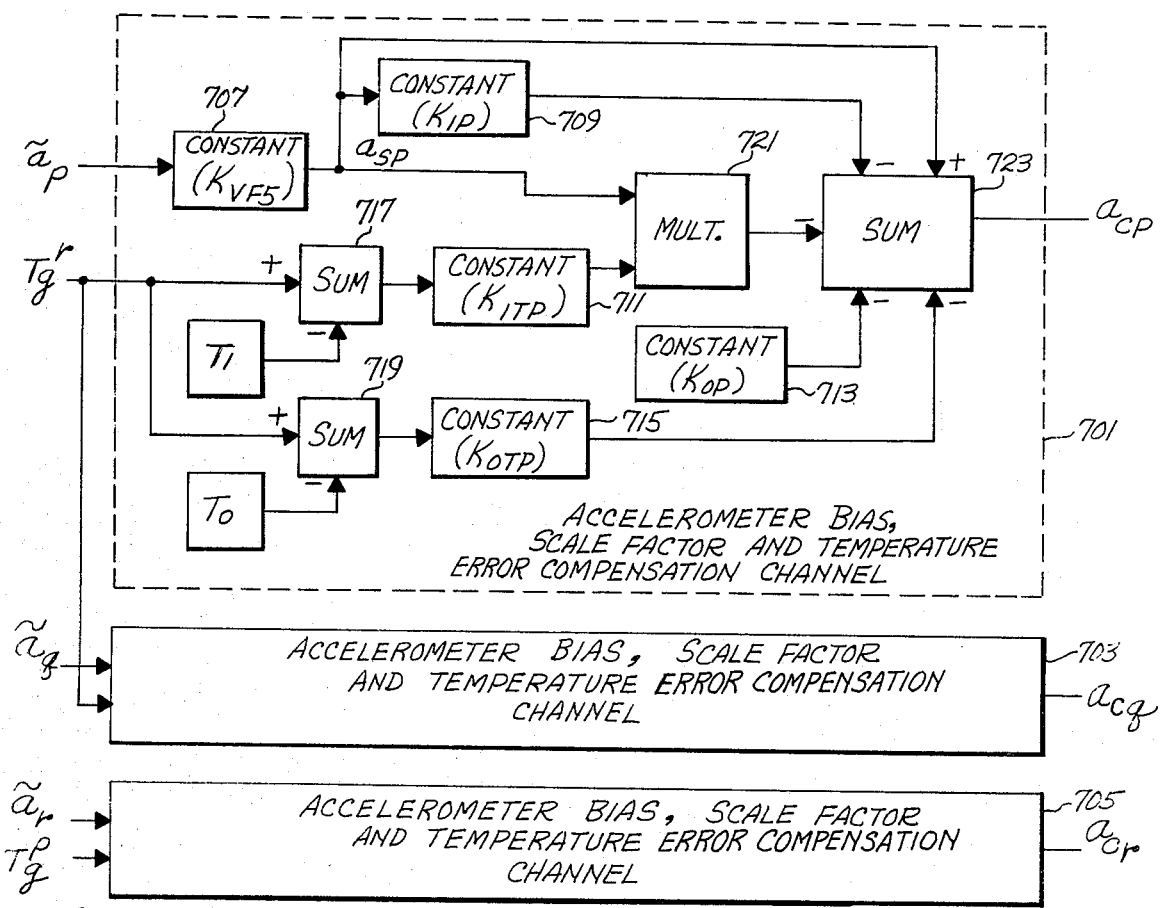
FIG. 28 is a functional block diagram of an accelerometer bias, scale factor and temperature error compensation network forming part of the inertial data processor illustrated in FIG. 27.

The accelerometer bias, scale factor, and temperature error compensation network 603 receives the raw measurements of specific force (acceleration) along the sensing axes of the accelerometers—previously denoted $\bar{a}_p$, $\bar{a}_q$ and $\bar{a}_r$. In addition, the accelerometer bias, scale factor, and temperature compensation network 603 receives the gyro temperature information—previously denoted $T_g{}^r$, $T_g{}^p$. The accelerometer bias, scale factor, and temperature error compensation network 603 compensates the raw accelerometer measurements by removing bias, scale factor, and temperature errors contained therein. The result is compensated accelerometer information signals denoted $a_{cp}$, $a_{cq}$ and $a_{cr}$ (the subscript c denotes that the accelerometer signals have been compensated for bias, scale factor and temperature errors). A suitable accelerometer bias, scale factor, temperature error compensation network 603 is illustrated in FIG. 28 and hereinafter described in detail.

The outputs of the accelerometer bias, scale factor, and temperature error compensation network 603, i.e., $a_{cp}$, $a_{cq}$ and $a_{cr}$, are applied to the accelerometer misalignment compensation network 605. The accelerometer misalignment compensation network 605 is simply a matrix (described below) that modifies the compensated accelerometer information signals to eliminate any error created by mounting the accelerometers along an axis other than the nominal body axis. More specifically, it is essentially impossible to physically align the sensing axis of the strapdown accelerometers as accurately as necessary in a precision navigation system. Thus, in most instances the accelerometer sense axes are slightly misaligned from the desired axis. Moreover, in a skewed axis system, the sense axis are intentionally misaligned with respect to the body axes of the aircraft. The misalignment errors are measured and stored in the related PROM. This error information is read into the memory 601. The accelerometer misalignment compensation network uses the stored error information (in matrix form) to compensate the $a_{cp}$, $a_{cq}$ and $a_{cr}$ signals. The resultant body axis acceleration signals, now fully compensated, are designated $a_p$, $a_q$ and $a_r$. These signals are applied to the gyro bias, scale factor, mass unbalance and temperature error compensation network 609 and to the transformation from body to navigation coordinate network 615. In addition, $a_p$, $a_q$ and $a_r$ are available for application to suitable aircraft display and control systems.

The gyro V/F scale factor and dynamic error compensation network 607 receives the raw gyro displacement angle measurement data previously denoted $\bar{\phi}_p{}^r$, $\bar{\phi}_q{}^r\bar{\phi}_r{}^p$, $\bar{\phi}_q{}^p$; and, the gyro pickoff angle data previously denoted $\theta_p{}^r$, $\theta_q{}^r$, $\theta_r{}^p$ and $\theta\text{HD } q^p$. As will be better understood from the following description of a preferred embodiment of the gyro V/F scale factor and dynamic error compensation network (FIG. 29), the gyro V/F scale factor and dynamic error compensation network 65 applies the V/F scale factor and removes dynamic errors from the raw gyro data. The resultant gyro data, denoted $\omega_{Dp}$, $\omega_{Dq}$, $\omega_{Dr}$ and $\omega'_{Dq}$, is applied to the gyro bias, scale factor, mass unbalance and temperature error compensation network 609.

The gyro bias, scale factor, mass unbalance and temperature error compensation network 609 also receives data from the memory 601 and the gyro temperature data, $T_g{}^r$ and $T_g{}^p$. Further, as previously noted, the gyro bias, scale factor, mass unbalance and temperature error compensation network receives the fully compensated accelerometer signals $a_p$, $a_q$ and $a_r$. The gyro bias, scale factor, mass unbalance and temperature error compensation network 609 modifies the gyro signals by removing bias, scale factor, mass unbalance, and temperatue errors. The resultant compensated gyro data signals are denoted $\omega_{cp}$, $\omega\text{HD } cq$, $\omega_{cr}$ and $\omega'_{cq}$. These signals are applied to the gyro misalignment compensation and averaging of redundant data network 611.

In addition to receiving the $\omega_{cp}$, $\omega_{cq}$, $\omega_{cr}$ and $\omega'_{cq}$ signals, the gyro misalignment compensation and averaging of redundant data network 611 also receives gyro misalignment signals from the memory 601 and uses the information contained in these signals (in matrix form) to compensate the $\omega_{cp}$, $\omega_{cq}$, $\omega_{cr}$ and $\omega'_{cq}$ signals for misalignment errors. (As with the accelerometers, it is essentially impossible to physically align the sense axes of the gyros accurately enough for a precision navigation system. Further in a skewed axis system, the gyro sense axes are intentionally misaligned with the aircraft body axes. The matrix modification of the $\omega_{cp}$, $\omega_{cq}$, $\omega_{cr}$ and $\omega'_{cq}$ signals compensates for these alignment errors.) In addition, the gyro misalignment compensation and averaging of redundant data network 611 averages the redundant data contained in the $\omega'\text{Hd } cq$ signal. Thus, the output of the gyro misalignment compensation and averaging of redundant data network 611 are fully compensated body angle rate signals. These signals are denoted $\omega_p$, $\omega_q$ and $\omega_r$ and are applied to the attitude matrix update network 613, as well as being available for application to suitable aircraft pilot display and flight control systems.

The attitutde matrix update network 613 also receives transport angular rate compensation signals, denoted $\rho_x$, $\rho_y$ and $\rho_z$ produced by the transport angular rate compensation network 621 hereinafter described; the Earth's angular rate constant from the memory 601; and, information signals related to the information at the $C_{11}$, $C_{21}$ and $C_{31}$ positions of a direction cosine matrix denoted [C] formed by the position matrix update network 619, hereinafter described. The attitude matrix update network 613 updates a direction cosine matrix denoted [B] that, when post multiplied by a vector in navigational coordinates, transforms that vector into aircraft body coordinates. The [B] matrix is applied to the transformation from body to navigational coordinate network 615 and to the output parameter computation network 625. A preferred embodiment of an attitude matrix update network 613 is illustrated in FIG. 33 and hereinafter described.

Based on the [B] matrix, the transformation from body to navigational coordinate network 615 transforms the $a_p$, $a_q$ and $a_r$ signals (which are in aircraft body coordinate form), produced by the accelerometer misalignment compensation network 605, into $a_x$, $a_y$ and $a_z$ signals (which are in navigational coordinate form). The $a_x$, $a_y$ and $a_z$ signals are applied to the velocity computation network 623.

The gravity computation network 617 receives an altitude signal ($h_t$) based on data produced by the pressure transducers, as hereinafter described in the air and temperature data processor section of this description; and, data from the memory 601. In addition, the gravity computation network receives a signal from the position matrix update network 619 denoting the information at $C_{31}$ position of the [C] matrix. In accordance therewith, the gravity computation network 617 produces a signal, denoted g, that represents the acceleration due to gravity at any specific latitude and altitude. This signal, g, includes the combined effects of gravitational mass attraction force and centrifugal force, and is applied to the velocity computation network 623. A suitable gravity computation network is illustrated in FIG. 34 and hereinafter described.

Figure 35:
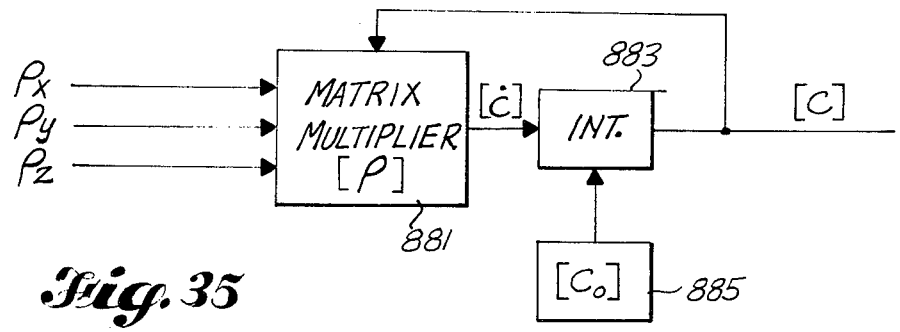
FIG. 35 is a functional block diagram of a position matrix update network forming part of the inertial data processor illustrated in FIG. 27.

The position matrix update network 619 produces the [C] matrix. The [C] matrix is a matrix that, when post multiplied by a vector in earth-centered coordinates, transforms the vector into navigational coordinates. In this regard, the position matrix update network 619 receives signals denoted $\rho_x$, $\rho_y$ and $\rho_z$ produced by the transport angular rate compensation network in the manner hereinafter described. ($\rho_x$, $\rho_y$ and $\rho_z$ represent the angular rate of the navigation coordinate system relative to an earth-centered coordinate system, expressed instantaneously in navigational coordinates.) The position matrix update network also receives an initial value of the [C] matrix, denoted [$C_0$] from the memory 601. As illustrated in FIG. 27, [C] matrix information is applied to the gravity computation network, the transport angular rate compensation network, the output parameter computation network, the velocity computation network and the attitude matrix update network. The attitude matrix update network information, for example, is located at the $C_{11}$, $C_{21}$ and $C_{31}$ positions of the C matrix, where the first subscript represents the row position and the second subscript represents the column position of the matrix. A suitable position matrix update network is illustrated in FIG. 35 and hereinafter described.

Figure 36:
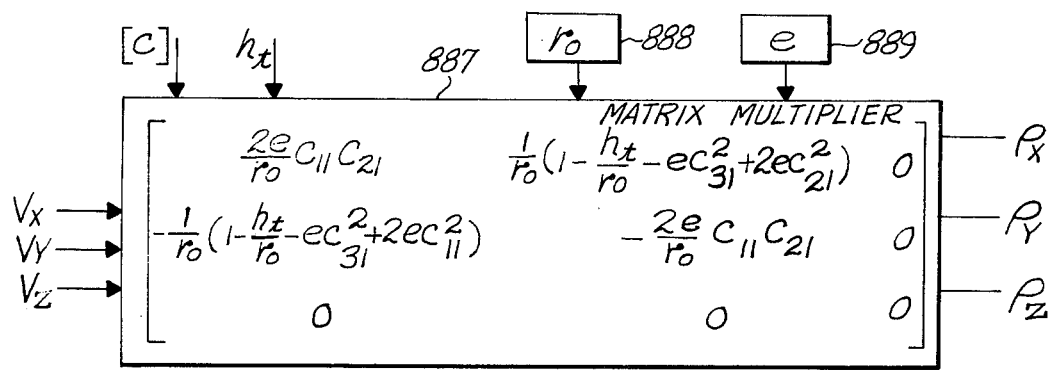
FIG. 36 is a functional block diagram of a transport angular rate compensation network forming part of the inertial data processor illustrated in FIG. 27.

The transport angular rate compensation network 621 receives: the altitude signal ($h_t$); aircraft velocity signals in navigational coordinates, produced by the velocity computation network 623 and denoted $V_x$, $V_y$ and $V_z$; the Earth's equatorial sea-level radius and the Earth's ellipticity from the memory 601; and, the entire [C] matrix produced by the position matrix update network 619. In accordance therewith, the transport angular rate compensation network 621 produces the $\rho_x$, $\rho_y$ $\rho_z$ signals, which represent the angular rate of the navigation coordinate system relative to an earth-centered coordinate system, expressed instantaneously in navigational coordinates. A suitable transport angular rate compensation network 621 is illustrated in FIG. 36 and hereinafter described.

Figure 37:
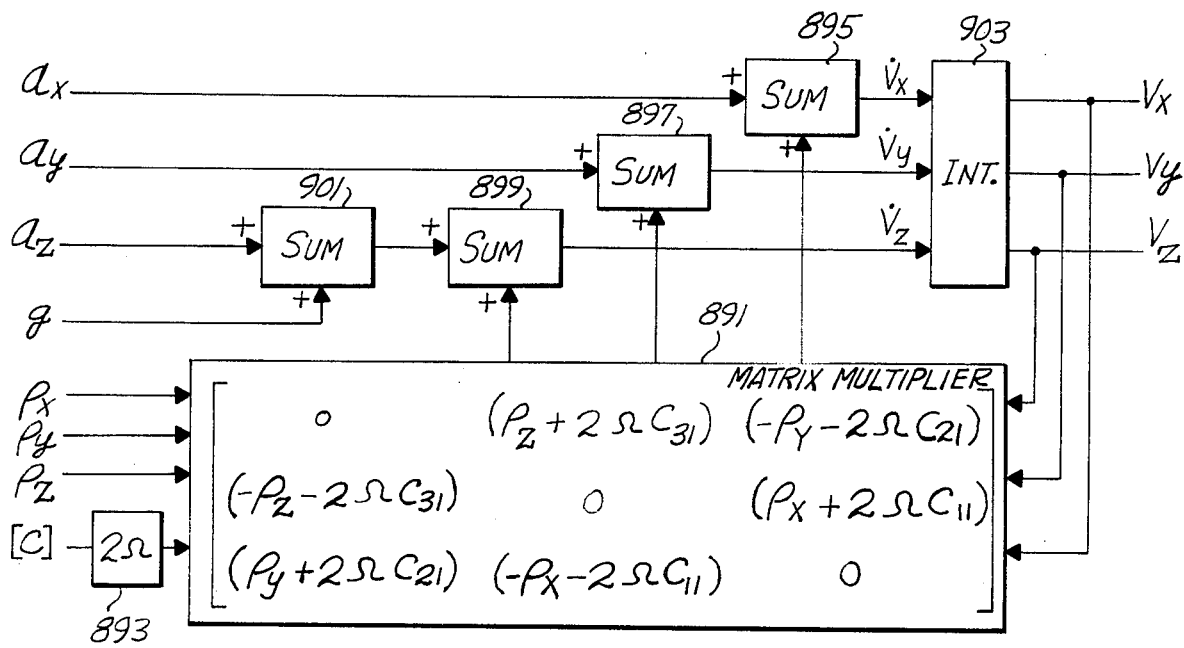
FIG. 37 is a functional block diagram of a velocity computation network forming part of the inertial data processor illustrated in FIG. 27.

As previously discussed, the velocity computation network 623 receives: the $a_x$, $a_y$ and $a_z$ signals; the $\rho_x$, $\rho_y$ and $\rho_z$ signals; the Earth's angular rate constant from the memory 601; and, the g signal. The velocity computation network 623 also receives the entire [C] matrix produced by the position matrix update network 619. Based thereon, the velocity computation network produces aircraft velocity signals expressed in navigational coordinates, denoted $V_x$, $V_y$ and $V_z$. These signals are available for application to suitable aircraft displays and/or flight control systems, as well as to the transport angular rate compensation network 621. A suitable velocity computation network is illustrated in FIG. 37 and hereinafter described.

The output parameter computation network 625 receives the [B] matrix developed by the attitude matrix update network 613 and the [C] matrix developed by the position matrix update network 619. In accordance therewith the output parameter computation network 625 produces roll ($\phi$), pitch ($\theta$), heading ($\psi$), longitude ($\mu$), latitude ($\lambda$), and wander azimuth ($\alpha$) signals. These signals are available for application to suitable aircraft displays and/or flight control systems, as necessary.

In summary, in general, the inertial data processor illustrated in FIG. 27 receives the raw inertial and temperature data produced by the gyros and accelerometers and forwarded to the computer in the manner heretofore described. In addition, the inertial data processor receives an altitude signal, produced by the air and temperature data processor hereinafter described; and, alignment and other idiosyncrasy information relating to the individual accelerometers and the gyros of the IMU modules. In accordance therewith (and in accordance with stored constant information), the inertial data processor compensates for dynamic, bias, scale factor, mass unbalance and temperature errors. In addition, the inertial data processor converts the information from body to navigational coordinate form, after compensating for misalignment, and develops position, heading and other information. The end result is the production of a variety of signals usable by aircraft pilot display, automatic flight control and navigation systems to create displays and/or control aircraft movement.

Accelerometer Bias, Scale Factor, and Temperature Error Compensation Network

An accelerometer bias, scale factor, and temperature error compensation network, suitable for use in the data processor illustrated in FIG. 27, is illustrated in FIG. 28 and comprises: three accelerometer bias, scale factor and temperature error compensation channels 701, 703, and 705. Since each of the channels is the same, except for certain constant values hereinafter discussed, only one of the channels is illustrated in detail in FIG. 28 and described herein.

The accelerometer bias, scale factor, and temperature error compensation channel 701 illustrated in detail in FIG. 28 is the channel that receives the $\bar{a}_p$ signal. This channel also receives the $T_g{'}$ temperature signal. The accelerometer bias, scale factor and temperature error compensation channel 701 illustrated in FIG. 28 includes five constant circuits 707, 709, 711, 713 and 715. The constant circuits receive input signals, as hereinafter described, and multiply them by the value of a constant, also hereinafter described. The constant values are stored in the memory 601 (FIG. 27) and "read" by the constant circuits, as necessary. In addition to the five constant circuits, the accelerometer bias, scale factor, and temperature error compensation channel 701 includes two two-input summers 717 and 719, each having one positive and one negative input; a two-input multiplier 721; and, a five-input summer 723 (one positive and four negative inputs). The accelerometer bias, scale factor and temperature error compensation channel also receives a signal denoted $T_0$ (which represents the nominal temperature for the accelerometer bias error values) and a signal denoted $T_1$ (which represents the nominal temperature for the accelerometer scale factor error values). While the source of the $T_0$ and $T_1$ signals are represented by blocks in FIG. 28 they are, of course, actually stored in the memory 601.

The $\tilde{a}_p$ signal is applied to the first constant circuit 707, where it is multiplied by a constant denoted $K_{VF5}$. $K_{VF5}$ is the scale factor of the current-to-frequency converter (I/F) that converted the AlX (e.g., $\tilde{a}_p$) accelerometer signal from current form to frequency form. The output of the first constant circuit 707 is a signal denoted $a_{sp}$. $a_{sp}$ is applied to: the positive input of the five-input summer 723; the input of the second constant circuit 709; and, one input of the multiplier 721. The second constant circuit 709 multiplies the $a_{sp}$ signal by a constant denoted $K_{1p}$. $K_{1p}$ is the scale factor error for the related accelerometer (AlX), nominally along the aircraft roll axis. The output of the second constant circuit 709 is applied to one of the negative inputs of the five-input summer 723.

The $T_g^r$ signal is applied to the positive inputs of the first and second two input summers 717 and 719. In addition, the $T_1$ signal is applied to the negative input of the first two-input summer 717. The output of the first two-input summer 717 is applied to the input of the third constant circuit 711, where it is multiplied by a constant denoted $K_{1Tp}$. $K_{1Tp}$ is the scale factor error temperature sensitivity coefficient for the related accelerometer. The output of the third constant circuit 711 is applied to the second input of the multiplier 721; and, the output of the multiplier 721 is applied to a negative input of the five-input summer 723. The fourth constant circuit 713 does not receive an input; rather it merely represents a constant value, denoted $K_{oP}$ stored in the memory. $K_{oP}$ is applied to another negative input of the five-input summer 723 and represents the bias error for the related accelerometer.

The negative input of the second two-input summer 719 receives the $T_0$ signal. The output of the second two-input summer 719 is applied to the input of the fifth constant circuit 715, where it is multiplied by a constant denoted $K_{oTP}$. $K_{oTP}$ is the bias error temperature sensitivity coefficient for the related accelerometer. The output of the fifth constant circuit 715 is applied to the the last negative input of the five-input summer 723. The output of the five-input summer 723 is the $a_{cp}$ signal discussed above with respect to FIG. 27. More specifically $a_{cp}$ represents the specific force measurement, compensated only for temperature, fixed errors, and scale factor errors, taken nominally along the related aircraft body axis. In this case the body axis is the roll (p) axis.

In a similar manner, the other accelerometer bias, scale factor, and temperature error compensation channels produce the $a_{cq}$ and $a_{cr}$ signals. In this regard, the second accelerometer bias, scale factor, and temperature error compensation channel 703 receives the $\tilde{a}_q$ signal and the $T_g^r$ signal. The third accelerometer bias, scale factor, and temperature error compensation channel 705 receives the $\tilde{a}_r$ signal and the $T_g^p$ temperature signal. The output of the second accelerometer bias, scale factor, and temperature error compensation channel is the $a_{cq}$ signal and the output of the third accelerometer bias, scale factor and temperature error compensation channel is the $a_{cr}$ signal.

In view of the foregoing discussion, it will be appreciated that the accelerometer bias, scale factor, and temperature error compensation network can be mathematically represented as follows:

$$\begin{bmatrix} a_{cp} \\ a_{cq} \\ a_{cr} \end{bmatrix} = \begin{bmatrix} a_{sp} \\ a_{sq} \\ a_{sr} \end{bmatrix} - \begin{bmatrix} K_{op} \\ K_{oq} \\ K_{or} \end{bmatrix} - \begin{bmatrix} K_{oTp}(T_g^r - T_o) \\ K_{oTq}(T_g^r - T_o) \\ K_{oTr}(T_g^p - T_o) \end{bmatrix} - \begin{bmatrix} [K_{lp} + K_{lTp}(T_g^r - T_l)] a_{sp} \\ [K_{lq} + K_{lTq}(T_g^r - T_l)] a_{sq} \\ [K_{lr} + K_{lTr}(T_g^p - T_l)] a_{sr} \end{bmatrix} \quad (1)$$

where:

$$\begin{bmatrix} a_{sp} \\ a_{sq} \\ a_{sr} \end{bmatrix} = \begin{bmatrix} K_{VF5}\,\tilde{a}_p \\ K_{VF6}\,\tilde{a}_q \\ K_{VF7}\,\tilde{a}_r \end{bmatrix} \quad (2)$$

Accelerometer Misalignment Compensation Network

As illustrated in FIG. 27 and previously discussed, the $a_{cp}$, $a_{cq}$ and $a_{cr}$ signals are applied to the accelerometer misalignment compensation network 605. The accelerometer misalignment compensation network compensates for axial misalignment of the accelerometers with respect to one another and with respect to the gyro axes. Compensation is accomplished by multiplying the $a_{cp}$, $a_{cq}$ and $a_{cr}$ signals by a transformation matrix denoted $[M_a]$ formed of constant values stored in the memory 601. Mathematically this multiplication step can be represented by the equation:

$$\begin{bmatrix} a_p \\ a_q \\ a_r \end{bmatrix} = [M_a] \begin{bmatrix} a_{cp} \\ a_{cq} \\ a_{cr} \end{bmatrix} \quad (3)$$

The transformation matrix $[M_a]$ used to compensate for accelerometer input axis misalignments (including nonorthogonality misalignments, i.e., skew misalignments) is defined as follows:

$$[M_a] = \begin{bmatrix} 1 & -\theta_{apr} & \theta_{apq} \\ \theta_{aqr} & 1 & -\theta_{aqp} \\ -\theta_{arq} & \theta_{arp} & 1 \end{bmatrix} \quad (4)$$

where $\theta_{aij}$ is the misalignment angle for the accelerometer input axis nominally along the ith body axis, caused by rotation about the jth body axis. For example, $\theta_{apr}$ is the misalignment angle about the yaw (r) axis for the accelerometer measuring acceleration along the roll (p) axis.

The outputs of the accelerometer misalignment compensation network are the fully compensated body axis acceleration signals denoted $a_p$, $a_q$ and $a_r$. These signals denote the specific force along the p, q, and r axes, respectively, of the aircraft as measured by accelerometers, compensated for temperature, fixed errors and misalignment of the accelerometer sense axes. As indicated in FIG. 27, and heretofore described, these signals are applied to the gyro bias, scale factor, mass unbalance and temperature error compensation network 609 and to the transformation from body to navigational coordinate network 615. These signals also are applied to the output bus of the computer for transmission to downstream subsystems via a serial transmitter at appropriate time intervals.

Gyro V/F Scale Factor and Dynamic Error Compensation Network

Figure 29:
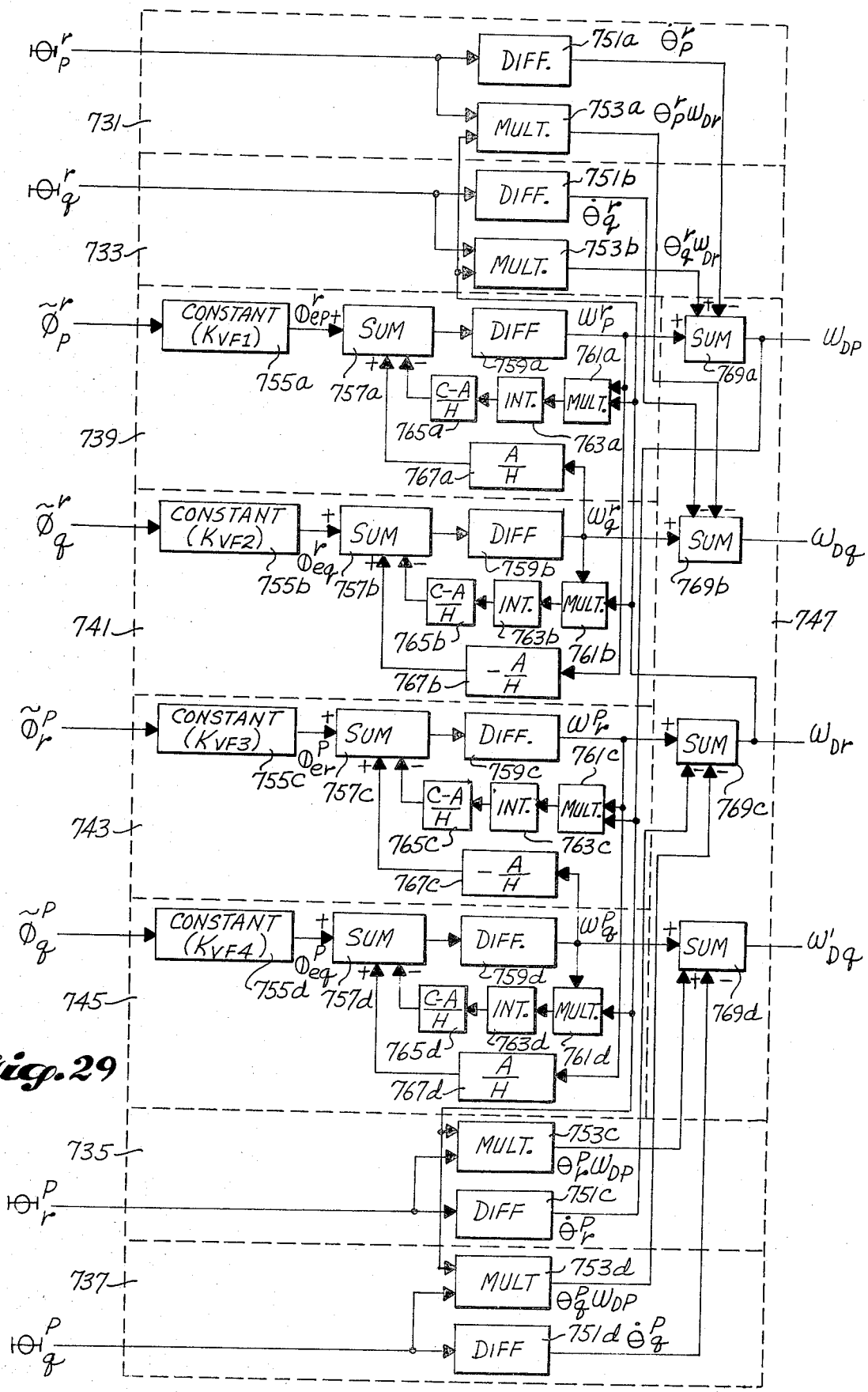
FIG. 29 is a functional block diagram of a gyro V/F scale factor and dynamic error compensation network forming part of the inertial data processor illustrated in FIG. 27.

A gyro V/F scale factor and dynamic error compensation network 607, suitable for use in the inertial data processor illustrated in FIG. 27, is illustrated in FIG. 29 and comprises: four pickoff angle channels 731, 733, 735 and 737; four gyro displacement angle channels 739, 741, 743 and 745; and, a summation network 747. Each of the pickoff angle channels 731, 733, 735 and 737 is identical and includes: a single differentiator 751a, b, c and d; and, a single multiplier 753a, b, c and d. Each of the gyro displacement angle channels 739, 741, 743 and 745 is substantially identical and includes: a constant circuit 755a, b, c and d; a three-input summer (with two positive inputs and a single negative input) 757 a, b, c and d; a differentiator 759a, b, c and d; a multiplier 761a, b, c and d; an integrator 763a, b, c, and d; a C-A/H circuit 765a, b, c and d; and, an A/H circuit 767a, b, c and d. In the case of the first and last gyro displacement angle channels 739 and 745, the A/H circuits multiply their inputs by the positive (+) value of A/H (as hereinafter defined); and, in the case of the second and third gyro displacement angle channels, the A/H circuits multiply their inputs by the negative (−) value of A/H. The summation network 747 includes four three-input summers 769a, b, c and d. The first and last of these three-input summers 769a and 769d have two positive inputs and a single negative input and the second and third of these three-input summers 769b and 769c have two negative inputs and a single positive input.

Since all of the pickoff angle channels are substantially identical and since all of the gyro displacement angle channels are substantially identical, only one of each such channels will be described in detail. In this regard, each of the pickoff angle channels receives a $\theta_i^j$ signal where i represents the nominal direction of the gyro input or sense axis and j represents the nominal direction of the gyro spin axis. Using this identification, the first pickoff angle channel 731 receives the $\theta_p^r$ signal; the second pickoff angle channel 733 receives the $\theta_q^r$ signal; the third pickoff angle channel 735 receives the $\theta_r^p$ signal; and, the fourth pickoff angle channel 737 receives the $\theta_q^p$ signal. Similarly, each of the gyro displacement angle channels receives a $\bar{\phi}_i^j$ signal where i represents the nominal direction of the input axis of the gyro and j represents the nominal direction of the spin axis of the gyro. Using this identification, the first gyro displacement angle channel 739 receives a $\bar{\phi}_p^r$ signal; the second gyro displacement angle channel 741 receives the $\bar{\phi}_q^r$ signal; the third gyro displacement angle channel 743 receives the $\bar{\phi}_r^p$ signal; and, the fourth gyro displacement angle channel 745 receives the $\bar{\phi}_q^p$ signal. The various channels modify the received signals in the manner hereinafter described; and, the outputs of the various channels are summed by the four three-input summers 769a, b, c and d of the summation network 747 in the manner hereinafter described to produce the $\omega_{Dp}$, $\omega_{Dq}$, $\omega_{Dr}$ and $\omega'_{Dq}$ signals discussed above with respect to FIG. 27. As previously noted, these signals are the gyro rate signals, nominally along the body axes, compensated only for V/F scale factor values and dynamic errors.

As noted above, only one of the pickoff angle channels is described herein in detail. The chosen channel is the first pickoff angle channel 731, which receives the $\theta_p^r$ signal. The $\theta_p^r$ signal is applied to both the differentiator 751a and one input of the multiplier 753a of the first pickoff channel 731. The output of the differentiator 751a, ($\dot{\theta}_p^r$) is applied to the negative input of the first three-input summer 769a of the summation network. The multiplier 753a also receives the $\omega_{Dr}$ signal, which is formed on the output by the third three-input summer 769c of the summation network. The output of the two-input muliplier 753a of the first pickoff angle channel 731 ($\theta_p^r \omega_{Dr}$) is applied to a negative input of the second three-input summer 769b of the summation network 747.

While the connections of the differentiators and multipliers of the second, third and fourth pickoff angle channels 733, 735 and 737 will not be described, the connection of the outputs of these items to the summation network is hereinafter described. In this regard, the output ($\dot{\theta}_q^r$) of the differentiator 751b of the second pickoff angle channel 733 is applied to a negative input of the second three-input summer 769b; the output ($\dot{\theta}_r^p$) of the differentiator 751c of the third pickoff angle channel 735 is applied to a negative input of the third three-input summer 769c; and, the output ($\dot{\theta}_q^p$) of the differentiator 751d of the fourth pickoff angle channel 737 is applied to a negative input of the fourth three-input summer 769d. The output ($\theta_q^r \omega_{Dr}$) of the multiplier 753b of the second pickoff angle channel 733 is applied to a positive input of the first three-input summer 769a; the output ($\theta_r^p \omega_{Dp}$) of the multiplier 753c of the third pickoff angle channel 735 is applied to a positive input of the fourth three-input summer 769d; and, the output ($\theta_q^p \omega_{Dp}$) of the multiplier 753d of the fourth pickoff angle channel 737 is applied to a negative input of the third three-input summer 769c. [As noted by the $\omega$ subscripts, the third and fourth pickoff angle channels multiply their channel inputs by $\omega_{Dp}$ rather than $\omega_{Dr}$.]

As noted above, each of the gyro displacement angle channels 739, 741, 743 and 745 includes a constant circuit 755a, b, c and d. The constant circuits multiply the input signals of their respective channels by a value that compensates for the scale factor of the V/F converter, which converts the original gyro signal from voltage form to frequency form, as previously described. Thus, the first gyro displacement angle channel 739 multiplies its input signal, $\bar{\phi}_p^r$ by a constant denoted $K_{VF1}$. The second, third and fourth gyro displacement angle channels 741, 743, and 745 multiply their input signals $\bar{\phi}_q^r$, $\bar{\phi}_r^p$ and $\bar{\phi}_q^p$ by constants denoted $K_{VF2}$, $K_{VF3}$ and $K_{VF4}$, respectively. The outputs of the constant circuits of the four gyro displacement angle channels are denoted $\phi_{ep}^r$, $\phi_{eq}^r$, $\phi_{er}^p$ and $\phi_{eq}^p$, respectively. Thus, these signals are the respective input signals compensated for the related V/F scale factor value.

Turning now to the first gyro displacement angle channel 739 in detail. The output of the constant ($K_{VF1}$) circuit 755a is applied to a positive input of the three-input summer 757a. The output of the three-input summer is applied to the input of the differentiator 759a. The output of the differentiator 759a, which is a signal denoted $\omega_p^r$, is a rate extraction signal. The subscript p denotes the aircraft body axis (roll) along which the sense axis of the gyro lies and the superscript r denotes the aircraft body axis (yaw) along which the spin axis lies. In both cases axial orientation is nominal, as opposed to precise. In any event, the $\omega_p^r$ signal is applied to one input of the multiplier 761a where it is multiplied by $\omega_{Dr}$. The output of the multiplier 761a is integrated by the integrator 763a. The output of the integrator applied to the input of the C-A/H circuit where it is multiplied by a constant C-A/H, where: A is the transverse moment of inertia of the related gyro rotor; C is the polar moment of inertia of the related gyro rotor; and, H is the angular momentum of the related gyro rotor. The values of C, A and H are stored in the memory 601 and read out as necessary. The C-A/H circuit determines the constant based on the equation C-A/H and, then multiplies the output of the integrator by the thusly determined constant.

The output of the C-A/H circuit is applied to the negative input of the summer 757a. The output of the differentiator of the second gyro displacement angle channel 741, which is denoted $\omega_q{}^r$ is applied to the A/H circuit 767a of the first gyro increment angle channel 739 where it is multiplied by the equation A/H, A and H being defined above. The output of the A/H circuit 767a, is applied to the other positive input of the three-input summer 757a. Finally, the output of the differentiator 759a, $\omega_p{}^r$, is applied to the other positive input of the first summer 769a of the summation network 747.

Except for nomenclature and signal source differences, the other channels 741, 743 and 745 are identical to the first gyro displacement angle channel 739. With respect to these differences, the multiplier 761b of the second gyro displacement angle channel 741, in addition to receiving a $\omega_q{}^r$ signal produced by the differentiator 759b of that channel, also receives the $\omega_{Dr}$ signal. Further, the A/H circuit, which is negative in the second gyro displacement angle channel 741, as noted above, receives the $\omega_p{}^r$ signal produced by the first gyro displacement angle channel 739. The output of the differentiator of the second gyro displacement angle channel 741, i.e., the $\omega_q{}^r$ signal, is applied to the positive input of the second three-input summer 769b of the summation network 747.

The multiplier 761c of the third gyro displacement angle channel 743, in addition to receiving the $\omega_r{}^p$ output of the differentiator of that channel, also receives the $\omega_{Dp}$ signal produced by the first three-input summer 769a of the summation network. The A/H circuit (which is negative) of the third gyro displacement angle channel 743 receives the $\omega_q{}^p$ signal produced by the differentiator 759d of the fourth gyro displacement angle channel 745. The output of the differentiator 759c of the third gyro displacement angle channel 743 is applied to the positive input of the third three-input summer 769c of the summation network 747.

The multiplier 761d of the fourth gyro displacement angle channel 745, in addition to receiving the $\omega_q{}^p$ output of the differentiator of that channel, also receives the $\omega_{Dp}$ signal produced by the first three-input summer of the summation network. The A/H circuit of the fourth gyro displacement angle channel 745 receives the $\omega_r{}^p$ signal produced by the output of the differentiator 759c of the third gyro displacement angle channel 743. The $\omega_q{}^p$ output of the differentiator 759d of the fourth gyro displacement angle channel 745 is applied to the other positive input of the fourth three-input summer 769d of the summation network 747. As previously noted, the outputs of the first and third summers 769a and 769c of the summation network are the $\omega_{Dp}$ and $\omega_{Dr}$, signals, respectively. The outputs of the second and fourth of the three-input summers 769b and 769d are the $\omega_{Dq}$ and $\omega'_{Dq}$ signals, respectively.

It will be appreciated that the gyro V/F scale factor and dynamic error compensation network illustrated in FIG. 29 can be represented mathematically. In this regard, in matrix form, and in terms of their inputs, the outputs of the summers of summation network 747 can be represented by the following equation:

$$\begin{bmatrix} \omega_{Dp} \\ \omega_{Dq} \\ \omega_{Dr} \\ \omega'_{Dq} \end{bmatrix} = \begin{bmatrix} \omega_p{}^r \\ \omega_q{}^r \\ \omega_r{}^p \\ \omega_q{}^p \end{bmatrix} - \begin{bmatrix} \dot{\theta}_p{}^r \\ \dot{\theta}_q{}^r \\ \dot{\theta}_r{}^p \\ \dot{\theta}_q{}^p \end{bmatrix} + \qquad (5)$$

$$\begin{bmatrix} \theta_q{}^r \; \omega_{Dr} \\ -\theta_p{}^r \; \omega_{Dr} \\ -\theta_q{}^p \; \omega_{Dp} \\ \theta_r{}^p \; \omega_{Dp} \end{bmatrix} \text{(redundant axis)}$$

where:

$$\begin{bmatrix} \dot{\theta}_p{}^r \\ \dot{\theta}_q{}^r \\ \dot{\theta}_r{}^p \\ \dot{\theta}_q{}^p \end{bmatrix} = \frac{d}{dt} \begin{bmatrix} \theta_p{}^r \\ \theta_q{}^r \\ \theta_r{}^p \\ \theta_q{}^p \end{bmatrix} \qquad (6)$$

The rate extraction signals, $\omega_p{}^r$, $\omega_q{}^r$, $\omega_r{}^p$ and $\omega_q{}^p$ can be represented by the following equation:

$$\begin{bmatrix} \omega_p{}^r \\ \omega_q{}^r \\ \omega_r{}^p \\ \omega_q{}^p \end{bmatrix} = \frac{d}{dt} \begin{bmatrix} \phi_{ep}^r \\ \phi_{eq}^r \\ \phi_{er}^p \\ \phi_{eq}^p \end{bmatrix} + \qquad (7)$$

$$\frac{d}{dt} \begin{bmatrix} \frac{A}{H} \omega_q{}^r - \frac{C-A}{H} \int_{t_{i-1}}^{t_i} \omega_p{}^r \, \omega_{Dr} dt \\ -\frac{A}{H} \omega_p{}^r - \frac{C-A}{H} \int_{t_{i-1}}^{t_i} \omega_q{}^r \, \omega_{Dr} dt \\ -\frac{A}{H} \omega_q{}^p - \frac{C-A}{H} \int_{t_{i-1}}^{t_i} \omega_r{}^p \, \omega_{Dp} dt \\ \frac{A}{H} \omega_r{}^p - \frac{C-A}{H} \int_{t_{i-1}}^{t_i} \omega_q{}^p \, \omega_{Dp} dt \end{bmatrix}$$

where:

$$\begin{bmatrix} \phi_{ep}^r \\ \phi_{eq}^r \\ \phi_{er}^p \\ \phi_{eq}^p \end{bmatrix} = \begin{bmatrix} K_{VF1} \; \tilde{\phi}_p{}^r \\ K_{VF2} \; \tilde{\phi}_q{}^r \\ K_{VF3} \; \tilde{\phi}_r{}^p \\ K_{VF4} \; \tilde{\phi}_q{}^p \end{bmatrix} \qquad (8)$$

In summary, the constant circuits 755a, b, c and d of the first, second, third and fourth gyro displacement angle channels 739, 741, 743 and 745 compensate for the scale factor of the respective V/F converters. The remaining items of the displacement angle channels and the pickoff angle channels coact to eliminate dynamic errors considering the transverse (A) and polar (C) moments of inertia and the angular momentum (H) of the gyro rotors.

Figure 30:
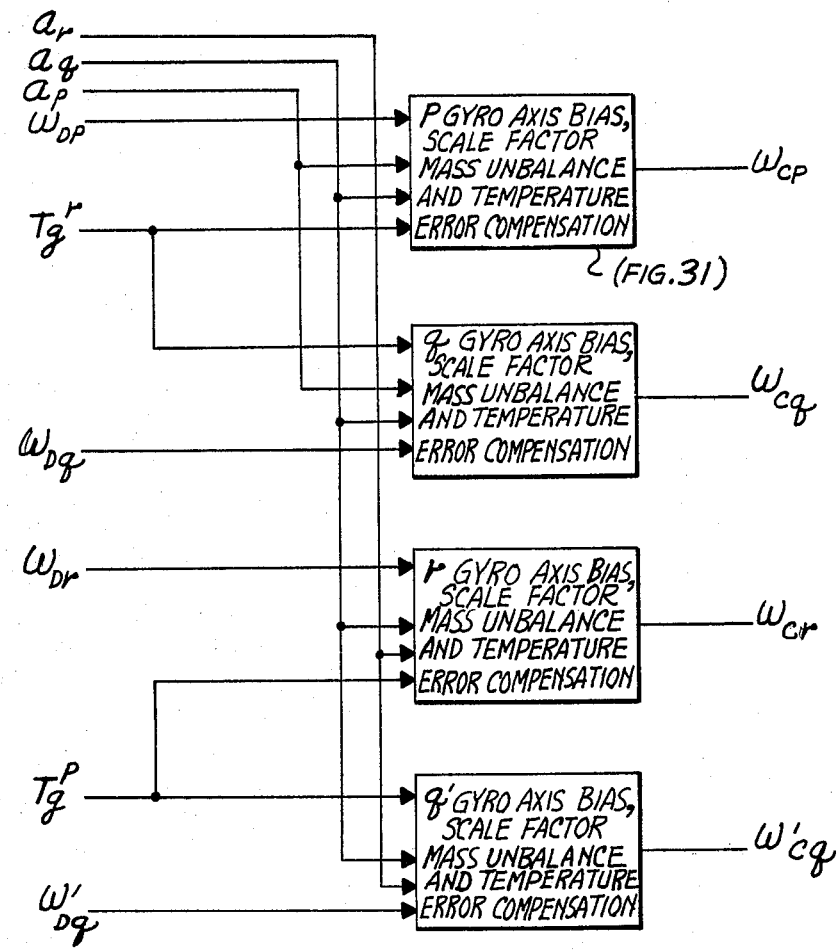
FIG. 30 is a functional block diagram of a gyro bias, scale factor, mass unbalance and temperature error compensation network forming part of the inertial data processor illustrated in FIG. 27.

Gyro Bias, Scale Factor, Mass Unbalance and Temperature Error Compensation Network An embodiment of gyro bias, scale factor, mass unbalance and temperature error compensation network suitable for use in the inertial data processor illustrated in FIG. 27 is illustrated in FIG. 30 and comprises four channels, one for each of the $\omega_{Dp}$, $\omega_{Dq}$, $\omega_{Dr}$ and $\omega'_{Dq}$ signals. These channels are denoted p gyro axis, q gyro axis, r gyro axis and q' gyro axis bias, scale factor, mass unbalance and temperature error compensation channels. Since, except for nomenclature differences, the channels are identical, only one channel (the p gyro axis channel) is herein described in detail. The p gyro axis bias, scale factor, mass unbalance and temperature error compensation channel is illustrated in FIG. 31 and comprises: six constant circuits 771, 773, 775, 777, 779 and 781 denoted $q^r$, $m^r$, $m_{T}{}^r$, $B_{oTp}$, $\epsilon_{TP}$, and $\epsilon_{op}$, respectively; three two-input summers 791, 793 and 795, each of which has a positive input and a negative input; two multipliers 797 and 798; and, an eight-input summer 799 (which has one positive input and seven negative inputs).

Figure 31:
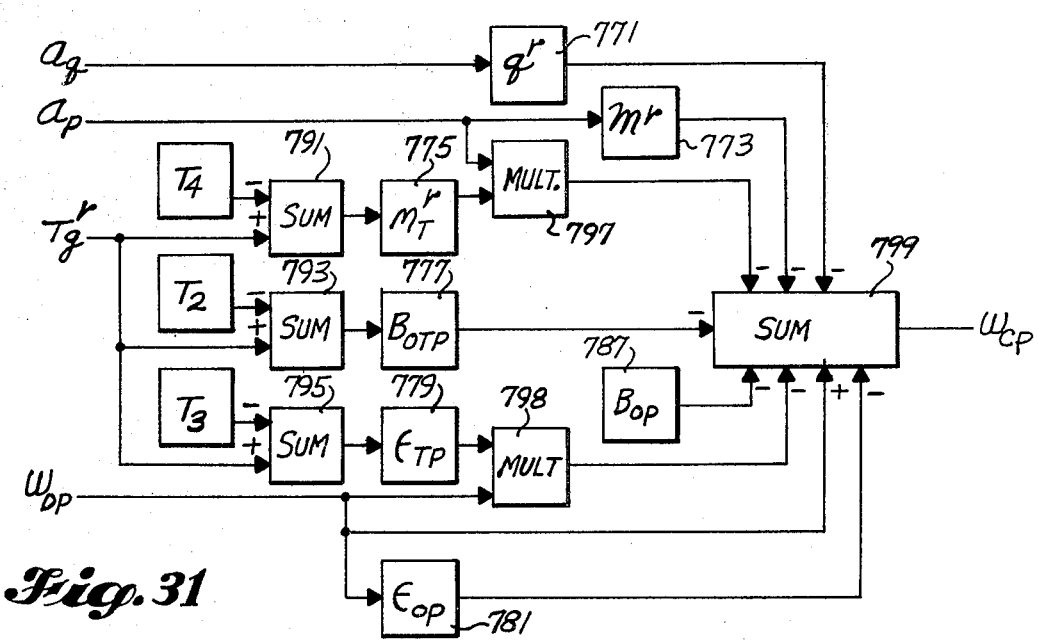
FIG. 31 is a functional block diagram of a p gyro axis bias, scale factor, mass unbalance and temperature error compensation circuit suitable for use in he gyro bias, scale factor, mass unbalance and temperature error compensation network illustrated in FIG. 30.

As illustrated in FIGS. 30 and 31, the p gyro axis bias, scale factor, mass unbalance and temperature error compensation channel receives the $a_q$ and $a_p$ signals produced by the accelerometer misalignment compensation network 605 in the manner previously described. In addition, the p gyro axis bias, scale factor, mass unbalance and temperature error compensation channel receives the $\omega_{Dp}$ signal produced by the gyro V/F scale factor and dynamic error compensation network 607 (FIG. 29); and, the $T_g{}^r$ temperature signal produced by the first gyro.

The $a_q$ signal is applied to the $q^r$ constant circuit where it is multiplied by the value of $q^r$. $q^r$ is the quadrature component of the spin axis mass unbalance error coefficient of the gyro that has its spin axis lying nominally along the yaw (r) axis of the aircraft. The value of $q^r$ is stored in the memory 601. The output of the $q^r$ constant circuit 771 is applied to one of the negative inputs of the eight-input summer 799. $a_p$ is applied to the $m^r$ constant circuit 773 where it is multiplied by the value of $m^r$. $m^r$ is the direct component of the gyro spin axis mass unbalance error coefficient of the gyro that has its spin axis lying nominally along the yaw (r) axis of the aircraft. The value of $m^r$ is also stored in the memory of 601. The output of the $m^r$ constant circuit 773 is applied to a second negative input of the eight-input summer 799. $a_p$ is also applied to one input of the first muliplier 797.

A series of temperature signals denoted $T_2$, $T_3$ and $T_4$, represented by blocks in FIG. 31, but actually stored in the memory, are applied to the negative inputs of the first, second and third two-input summers 791, 793, and 795, respectively. $T_2$ represents the nominal temperature for the gyro bias error value and is applied to the second two-input summer 793; $T_3$ represents the nominal temperature for the gyro scale factor error value and is applied to the third two-input summer 795; and, $T_4$ represents the nominal temperature for the direct component of mass unbalance error coefficient value and is applied to the first two-input summer 791. $T_g{}^r$ is applied to the positive inputs of all of the first, second and third two-input summers 791, 793 and 795.

The output of the first two-input summer 791 is applied to the input of the $m_T{}^r$ constant circuit 775 where it is multiplied by the value of $m_T{}^r$. $m_T{}^r$ is the temperature sensitivity coefficient of the direct component of gyro spin axis mass unbalance error coefficient of the gyro that has its spin axis lying nominally along the yaw (r) axis of the aircraft. The output of $m_T{}^r$ constant circuit is applied to the second input of the first multiplier 797. The output of the first multiplier 797 is applied to the third negative input of the eight-input summer 799.

The output of the second two-input summer 793 is applied to the input of the $B_{oTp}$ constant circuit 777 where it is multiplied by the value of $B_{oTp}$. $B_{oTp}$ is the gyro bias error temperature sensitivity coefficient for the gyro having its input axis lying nominally along the roll (p) axis of the aircraft. The output of the $B_{oTp}$ constant circuit 777 is applied to a fourth negative input of the eight-input summer 799.

A constant signal denoted $B_{op}$, represented by a block 787 in FIG. 31, but actually stored in the memory 601, is applied to another negative input of the eight-input summer 799. $B_{op}$ is the bias error of the gyro having its input axis lying nominally along the roll (p) axis of the aircraft.

The output of the third two-input summer 795 is applied to the input of the $\epsilon_{Tp}$ constant circuit 779 where it is multiplied by the value of $\epsilon_{Tp}$. $\epsilon_{Tp}$ is the gyro scale factor bias error temperature sensitivity coefficient of the gyro having its input axis lying nominally along the roll (p) axis of the aircraft. The output of the $\epsilon_{Tp}$ circuit is applied to one input of the second multiplier 798. $\omega_{Dp}$, is applied to the second input of the second multiplier 798, and to the positive input of the eight-input summer 799. The output of the second multiplier 798 is applied to yet another negative input of the eight-input summer 799. $\omega_{Dp}$ is also applied to the input of the $\epsilon_{op}$ constant circuit 781 where it is multiplied by the value of $\epsilon_{op}$. $\epsilon_{op}$ is the gyro scale factor bias error of the gyro having its input axis lying nominally along the roll (p) axis of the aircraft. The output of the $\epsilon_{op}$ constant circuit 781 is applied to the last negative input of the eight-input summer 799. The output of the eight-input summer is the signal denoted $\omega_{cp}$. As discussed above, thus, $\omega_{cp}$ is a gyro signal that is compensated for V/F scale factor, dynamic error, gyro bias, scale factor, mass unbalance and temperature sensitivity errors.

As noted above, the q gyro axis, r gyro axis and q' gyro axis bias, scale factor, mass unbalance and temperature error compensation channels are substantially identical to the p gyro axis bias, scale factor, mass unbalance and temperature error compensation channel. The only differences are in nomenclature and, in a couple of instances, the sign of the terms. In this regard, as illustrated in FIG. 30, the $T_g{}^r$ is applied to the q gyro bias, scale factor, mass unbalance and temperature error compensation channel. The $T_g{}^p$ temperature signal is applied to the r gyro axis and to the q' gyro axis bias, scale factor, mass unbalance and temperature error compensation channels. Further, the q gyro axis bias, scale factor, mass unbalance and temperature error compensation channel receives the $a_p$, $a_q$ and $\omega_{Dq}$ signals and produces the $\omega_{cq}$ signal. In this channel the $a_q$ signal is inverted prior to being acted upon. The r gyro axis bias, scale factor, mass unbalance and temperature error compensation channel receives the $a_r$, $a_q$ and $\omega_{Dr}$ signals and produces the $\omega_{cr}$ signal. In this channel the $a_r$ signal is inverted before being acted upon. Further, the $q_r$ input of the right input summer is positive rather than negative. The q' gyro axis bias, scale factor, mass unbalance and temperature error compensation channel receives $a_r$, $a_q$ and $\omega'_{Dq}$ signals and produces the $\omega'_{cq}$ signal. In this channel the $q_r$ input of the eight-input summer is also positive rather than negative.

As with the other networks of the data processor, the gyro bias, scale factor, mass unbalance and temperature error compensation network illustrated in FIG. 30 can be mathematically represented. The result is a matrix equation that represents the gyro bias, scale factor, mass unbalance and temperature error compensation network 609:

$$
\begin{bmatrix} \omega_{cp} \\ \omega_{cq} \\ \omega_{cr} \\ \omega'_{eq} \end{bmatrix} = \begin{bmatrix} \omega_{Dp}(1 - \epsilon_{op}) \\ \omega_{Dq}(1 - \epsilon_{oq}) \\ \omega_{Dr}(1 - \epsilon_{or}) \\ \omega_{Dq}(1 - \epsilon_{oq}') \end{bmatrix} - \begin{bmatrix} B_{op} \\ B_{oq} \\ B_{or} \\ B_{oq}' \end{bmatrix} -
$$

$$
\begin{bmatrix} B_{oTp}(T_g^r - T_2) \\ B_{oTq}(T_g^r - T_2) \\ B_{oTr}(T_g^p - T_2) \\ B_{oTq}'(T_g^p - T_2) \end{bmatrix} - \begin{bmatrix} [\epsilon_{Tp}(T_g^r - T_3)] \omega_{Dp} \\ [\epsilon_{Tq}(T_g^r - T_3)] \omega_{Dq} \\ [\epsilon_{Tr}(T_g^p - \omega3)] \omega_{Dr} \\ [\epsilon_{Tq}'(T_q^p - T_3)] \omega_{Dq}' \end{bmatrix} -
$$

$$
\begin{bmatrix} [m^r + m_T{}^r(T_g^r - T_4)]a_p \\ [m^r + m_T{}^r(T_g^r - T_4)](-a_q) \\ [m^p + m_T{}^p(T_g^p - T_4)](-a_r) \\ [m^p + m_T{}^p(T_g^p - T_4)]a_q \end{bmatrix} +
$$

$$
\begin{bmatrix} -q^r a_q \\ -q^r a_p \\ q^p a_q \\ q^p a_2 \end{bmatrix} \text{(redundant axis)}
$$

(9)

Gyro Misalignment Compensation and Averaging of Redundant Data Network

As previously discussed, the $\omega_{cp}$, $\omega_{cq}$, $\omega_{cr}$ and $\omega'_{cq}$ signals are nominally related to the aircraft body axes, i.e., the roll (p), pitch (q) and yaw (r) axes of the aircraft. It is essentially impossible to perfectly align the sense and spin axes of the gyros relative to one another and relative to the sense axes of the accelerometers. Moreover, the gyro sense axes may be intentionally skewed, as discussed above. However, it is necessary that the information obtained from the gyros be precisely related to each other; to the accelerometer information; and, to the aircraft body axes. In order to do this, it is necessary to modify the $\omega_{cp}$, $\omega_{cq}$, $\omega_{cr}$ and $\omega'_{cq}$ signals to compensate for actual misalignment. This is accomplished by the gyro misalignment compensation and averaging of redundant data network. (In addition to gyro misalignment compensation, this network also averages the redundant data contained in the $\omega'_{cq}$ signal.)

A gyro misalignment compensation and averaging of redundant data network suitable for use in the inertial data processor illustrated in FIG. 27 is illustrated in FIG. 32 and comprises first and second matrix multipliers 801 and 803; and, a data averaging circuit 805. The data averaging circuit comprises three two-input summers 807, 809 and 811; and, three divide-by-two circuits 813, 815 and 817. The inputs of the three two-input summers are all positive. Also illustrated in FIG. 32 is an averaging switch 819, illustrated schematically as three single pole, single throw switch elements ganged together; and, a selection switch 821, illustrated schematically as three single pole, double throw switch elements ganged together and ganged to the averaging switch 819.

The first matrix multiplier 801, denoted the [$M_g$] matrix multiplier, receives the $\omega_{cp}$, $\omega_{cq}$ and $\omega_{cr}$ signals. The second matrix multiplier 803, denoted the [$M'_g$] matrix multiplier, receives the $\omega_{cp}$, $\omega'_{cq}$ and $\omega_{cr}$ signals via the averaging switch 819, one signal being applied through each of the switch elements. The matrix multipliers function in accordance with the following general equation:

$$
\begin{bmatrix} \omega_p \\ \omega_q \\ \omega_r \end{bmatrix} = [M_g] \begin{bmatrix} \omega_{cp} \\ \omega_{cq} \\ \omega_{cr} \end{bmatrix}
$$

(10)

In the case of the second matrix multiplier, [$M_g$] in equation (10) is replaced by [$M'_g$] and $\omega_{cq}$ is replaced by $\omega'_{cq}$. [$M_g$] and [$M'_g$] are defined by the following two equations, respectively:

$$
[M_g] = \begin{bmatrix} 1 & \theta_{gpr} & \theta_{gpq} \\ \theta_{gqr} & 1 & -\theta_{gqp} \\ -\theta_{grq} & \theta_{grp} & 1 \end{bmatrix}
$$

(11)

$$
[M'_g] = \begin{bmatrix} 1 & -\theta_{gpr} & \theta_{gpq} \\ \theta_{gq'r} & 1 & -\theta_{gq'p} \\ -\theta_{grq} & \theta_{grp} & 1 \end{bmatrix}
$$

(12)

where: $\theta_{gij}$ is the misalignment angle of the gyro having its input axis lying nominally along the ith body axis, caused by a rotation about the jth body axis.

The outputs of the first matrix multiplier 801 are denoted $\omega_p$, $\omega_q$ and $\omega_r$ and the outputs of the second matrix multiplier 803 are denoted $\omega'_p$, $\omega'_q$ and $\omega'_r$. $\omega_p$ and $\omega'_p$ are applied to the inputs of the first two-input summer 807; $\omega_q$ and $\omega'_q$ are applied to the inputs of the second two-input summer 809; and $\omega_r$ and $\omega'_r$ are applied to the inputs of the third two-input summer 811. The outputs of the first, second and third two-input summers 807, 809 and 811 are applied to the inputs of the first, second and third divide-by-two circuits 813, 815 and 817, respectively. The output of the first divide-by-two circuit 813 is denoted $\omega_{pm}$; the output of the second divide-by-two circuit 815 is denoted $\omega_{qm}$; and the output of the third divide-by-two circuit 817 is denoted $\omega_{rm}$.

$\omega_p$ and $\omega_{pm}$ are each applied to one of the remote terminals of the first switch element of the selection switch 821; $\omega_q$ and $\omega_{qm}$ are each applied to one of the remote terminals of the second switch element of the selection switch 821; and $\omega_r$ and $\omega_{rm}$ are each applied to one of the remote terminals of the third switch element of the selection switch 821. The outputs at the common terminals of the first, second and third switch elements of the section switch 821 are denoted $\omega_p$, $\omega_q$ and $\omega_r$, respectively.

It will be appreciated from the foregoing description that the first and second matrix multipliers 801 and 803 correct the signals they receive for relative misalignment between the actual sense axes of the gyros and between the gyro and accelerometer axes. The data averaging network allows the data to be averaged by summing related axes data and then dividing the resultant data by two. The averaging switch 819 allows the redundant channel data to be ignored if desired. The selection switch allows a choice to be made between the averaged data signals ($\omega_{pm}$, $\omega_{qm}$ and $\omega_{rm}$) or the $\omega_p$, $\omega_q$ and $\omega_r$ signals.

Attitude Matrix Update Network

An attitude matrix update network suitable for use in the inertial data processor illustrated in FIG. 27, is illustrated in FIG. 33 and comprises: six two-input summers 831, 833, 835, 837, 839 and 841; two matrix multipliers 843 and 845; an integrator 847; three $\Omega$ constant circuits 849, 851 and 853; and an initial matrix value circuit 855. The first three summers 831, 833 and 835 each have a positive input and a negative input; and, the other three summers 837, 839 and 841 have two positive inputs.

$\omega_p$ is applied to the positive input of the first summer 831; $\omega_q$ is applied to the positive input of the second summer 833; and, $\omega_r$ is applied to the positive input of the third summer 835. The negative input of the first summer receives a first signal produced by the second matrix multiplier 845 in the manner hereinafter described; the negative input of the second summer 833 receives a second signal produced by the second matrix multiplier 845 in the manner hereinafter described; and, the negative input of the third summer 835 receives a third signal produced by the second matrix multiplier 845 in the manner hereinafter described. The output for the first summer is denoted $\xi_p$, the output of the second summer 833 is denoted $\xi_q$ and the output of the third summer 835 is denoted $\xi_r$. $\xi_p$, $\xi_p$, and $\xi_r$ are each applied to an input of the first matrix multiplier 843. The first matrix multiplier forms a $\xi$ matrix of the $\xi_p$, $\xi_q$ and $\xi_r$ signals and multiplies this matrix by a matrix, denoted [B], produced at the output of the integrator 847 as hereinafter described. The $\xi$ matrix formed from the $\xi_p$, $\xi_q$ and $\xi_r$ signals is as follows:

$$[\xi] = \begin{bmatrix} 0 & \xi_r & -\xi_q \\ -\xi_r & 0 & \xi_p \\ \xi_q & -\xi_p & 0 \end{bmatrix} \quad (13)$$

The output of the first matrix multiplier 843 is a matrix signal denoted $[\dot{B}]$; whereby $[\dot{B}]$ is defined by the following equation:

$$[\dot{B}] = \begin{bmatrix} 0 & \xi_r & -\xi_q \\ -\xi_r & 0 & \xi_p \\ \xi_q & -\xi_p & 0 \end{bmatrix} [B] \quad (14)$$

The nomenclature $[\dot{B}]$, of course, means $d[B]/dt$, where the derivative of the matrix is taken term-by-term.

The output of the first matrix multiplier 843, e.g., $[\dot{B}]$, is applied to the integrator 847. (The integrator initially receives a signal $[B_0]$ from memory 601 that denotes the initial value of [B]. The value of $[B_0]$ is determined during a self alignment procedure during which the invention is analytically aligned relative to local level and true north, as hereinafter described.) The integrator 847 integrates the $[\dot{B}]$ signal after being initialized by the value of $[B_0]$. The result of this integration is [B]. As noted above [B] is a direction cosine matrix that, when post-multiplied by a vector in navigational coordinates, transforms the vector to aircraft body coordinates. [B], in addition to being applied to the first matrix multiplier 843, as discussed above (and to other networks, as illustrated in FIG. 27 and previously discussed), is also applied to the second matrix multiplier 845.

$\rho_x$ is applied to one of the inputs of the fourth summer 837. $C_{11}$ (generally defined above and hereinafter described in more detail) is applied to the input of the first $\Omega$ constant circuit 849 and the output of the first $\Omega$ constant circuit 849 is applied to the second input of the fourth summer 837. The $\Omega$ constant circuits multiply their inputs by a value ($\Omega$), stored in the memory 601, that is equal to the magnitude of the earth's angular velocity. The output of the fourth summer 837 is applied to an input of the second matrix muliplier 845. $\rho_y$ is applied to one of the inputs of the fifth summer 839; and, $C_{21}$ (also generally defined above and hereinafter described in more detail) is multiplied by the second $\Omega$ constant circuit 851. The output of the second $\Omega$ constant circuit 851 is applied to the second input of the fifth summer 839. The output of the fifth summer 839 is applied to another input of the second matrix multiplier 845. $\rho_z$ is applied to one input of the sixth summer 841. $C_{31}$ (also generally defined above and hereinafter described in more detail) is applied to the third $\Omega$ constant circuit 853 and the output of the third $\Omega$ constant circuit is applied to the second input of the sixth summer 841. The output of the sixth summer 841 is applied to a further input of the second matrix multiplier 845. As a result, the outputs of the fourth, fifth and sixth summers 837, 839 and 841 can be mathematically represented by: $\rho_x + \Omega C_{11}$, $\rho_y + \Omega C_{21}$ and $\rho_z + \Omega C_{31}$, respectively.

The second matrix multiplier 845 multiplies the $\rho_x + \Omega C_{11}$, $\rho_y + \Omega C_{21}$ and $\rho L_z + \Omega C_{31}$ signals by [B] and the results are applied to the negative inputs of the first, second and third summers 831, 833 and 835, respectively. Consequently, the $\xi_p$, $\xi_q$ and $\xi_r$ signals formed at the outputs of the first, second and third summers 831, 833 and 835 can be defined by the equation:

$$\begin{bmatrix} \xi_p \\ \xi_q \\ \xi_r \end{bmatrix} = \begin{bmatrix} \omega_p \\ \omega_q \\ \omega_r \end{bmatrix} - [B] \begin{bmatrix} \rho_x + \Omega C_{11} \\ \rho_y + \Omega C_{21} \\ \rho_z + \Omega C_{31} \end{bmatrix} \quad (15)$$

And, of course, [B] can be defined by the equation:

$$[B] = \int_0^{t_i} [\dot{B}]\, dt + [B_0] \quad (16)$$

Gravity Computation Network

A gravity computation network suitable for use in the inertial data processor illustrated in FIG. 27 is illustrated in FIG. 34 and comprises: three constant circuits 863, 865 and 867; a squaring circuit 869; and, a three-input summer 871. The three-input summer 871 has two positive inputs and one negative input. A constant having a value of one (1), represented by a block 873 in FIG. 34, but actually stored in the memory 601, is applied to one of the positive inputs of the three-input summer 871. An altitude signal ($h_1$), which represents the altitude above mean sea level (reference ellipsoid) along the plum line direction from the aircraft, is applied to the input of the first constant circuit 863. The value of $h_t$ is obtained from the air and temperature data processor illustrated in FIGS. 45-51 and hereinafter described. The first constant circuit 863 multiplies $h_t$ by a value (stored in the memory) equal to $2/r_0$, where $r_0$ is the equatorial radius of the earth at mean sea level. The output of the first constant circuit 863 is applied to the negative input of the three-input summer 871.

$C_{31}$ is applied to the input of the squaring circuit 869, where it is squared. The output of the squaring circuit 869 is applied to the input of the second constant circuit 865 where it is multiplied by a gravity constant, $K_g$, whose value is also stored in memory. More specifically, $K_g$ is a constant relating gravitational acceleration to latitude. The output of the second constant circuit 865 is applied to the other positive input of the three-input summer 871. The output of the three input summer 871 is applied to the input of the third constant circuit 867. The third constant circuit 867 multiplies its input by a value (stored in the memory) equal to $g_o$, which represents the acceleration due to gravity in the equatorial plane at mean sea level. The output of the third constant circuit 867 is g. As noted above, g is the acceleration due to gravity (combined effects of gravitational mass attraction force and centrifugal force) at any specific latitude and altitude.

As with the other networks, the gravity computation network can be expressed mathematically. The mathematical expression based on FIG. 34 is:

$$g = g_o \left( 1 - \frac{2h_t}{r_o} + K_g C_{31}^2 \right) \tag{17}$$

Position Matrix Update Network

A position matrix update network suitable for use in the embodiment of the inertial data processor illustrated in FIG. 27 is illustrated in FIG. 35 and comprises: a matrix multiplier 881; and an integrator 883. The $\rho_x$, $\rho_y$ and $\rho_z$ signals are applied to inputs of the matrix multiplier. The matrix multiplier forms the following matrix from these signals:

$$\begin{bmatrix} 0 & \rho_z & -\rho_y \\ -\rho_z & 0 & \rho_x \\ \rho_y & -\rho_x & 0 \end{bmatrix} \tag{18}$$

The matrix multiplier also receives the [C] matrix produced at the output of the integrator 883 in the manner herein described. As noted above, [C] is a direction cosine matrix that, when post-multiplied by a vector in earth-centered coordinates, transforms that vector to navigational coordinates. The output of the matrix multiplier is denoted [Ċ]. As a result, mathematically, the output of the matrix multiplier can be represented by the following equation:

$$[\dot{C}] = \begin{bmatrix} 0 & \rho_z & -\rho_y \\ -\rho_z & 0 & \rho_x \\ \rho_y & -\rho_x & 0 \end{bmatrix} [C] \tag{19}$$

The [Ċ] output of the matrix multiplier is applied to one input of the integrator 883. An initial value of the [C] matrix, denoted $[C_0]$ and represented by a block 885 in FIG. 35 (but actually stored in the memory 601) is applied to a second input of the integrator 883. The initial value of [C], $[C_0]$, is determined in the manner hereinafter described. The integrator 883 integrates the [Ċ] matrix after being initialized by $[C_0]$. As previously noted, the output of the integrator is the [C] matrix.

It will be appreciated from the foregoing discussion that the output of the integrator 883 can be mathematically represented by the following equation:

$$[C] = \int_0^{t_i} [\dot{C}] dt + [C_0] \tag{20}$$

Transport Angular Compensation Network

A block diagram of a transport angular rate compensation network suitable for use in the embodiment in the inertial data processor illustrated in FIG. 27 is illustrated in FIG. 36. In essence, the transport angular rate compensation network is a matrix multiplier 887 that forms a matrix of certain input signals (and constants) and multiplies the $V_x$, $V_y$ and $V_z$ signals, produced by the velocity computation network 623 in the manner hereinafter described, to produce the $\rho_x$, $\rho_y$ and $\rho_z$ signals used by the position matrix update network 619, the attitude matrix update network 613 and the velocity computation network 623. More specifically, the matrix multiplier receives selected portions of the [C] matrix (specifically, the information at the $C_{11}$, $C_{21}$ and $C_{31}$ positions of the [C] matrix); and the altitude signal ($h_t$). The matrix multiplier also receives the $r_o$ constant and a constant denoted e. Both $r_o$ and e are represented by blocks 888 and 889 in FIG. 36, but are actually stored in the memory 601. As previously discussed, $r_o$ is the equatorial radius of the earth at mean sea level. e is the ellipticity of a polar cross-section of the earth.

Mathematically, the matrix formed by the matrix multiplier 887 is:

$$\begin{bmatrix} \frac{2e}{r_o} C_{11} C_{21} & \frac{1}{r_o}\left(1 - \frac{h_t}{r_o} - e C_{31}^2 + 2e C_{21}^2\right) & 0 \\ -\frac{1}{r_o}\left(1 - \frac{h_t}{r_o} - e C_{31}^2 + 2e C_{11}^2\right) & -\frac{2e}{r_o} C_{11} C_{21} & 0 \\ 0 & 0 & 0 \end{bmatrix} \tag{21}$$

As previously noted, the matrix multiplier 887 multiplies $V_x$, $V_y$ and $V_z$ by the foregoing matrix. As a result, the transport angular rate compensation network can be represented by the following equation:

$$\begin{bmatrix} \rho_x \\ \rho_y \\ \rho_z \end{bmatrix} = \begin{bmatrix} \frac{2e}{r_o} C_{11} C_{21} & \frac{1}{r_o}\left(1 - \frac{h_t}{r_o} - eC_{31}^2 + 2eC_{21}^2\right) & 0 \\ -\frac{1}{r_o}\left(1 - \frac{h_t}{r_o} - e C_{31}^2 + 2eC_{11}^2\right) & -\frac{2e}{r_o} C_{11} C_{21} & 0 \\ 0 & 0 & 0 \end{bmatrix} \begin{bmatrix} V_x \\ V_y \\ V_z \end{bmatrix} \quad (22)$$

Velocity Computation Network

A velocity computation network suitable for use in the inertial data processor illustrated in FIG. 27 is illustrated in FIG. 37 and comprises: a matrix multiplier 891; a constant circuit 893; four summers 895, 897, 899 and 901, each of which has two positive inputs; and, a multiple integrator 903.

Selected elements of [C] matrix (specifically, the values at the $C_{11}$, $C_{21}$ and $C_{31}$ positions) are applied to the constant circuit where they are multiplied by the value of $2\Omega$. As noted above, $\Omega$ is the magnitude of the earth's angular velocity. The output of the constant circuit 893 is applied to the matrix multiplier 891. Matrix multiplier 891 also receives the $\rho_x$, $\rho_y$ and $\rho_z$ signals produced by the transport angular rate compensation network; and, forms the matrix:

$$\begin{bmatrix} 0 & (\rho_z + 2\Omega C_{31}) & (-\rho_y - 2\Omega C_{21}) \\ (-\rho_z - 2\Omega C_{31}) & 0 & (\rho_x + 2\Omega C_{11}) \\ (\rho_y + 2\Omega C_{21}) & (-\rho_x - 2\Omega C_{11}) & 0 \end{bmatrix} \quad (23)$$

The matrix multiplier 891 multiplies the $V_x$, $V_y$ and $V_z$ signals, produced at the output of the multiple integrator 903, by the foregoing matrix. The matrix multiplier produces three outputs. One of these outputs is applied to an input of each of the first, second and third two-input summers 895, 897 and 899, respectively. More specifically, the matrix multiplier output related to $V_x$ is applied to one input of the first summer 895. $a_x$ is applied to the second input of the first summer 895. The output of the matrix multiplier related to $V_y$ is applied to one input of the second summer 897. $a_y$ is applied to the second input of the second summer 897. $a_z$ is applied to one input and g is applied to the other input of the fourth summer 901. The output of the matrix multiplier 891 related to $V_z$ is applied to one input of the third summer 899 and the output of the fourth summer 901 is applied to the second input of the third summer 899. As a result, the output of the first, second and third summers can be represented by the following equation:

$$\begin{bmatrix} \dot{V}_x \\ \dot{V}_y \\ \dot{V}_z \end{bmatrix} = \begin{bmatrix} a_x \\ a_y \\ a_z \end{bmatrix} + \begin{bmatrix} 0 \\ 0 \\ g \end{bmatrix} + \begin{bmatrix} 0 & (\rho_z + 2\Omega C_{31}) & (-\rho_y - 2\Omega C_{21}) \\ (-\rho_z - 2\Omega C_{31}) & 0 & (\rho_x - 2\Omega C_{11}) \\ (\rho_y - 2\Omega C_{21}) & (-\rho_x - 2\Omega C_{11}) & 0 \end{bmatrix} \begin{bmatrix} V_x \\ V_y \\ V_z \end{bmatrix} \quad (24)$$

The multiple integrator 903 includes three separate integrators, each of which receives the output of one of the first, second and third summers. The output of the integrators are the $V_x$, $V_y$ and $V_z$ signals. As a result, $V_x$, $V_y$ and $V_z$ can be represented by the following equation:

$$\begin{bmatrix} V_x \\ V_y \\ V_z \end{bmatrix} = \int_0^{t_i} \begin{bmatrix} \dot{V}_x \\ \dot{V}_y \\ \dot{V}_z \end{bmatrix} dt + \overline{V_0}(\overline{V_0} = 0) \quad (25)$$

Output Parameter Computation Network

Figure 38:
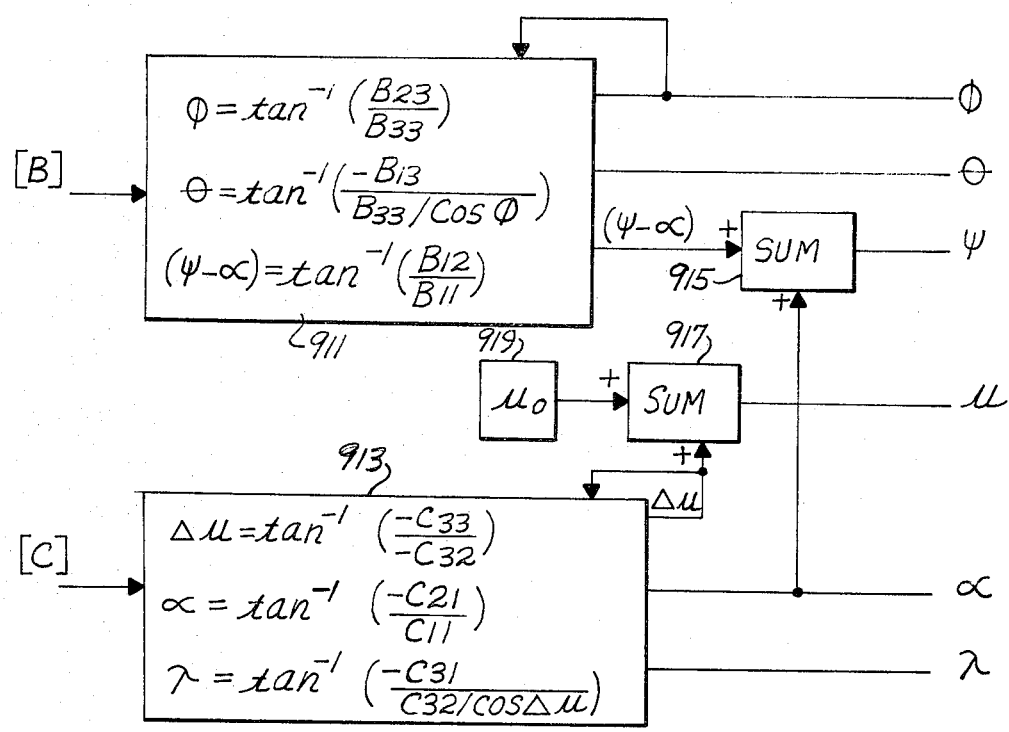
FIG. 38 is a functional block diagram of an output parameter computation network forming part of the inertial data processor illustrated in FIG. 27.

An output parameter computation network suitable for use in the inertial data processor illustrated in FIG. 27 is illustrated in FIG. 38 and comprises: two calculation circuits 911 and 913; and, two two-input summers 915 and 917. Both of the inputs of the two-input summers are positive.

The first calculation circuit 911 receives signals representing the values of certain elements of the B matrix (specifically, the $B_{11}$, $B_{12}$, $B_{13}$, $B_{23}$ and $B_{33}$ values) and, in accordance therewith, produces roll ($\phi$), pitch ($\theta$), and heading ($\psi$) minus wander azimuth ($\alpha$) signals. The value of the roll ($\phi$) signal is determined in accordance with the following equation:

$$\phi = \tan^{-1}\left(\frac{B_{23}}{B_{33}}\right) \quad (26)$$

The roll ($\phi$) signal is applied to the first calculation circuit 911. The pitch ($\theta$) value is determined in accordance with the following equation:

$$\theta = \tan^{-1}\left(\frac{-B_{13}}{B_{33}/\cos\phi}\right) \text{ (for } \cos\phi \neq 0\text{)} \quad (27)$$

The heading minus wander azimuth signal ($\psi - \alpha$) is determined in accordance with the following equation:

$$(\psi - \alpha) = \tan^{-1}\left(\frac{B_{12}}{B_{11}}\right) \quad (28)$$

As previously noted, the $\phi$ signal is applied to the first calculation network 911 so that it can be used to determine the value of $\theta$. In addition, $\theta$ and $\phi$ form output signals. The $\psi - \alpha$ signal is applied to one input of the first summer 915.

The second calculation circuit 913 receives signals representing the values at certain positions in the [C]

matrix (specifically, the $C_{11}$, $C_{21}$, $C_{31}$, $C_{32}$ and $C_{33}$ values) and, in accordance therewith, produces change in longitude ($\Delta\mu$), wander azimuth ($\alpha$) and latitude ($\lambda$) signals. The change in longitude signal ($\Delta\mu$) is determined in accordance with the following equation:

$$\Delta\mu = \tan^{-1}\left(\frac{-C_{33}}{-C_{32}}\right) \quad (29)$$

The wander azimuth signal ($\alpha$) is determined in accordance with the following equation:

$$\alpha = \tan^{-1}\left(\frac{-C_{21}}{-C_{11}}\right) \quad (30)$$

The latitude signal ($\lambda$) is determined in accordance with the following equation:

$$\lambda = \tan^{-1}\left(\frac{-C_{31}}{-C_{32}/\cos\Delta\mu}\right) \quad \text{(for } \cos\Delta\mu \neq 0\text{)} \quad (31)$$

$\alpha$ is applied to the second input of the first summer 915 where it is summed with the $\psi-\alpha$ output of the first calculation circuit 911 to produce a $\psi$ signal. $\psi$ is the heading of the aircraft, referenced to true north.

An initial longitude signal $\mu_0$, denoted by a block 919 in FIG. 38, but actually stored in the memory 601, is applied to one input of the second summer 917. $\mu_0$ is the initial longitude of the aircraft and is input during the alignment procedure. $\Delta\mu$ is applied to the second input of the second summer 917 as well as to the second calculation circuit 913. The summation of $\mu_0$ and $\Delta\mu$ produces a $\mu$ (longitude) signal.

[C] Matrix-Initial Value

As discussed above, the [C] matrix is a direction cosine matrix that transforms a vector expressed in earth-centered coordinates to a vector expressed in navigational coordinates. That is, $\bar{R}_N = [C]\bar{R}_E$, where $\bar{R}_N$ represents a vector in navigational coordinates and $\bar{R}_E$ represents a vector in earth-centered coordinates. (The subscript N denotes local level navigational coordinates and the subscript E denotes earth-centered coordinates.)

Figure 39:
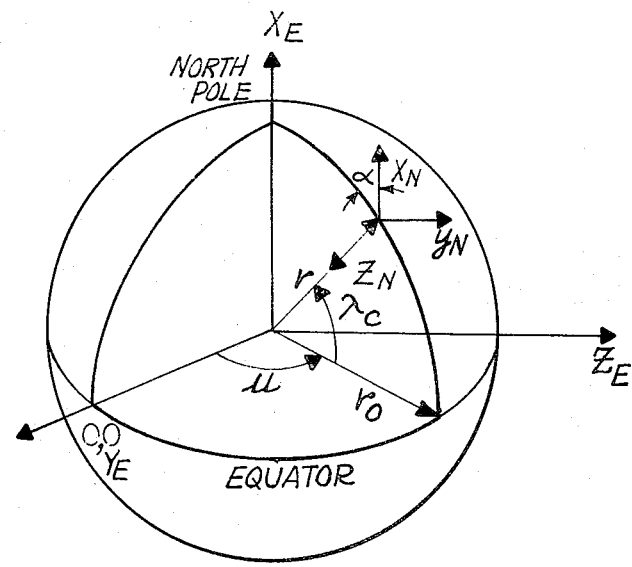
FIG. 39 is a diagram of the earth illustrating the relationship between vectors expressed in earth centered coordinates and vectors expressed in navigational coordinates.

Attention is now directed to FIG. 39, which illustrates both earth-centered and navigational coordinate systems. In the earth-centered coordinate system, $X_E$ passes through the north pole, $Y_E$ passes through the Greenwich meridian in the equatorial plane and $Z_{E=X_E \times Y_E}$ (cross product). The origin of the coordinate system is at the center of the earth; and, of course, the coordinate system rotates with the earth. In the local level navigation coordinate system, $X_N$ is directed toward north (for $\alpha=0$), $Y_N$ is directed toward east (for $\alpha=0$) and $Z_N$ is directed down, where $\alpha$ represents wander azimuth, as noted above. In addition, the origin of the navigational coordinate set moves with the aircraft so as to remain on the surface of the earth, directly beneath the aircraft (along a line connecting the center of the earth and the aircraft). Finally, in FIG. 39, $\lambda_c$ represents the geocentric latitude and $\mu$ represents the longitude of the aircraft; $r_o$ represents the equatorial radius of the earth; and r represents the radius of the earth at the latitude and longitude of the aircraft.

The transformation from earth-centered to navigational coordinates is accomplished by three successive vector rotations. The first rotation is about $X_E$ by the angle $\mu+90$. The second rotation is about $Y'_E$ (the rotated $Y_E$ axis) by the angle $-\lambda$ (where $\lambda$ is the geographic latitude). The third rotation is about $Z''$ (the twice rotated $Z_E$ axis) by the angle $\alpha$. It will be appreciated from the foregoing discussion that:

$$[C] = R(3,\alpha)\, R(2,-\lambda)\, R(1, \mu + 90) \quad (32)$$

where:

$$R(1, \mu+90) = \begin{bmatrix} 1 & 0 & 0 \\ 0 & \cos(\mu+90) & \sin(\mu+90) \\ 0 & -\sin(\mu+90) & \cos(\mu+90) \end{bmatrix}$$

$$= \begin{bmatrix} 1 & 0 & 0 \\ 0 & -\sin\mu & \cos\mu \\ 0 & -\cos\mu & -\sin\mu \end{bmatrix}$$

$$R(2,-\lambda) = \begin{bmatrix} \cos(-\lambda) & 0 & -\sin(-\lambda) \\ 0 & 1 & 0 \\ \sin(-\lambda) & 0 & \cos(-\lambda) \end{bmatrix}$$

$$= \begin{bmatrix} \cos\lambda & 0 & \sin\lambda \\ 0 & 1 & 0 \\ -\sin\lambda & 0 & \cos\lambda \end{bmatrix}$$

$$R(3,\alpha) = \begin{bmatrix} \cos\alpha & \sin\alpha & 0 \\ -\sin\alpha & \cos\alpha & 0 \\ 0 & 0 & 1 \end{bmatrix}$$

Consequently C can be written as:

$$[C] = \begin{bmatrix} \cos\alpha & \sin\alpha & 0 \\ -\sin\alpha & \cos\alpha & 0 \\ 0 & 0 & 1 \end{bmatrix} \begin{bmatrix} \cos\lambda & 0 & \sin\lambda \\ 0 & 1 & 0 \\ -\sin\lambda & 0 & \cos\lambda \end{bmatrix} \begin{bmatrix} 1 & 0 & 0 \\ 0 & -\sin\mu\cos\mu \\ 0 & -\cos\mu & -\sin\mu \end{bmatrix} \quad (33)$$

or $$[C] = \begin{bmatrix} \cos\alpha\cos\lambda & -\sin\alpha\sin\mu - \cos\alpha\sin\lambda\cos\mu & \sin\alpha\cos\mu - \cos\alpha\sin\lambda\sin\mu \\ -\sin\alpha\cos\lambda & -\cos\alpha\sin\mu + \sin\alpha\sin\lambda\cos\mu & \cos\alpha\cos\mu - \sin\alpha\sin\lambda\sin\mu \\ -\sin\lambda & -\cos\lambda\cos\mu & -\cos\lambda\sin\mu \end{bmatrix} \quad (34)$$

Thus, in terms of matrix positions:

| | | |
|---|---|---|
| $C_{11}$ | = | $\cos\alpha\cos\lambda$ |
| $C_{12}$ | = | $-\sin\alpha\sin\mu\cos\alpha\sin\lambda\cos\mu$ |
| $C_{13}$ | = | $\sin\alpha\cos\mu - \cos\alpha\sin\lambda\sin\mu$ |
| $C_{21}$ | = | $-\sin\alpha\cos\lambda$ |
| $C_{22}$ | = | $-\cos\alpha\sin\mu + \sin\alpha\sin\lambda\cos\mu$ |
| $C_{23}$ | = | $\cos\alpha\cos\mu + \sin\alpha\sin\lambda\sin\mu$ |
| $C_{31}$ | = | $-\sin\lambda$ |
| $C_{32}$ | = | $-\cos\lambda\cos\mu$ |
| $C_{33}$ | = | $-\cos\lambda\sin\mu$ |

As will be readily appreciated by those skilled in the inertial navigation art, the wander azimuth ($\alpha$) can be set equal to any desired value during alignment. Preferably, the chosen value is zero (0), whereby the $\sin\alpha=0$ and the $\cos\alpha=1$. Consequently, the foregoing matrix can be reduced to the following during alignment:

$$[C] = \begin{bmatrix} \cos\lambda & -\sin\lambda\cos\mu & -\sin\lambda\sin\mu \\ 0 & -\sin\mu & \cos\mu \\ -\sin\lambda & -\cos\lambda\cos\mu & -\cos\lambda\sin\mu \end{bmatrix} \quad (35)$$

If the system is designed to operate as a delta longitude navigation system, then, longitude ($\mu$) is set equal to zero during alignment, whereby $\sin\mu=0$ and $\cos\mu=1$ and the foregoing matrix becomes:

$$C = \begin{bmatrix} \cos\lambda & -\sin\lambda & 0 \\ 0 & 0 & 1 \\ -\sin\lambda & -\cos\lambda & 0 \end{bmatrix} \quad (36)$$

Alternately, if the longitude position is to be produced by an actual embodiment of the invention, the pilot must insert the initial longitude position of the aircraft during alignment for use in the development of the initial [C] matrix. Or, a pilot inserted initial longitude value can be summed with a delta longitude value determined by the invention during flight (based on a zero longitude starting value) to provide the actual longitude position during flight.

The latitude ($\lambda$) is, of course, related to the measured value of earth rate, and is determined during the alignment sequence during which the initial value of the [B] matrix, [B$_0$], is also determined, as hereinafter described.

It will be appreciated from the foregoing dicussion that the initial value of the [C] matrix, [C$_0$], is determined by either equation (35) or equation (36), depending upon whether the system is to provide actual longitude information or delta longitude information. In most instances, delta longitude information will be provided and the result used to update a display set to the initial longitude value by the pilot.

Self Alignment

As will be readily appreciated by those familiar with inertial navigation systems, it is necessary to align such navigation systems prior to their use, i.e., prior to the flight of an aircraft incorporating such systems. Usually alignment is accomplished during a self-alignment sequence during which the navigation system aligns itself based on the signals produced by the inertial sensors, e.g., gyros and accelerometers. The present invetion includes such a self-alignment sequence, during which as noted above, the initial value of the [B] matrix, [B$_0$], is determined. More specifically, in a platform inertial navigation system alignment is accomplished by torquing the gimbal motors supporting the platform until the platform is level and pointed or headed in the correct direction. This is accomplished by using the sensed inertial data in a feedback manner to null errors. Somewhat similar alignment action takes place in the present strapdown system, but in an entirely different manner. More specifically, in the present invention, during alignment, the components of the [B] matrix are upgraded until the value of signals rotated by the [B] matrix achieve desired values (specifically, the values of north and east accelerometer signals equal zero).

In accordance with the invention, the self-alignment sequence comprises a coarse alignment sequence and a fine alignment sequence. The coarse and fine alignment sequences are carried out by the computer. The coarse alignment sequence is illustrated in functional block form in FIG. 40 and the fine alignment sequence is illustrated in functional block form in FIG. 41. As will be better understood from the following description, the coarse alignment sequence produces a rapid estimate of the aircraft's attitude, heading and latitude. The method utilized is very sensitive to aircraft angular motion, which prohibits the sole use of this sequence for fine alignment in a noisy environment. However, in a quiet environment, the coarse alignment sequence converges very rapidly.

There are a number of reasons for using the hereinafter described coarse alignment sequence. First, this alignment sequence yields a coarse estimate of pitch ($\theta$), roll ($\phi$), heading or yaw ($\psi$) and latitude ($\lambda$) without requiring that any initial conditions be met. Secondly, the coarse alignment sequence yields data in a very rapid manner, due to its rapid convergence, as noted above. Third, the coarse alignment sequence develops no trigonometric ambiguities with respect to heading quadrant or hemisphere. Fourth, when continued in parallel with the fine alignment sequence, the coarse alignment sequence yields a gross check on the heading and latitude parameters determined during the fine alignment sequence.

The fine alignment sequence uses a closed loop refinement technique that is very analogous to the technique used in a conventional north slaved platform system. The relative orientation of the mathematical "platform" to the vehicle body axes is continuously desribed by the [B] matix. The [B] matrix is iteratively updated using a second order Runge-Kutta integration algorithm based on the vehicle body axis angular rate information received from the gyros. In addition, the matrix is rotated or "torqued" at an angular rate equal to the current computed estimate of the horizontal and vertical components of earth rate plus a feedback rate, which is a function of errors in the system. It is this feedback signal which drives the "B" matrix to its correct value. Unlike a more conventional platform system, in many latitudes, a latitude value is computed during the coarse alignment sequence, rather than being inserted manually and used during fine alignment. (As hereinafter discussed, at some latitudes a latitude value must be inserted manually.) As will be readily appreciated by those skilled in the inertial navigation art, the success of the latitude computation technique used depends upon gyro turn-on repeatability. More specifically, the gyro turn-on repeatability must be sufficiently good that only post-flight updating is required to take care of slow drift in the turn-on repeatability. If the gyros do not meet this requirement, then a manually inserted latitude value, rather than a latitude value computed during the course alignment sequence, must be utilized at all latitudes.

Coarse Alignment

Figure 40:
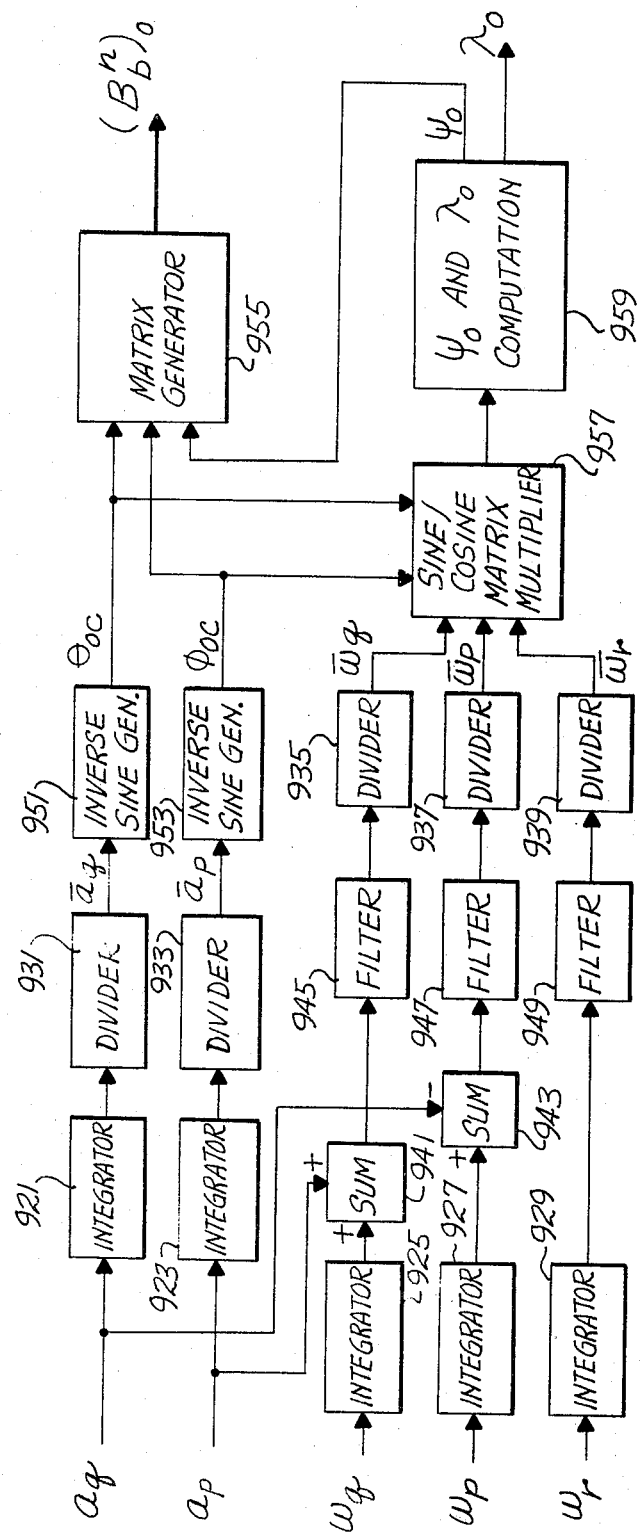
FIG. 40 is a functional block diagram of a coarse self-alignment subsystem forming part of (or formed by) the computer illustrated in FIG. 3.

FIG. 40 is a functional block diagram of a system formed in accordance with the invention for performing the coarse alignment sequence of operations. That is, in the preferred embodiment of the invention, the computer is programmed to perform in accordance with the coarse alignment sequence. In order to better understand the operation of the computer during the coarse alignment sequence, FIG. 40 illustrates the operation in functional block form as a set of discrete networks. Obviously, if desired, a discrete network system of the type illustrated in FIG. 40 could be utilized, rather than utilizing a programmed general purpose digital computer, as is preferred.

The coarse alignment system illustrated in FIG. 40 comprises: five integrators 921, 923, 925, 927 and 929; five time dividers 931, 933, 935, 937 and 939; two two-input summers 941 and 943; three filters 945, 947 and 949; two inverse sine generators 951 and 953; a matrix generator 955; a sine/cosine matrix multiplier 957; and a $\psi_0$ and $\lambda_0$ computation network 959.

The coarse alignment system determines the value of the desired parameters by an open-loop averaging method. Pitch and roll attitude are determined by averaging the compensated outputs of the pitch and roll accelerometers ($a_q$ and $a_p$). This is accomplished by integrating these signals continuously from T=0 and dividing the accumulated integral by the time elapsed. More specifically, as illustrated in FIG. 40, $a_q$ is applied to the input of the first integrator 921 and the output is applied to the input of the first divider 931. The integrator integrates from T=0 and, the result is divided by the elapsed time. Similarly, the $a_p$ signal is applied to the input of the second integrator 923 and the output of the second integrator is divided in the second divider 933 by a value equal to the elapsed time. The resultant signals are denoted $\bar{a}_q$ and $\bar{a}_p$, respectively, Thus, $\bar{a}_q$ and $\bar{a}_p$ represent the integrated, time averaged values of $\bar{a}_q$ and $\bar{a}_p$. Estimates of pitch and roll are based on the inverse sine values of these averaged quantities. More specifically, the inverse sine value of $a_q$ produced by the first inverse sine generator 951 and the inverse sine value of $a_p$ is produced by the second inverse sine generator 953. The outputs of the first and second inverse sine generators are denoted $\theta_{0c}$ and $\phi_{0c}$, respectively, to indicate that they represent the pitch and roll attitude values determined during the coarse alignment mode. $\theta_{0c}$ and $\phi_{0c}$ are applied to the matrix generator 955 and to the sine/cosine matrix multipler 957.

Heading and latitude are determined from the averaged outputs of the gyros corrected for angular rotation of the vehicle with respect to ground about the pitch and roll axes. More specifically, the compensated gyro values, denoted as body angular rates in FIG. 27 ($\omega_q$, $\omega_p$ and $\omega_r$), are averaged by a similar integration technique to the one described above with respect to the pitch and roll accelerometer values. In addition, the effects of pitch and roll motion are compensated for by "subtracting" from the integrated roll and pitch axes rates, respectively, the sensed pitch and roll axis acceleration values. While providing compensation for vehicle angular motion, the accelerometer signals also introduce their own translational noise in the form of two very large amplitude signals having high frequency content. In accordance with the invention, this undesirable noise is effectively attenuated by the inclusion of second order lag filters, hereinafter described in more detail.

While compensation is provided for pitch and roll motion, no compensation is provided for rotations about the yaw axis because such rotations are small (due to the aircraft being in a fixed position) and do not result in the production of unsatisfactory coarse alignment signals.

More specifically, heading and latitude are determined in the coarse alignment system illustrated in FIG. 40 by applying the $\omega_q$, $\omega_p$ and $\omega_r$ signals to the third, fourth and fifth integrators 925, 927 and 929, respectively. The integrated $\omega_q$ and $\omega_p$ signals are summed with the $a_p$ and $a_q$ signals respectively. The results are filtered by the first and second filters 945 and 947, respectively, which are second order lag filters that can be mathematically represented by the expression:

$$\frac{1}{(T_1 s + 1)(T_2 s + 1)} \qquad (37)$$

where: preferably, the time constant terms $T_1$ and $T_2$ have values equal to 5.0 seconds.

The outputs of the first and second filters 945 and 947 are applied to the inputs of the third and fourth dividers 935 and 937 wherein they are divided by the value of the elapsed time.

The output of the fifth integrator 929, as indicated above, is not summed with a compensation signal. Rather, this signal is merely filtered by the third filter 949, which is a first order lag filter that can be mathematically represented by the expression:

$$\frac{1}{(T_3 s + 1)} \qquad (38)$$

where: preferably, the time constant term $T_3$ has a value equal to 5.0 seconds.

The output of the third filter 949 is applied to the input of the fifth divider 939 where it is divided by the elapsed time.

The outputs of the third, fourth and fifth dividers 935, 937 and 939 are averaged, compensated, angular rate signals denoted $\bar{\omega}_q$, $\bar{\omega}_p$ and $\bar{\omega}_r$. $\omega_q$, $\bar{\omega}_p$ and $\bar{\omega}_r$ are applied to the sine/cosine matrix multiplier 957 wherein they are rotated through the angles $\theta_o$ and $\phi_o$ into a frame of reference with two axes in the horizontal plane and one in the vertical direction. More specifically, the sine/cosine matrix multiplier forms the following matrix:

$$\begin{bmatrix} \cos\theta_0 & \sin\theta_o \sin\phi_0 & \sin\theta_0 \cos\phi_0 \\ 0 & \cos\phi_0 & -\sin\phi_0 \\ -\sin\theta_0 & \cos\theta_0 \sin\phi_0 & \cos\theta_0 \cos\phi_0 \end{bmatrix} \qquad (39)$$

The $\bar{\omega}_q$, $\bar{\omega}_p$ and $\omega_r$ signals are multiplied by the foregoing matrix to form the two horizontal components and the vertical component. The two horizontal components are denoted $\bar{\omega}_q'$ and $\bar{\omega}_p'$ and the vertical component is denoted $\bar{\omega}_d$ (to represent down). The $\psi_O$ and $\lambda_O$ computation network determines the heading and the latitude from the $\bar{\omega}_q'$, $\bar{\omega}_q'$ and $\bar{\omega}_d$ signals. More specifically, heading, $\psi_O$, is determined from the two horizontal components in accordance with the equation:

$$\psi_0 = \text{TAN}^{-1} \frac{-\bar{\omega}_p'}{\bar{\omega}_q'} \qquad (40)$$

Latitude, $\lambda_O$, is determined in accordance with the equation:

$$\lambda_0 = \text{TAN}^{-1} \frac{-\bar{\omega}_d}{\sqrt{\bar{\omega}_q'^2 + \bar{\omega}_p'^2}} \qquad (41)$$

The $\lambda_O$ signal is applied to the fine alignment subsystem illustrated in FIG. 41 and hereinafter described and $\psi_O$ is applied to the matrix generator 955.

The matrix generator forms an initial coarse value of the [B] matrix, denoted $(B_b^n)_o$ in FIG. 40. The $(B_b^n)_o$ matrix is formed in accordance with the following expression:

$$\begin{bmatrix} \cos\theta_0\cos\psi_0 & \sin\theta_0\sin\phi_0\cos\psi_0 & \sin\theta_0\cos\phi_0\cos\psi_0 \\ & -\cos\phi_0\sin\psi_0 & +\sin\phi_0\sin\psi_0 \\ \cos\theta_0\sin\psi_0 & \sin\theta_0\sin\phi_0\sin\psi_0 & \sin\theta_0\cos\phi_0\sin\psi_0 \\ & +\cos\phi_0\cos\psi_0 & -\sin\phi_0\cos\psi_0 \\ -\sin\theta_0 & \cos\theta_0\sin\phi_0 & \cos\theta_0\cos\phi_0 \end{bmatrix}$$

Figure 41:
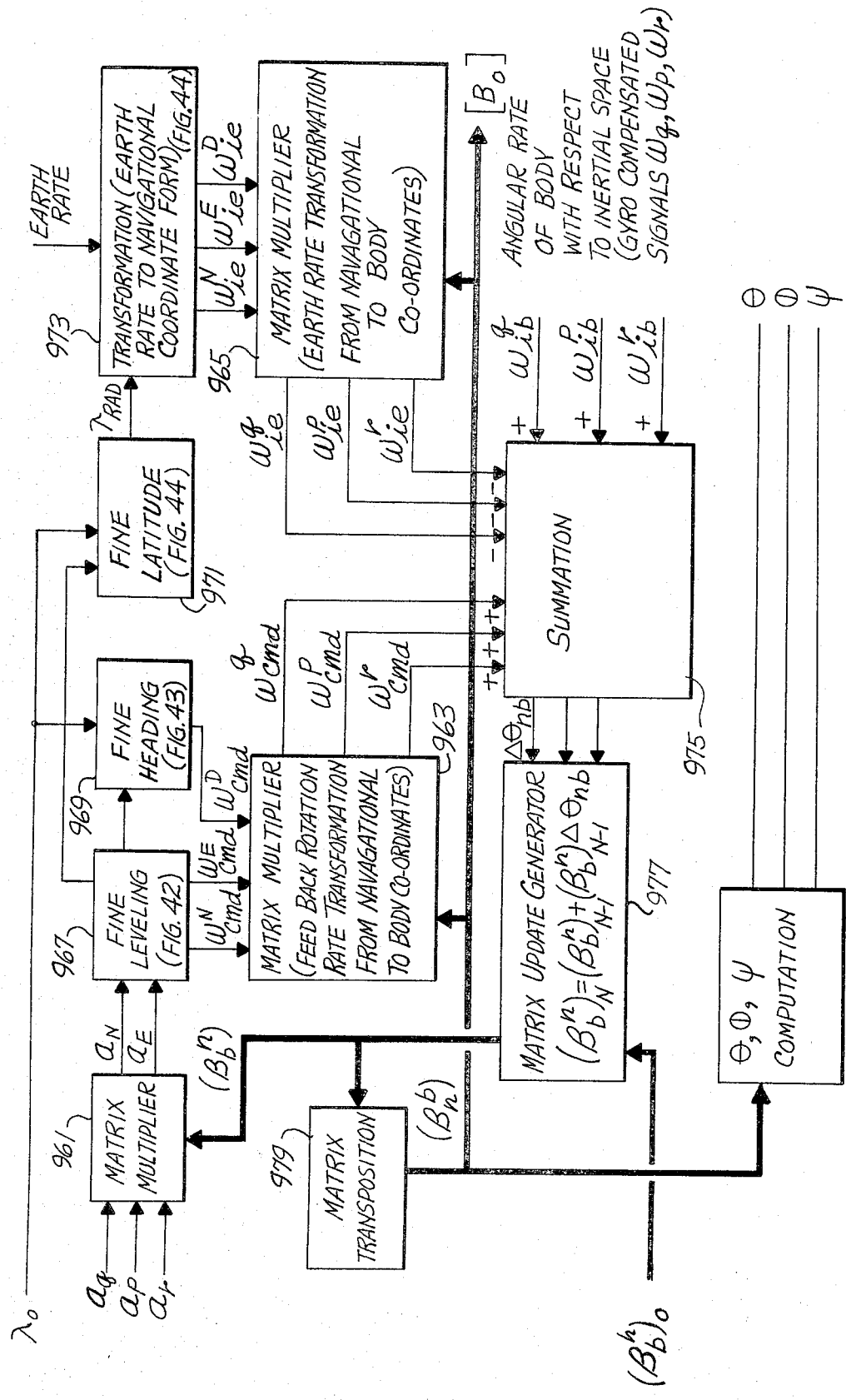
FIG. 41 is a functional block diagram of a fine self-alignment subsystem forming part of (or formed by) the computer illustrated in FIG. 3.

The $(B_b^n)_o$ matrix signal is also applied to the fine alignment subsystem illustrated in FIG. 41 to serve as an initial condition for the fine alignment subsystem wherein the initial value of the [B] matrix, $[B_O]$, used in the inertial data processor illustrated in FIG. 27 and heretofore described, is developed.

As noted above, preferably, the coarse alignment subsystem is operated continuously, independent of the fine alignment subsystem, in order to provide a check on the heading and, more importantly, the latitude values determined by the fine alignment subsystem.

Fine Alignment

FIG. 41 is a functional block diagram illustrating the fine alignment sequence and includes: three matrix multipliers 961, 963 and 965; a fine leveling network 967; a fine heading network 969; a fine latitude network 971; a transformation network 973 for transforming earth rate information into navigational coordinate form based on latitude; a summation network 975; a matrix update generator 977; a matrix transposition network 979; and a $\theta$, $\phi$ and $\psi$ computation network 981. The illustrated matrix multipliers mathematically "rotate" the input signals they receive from one coordinate form into another coordinate form. In this regard the first matrix multipler 961 rotates body coordinate signals into navigational coordinate signals. The second and third matrix multipliers 963 and 965 rotate navigational coordinate signals into body coordinate signals.

The fine alignment sequence begins a predetermined period of time, e.g., 120 seconds, after the coarse alignment sequence begins. The first matrix multiplier 961 receives the compensated accelerometer signals $a_q$, $a_p$ and $a_r$, produced by the inertial data processor illustrated in FIG. 27. These signals are rotated by the first matrix multiplier from body coordinate form to navigational coordinate form. Since only the north and east components are needed during the fine alignment sequence, only north and east component signals, $a_N$ and $a_E$, respectively, are produced. As will be better understood by the following discussion, these signals are driven to zero during the fine alignment sequence by upgrading the [B] matrix until this result is accomplished.

The $a_N$ and $a_E$ signals are applied to the fine leveling network 967. As will be better understood from a description of a preferred embodiment of a fine leveling network illustrated in FIG. 42 and hereinafter described, the fine leveling network converts the rotated accelerometer signals into north and east rate component error signals designated $\omega_{cmd}^N$ and $\omega_{cmd}^E$. Thus, the fine leveling network produces north and east feedback rotation rate error signals. A predetermined time interval after the fine leveling network starts to produce the north and east feedback rotation rate error signals, a signal (derived from the $a_N$ signal, as will be better understood from the following description of FIG. 42) is applied by the fine leveling network to the fine heading network 969. The fine heading network also receives the $\lambda_O$ signal produced by the coarse alignment subsystem illustrated in FIG. 40 and heretofore described. In accordance with these signals, the fine heading network 967 produces a feedback rotation rate error signal in the down direction designated $\omega_{cmd}^D$. The specific way this signal is produced will be better understood from the following description of FIG. 43, which illustrates a preferred embodiment of a fine heading network formed in accordance with the invention.

The second matrix multiplier 963 rotates the $\omega_{cmd}^N$, $\omega_{cmd}^E$ and $\omega_{cmd}^D$ feedback rotation rate error signals from navigational form to body coordinate form. The resultant signals are denoted $\omega_{cmd}^q$, $\omega_{cmd}^p$ and $\omega_{cmd}^r$. These signals, which are feedback rotation rate error signals in body coordinate form, are applied to positive inputs of the summation network 975.

Figure 44:
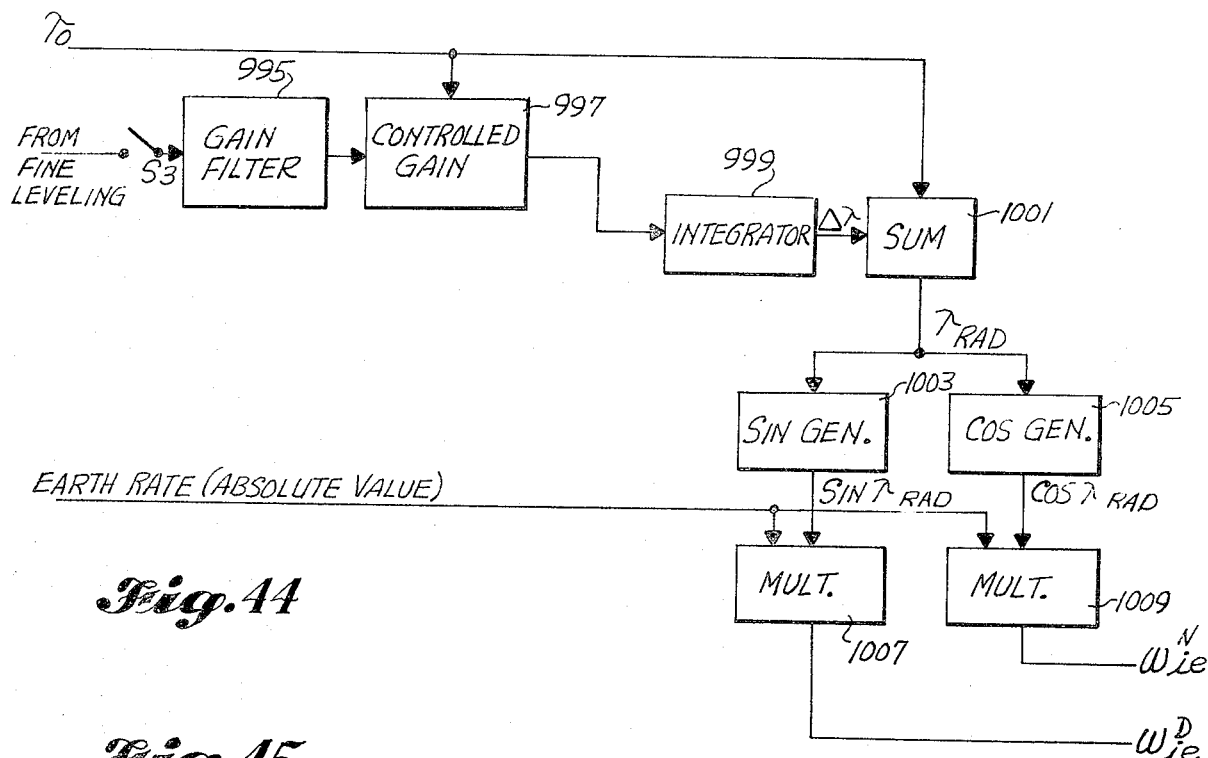
FIG. 44 is a functional block diagram of a fine latitude network forming part of the fine self-alignment subsystem illustrated in FIG. 41.

The fine latitude network 971 also receives a signal from the fine leveling network 967 (in this case derived from the $a_E$ signal) in the manner hereinafter described. The fine latitude network 971 also receives the $\lambda_O$ signal produced by the coarse alignment subsystem illustrated in FIG. 40 and heretofore described. The fine latitude network 971 produces a corrected latitude signal identified as $\lambda_{RAD}$, which is applied to the transformation network 973. The transformation network 973 also receives the earth rate signal. The transformation network uses the $\lambda_{RAD}$ signal to convert earth rate into north, east and down vector components. That is, the latitude of the aircraft determines how the earth rate signal is converted into its north, east and down vector components. As will be readily appreciated by those skilled in the inertial navigation art, an erroneous knowledge of latitude would cause the system to apply an incorrect magnitude of earth rate torque about the mathematical north axis. The fine latitude network, as will be better understood from the following description of FIG. 44, provides a means for preventing this action from occurring. More specifically, the fine latitude network 971 uses a feedback signal derived from the east accelerometer to modify the $\lambda_O$ signal so that the correct latitude is received by the transformation network 973.

As discussed above, the transformation network 973 uses the $\lambda_{RAD}$ signal to break the earth rate signal into its north, east and down components. These components, which are denoted $\omega_{ie}^N$, $\omega_{ie}^E$ and $\partial_{ie}^D$, respectively, are applied to the third matrix multiplier 965 where they are transformed from navigational to body coordinate form. The resultant signals, denoted $\omega_{ie}^q$, $\omega_{ie}^p$ and $\omega_{ie}^r$, are applied to negative inputs of the summation network 975.

The summation network 975 also receives the compensated gyro signals $\omega_q$, $\omega_p$ and $\omega_r$, which define the angular rate of the aircraft with respect to inertial space. In FIG. 41, for purposes of signal correspondence, these signals are denoted $\omega_{ib}^q$, $\omega_{ib}^p$ and $\omega_{ib}^r$, respectively, and are applied to plus inputs of the summation network 975.

At this point, it will be appreciated that the summation network 975 receives three independent sets of signals. The $\omega_{cmd}$ signals are feedback signals, which are a function of errors in the system. The $\omega_{ie}$ signals represent a current computed estimate of the horizontal and vertical components of earth rate. The $\omega_{ib}$ signals represent the vehicle body axis angular rates developed by the gyros. Thus, all information necessary to continuously update the [B] matrix is contained in these signals, when they are appropriately summed, as indicated by the plus and minus inputs of the summation network 975. That is, all the $\omega^q$ signals are summed, all the $\omega^p$ signals are summed and all the $\omega^r$ signals are summed. The results of the summation are three signals compositely denoted $\Delta\theta_{nb}$ in FIG. 41. These signals are applied to the matrix update generator 977, which produces the [B] matrix in transposed form, i.e., body-to-navigational form rather than navigational-to-body form.

More specifically, the matrix update generator produces the body to navigational coordinate matrix as it is iteratively updated using the second order Runge-Kutta integration algorithm technique herein described. The updating is in accordance with the equation:

$$(B_b{}^n)_N = (B_b{}^n)_{N-1} + (B_b{}^n)_{N-1} \Delta\theta_{nb} \qquad (42)$$

The initial matrix value produced when $N-1=0$, i.e., $(B_b{}^n)_O$, is provided by the matrix generator 955 forming a portion of the coarse alignment subsystem illustrated in FIG. 40 and previously described.

The body-to-navigational transformation matrix produced by the matrix update generator and denoted $(B_b{}^n)$ in FIG. 41 is applied to the first matrix multiplier 961 and to the matrix transposition network 979. The matrix transposition network transposes the body-to-navigational form of the matrix to a navigational-to-body form, $(B_n{}^b)$. The $(B_n{}^b)$ form is applied to the second and third matrix multipliers, which transform input signals from navigational-to-body coordinate form, as previously described. In addition, the $(B_n{}^b)$ form is also the initial [B] matrix, $[B_O]$, utilized by the inertial data processor illustrated in FIG. 27 and previously described. Finally, the $(B_n{}^b)$ form is applied to the $\theta$, $\phi$ and $\psi$ computation network 981 wherein it is used to derive initial pitch ($\theta$), roll ($\phi$) and heading ($\psi$) signals in accordance with the equations:

$$\theta = \text{TAN}^{-1}\left(\frac{-b_{13}}{b_{33}/\cos\phi}\right) \qquad (43)$$

$$\phi = \text{TAN}^{-1}\left(\frac{b_{23}}{b_{33}}\right) \qquad (44)$$

$$\psi = \text{TAN}^{-1}\left(\frac{b_{12}}{b_{11}}\right) \qquad (45)$$

where the b subscript numbers denote the row/column position of the $(B_n{}^b)$ matrix signals used in the equations.

As previously discussed, the measurements of linear and angular motion of the vehicle are obtained in body axis coordinate form. This requires that (1) the gyro rate data be used to compute the attitude of the vehicle relative to the local level frame of reference; and, (2) the computed attitude be used to resolve the body axis accelerations into the local level frame of reference. The requirements are the same for both the alignment and the navigational modes of operation. And, they are met by the [B] matrix, which defines the orthogonal transformation from body coordinate form to navigational (local level) coordinate form. In order to accurately define the transformation the [B] matrix must be continuously updated at a fast rate. In an actual embodiment of the invention, the rate used was 100 iterations per second. As noted above, the computational algorithm utilized by the matrix update generator 977 is a second order Runge-Kutta integration, which can be expressed as follows:

$$[B_b{}^n]_N = [B_b{}^n]_{N-1} + \tfrac{1}{2}\{[G_1]+[G_2]\} \qquad (46)$$

$\tfrac{1}{2}\{[G_1]+[G_2]\}$ represent $\Delta\theta_{nb}$ and the bracketed components are equal to:

$$[G_1] = [B_b{}^n]_{N-1}\cdot[\omega_{ib}{}^b]_1 \delta t \qquad (47)$$

$$[G_2] = \{[B_b{}^n]_{N-1}+[G_1]\}\cdot[\omega_{ib}{}^b]_2 \delta t \qquad (48)$$

where:

$[\omega_{ib}{}^b]_2$ represents the average rate over the most recent interval.

$[\omega_{ib}{}^b]_1$ represents the average rate over the preceeding interval.

For a more detailed description of second order Runge-Kutta integrations applicable to the present invention, attention is directed to Contract Report CR-968 available from the National Aeronautics and Space Administration (NASA), Washington, D.C.

Fine Leveling

Figure 42:
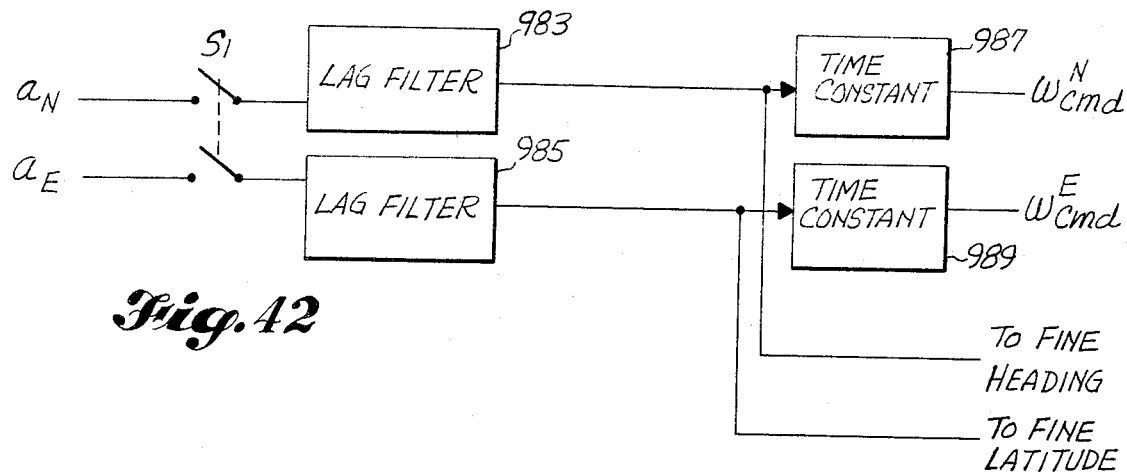
FIG. 42 is a functional block diagram of a fine leveling network forming part of the fine self-alignment subsystem illustrated in FIG. 41.

A block diagram of a fine leveling network suitable for use in the fine alignment system illustrated in FIG. 41 is illustrated in FIG. 42 and comprises a first switch designated S1; first and second lag filters 983 and 985; and, first and second time constant circuits 987 and 989. S1 is diagrammatically illustrated as a double pole, single throw switch and is included to indicate, as noted above, that the fine leveling sequence is initiated a predetermind time period (e.g., 120 seconds) after the initiation of the coarse leveling sequence. That is, S1 is closed a predetermined time period after the coarse leveling sequence is commenced. $a_N$ is applied through one set of S1 contacts to the first lag filter 983 and $a_E$ is applied to the other set of contacts to the second lag filter 985. The first and second lag filters are first order lag filters, which can be defined by the expression:

$$\frac{1}{T_L s + 1} \qquad (49)$$

where: preferably, the time constant $T_L$ is equal to ten (10) seconds. The lag filters attenuate noise which is present in the north and east acceleration signals $a_N$ and $a_E$.

The outputs of the first and second lag filters 983 and 985 are applied to the inputs of the first and second time constant circuits 987 and 989, respectively. Preferably the time constant, $K_L$, of the first and second time constant circuits is equal to 25 seconds, i.e., $K_L$ equals 0.04 sec$^{-1}$.

If the values denoted above are used, i.e., the lag filters are ten second lag filters and the time constant circuits have a 25 1 second time constant value, the error in pitch and roll attitude due to acceleration noise will be less than 6 arc seconds; rapid leveling will occur because of the 25 second loop; and, adequate damping of the second order gyro compass mode will be obtained because the damping coefficient of the gyro compass mode characteristic equation is directly proportional to $K_L$.

As noted above, neither the heading nor the latitude loops are closed at the time fine leveling is initiated. In this regard, the signal applied to the fine heading network by the fine leading network is taken at the junction between the first lag filter 983 and the first time constant circuit 987; and the signal applied to the fine latitude network by the fine leveling network is taken at the junction between the second lag filter 985 and the second time constant circuit 989.

Fine Heading

Figure 43:
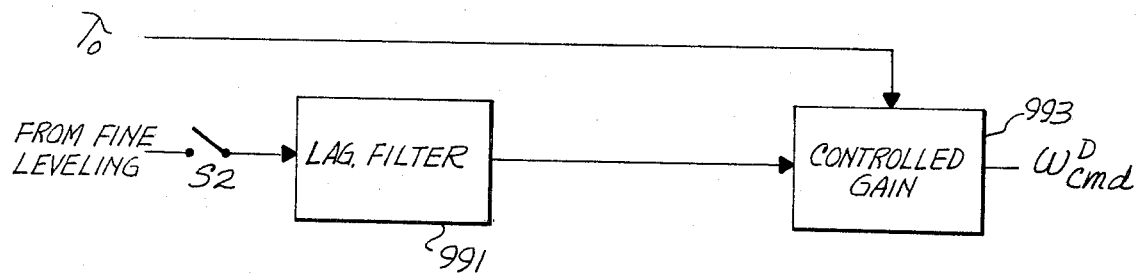
FIG. 43 is a functional block diagram of a fine heading network forming part of the fine self-alignment subsystem illustrated in FIG. 41.

A fine heading network suitable for use in the fine alignment subsystem illustrated in FIG. 41 is illustrated in FIG. 43 and comprises a single pole, single throw switch designated S2; a lag filter 991; and, a controlled gain circuit 993. The signal received from the fine leveling circuit illustrated in FIG. 42, i.e., the signal formed at the junction between the first lag filter 983 and the first time constant circuit 987 is applied through S2 to the input of the lag filter 991, which is a first order lag filter functioning in accordance with the expression:

$$\frac{1}{t_D s + 1} \tag{50}$$

where: preferably, the time constant $t_D$ is equal to thirty (30) seconds.

The output of the lag filter 991 is applied to the signal input of the controlled gain circuit 993. The control input of the controlled gain circuit 993 receives the $\lambda_O$ signal produced during the coarse alignment sequence. The controlled gain circuit functions in accordance with the expression:

$$\frac{K_\psi}{\cos\lambda_0} \tag{51}$$

where: preferably the gain factor, $K_\psi$, has a value of five (5.0).

The output of the controlled gain circuit is the $\omega_{cmd}{}^D$ signal applied to the third matrix multiplier 965 illustrated in FIG. 41.

It will be appreciated by those skilled in the inertial navigation art from the description thus far that the operation of the fine heading network is analogous to that used in a north slaved platform gyro compass system. In essence, the [B] matrix is rotated in azimuth until the output of the "north" accelerometer, e.g., $a_N$, is zero. (As will be readily appreciated, by those familiar with inertial navigation systems, azimuth error will cause the horizontal earth rate torque to be applied in the wrong direction, causing a first order standoff on the north accelerometer.)

The azimuth torquing gain, $K_\psi$, and the time constant of the lag filter 993 were chosen in order for the gyro compass natural frequency ($\omega_N$) to be greater than 0.01 radians per second. This permits heading settling to less than to 2.0 arc minutes of error in eight minutes of total alignment time starting with a typical coarse alignment residual error. The azimuth torquing gain and lag filter time constant value are also chosen so that the error in heading due to accelerometer noise is less than 2 arc minutes and the heading mode damping is greater than 0.8. Preferably, the operation of the fine heading network is initiated one minute after fine leveling starts.

That is, S2 is closed one minute after the fine alignment sequence is initiated.

Fine Latitude and Transformation Network

FIG. 44 is a block diagram of fine latitude and transformation networks suitable for use in the fine alignment subsystem illustrated in FIG. 41. The fine latitude and transformation networks illustrated in FIG. 44 comprises: a single pole, single throw switch designated S3; a filter 995; a controlled gain circuit 997; an integrator 999; a two-input summer 1001; a sine generator 1003; a cosine generator 1005; and, first and second multiplier 1007 and 1009.

The signal from the fine leveling network, obtained from the junction between the second lag filter 985 and the second time constant circuit 989 thereof, is applied through S3 to the input of the filter 995. Preferably the filter 995 functions in accordance with the expression:

$$\frac{1}{t_{\lambda_E} s + 1}$$

where: preferably, the value of the time constant, $t_{\lambda_E}$ equals thirty (30) seconds.

The output of the filter is applied to the signal input of the controlled gain circuit 997. $\lambda_O$, produced by the coarse alignment subsystem, is applied to the control input of the controlled gain circuit 997. The output of the controlled gain circuit 997 is applied to the input of the integrator 999. Preferably the controlled gain circuit functions in accordance with the expression:

$$\frac{K_{\lambda_E}}{\sin\lambda_o}$$

where: preferably, the gain factor, $K_{\lambda_E}$, has a value of five (5.0)

It will be appreciated that the latitude feedback gain $K_{\lambda_E}$ is divided by $\sin \lambda_O$ so that a constant loop gain is maintained irrespective of latitude. It is for this same reason that the heading gain $K_\phi$ is divided by $\cos \lambda_O$ in the controlled gain circuit of the fine heading network illustrated in FIG. 43.

The output of the integrator 999, which is a signal denoted $\Delta\lambda$ is applied to one input of the summer 1001. $\lambda_O$ is applied to the second input of the summer 1001. The output of the summer 1001 is the corrected latitude signal denoted $\lambda_{RAD}$. (The subscript RAD denotes that the corrected $\lambda$ signal is in radians.)

The output of the summer 1001 is applied to the control input of both the sine generator 1003 and the cosine generator 1005. In accordance with their inputs, the sine and cosine generator produce sine and cosine signals. That is, the sine generator generates a signal denoted $\sin \lambda_{RAD}$ and the cosine generator generates a signal denoted $\cos \lambda_{RAD}$. The output of the sine generator is connected to one input of the first multiplier 1007 and the output of the cosine generator is applied to one input of the second multiplier 1009. The absolute value of earth rate, previously defined as $\Omega$, is applied to the second inputs of both the first and second multipliers 1007 and 1009. When earth rate is multiplied by $\sin \lambda_{RAD}$ the $\omega_{ie}{}^D$ signal previously described is produced and when earth rate is multiplied by $\cos \lambda_{RAD}$ the $\omega_{ie}{}^N$ signal previously described is produced. $\omega_{ie}{}^E$ is also shown in FIG. 44 as a zero level signal. That is, while $\omega_{ie}{}^E$ is equal to zero, it is shown in FIG. 44 for completion purposes.

The fine latitude network illustrated in FIG. 44 is only useful if the latitude of the aircraft is more than 23 degrees away from the equator. If the latitude of the aircraft is less than 23 degrees, this network cannot be used and the exact value of latitude must be entered manually. Similarly, if the aircraft is above +70° latitude (at present there are no significant commercial airports above +70° latitude) the exact value of latitude must be entered manually because the fine latitude network will not function accurately.

It is pointed out here that gyro and accelerometer quantization can cause a problem during alignment in a noise free environment if the pulse size is made too large. Tests run on a simulator to determine the upper limits on gyro and accelerometer pulse size have shown that gyro converter pulse size should be less than 5 sec per pulse and the accelerometer converter pulse size should be less than 0.03 feet per second per pulse. In this test, the aircraft body axes were oriented such that the sensitive axis of the pertinent gyro or accelerometer was coupled very slightly with earth rate or gravity, respectively, so the converter would deliver a pulse about once every five minutes. In this state, a system transient follows the release of each pulse. Both gyro and accelerometer pulse sizes for the foregoing nature are low enough to prevent a heading or latitude transient peak error of two minutes from occurring. It will be appreciated that in most orientations the quantization problem will not arise because the rate of gyro and accelerometer produced pulses is much higher. Further, in any orientation where noise is present, the noise "exercises" the converters, whereby pulses are released rapidly and continuously.

Data Processor—Air and Temperature Data

Figure 45:
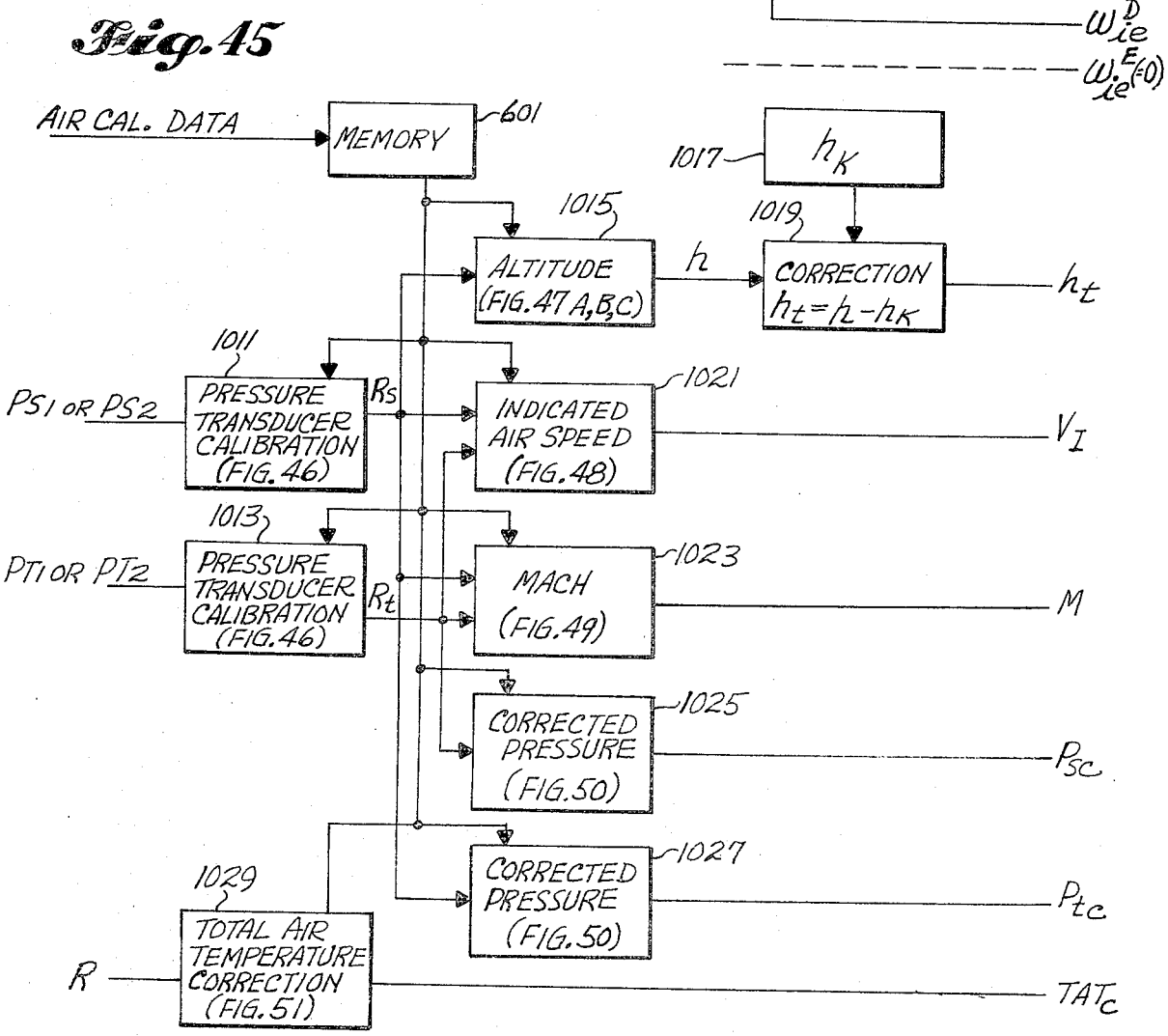
FIG. 45 is a functional block diagram of an air and temperature data processor forming part of (or formed by) the computer illustrated in FIG. 3.

FIG. 45 is a functional block diagram of an air and temperature data processor formed in accordance with the invention. More specifically, as previously discussed, the computer 54 processes air and temperature data as well as inertial data. As also noted above, preferably, the computer is either a general or special purpose digital data processor. In this regard, the computer shares components, as necessary, in order to process both inertial, temperature and air data, as well as function in accordance with the coarse and fine alignment sequence previously described in a conventional manner, well known to those skilled in the data processing art. FIG. 45 illustrates in functional block diagram how air and temperature data is processed, in a manner designed to make such processing more readily understood. In this regard, while preferably, as with the other computational subsystems, the functional block diagram illustrated in FIG. 45 is "created" by the computer, as necessary, when air and temperature data is to be processed, it is to be understood that, if desired, the illustrated air and temperature data processor could be formed of a separate discrete system of networks of the type hereinafter described.

The air and temperature data processor illustrated in FIG. 45 includes the memory 601 previously described with respect to the inertial data processor. In addition, the air and temperature data processor illustrated in FIG. 45 includes: first and second pressure transducer calibration networks 1011 and 1013; an altitude computation network 1015; an altitude correction source 1017; an altitude correction network 1019; an indicated airspeed network 1021; a Mach network 1023; first and second corrected pressure networks 1025 and 1027; and, a total air temperature correction network 1029.

As before, the memory 601 receives and stores calibration data, in this case air calibration data. As previously described, air calibration data that remains fixed, such as air data module idiosyncrasies data peculiar to each air data module, is read at startup. Air calibration data that is continuously changing, such as data denoting the temperature of the air data module, continuously updates the memory. In addition, the memory stores certain constants utilized by the various networks in the manner hereinafter described.

The memory 601 is connected to: the first and second pressure transducer calibration networks 1011 and 1013; an altitude network 1015; an indicated airspeed network 1021; the Mach network 1023; the first and second corrected pressure networks 1025 and 1027; and, the total air temperature correction network 1029.

The first and second pressure transducer calibration networks receive and calibrate the static (PS1 or PS2 or the average thereof) and dynamic (PT1 or PT2 or the average thereof) pressure data, and reproduced it in a normalized form suitable for use by the altitude, indicated airspeed and Mach networks 1015, 1021 and 1023. In addition, the calibrated, normalized pressure form, of the pressure transducer signals are reconverted to pressure form by the corrected pressure networks 1025 and 1027. More specifically, the pressure transducer calibration networks 1011 and 1013 produce normalized pressure signals identified as $R_s$ and $R_t$, respectively. These signals are utilized by the altitude, indicated airspeed and Mach networks to produce altitude (h) indicated airspeed ($V_I$) and Mach (M) data signals. In addition, the first and second corrected pressure networks 1025 and 1027 reconvert the $R_s$ and $R_t$ signals into corrected pressure signals designated $P_{sc}$ and $P_{tc}$.

The altitude (h) signal produced by the altitude network 1015 is calculated on the assumption that the mean sea level pressure is a standard atmosphere (29.92 inches of mercury). If the sea level pressure is not standard, a correction is added to the standard altitude (h) to get the true altitude ($h_t$). The correction factor ($h_k$) is produced by the altitude correction factor network 1017. This correction is the altitude at which the pressure is 29.92 when the sea level pressure is a given pressure $P_k$. The correction can be computed by using $P_k$ in the altitude network 1015 to obtain the correction factor $h_k$. Alternatively, other techniques can be utilized. In any event, the $h_k$ value is subtracted from the h value in the altitude correction circuit 1019 to produce the true altitude $h_t$. The correction $h_k$, of course, only needs to be calculated when a new sea level pressure $P_k$ is entered. It is for this reason that $h_k$ is illustrated as a separate block. In an actual embodiment of the invention, as previously noted, the altitude network 1015 produces an $h_k$ signal when a new $P_k$ is entered (which must be converted to an $R_k$ signal by the first pressure transducer calibration network 1011). Thereafter, the $h_k$ value is stored in memory for use by the altitude correction factor network to correct h signals produced thereafter.

Figure 51:
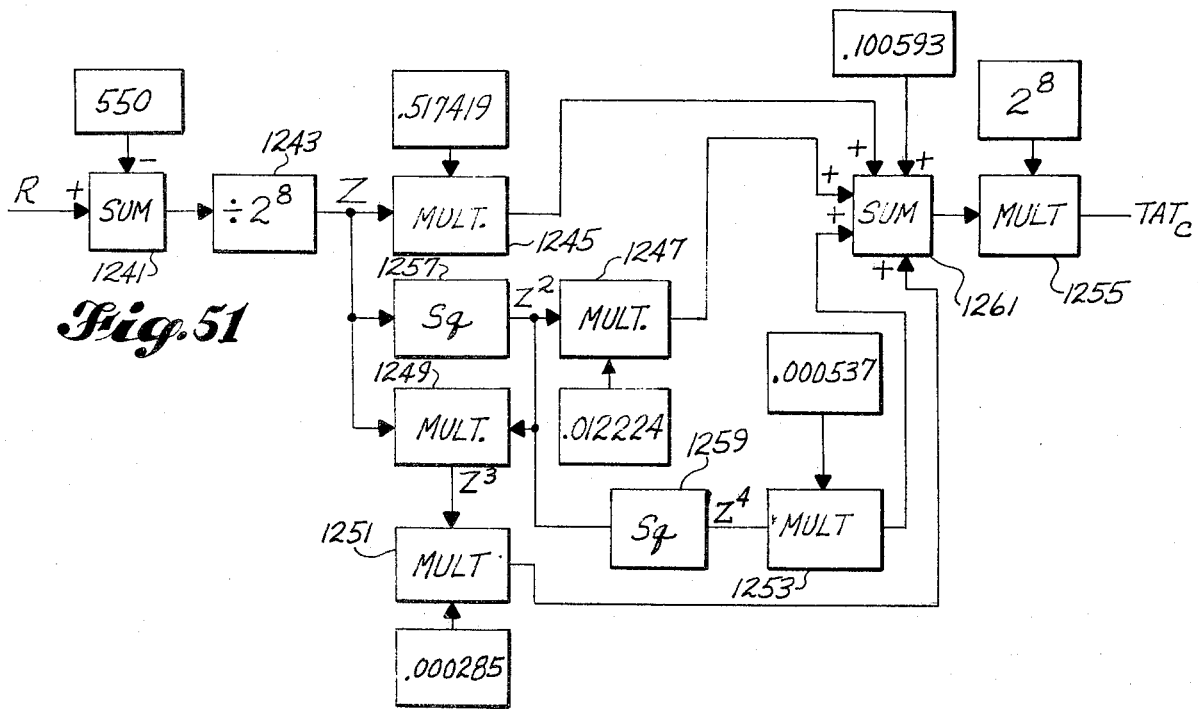

The total air temperature correction network 1029 receives the signal produced by the total air temperature sensor (denoted R in FIG. 45 because it is in the form of a resistance value, as hereinafter described), corrects that signal and produces a corrected total air temperature signal denoted $TAT_c$. A preferred embodiment of the total air temperature network is illustrated in FIG. 51 and hereinafter described.

Transducer Calibration Network

Figure 46:
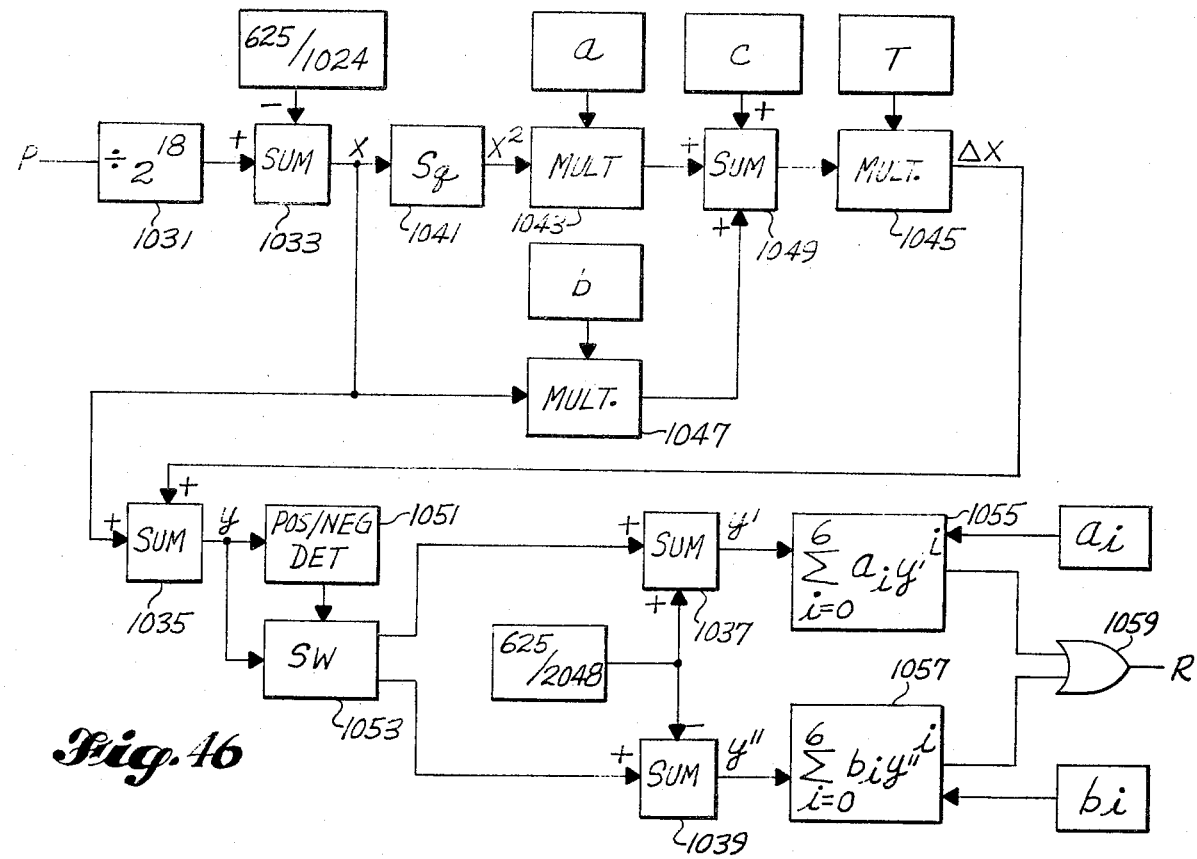
FIG. 46 is a functional block diagram of a pressure transducer calibration network forming part of the air and temperature data processor illustrated in FIG. 45.

Since the first and second pressure transducer calibration networks 1011 and 1013 forming part of the air data processor illustrated in FIG. 45 are identical, only one is illustrated and described in detail. In this regard, a suitable pressure transducer calibration network is illustrated in FIG. 46 and comprises: a divide-by-$2^{18}$ circuit 1031; four two-input summers 1033, 1035, 1037 and 1039; a squaring circuit 1041; three multipliers 1043, 1045 and 1047; a three-input summer 1049; a positive/negative detector 1051; a switch 1053; first and second summation networks 1055 and 1057; and, an OR gate 1059. In addition, FIG. 46 illustrates a number of constant blocks denoted a, b, c, $a_i$ and $b_i$. The constant blocks denote information received from the memory representing transducer peculiar constants and are hereinafter described. In addition, FIG. 46 includes two numerical blocks designated 625/1024 and 625/2048 which represent numerical constants also obtained from the memory 601. Finally, FIG. 46 includes a block designated T denoting the temperature of the pressure transducer module producing the pressure signal to be calibrated. As previously discussed, preferably, this temperature signal forms part of the air calibration data. Alternatively, the temperature information could be independently obtained.

As previously discussed, the pressure transducer signals are in frequency form. That is the frequency of the pressure transducer signals vary as a function of pressure. In the preferred embodiment of the invention, the frequency of the signals have periods ranging from 300 to 700 microseconds. As previously described, these signals are used to gate a clock signal (clock 3) to a counter for a predetermined number of periods of the pressure signal (e.g., 32 periods). See FIG. 24. Assuming the frequencies fall in this range (300 to 700 microseconds), the clock signal is a ten MHz signal, as discussed above, and the counter counts for 32 periods of the pulse, as also discussed above, the gated pulse counts fall between 96,000 and 224,000. The pressure transducer calibration network illustrated in FIG. 46 first scales this pulse count value by applying it to the divide-by-$2^{18}$ circuit where it is divided by $2^{18}$ (262,144) and applying the result to the first two-input summer 1033 where 625/1024 (0.6105315) is subtracted from the result. The new value is denoted x and lies between $-0.244141$ and $+0.244140$. Obviously, if the pressure signals have different periods and/or the clock signal has a different frequency rate and/or the counter counts for a different number of periods, different division and subtraction values must be used to provide the desired scaling.

After scaling, a correction factor $\Delta x$, defined by the equation $\Delta x = (ax^2 + bx + c)T$ is developed by the pressure calibration network. The correction factor is developed by first applying x to the squaring circuit 1041 to produce $x^2$ and applying the result to the first multiplier 1043 where $x^2$ is multiplied by a. In addition, x is applied to the third multiplier 1047 where it is multiplied by b. The output of the first and third multipliers are summed in the three-input summer 1049 with c to produce an output equal to $ax^2 + bx + c$. The result is applied to the second multiplier 1045 where it is multiplied by T to produce the resultant corrector factor $\Delta x$. The values of a, b and c are calibration factors produced in the manner hereinafter described. (The temperature T is actually a temperature difference signal created by subtracting a transducer peculiar reference from a digitized signal representing the temperature of the transducer converted to a 12-bit digital numbers scaled to lie between 0 and 1.)

Following the production of $\Delta x$, the pressure calibration network produces a pressure corrected input signal y by adding $\Delta x$ to x, i.e., $y = x + \Delta x$. This is accomplished by applying both x and $\Delta x$ to the second two-input summer 1035.

If y is greater than 0, a new y is formed by adding 625/2048 to y and using the new y(y') as the independent variable in a sixth order equation to develop the value of a factor denoted R, which represents the normalized pressure developed by the pressure calibration system. Alternatively, if y is less than 0, a new y is formed by subtracting 625/2048 from y and using this new y (y'') as the independent variable in a different sixth order equation to develop the value of R. The foregoing result is accomplished by applying the output of the second two-input summer 1035 (e.g., y) to the positive and negative detector 1051 and to the switch 1053. If y is greater than 0, e.g., positive, the switch 1053 is placed in a first state. Alternatively, if y is less than 0, e.g., negative, the switch is placed in a second state. In the first state the switch applies y to one input of the third two-input summer 1037 and in the second state, the switch applies y to one input of the fourth two-input summer 1039. The 625/2048 (0.0351757) numerical value is applied to the other inputs of the third and fourth two-input summers 1037 and 1039. In this regard, the 625/2048 input of the third two-input summer 1057 is positive and the 625/2048 input of the fourth two-input summer 1059 is negative.

The output of the third two-input summer 1037 is connected to the input of the first summation network 1055 and the output of the fourth two-input summer 1039 is applied to the input of the second summation network 1057. The first summation network functions in accordance with a sixth order equation defined by the expression:

$$\sum_{i=0}^{6} a_i y'^i \qquad (54)$$

the second summation network 1057 functions in accordance with a sixth order equation defined by the expression:

$$\sum_{i=0}^{6} b_i y''^i \qquad (55)$$

The outputs of the first and second summation networks are applied to the two inputs of the two-input OR gate 1059 and the output of the two input OR gate is the value of the normalized pressure R.

As noted above, the values of a, b, c, $a_i$ and $b_i$ are transducer peculiar constants. The values of these constants are obtained during a laboratory calibration of the transducers. That is, the outputs of the transducers are measured for known input values and, after a series of data points have been obtained, the constant values are obtained by the simultaneous solution of the required number of equations. In the case of the equation $x = [ax^2 + bx + c]T$ a minimum of three equations are needed. In the case of the summation networks, a minimum of six equations are needed because of the sixth order nature of the summation equations.

Preferably, the pressure transducer calibration networks 1011 and 1013 determine static pressure at least 16 times per second and dynamic or total pressure at least 8 times per second.

Altitude

Figure 47A:
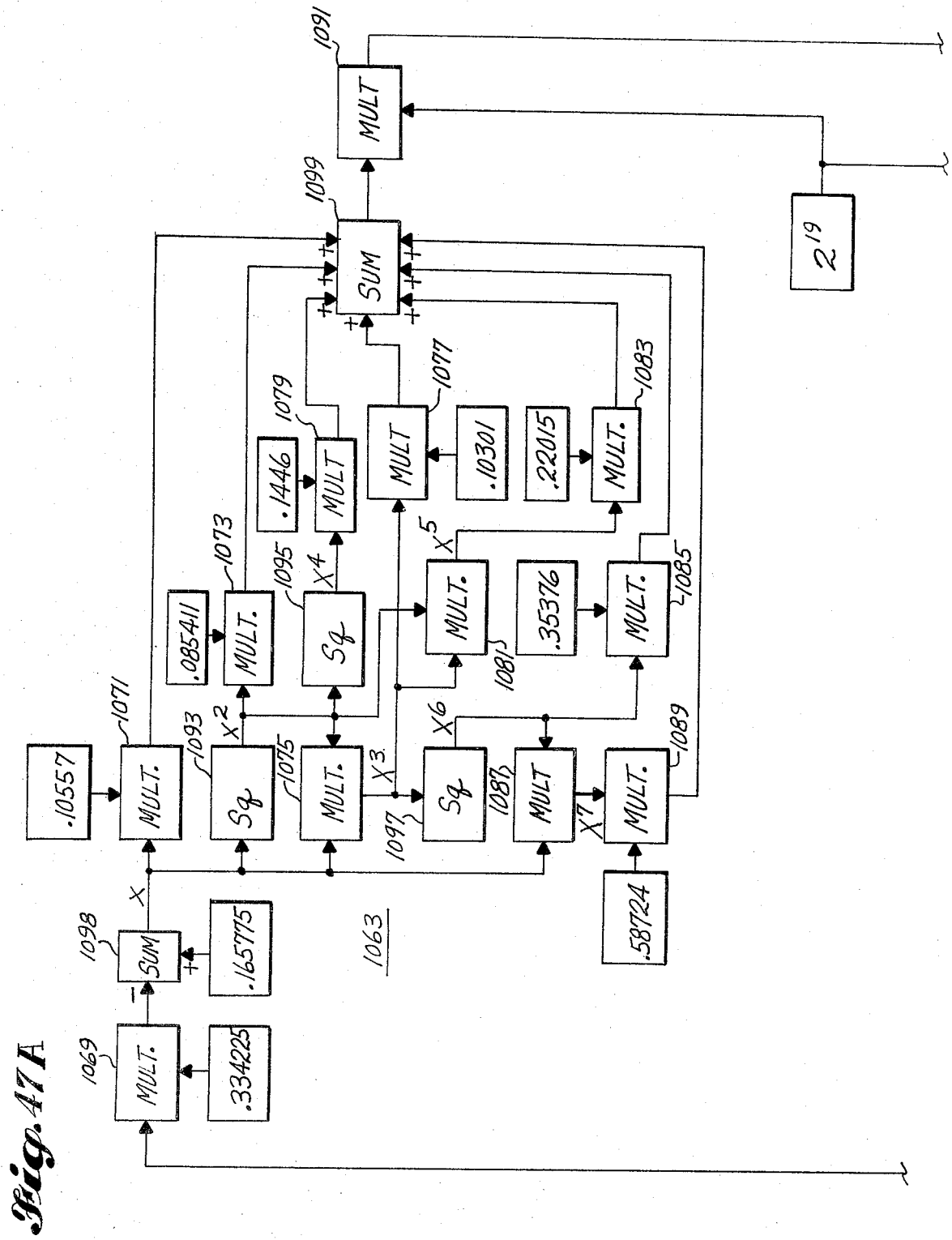
FIGS. 47A, B and C form a functional block diagram of an altitude network forming part of the air and temperature data processor illustrated in FIG. 45.
Figure 47B:
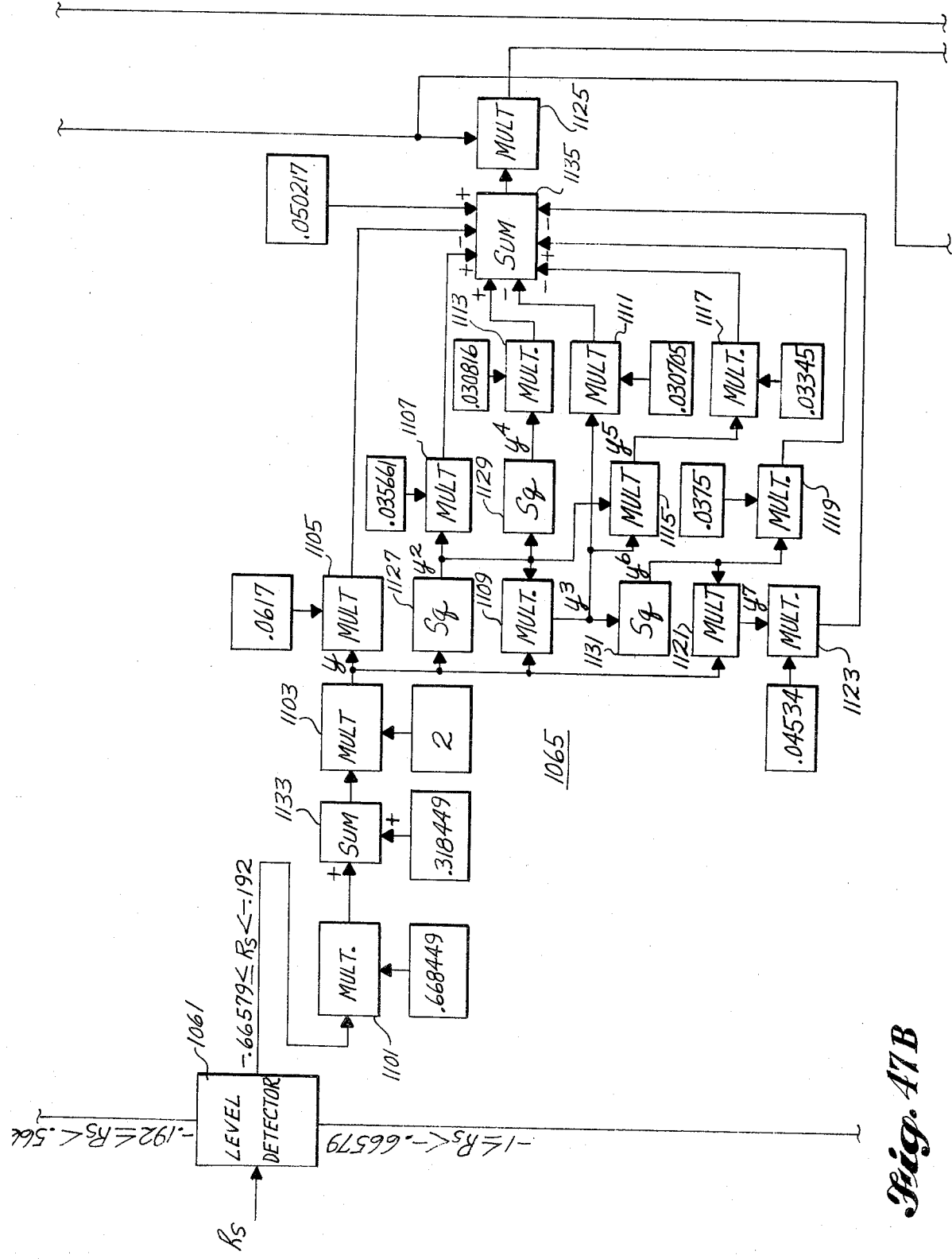
Figure 47C:
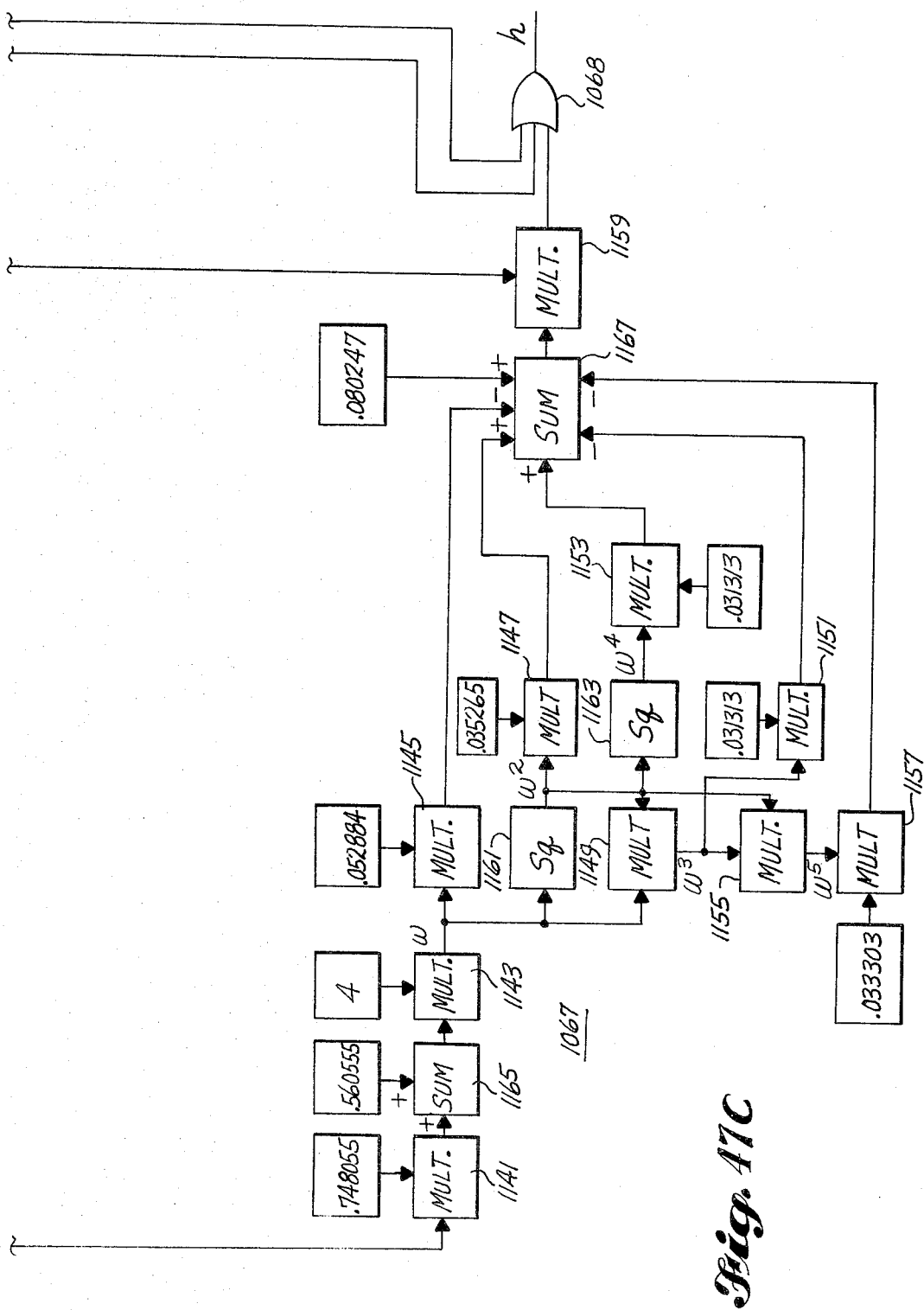

An altitude network suitable for use in the air data processor illustrated in FIG. 45 is illustrated in combined FIGS. 47A-C. Prior to describing the altitude network illustrated in composite FIGS. 47A-C, a brief discussion of the mathematical basis for this network is presented.

The variation of pressure with altitude can be defined by the equation:

$$dP = -\rho g\, dh \quad (56)$$

where:
P = atmospheric pressure
$\rho$ = air density
g = gravitational acceleration
h = altitude Air density is a function of temperature and pressure and can be defined by the equation:

$$\rho = \frac{MP}{R^*T} \quad (57)$$

where:
M = atmospheric molecular weight
T = atmospheric temperature
R* = universal gas constant Equations (56) and (57) can be combined to provide an equation giving the variation of pressure with altitude. This equation is:

$$\frac{dP}{P} = \frac{M}{R^*T} g\, dh \quad (58)$$

In the troposphere (below 36,089 feet) gravitation acceleration can be assumed to be constant, and the variation of temperature with altitude can be approximated by the following equation:

$$T = L(h - h_b) + T_b \quad (59)$$

where:
L = the lapse rate
$T_b$ = the temperature at altitude $h_b$

Substitution of equation (59) into equation (58) and integrating from $h_b$ to h gives the following equation:

$$h = h_b + \frac{T_b\left[\left(\frac{P}{P_b}\right)^{\frac{-R^*L}{gM}} - 1\right]}{L} \quad (60)$$

Using standard values for the atmospheric constants and setting the referenced altitude equal to sea level reduces equation (60) to:

$$h = 144{,}900\left(1 - \left[\frac{P}{29.92}\right]^{.191}\right) \quad (61)$$

where h is in feet and P is in inches of mercury.

In accordance with the invention, for digital computation, equation (61) is approximated with polynomials. Two seventh order polynomials cover the range from −1,000 feet to 36,089 feet, the upper limit of the troposphere. For $0.54 < P/29.92 \leq 1.04$ $(16{,}000 > h \geq -1000)$, equation (61) is approximated by:

$$h = 144{,}900[.191x + .07726x^2 + .04659x^3 + .0327x^4 + \quad (62)$$
$$.0249x^5 + .02x^6 + .0166x^7]$$

where: $x = 1 - \frac{P}{29.92}$

For $0.2234 < P/29.92 \leq 0.54$ $(36{,}980 > h \geq 16{,}000)$ equation (61) is approximated by:

$$h = 144{,}900\,[.1817 - .4465y + .5161y^2 - .889y^3 + \quad (63)$$
$$1.784y^4 - 3.873y^5 + 8.87y^6 - 21.0y^7]$$

where: $y = \frac{P}{29.92} - .35$

Above the tropopause, 36,089 feet, the atmosphere is considered to be isothermal. As a result, equation (58) can be integrated from the tropopause to h with the temperature being held constant, which produces the following equation:

$$h = h_{trop} - \frac{R^*T_{trop}}{g_oM} \ln\left(\frac{P}{P_{trop}}\right) \quad (64)$$

where the subscript trop refers to the atmospheric conditions at the tropopause.

If standard values for the atmospheric constants in equation (64) are used, the following equation is produced:

$$h = 36{,}089\left[1 - .5764 \ln\left(\frac{P}{6.684}\right)\right] \quad (65)$$

where h is in feet and P is in inches of mercury.

In accordance with the invention, equation (65) is approximated by the following fifth order polynomial:

$$h = 36{,}089[1.16583 - .76834w + .51242w^2 - .4554w^3 \quad (66)$$
$$+ .4554w^4 - .4842w^5]$$

where: $w = \frac{P}{6.684} - .75$

As noted above, the pressure transducer calibration networks convert input pressure to a normalized value, R, which lies between −1 and 1. Altitude, of course, is based on static pressure, $P_s$. As a result, the altimeter network uses the normalized static pressure value $R_s$. And, rather than using equations (62),(63) and (66), which are based on unnormalized pressure, because it is more convenient for all equations to have the same scale factor and maintain all coefficients and variables with a magnitude of less than one, these equations are rescaled so that $R_s$ rather than $P_s$ can be used. The rescaled equations are as follows:

For $1.92 \leq R_s < .566 (16{,}000 > h \geq -1{,}000)$ \quad (67)

-continued
$$h = 2^{19}[.10557x + .085411x^2 + .10301x^3 + .1446x^4 + .22015x^5 + .35376x^6 + .58724x^7]$$
where: $x = .165775 - .334225R_s$ For $.66579 \leq R_s < -.192 (36,089 > h \geq 16,000)$     (68)
$$h = 2^{19}[.050217 - .0617y + .035661y^2 - .030705y^3 + .030816y^4 - .03345y^5 + .0375y^6 - .04534y^7]$$
where: $y = 2(.668449R_s + .318449)$ For $-1 \leq R_s < -.66579 (\infty > h > 36,089)$     (69)
$$h = 2^{19}[.080247 - .052884w + .035265w^2 - .031313w^3 + .031313w^4 - .033303w^5]$$
where: $w = 4(.0748055R_s + .560555)$ As will be better understood from the following description, the altitude network illustrated in composite FIGS. 47A–C, carries out the calculations set forth in equations (67), (68) and (69). In this regard, the altitude network includes three separate channels 1063, 1065 and 1067 illustrated in FIGS. 47A, 47B and 47C, respectively. Each channel is adapted to perform the calculations related to one of the foregoing equations. Specifically, the channel 1063 illustrated in FIG. 47A performs the calculations described by equation (67), the channel 1065 illustrated in FIG. 47B performs the calculations described by equation (68) and the channel 1067 illustrated in FIG. 48C performs the calculations described by equation (69). However, prior to performing these calculations, it is necessary to determine which channel is to be implemented, since they are mutually exclusive, i.e., if one channel is operating, the other channels are not operating. In this regard, $R_s$ is applied to a level detector 1061. The level detector determines which channel is to receive $R_s$. In this regard, if $R_s$ is greater than or equal to $-1.92$, but less than $0.556$ the first channel 1063 illustrated in FIG. 47A receives $R_s$. If $R_s$ is greater than or equal to $-0.66579$, but less than $-0.192$, the second channel 1065 illustrated in FIG. 47B receives $R_s$. If $R_s$ is greater than or equal to $-1$, but less than $-0.66579$, the third channel 1067 illustrated in FIG. 47C receives $R_s$. The outputs of the first, second and third channels 1063, 1065 and 1067 are each connected to one input of a three-input OR gate 1068 whose output is the altitude signal h.

The first channel 1063 illustrated in FIG. 47A comprises: twelve multipliers 1069, 1071, 1073, 1075, 1077, 1079, 1081, 1083, 1085, 1087, 1089 and 1091; three squaring circuits 1093, 1095 and 1097; a two-input summer 1098, having a positive and a negative input; and a seven-input summer 1099, having all positive inputs.

The $R_s$ signal received from the level detector 1061 is multiplied in the first multiplier 1069 by a constant equal to 0.334225 obtained from the memory. The result is applied to the negative input of the two-input summer 1098. A constant equal to 0.165775 is applied to the positive input of the two-input summer, which sums its two inputs. The output of the two-input summer 1098 is the x value of equation (67) which is equal to $0.165775 - 0.334225 R_s$. x is applied to one input of the second multiplier 1071 where it is multiplied by a numerical constant equal to 0.10557 obtained from the memory. The result is the first component inside of the bracket of equation (67), $0.10557x$ and is applied to a positive input of the seven-input summer 1099. x is also squared by the first squaring circuit 1093 and the result ($x^2$) is multiplied in the third multiplier 1073 by a constant equal to 0.085411, also obtained from memory. The result is the second term inside of the bracket of equation (67), $0.085411x^2$, and is applied to a second input of the seven-input summer 1099. x and $x^2$ are multiplied together in the fourth multiplier 1075 and the result ($x^3$) is multiplied in the fifth multiplier 1077 by a numerical value equal to 0.10301. The result is the third term inside of the bracket of equation (67), $0.10301 x^3$, and is applied to a third input of the seven-input summer 1099.

$x^2$ is also squared by the second squaring circuit 1095 to produce $x^4$, which is multiplied in the sixth multiplier 1079 by a constant equal to 0.1446. The result is the fourth term inside of the bracket of equation (67), $0.1446x^4$, and is applied to a fourth input of the seven-input summer 1099. The output of the fourth multiplier 1075, $x^3$, is multiplied by the output of the first squaring circuit 1093, $x^2$, in the seventh multiplier 1081 to produce $x^5$. $x^5$ is multiplied in the eighth multiplier 1083 by a constant equal to 0.22015. The result is the fifth term inside of the bracket of equation (67), $0.22015x^5$, which is applied to a fifth input of the seven-input summer 1099.

The output of the fourth multiplier 1075, $x^3$, is also squared by the third squaring circuit 1097 to produce $x^6$. $x^6$ is applied to the input of the ninth multiplier 1085 where it is multiplied by a constant equal to 0.35376. The result is the sixth term inside of the bracket of equation (67), $0.35376x^6$, and is applied to the sixth input of the seven-input summer 1099. The output of the third squaring circuit 1097, $x^6$, is multiplied by x in the tenth multiplier 1087 to produce $x^7$. $x^7$ is multiplied by a constant equal to 0.58724, obtained from memory, in the eleventh multiplier 1089. The result is the seventh term inside of the bracket of equation (66), $0.58724x^7$, and is applied to the seventh input of the seven-input summer 1089.

It will be appreciated from the foregoing description that the seven-input summer 1089 receives all seven terms inside of the bracket of equation (67), whereby the output of the summer is equal to the combined value of all of the terms inside of the bracket. The output of the seven-input summer 1089 is applied to one input of the twelfth multiplier 1091 where it is multiplied by a constant equal to $2^{19}$ whereby the output of the twelfth multiplier 1091 is h, based on equation (67). The output of the twelfth multiplier 1091 is applied to one input of the three input OR gate 1068.

The second channel 1065 illustrated in FIG. 47B comprises: thirteen multipliers 1101, 1103, 1105, 1107, 1109, 1111, 1113, 1115, 1117, 1119, 1121, 1123 and 1125; three squaring circuits 1127, 1129, and 1131; a two-input summer 1133, having both positive inputs; and, an eight-input summer 1135, having four positive and four negative inputs. The $R_s$ signal produced by the level detector is multiplied in the first multiplier 1101 by the numerical value 0.668449 obtained from the memory. The result of this multiplication is summed with the numerical value 0.318449 in the two-input summer 1133. The result of the summation is multiplied by two in the second multiplier 1103. As a result, the output of the second multiplier 1103 is the y value used in equation (68). That is, the output of the second multiplier 1103 equals $2(0.668449R_s + 0.318449)$.

The first term inside of the bracket of equation (68), 0.050217 is applied to a plus input of the eight-input summer 1135. The y value formed at the output of the second multiplier 1103 is multiplied in the third multiplier 1155 by a constant equal to 0.0617. The result is the second term inside of the bracket of equation (68), 0.0617y, and is applied to a negative input of the eight-input summer 1135. y is also squared by the first squaring circuit 1127 and the result, $y^2$, is multiplied in the fourth multiplier 1107 by the numerical value 0.035661. The result is the third term inside of the bracket of equation (68), $0.035661y^2$, and is applied to a positive input of the eight-input summer 1135.

The output of the first squaring circuit 1127, $y^2$, is multiplied by y in the fifth multiplier 1109. The result of the multiplication, $y^3$, is multiplied by the numerical value 0.030705 in the sixth multiplier 1111. The result of this multiplication is the fourth term inside of the bracket of equation (68), $0.030705y^3$, and is applied to a negative input of the eight-input summer 1135. The output of the first squaring circuit 1127, $y^2$, is also squared by the second squaring circuit 1129 and the result, $y^4$, is multiplied in the seventh multiplier 1113 by the numerical value 0.030816. The result is the fifth term inside of the bracket of equation (68), $0.030816y^4$, and is applied to a positive input of the eight-input summer 1135. The output, $y^2$, of the first squaring circuit is also multiplied by the output, $y^3$, of the fifth multiplier 1109 in the eighth multiplier 1115 to produce $y^5$. $y^5$ is multiplied in the ninth multiplier 1117 by the numerical value 0.03345. The result is the sixth term inside of the bracket of equation (68), $0.03345y^5$, and is applied to a negative input of the eight-input summer 1135.

The output, $y^3$, of the fifth multiplier 1109 is squared by the third squaring circuit 1131 to produce $y^6$, which is multiplied in the tenth multiplier 1119 by the numerical value 0.0375. The result is the seventh term inside of the bracket of equation (68), $0.0375y^6$, and is applied to a positive input of the eight-input summer 1135. Finally, the output, $y^6$, of the third squaring circuit 1131 is multiplied by y in the eleventh multiplier 1121. The result, $y^7$, is multiplied by the constant value 0.04534 in the twelfth multiplier 1123. The result of this multiplication is the eighth term inside of the bracket of equation (68), $0.04534y^7$, and is applied to a negative input of the eight-input summer 1135.

It will be appreciated from the foregoing description that the output of the eight-input summer 1135 of the channel illustrated in FIG. 47B includes all of the terms inside of the bracket of equation (68), summed in the appropriate manner. This output is applied to the input of the thirteenth multiplier 1125, where it is multiplied by $2^{19}$. The result is the h signal defined by equation (68), and is applied to the second input of the three input OR gate 1068.

The third channel illustrated in FIG. 47C comprises: ten multipliers, 1141,1143,1145,1147,1149,1151,1153,1155,1157 and 1159; two squaring circuits 1161 and 1163; a two-input summer 1165, having both positive inputs; and, a six-input summer 1167 having three positive inputs and three negative inputs.

The $R_s$ output of the level detector 1061 is multiplied in the first multiplier 1141 by a constant equal to 0.748055 and the result is summed in the two-input summer 1165 with a constant equal to 0.560555. The result of the summation is multiplied in the second multiplier 1143 by 4 whereby the value of the output of the second multiplier is the w component of equation (69). That is, the value output of the second multiplier 1143 is equal to $4(0.0748055R_s + 0.0560555)$.

A constant equal to 0.080247 is applied to a positive input of the six-input summer 1167. w is multiplied in the third multiplier 1145 by a constant equal to 0.052884. The result is the second term inside of the bracket of equation (69), 0.052884w, and is applied to a negative input of the eight-input summer 1167.

w is also squared by the first squaring circuit 1161, and the result, $w^2$, is multiplied in the fourth multiplier 1147 by a constant equal to 0.035265. The result of this multiplication is the third term inside of the bracket of equation (69), $0.035265w^2$, and is applied to a positive input of the six-input summer 1167.

The output, $w^2$, of the first squaring circuit 1161 is multiplied in the fifth multiplier 1149 by w to form $w^3$. $w^3$ is multiplied in the sixth multiplier 1151 by a constant equal to 0.031313. The result is the fourth term inside of the bracket of equation (68), $0.031313w^3$, and is applied to a negative input of the six-input summer 1167. The output, $w^2$, of the first squaring circuit 1161, is also squared in the second squaring circuit 1163 to form $w^4$, which is multiplied in the seventh multiplier 1153 by a constant equal to 0.031313. The result is the fifth term inside of the bracket of equation (69), $0.031313w^4$, and is applied to a positive input of the six-input summer 1167. Finally, the output, $w^2$, of the first squaring circuit 1161 is multiplied in the eighth multiplier 1155 by the output first of the fifth multiplier 1149 to form $w^5$. $w^5$ is multiplied in the ninth multiplier 1157 by a constant equal to 0.033303. The result is the sixth term inside of the bracket of equation (69), $0.033303w^5$, and is applied to a negative input of the six-input summer 1167.

It will be appreciated from the foregoing description that the six-input summer 1167 receives all of the terms inside of the bracket of equation (69) in the appropriate positive and negative manner. The output of the six-input summer 1167 is applied to one input of the tenth multiplier 1159 where it is multiplied by $2^{10}$, whereby the output of the tenth summer is equal to the h value defined by equation (69). The output of the tenth multiplier 1159 is applied to the third input of the three-input OR gate 1068.

It will be appreciated from the foregoing description, that regardless of which channel is used, the output of the three-input OR gate 1068 is the altitude (h) signal based on a standard atmosphere, i.e., that sea level pressure is 29.92 inches of mercury. As previously described, the altitude (h) value is corrected by the altitude correction network 1039 illustrated in FIG. 49 and previously described by subtracting an $h_k$ value from h to produce a corrected altitude ($h_t$) value. As previously noted, preferably, $h_k$ is determined by applying a given pressure $P_k$ to the related pressure transducer calibration network 1011 and obtaining a $h_k$ value therefor, from the altitude network 1015. $P_k$ is the pressure at sea level that creates an $h_k$ altitude value equal to standard pressure. That is, $h_k$ is the altitude at which the pressure is 29.92 when the sea level pressure is $P_k$.

Preferably, the true altitude $h_t$ is determined at least sixteen times per second. ($h_k$ is, of course, only calculated when a new sea level pressure is entered.)

Indicated Airspeed

Figure 48:
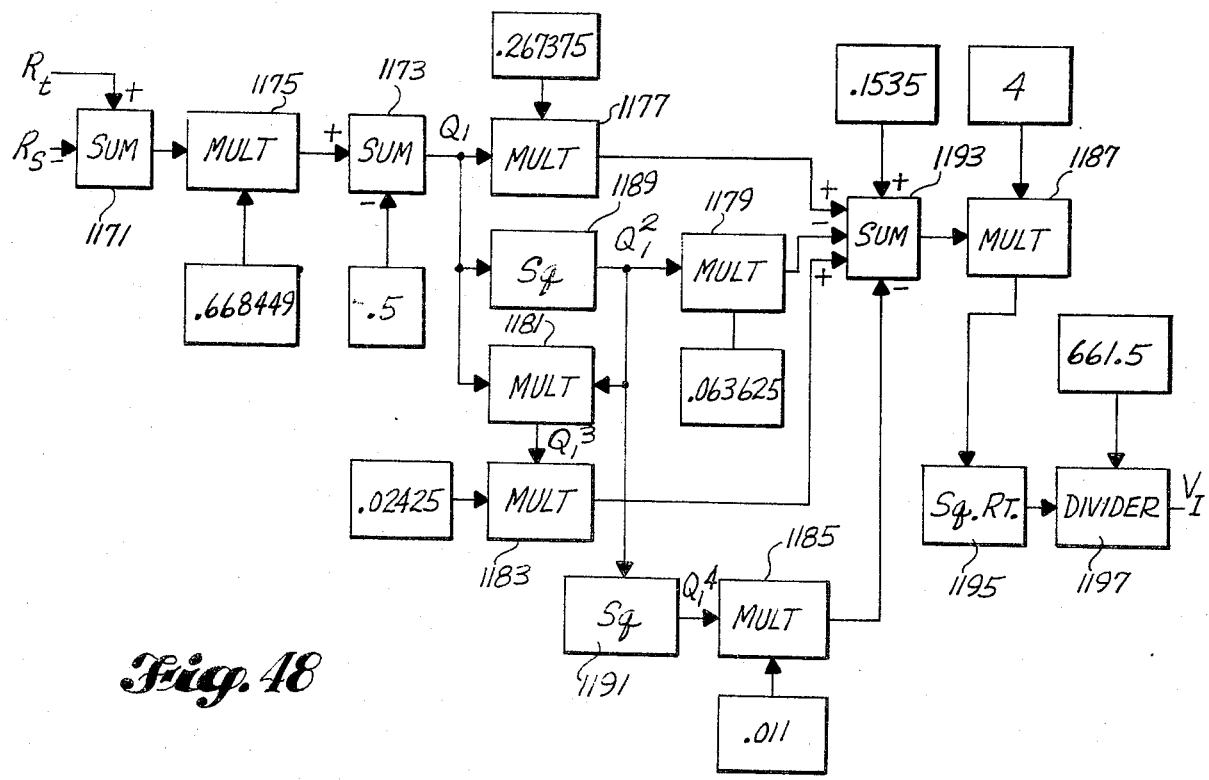
FIG. 48 is a functional block diagram of an indicated airspeed network forming part of the air and temperature data processor illustrated in FIG. 45.

FIG. 48 is a block diagram of an indicated airspeed network suitable for use in the air and temperature data processor illustrated in FIG. 45. Prior to describing this figure, a brief discussion of indicated airspeed is presented so that how indicated airspeed is determined by the network illustrated in FIG. 48 will be better understood. In this regard, as is well known to those skilled in the aircraft art, indicated airspeed, $V_I$, is a measure of the aerodynamic forces on the aircraft. As such, indicated airspeed is that airspeed required, at sea level, to produce a measured impact pressure, $P_t-P_s$. In this regard, the indicated airspeed in knots can be represented by the equation:

$$V_1 = 661.5 \sqrt{5\left[\frac{(P_t - P_s + 29.92)^{2/7}}{29.92} - 1\right]} \tag{70}$$

In accordance with the invention, the indicated airspeed is approximated by the following equation:

$$\left(\frac{V_I}{661.5}\right)^2 = 4[.1535 + .267375Q_1 - .063625Q_1{}^2 + .02425Q_1{}^3 - .011Q_1{}^4] \tag{71}$$

where: when $P_t$ and $P_s$ are expressed as $R_t$ and $R_s$, respectively, $Q_1$ equals $0.668449(R_t-R_s)-0.5$.

The indicated airspeed network illustrated in FIG. 48 first determines $Q_1$ in accordance with the foregoing formula and, thereafter, computes the value of $V_I$ in accordance with equation (71). The indicated airspeed network illustrated in FIG. 48 comprises: two two-input summers 1171 and 1173, each with a positive and a negative input; seven multipliers 1175,1177,1179,1181,1183,1185 and 1187; two squaring circuits 1189 and 1191; a five-input summer 1193 having two negative and three positive inputs; a square root circuit 1195; and a divider 1197. The $R_t$ and $R_s$ signals produced by the first and second pressure transducer calibration networks 1031 and 1033 are applied to the inputs of the first two-input summer 1171. $R_t$ is applied to the positive input and $R_s$ is applied to the negative input. Thus, the output of the first two-input summer is $R_t-R_s$. The output of the first two-input summer 1171 is multiplied in the first multiplier 1175 by a constant equal to 0.668449 and the result is applied to the positive input of the second two-input summer 1173. A constant equal to 0.5 is applied to the negative input of the second two-input summer 1173. As a result, the output of the second two-input summer 1173 is equal to $0.668449(R_t-R_s)-0.5$, which, as noted above, is equal to $Q_1$.

A constant equal to 0.1535 is applied to a positive input of the five-input summer 1193. $Q_1$ is applied to the second multiplier 1177 where it is multiplied by a constant equal to 0.267375. The result is the second term inside of the bracket of equation (71), $0.267375 Q_1$ and is applied to a positive input of the five-input summer 1193. $Q_1$ is also squared by the first squaring circuit 1189 and the results, $Q_1{}^2$, is multiplied in the third multiplier 1179 by a constant equal to 0.063625. The result of this multiplication is the third term inside of the bracket of equation (71), $0.063625Q_1{}^2$, and is applied to a negative input of the five-input summer 1193. The output, $Q_1{}^2$, of the first squaring circuit 1189 is multiplied in the fourth multiplier 1181 by $Q_1$. The result, $Q_1{}^3$, is applied to the fifth multiplier 1183 where it is multiplied by a constant equal to 0.02424. The result is the fourth term inside of the bracket of equation (71), $0.02424Q_1{}^3$, and is applied to a positive input of the five-input summer 1193. In addition, $Q_1{}^2$ is squared by the second squaring circuit 1191 and the result, $Q_1{}^4$, is multiplied by a constant equal to 0.011 in the sixth multiplier 1185. The output of the sixth multiplier 1185 is the fifth term inside of the bracket of equation (71), $0.011Q_1{}^4$, and is applied to a negative input of the five-input summer 1193.

It will be appreciated from the foregoing description that the output of the five-input summer 1193 is the entire term inside of the bracket of equation (71). This output is applied to the seventh multiplier 1187 where it is multiplied by a constant equal to 4. Consequently, the output of the seventh multiplier 1187 is the entire right side of equation (71). In order to obtain the value of $V_I$, the right side of equation (71) must have its square root determined and the result divided by 661.5. In order to accomplish this, the output of the seventh multiplier 1187 is applied to the square root circuit 1195, where the square root is determined. The output of the square root circuit 1195 is applied to the divider 1197 where it is divided by 661.5. Consequently, the output of the divided 1197 is the indicated airspeed, $V_I$.

Preferably, the calculations necessary to obtain indicated airspeed are performed at least eight (8) times per second in order to maintain the indicated airspeed information current.

Mach

Figure 49:
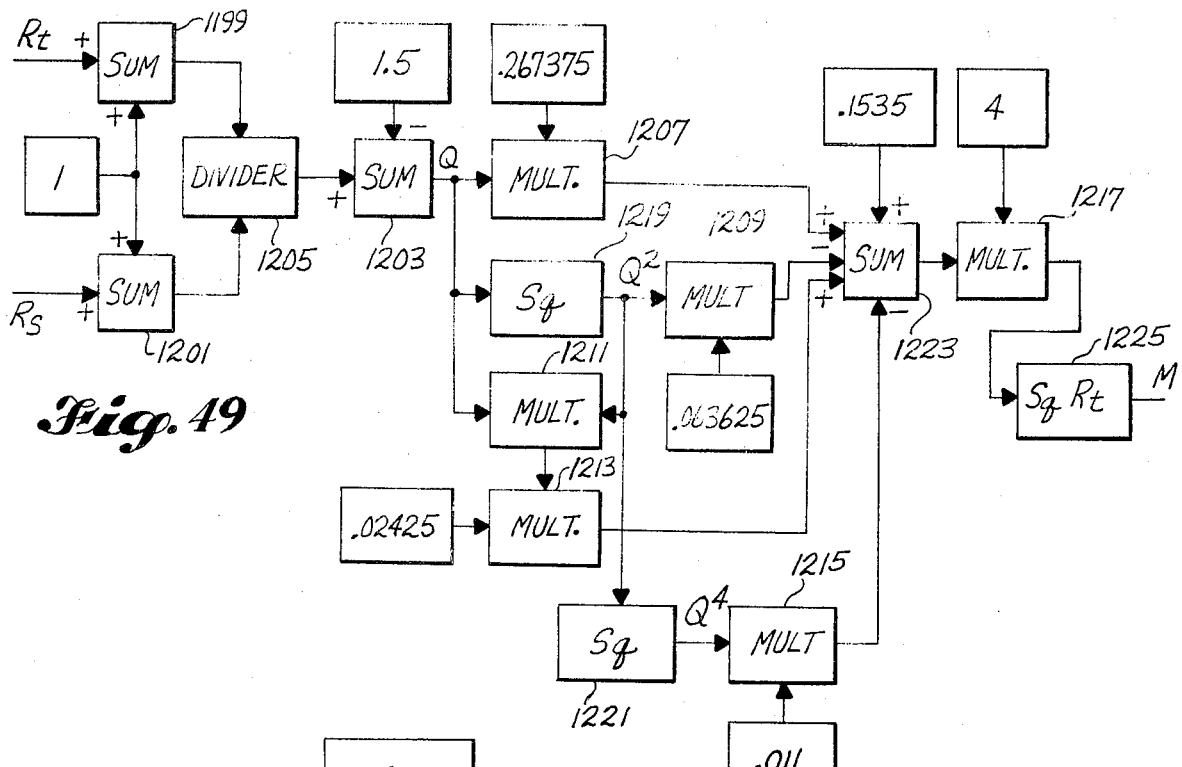
FIG. 49 is a functional block diagram of a Mach network forming part of the air and temperature data processor illustrated in FIG. 45.

FIG. 49 is a block diagram of a Mach network suitable for use in the air and temperature data processor illustrated in FIG. 45. Prior to describing the network illustrated in FIG. 49, in order to better understand the functional operation of that network, a brief discussion of Mach number, M, developed is set forth.

Mach number, M, is a measure of the airspeed of an aircraft and equals the airspeed divided by the speed of sound. In terms of total pressure $P_t$ and static pressure, $P_s$, the Mach number can be represented by the equation:

$$M = \sqrt{5\left[\left(\frac{P_t}{P_s}\right)^{2/7} - 1\right]} \tag{72}$$

In accordance with this invention, the foregoing equation is approximated by the following equation:

$$M^2 = 4[0.1535 + 0.267375Q - 0.063625Q^2 + 0.02425Q^3 - 0.011Q^4] \tag{73}$$

where, when $P_t$ and $P_s$ are expressed in terms of $R_t$ and $R_s$, Q is defined by the equation:

$$Q = \frac{R_t + 1}{R_s + 1} - 1.5 \tag{74}$$

The Mach network illustrated in FIG. 49 first determines Q and, thereafter, determines the value of M in accordance with equation (73).

The Mach network illustrated in FIG. 49 comprises: three two-input summers 1199, 1201 and 1203, the first two-input summers having both positive inputs and the third having a positive input and a negative input; a divider 1205; six multipliers 1207, 1209, 1211, 1213, 1215 and 1217; two squaring circuits 1219 and 1221; a five-input summer 1223 having three positive and two negative inputs; and, a square root circuit 1225. $R_t$ is applied to one input of the first two-input summer 1199 and $R_s$ is applied to one input of the second two-input summer 1201. A constant equal to 1.0 is applied to the second inputs of the first and second two-input summers 1199 and 1201. Thus, the output of the first two-input summer 1199 is equal to $R_t+1$ and the output of the second two-input summer 1201 is equal to $R_s+1$. The output of the first two-input summer is divided by the output of the second two-input summer in the divider 1205, whereby the output of the divider 1205 is equal to $(R_t+1)/(R_s+1)$. The output of the divider 1205 is applied to the positive input of the third two-input summer 1203 and a constant equal to 1.5 is applied to the negative input thereof. As a result, the output of the third two-input summer 1203 is equal to the value of Q, based on equation (74).

A constant equal to 0.1535 is applied to a positive input of the five-input summer 1223. Q is multiplied by a constant equal to 0.267375 in the first multiplier 1207. The result is the second term inside of the bracket of equation (73), 0.267375Q, and is applied to a positive input of the five-input summer 1223. Q is also squared by the first squaring circuit 1219 and the result, $Q^2$, is multiplied by 0.063625 in the second multiplier 1209. Thus, the output of the second multiplier 1209 is the third term inside of the bracket of equation (73), $0.063625Q^2$. This output is applied to a negative input of the five-input summer 1223. $Q^2$ is also multiplied by Q in the third multiplier 1211 and the result, $Q^3$, is multiplied by a constant equal to 0.02425 in the fourth multiplier 1213. The result is the fourth term inside of the bracket of equation (73) $0.02425Q^3$, and is applied to a positive input of the five-input summer 1223. $Q^2$ is also squared by the second squaring circuit 1221 and the result, $Q^4$, is multiplied by a constant equal to 0.011 in the fifth multiplier 1215. The result is the fifth term inside of the bracket of equation (73), $0.011Q^4$, and is applied to a negative input of the five-input summer 1223. Thus, the output of the five-input summer 1223 includes all of the terms inside of the bracket of equation (73). This output is multiplied in the sixth multiplier 1217 by a constant equal to 4 and the square root of the result is taken by the square root circuit 1225. The result is the Mach number M.

It will be appreciated from reviewing FIGS. 48 and 49 that the portion of the Mach network between the output of the third two-input summer 1203 and the output of the network is identical to the portion of the indicated airspeed network between the output of the second two-input summer 1173 and the output of the square root circuit 1195. Consequently, common circuits can be utilized to perform both functions or, in the case of a programmed digital computer, a common program can be used for those portions of an overall program, if desired.

As with the rate of computation of indicated airspeed, preferably, the Mach number, M is determined at least eight times per second.

Corrected Pressure Network

Figure 50:
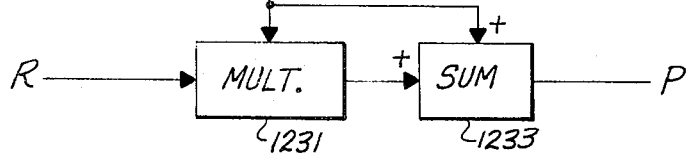
FIG. 50 is a functional block diagram of a corrected pressure network forming part of the air and temperature data processor illustrated in FIG. 45; and, FIG. 51 is a functional block diagram of a total air temperature correction network forming part of the air and temperature data processor illustrated in FIG. 45.

As illustrated in FIG. 45 and previously discussed, the values of $R_s$ and $R_t$ are reconverted to corrected pressure signals by the corrected pressure networks 1025 and 1027. A suitable corrected pressure network that can be utilized to convert either $R_s$ or $R_t$ to pressure corrected signals, $P_{sc}$ or $P_{tc}$, respectively, is illustrated in FIG. 50 and comprises: a multiplier 1231; and, a two-input summer 1223, having both positive inputs. The network illustrated in FIG. 50 functions in accordance with the equation:

$$P = 20R + 20 \quad (75)$$

where:
$P$ = either $P_{sc}$ or $P_{tc}$, depending upon whether $R=R_s$ or $R_t$, respectively.

In FIG. 50, the relevant R value is applied to one input of the multiplier 1231 where it is multiplied by a constant equal to 20. As a result, the P output of the corrected pressure network is equal to $20R+20$ (equation 75).

Total Air Temperature

FIG. 51 is a block diagram of a total air temperature network suitable for use in the air and temperature data processor illustrated in FIG. 45. Prior to describing the nature and operation of the total air temperature network illustrated in FIG. 51, a brief discussion of total air temperature is presented.

Total air temperature is the temperature of moving air after that air has been brought to rest. In most instances, the total air temperature probe utilized on aircraft contains a 500 ohm platinum wire resistance element which follows the Callender-VanDusen temperature-resistance curve. In other words, the TAT signal received by the computer is a resistance signal based, preferably, on a 500 ohm platinum wire resistance element.

In any event, the total air temperature in degrees Celsius can be defined by the following equation:

$$TAT_c = T + a\left(\frac{T}{100} - 1\right)\left(\frac{T}{100}\right) + b\left(\frac{T}{100} - 1\right)\left(\frac{T}{100}\right)^3 \quad (76)$$

where: $T = \frac{K_1 R}{T - K_2 R}$ and a, b, $K_1$, and $K_2$ are constants; and, R is the resistance of the probe element. With a standard 500 ohm platinum resistance element, equation (76) can be approximated by the following equation:

$$TAT_c = 256[0.100593 + 0.517419Z + 0.012224Z^2 + 0.000285Z^3 + 0.000537Z^4] \quad (77)$$

where:
$Z = (R-550)/256$

With R being the probe resistance in ohms, the total air temperature network illustrated in FIG. 51 first determines the value Z in accordance with the foregoing formula and, thereafter, determines the value of $TAT_c$ in accordance with equation (77).

The total air temperature network illustrated in FIG. 51 comprises: a two-input summer 1241, having a positive input and a negative input; a divide-by-$2^8$ divider 1241; six multipliers 1245, 1247, 1249, 1251, 1253, and 1255; two squaring circuits 1257 and 1259; and a five-input summer 1261, having all positive inputs.

R (the measured resistance of the true air temperature probe) is applied to the positive input and constant equal to 550 is applied to the negative input of the two-input summer 1241. Thus, the output of the two-input summer is equal to R-550. This input is divided by $2^8$ (numerical value 256) in the divide-by-$2^8$ divider whereby the output of the divide-by $2^8$ divider is equal to Z. A constant equal to 0.100593 is applied to one input of the five-input summer 1261. Z is multiplied by a constant equal to 0.517419 in the first multiplier 1245 and the result is applied to a second input of the five-input summer 1261. Z is also squared by the first squaring circuit 1257 and the result is multiplied in the second multiplier 1247 by a constant equal to 0.012224. The output of the second multiplier 1247 is applied to a third input of the five-input summer 1261. The output of the first squaring circuit, $Z^2$, is multiplied by Z in the third multiplier 1249 and the result, $Z^3$, is multiplied by a constant equal to 0.000285 in the fourth multiplier 1251. The output of the fourth multiplier 1251 is applied to a fourth input of the five-input summer 1261. $Z^2$ is also squared by the second squaring circuit 1259 and the result, $Z^4$, is multiplied by a constant equal to 0.00537 in the fifth multiplier 1253. The output of the fifth multiplier 1253 is applied to the fifth input of the five-input summer 1261.

It will be appreciated from the foregoing discussion that the output of the five-input summer 1261 is equal to all of the terms inside of the bracket of equation (77). The output of the five-input summer 1261 is multiplied by $2^8$ (256) in the sixth multiplier 1275. Thus, the output of the sixth multiplier 1255 is equal to $TAT_c$. Preferably, a new value of $TAT_c$ is determined at least twice a second.

Conclusion

In conclusion, the invention provides an integrated-strapdown-air-data sensor (ISADS) system suitable for use in an aircraft to provide a multitude of signals suitable for use by downstream automatic flight control, pilot display and navigational systems. In general, the ISADS system includes a plurality of inertial measuring unit (IMU) modules, a plurality of pressure transducer modules and one or more total air temperature sensors. The data developed by these elements are placed in form suitable for receipt by, and is forwarded to, a computer when the computer produces suitable commands, which are interpreted by an instruction decoder. The computer manipulates the data to eliminate errors from the raw data and manipulates the corrected data to produce the desired information signals. While, preferably, the computer is a suitably programmed digital data processor, it can also take the form of discreet networks, if desired. Also, preferably, the sense axes of the IMU modules are skewed with respect to one another; and, the system includes redundant channels.

While the preferred embodiment of the invention integrates inertial, air and temperature data, if desired, inertial data can be separately produced and manipulated. That is, if the integration of air and temperature data with inertial data is undesired, a stand alone inertial system can be formed in accordance with the invention. Or, only inertial and air data can be integrated together. Or, the data can be integrated in different manners. Hence, the invention can be practiced otherwise than as specifically described herein.

The embodiments of the invention in which an exclusive property or privilege is claimed are defined as follows:

1. An integrated-strapdown-air-data sensor system for an aircraft comprising:
(a) a plurality of inertial measuring unit (IMU) modules, suitable for strapdown mounting in an aircraft, each of said IMU modules acceleration of said aircraft along at least two different axes and producing raw angular rate and raw linear acceleration signals related thereto, each of said IMU modules including a temperature sensor for sensing the temperature of the related IMU module and producing an IMU temperature signal related thereto;
(b) at least one pressure transducer module, suitable for mounting in an aircraft, for sensing air data and producing raw air data signals related thereto;
(c) at least one total air temperature sensor, suitable for mounting in an aircraft, for sensing the outside total air temperature at the skin of the aircraft and producing a total air temperature signal related thereto; and,
(d) at least one signal processor coupled to said plurality of IMU modules, said at least one pressure transducer module and said at least one total air temperature sensor, for:
 (1) receiving said raw angular rate, raw linear acceleration, IMU temperature, raw air data and total air temperature signals;
 (2) converting said raw angular rate, raw linear acceleration, IMU temperature, raw air data, and total air temperature signals into common time base digital form;
 (3) compensating said raw angular rate and raw linear acceleration signals in common time base digital form for various types of errors that cause said raw angular rate and raw linear acceleration signals to be inaccurate and producing accurate body angular rate and accurate body linear acceleration signals;
 (4) calibrating said raw air data signals in common time base digital form to produce accurate air data signals; and,
 (5) combining said accurate body angular rate and accurate body acceleration signals, and said accurate air data signals, to produce accurate attitude, navigational position and velocity signals that define the attitude, navigational position and velocity of said aircraft and are suitable for use by the automatic flight control, navigation and display systems of said aircraft.

2. An integrated-strapdown-air-data-sensor system as claimed in claim 1 wherein the two different axes of said inertial sensing means of at least some of said IMU modules are skewed with respect to the two different axes of said inertial sensing means of others of said IMU modules.

3. An integrated-strapdown-air-data sensor system as claimed in claim 2 wherein said inertial sensing means includes gyroscope means for sensing angular rate along two orthogonal axes and accelerometer means for sensing linear acceleration along the same two orthogonal axes, said two orthogonal axes forming said at least two different axes.

4. An integrated-strapdown-air-data sensor system as claimed in claim 3 wherein said gyroscope means comprises a two-degree-of-freedom gyroscope and wherein said accelerometer means comprises two single-degree-of-freedom accelerometers.

5. An integrated-strapdown-air-data sensor system as claimed in claim 3 wherein said gyroscope means comprises two single-degree-of-freedom gyroscopes and wherein said accelerometer means comprises two single-degree-of-freedom accelerometers.

6. An integrated-strapdown-air-data sensor system as claimed in claim 1 wherein said inertial sensing means includes gyroscope means for sensing angular rate along two orthogonal axes and accelerometer means for sensing linear acceleration along the same two orthogonal axes, said two orthogonal axes forming said at least two different axes.

7. An integrated-strapdown-air-data sensor system as claimed in claim 6 wherein said gyroscope means comprises a two-degree-of-freedom gyroscope and wherein said accelerometer means comprises two single-degree-of-freedom accelerometers.

8. An integrated-strapdown-air-data sensor system as claimed in claim 6 wherein said gyroscope means comprises two single-degree-of-freedom gyroscopes and wherein said accelerometer means comprises two-single-degree-of-freedom accelerometers.

9. An integrated-strapdown-air-data sensor system as claimed in claim 6 including a plurality of pressure transducer modules, each suitable for mounting in an aircraft, for sensing air data and producing said raw air data signals related thereto.

10. An integrated-strapdown-air-data sensor system as claimed in claim 9 wherein said raw air data signals produced by each of said pressure transducer modules includes static and total pressure signals.

11. An integrated-strapdown-air-data sensor system as claimed in claim 10 wherein said pressure transducer modules produce said static and total pressure signals in electrical form suitable for receipt by said signal processor.

12. An integrated-strapdown-air-data sensor system as claimed in claim 11 wherein said static and total pressure signals in electrical form are digital in nature.

13. An integrated-strapdown-air-data sensor system as claimed in claim 9 wherein said signal processor compensates said raw angular rate signals for V/F scale factor and dynamic errors.

14. An integrated-strapdown-air-data sensor system as claimed in claim 13 wherein said signal processor also compensates said raw angular rate signals for gyro bias, scale factor, mass unbalance and temperature errors.

15. An integrated-strapdown-air-data sensor system as claimed in claim 14 wherein said signal processor compensates said raw acceleration signals for bias, scale factor and temperature errors.

16. An integrated-strapdown-air-data sensor system as claimed in claim 15 wherein said signal processor also compensates said raw angular rate signals for misalignment between said two orthogonal axes and predetermined axes of said aircraft.

17. An integrated-strapdown-air-data sensor system as claimed in claim 16 wherein said signal processor also compensates said raw acceleration signals for misalignment between said two orthogonal axes and predetermined axes of said aircraft.

18. An integrated-strapdown-air-data sensor system as claimed in claim 17 wherein said two orthogonal axes are nominally related to predetermined axes of said aircraft and wherein said predetermined axes of said aircraft include the pitch, roll and yaw axes of the aircraft.

19. An integrated-strapdown-air-data sensor system as claimed in claim 18 wherein said accurate body angular rate and said accurate body linear acceleration signals are combined to produce accurate navigational position and velocity signals.

20. An integrated-strapdown-air-data sensor system as claimed in claim 19 wherein said signal processor produces said accurate velocity signals by:

determining the angular rate of the navigational coordinate system relative to an earth-centered coordinate system, exposed instantaneously in navigational coordinates, based on the value of a position matrix, the altitude of the aircraft and the velocity of the aircraft;

developing and updating said position matrix based on said angular rate of the navigational coordinate system of the aircraft relative to an earth-centered coordinate system, expressed instantaneously in navigational coordinates;

developing and updating an attitude matrix based on said accurate body angular rate signals, said angular rate of the navigational coordinate system relative to an earth-centered coordinate system, expressed instantaneously in navigational coordinates, and said position matrix;

transforming said accurate body acceleration signals to accurate navigational coordinate acceleration signals based on said attitude matrix; and, combining said accurate navigational coordinate acceleration signals with said angular rate of the navigational coordinate system to an earth-centered coordinate system, expressed instantaneously in navigational coordinates, gravity and said position matrix to produce accurate navigational coordinate velocity signals.

21. An integrated-strapdown-air-data sensor system as claimed in claim 20 wherein said signal processor produces said accurate navigational position signals by combining selected portions of said position matrix.

22. An integrated-strapdown-air-data sensor system as claimed in claim 21 wherein selected portions of said attitude matrix and position matrix are also combined by said signal processor to produce accurate attitude signals.

23. An integrated-strapdown-air-data sensor system as claimed in claim 22 wherein said signal processor determines the initial value of said attitude matrix prior to the takeoff of said aircraft based on said accurate body linear acceleration signals and said accurate body angular rate signals.

24. An integrated-strapdown-air-data sensor system as claimed in claim 23 wherein said initial value of said attitude matrix is determined by first producing a rough estimate of said initial value of said attitude matrix and, then, refining said initial value in a continuous manner to produce an accurate initial value of said attitude matrix.

25. An integrated-strapdown-air-data sensor system as claimed in claim 24 wherein said signal processor produces initial values representing the attitude of said aircraft as well as said initial value of said attitude matrix prior to the takeoff of said aircraft.

26. An integrated-strapdown-air-data sensor system as claimed in claim 25 wherein said signal processor also produces signals representing the altitude, indicated airspeed, Mach number, corrected static and total pressure and corrected total air temperature signals suitable for use by the automatic flight control, navigation and display systems of an aircraft, as required.

27. An integrated-strapdown-air-data sensor system as claimed in claim 9 including a plurality of signal processors suitable for selective connection to said plurality of IMU modules, said plurality of pressure transducer modules and said at least one total air temperature sensor for:

(a) selectively receiving said raw angular rate, raw linear acceleration, IMU temperature, raw air data and total air temperature signals from said plurality of IMU modules, said plurality of pressure transducer modules and said at least one total air temperature sensor;

(b) individually converting said received raw angular rate, raw linear acceleration, IMU temperature, raw air data and total air temperature signals into common time base digital form;

(c) individually compensating said raw angular rate and raw linear acceleration signals in common time base digital form for various types of errors that cause said raw angular rate and raw linear acceleration signals to be inaccurate and producing accurate body angular rate and accurate body linear acceleration signals;

(d) individually calibrating said raw air data signals in common time base digital form to produce accurate air data signals; and, (e) individually combining said accurate body angular rate and accurate body linear acceleration signals and said accurate air data signals to produce accurate attitude, navigational position and velocity signals related to the attitude, navigational position and velocity of said aircraft and suitable for use by the automatic flight control, navigation and display systems of said aircraft.

28. An integrated-strapdown-air-data sensor system as claimed in claim 27 wherein said signal processors compensate said raw angular rate signals for V/F scale factor and dynamic errors.

29. An integrated-strapdown-air-data sensor system as claimed in claim 28 wherein said signal processors also compensate said raw angular rate signals for gyro bias, scale factor, mass unbalance and temperature errors.

30. An integrated-strapdown-air-data sensor system as claimed in claim 29 wherein said signal processors compensate said raw linear acceleration signals for bias, scale factor and temperature errors.

31. An integrated-strapdown-air-data sensor system as claimed in claim 30 wherein said signal processors also compensate said raw angular rate signals for misalignment between said two orthogonal axes and predetermined axes of said aircraft.

32. An integrated-strapdown-air-data sensor system as claimed in claim 31 wherein said signal processors also compensate said raw linear acceleration signals for misalignment between said two orthogonal axes and predetermined axes of said aircraft.

33. An integrated-strapdown-air-data sensor system as claimed in claim 32 wherein said two orthogonal axes are nominally related to predetermined axes of said aircraft and wherein said predetermined axes of said aircraft include the pitch, roll and yaw axes of the aircraft.

34. An integrated-strapdown-air-data sensor system as claimed in claim 33 wherein said accurate body angular rate and said accurate body linear acceleration signals are combined to produce accurate navigational position and velocity signals.

35. An integrated-strapdown-air-data sensor system as claimed in claim 34 wherein said signal processors produce said accurate velocity signals by:

determining the angular rate of the navigational coordinate system relative to an earth-centered coordinate system, expressed instantaneously in navigational coordinates, based on a value of a position matrix, the altitude of the aircraft and the velocity of the aircraft;

developing and continuously updating said position matrix based on said angular rate of the navigational coordinate system relative to an earth-centered coordinate system, expressed instantaneously in navigational coordinates;

developing and continuously updating an attitude matrix based on said accurate body angular rate signals, said angular rate of the navigational coordinate system relative to an earth-centered coordinate system, expressed instantaneously in navigational coordinates, and said position matrix;

transforming said accurate body acceleration signals to accurate navigational coordinate acceleration signals based on said attitude matrix; and, combining said accurate navigational coordinate acceleration signals with said angular rate of the navigational coordinate system relative to an earth-centered coordinate system, expressed instantaneously in navigational coordinates, gravity and said position matrix to produce accurate navigational coordinate velocity signals.

36. An integrated-strapdown-air-data sensor system as claimed in claim 35 wherein said signal processors produce said accurate navigational position signals by combining selected portions of said position matrix.

37. An integrated-strapdown-air-data sensor system as claimed in claim 36 wherein selected portions of said attitude matrix and position matrix are also combined by said signal processors to produce accurate attitude signals.

38. An integrated-strapdown-air-data sensor system as claimed in claim 37 wherein said signals processors determine the initial value of said attitude matrix prior to the takeoff of said aircraft based on said accurate body linear acceleration signals and said accurate body angular rate signals.

39. An integrated-strapdown-air-data sensor system as claimed in claim 38 wherein said initial value of said attitude matrix is determined by first producing a rough estimate of said initial value of said attitude matrix and, then, refining said initial value in a continuous manner to produce an accurate initial value of said attitude matrix.

40. An integrated-strapdown-air-data sensor system as claimed in claim 39 wherein said signal processors produce initial values representing the attitude of said aircraft as well as said initial value of said attitude matrix prior to the takeoff of said aircraft.

41. An integrated-strapdown-air-data sensor system as claimed in claim 40 wherein said signal processors also produce signals representing the altitude, indicated airspeed, Mach number, corrected static and total pressure and corrected total air temperature signals suitable for use by the automatic flight control, navigation and display systems of an aircraft, as required.

42. A strapdown inertial sensing system suitable for use in an aircraft to produce signals representing the attitude, position and velocity of the aircraft, said strapdown inertial sensing system comprising:

(a) a plurality of inertial measuring unit (IMU) modules, suitable for strapdown mounting in an aircraft, each of said plurality of IMU modules including inertial sensing means for sensing the angular rate and the linear acceleration of said aircraft along at least two different axes and producing raw angular rate and raw linear acceleration signals related thereto, each of said IMU modules including a temperature sensor for sensing the temperature of the related IMU module and producing an IMU temperature signal related thereto; and, (b) at least one signal processor coupled to said plurality of IMU modules for:

(1) receiving said raw angular rate, raw linear acceleration and IMU temperature signals;
(2) converting said raw angular rate, raw linear acceleration and IMU temperature signals into common time base digital form;
(3) compensating said raw angular rate and raw linear acceleration signals in common time base digital form for various types of errors that cause said raw angular rate and raw linear acceleration signals to be inaccurate and producing accurate body angular rate and accurate body linear acceleration signals;
(4) combining said accurate body angular rate and accurate body linear acceleration signals with an altitude signal to produce accurate signals representing the attitude, position and velocity of an aircraft incorporating said strapdown inertial sensing system.

43. A strapdown inertial sensing system as claimed in claim 42 wherein the two different axes of said inertial sensing means of at least some of said IMU modules are skewed with respect to the two different axes of said inertial sensing means of others of said IMU modules.

44. A strapdown inertial sensing system as claimed in claim 43 wherein said inertial sensing means includes gyroscope means for sensing angular rate along two orthogonal axes and accelerometer means for sensing linear acceleration along the same two orthogonal axes, said two orthogonal axes forming said at least two different axes.

45. A strapdown inertial sensing system as claimed in claim 44 wherein said gyroscope means comprises a two-degree-of-freedom gyroscope and wherein said accelerometer means comprises two single-degree-of-freedom accelerometers.

46. A strapdown inertial sensing system as claimed in claim 44 wherein said gyroscope means comprises two single-degree-of-freedom gyroscope and wherein said accelerometer means comprises two single-degree-of-freedom accelerometers.

47. A strapdown inertial sensing system as claimed in claim 42 wherein said inertial sensing means includes gyroscope means for sensing angular rate along two orthogonal axes and accelerometer means for sensing linear acceleration along the same two orthogonal axes, said two orthogonal axes forming said at least two different axes.

48. A strapdown inertial sensing system as claimed in claim 47 wherein said gyroscope means comprises a two-degree-of-freedom gyroscope and wherein said accelerometer means comprises two single-degree-of-freedom accelerometers.

49. A strapdown inertial sensing system as claimed in claim 47 wherein said gyroscope means comprises two single-degree-of-freedom gyroscopes and wherein said accelerometer means comprises two single-degree-of-freedom accelerometers.

50. A strapdown inertial sensing system as claimed in claim 47 wherein said two orthogonal axes are nominally related to predetermined axes of said aircraft and wherein said predetermined axes of said aircraft include the pitch, roll and yaw axes of the aircraft.

51. A strapdown inertial sensing system as claimed in claim 42 wherein said signal processor compensates said raw angular rate signals for V/F scale factor and dynamic errors.

52. A strapdown inertial sensing system as claimed in claim 51 wherein said signal processor also compensates said raw angular rate signals for gyro bias, scale factor, mass unbalance and temperature errors.

53. A strapdown inertial sensing system as claimed in claim 42 wherein said signal processor compensates said raw linear acceleration signals for bias, scale factor and temperature errors.

54. A strapdown inertial sensing system as claimed in claim 42 wherein said signal processor compensates said raw angular rate signals for misalignment between said two different axes and predetermined axes of said aircraft.

55. A strapdown inertial sensing system as claimed in claim 42 wherein said signal processor compensates said raw linear acceleration signals for misalignment between said two different axes and predetermined axes of said aircraft.

56. A strapdown inertial sensing system as claimed in claim 42 wherein said accurate body angular rate and said accurate body acceleration signals are combined to produce accurate navigational position and velocity signals.

57. A strapdown inertial sensing system as claimed in claim 56 wherein said signal processor produces said accurate velocity signals by:
determining the angular rate of the navigational coordinate system relative to an earth-centered coordinate system, expressed instantaneously in navigational coordinates, based on the value of a position matrix, the altitude of the aircraft and the velocity of the aircraft;
developing and updating said position matrix based on said angular rate of the navigational coordinate system relative to an earth-centered coordinate system, expressed instantaneously in navigational coordinates;
developing and updating an attitude matrix based on said accurate body angular rate signals, said angular rate of the navigational coordinate system relative to an earth-centered coordinate system, expressed instantaneously in navigational coordinates, and said position matrix;
transforming said accurate body acceleration signals to accurate navigational coordinate acceleration signals based on said attitude matrix; and,
combining said accurate navigational coordinate acceleration signals with said angular rate of the navigational coordinate system relative to an earth-centered coordinate system, expressed instantaneously in navigational coordinates, gravity and said position matrix to produce accurate navigational coordinate velocity signals.

58. A strapdown inertial sensing system as claimed in claim 57 wherein said signal processor produces said accurate navigational position signals by combining selected portions of said position matrix.

59. A strapdown inertial sensing system as claimed in claim 58 wherein selected portions of said attitude matrix and position matrix are also combined by said signal processor to produce accurate attitude signals.

60. A strapdown inertial sensing system as claimed in claim 59 wherein said signal processor determines the initial value of said attitude matrix prior to the takeoff of said aircraft based on said accurate body linear acceleration signals and said accurate body angular rate signals.

61. A strapdown inertial sensing system as claimed in claim 60 wherein said initial value of said attitude matrix is determined by first producing a rough estimate of said initial value of said attitude matrix and, then, refining said initial value in a continuous manner to produce an accurate initial value of said attitude matrix.

62. A strapdown inertial sensing system as claimed in claim 61 wherein said signal processor produces initial values representing the attitude of said aircraft as well as said initial value of said attitude matrix prior to the takeoff of said aircraft.

* * * * *

UNITED STATES PATENT AND TRADEMARK OFFICE
CERTIFICATE OF CORRECTION

PATENT NO. : 4,303,978
DATED : December 1, 1981
INVENTOR(S) : Jack C. H. Shaw, et al.

It is certified that error appears in the above-identified patent and that said Letters Patent are hereby corrected as shown below:

On The Title Page,

Abstract, line 19: "(47)" is changed to — (48) —

Column 1, line 50: delete "not"

line 51: insert — not — after "that"

Column 11, line 62: "torques" is changed to — torque —

Column 20, line 31: "muliplexed" is changed to — multiplexed —

Column 22, line 37: "vaue" is changed to — value —

Column 29, line 6: "insertial" is changed to — inertial —

Column 57, line 42: "axis", both occurrence to resd -- axes --.

Column 58, line 14: "$\omega HD\, cq$" is changed to — $\omega cq$ — line 32: "$\omega'Hdcq$" is changed to — $\omega'cq$ —

Column 64, line 7: "muliplier" is changed to — multiplier —

Column 67, line 51: "muliplier" is changed to — multiplier —

Column 69, line 15: "$\omega'eq$" is changed to — $\omega'cq$ — line 19: "$\omega 3$" is changed to — T3 — line 30: "$q^P a_2$" is changed to — $q^P a_r$ —

UNITED STATES PATENT AND TRADEMARK OFFICE
CERTIFICATE OF CORRECTION

PATENT NO. : 4,303,978

DATED : December 1, 1981

INVENTOR(S) : Jack C. H. Shaw, et al.

It is certified that error appears in the above-identified patent and that said Letters Patent are hereby corrected as shown below:

Column 70, line 58: "section" is changed to -- selection --

Column 71, line 29: "$\xi p$", second occurrence to read -- $\xi q$ --

Column 72, line 12: "muliplier" is changed to -- multiplier -- line 61: "(h1)" is changed to -- (ht) --

Column 74, line 5: "[C]" is changed to -- $[\dot{C}]$ --

Column 75, line 60: "$(\rho x - 2\Omega C_{11})$" is changed to -- $(\rho x + 2\Omega C_{11})$ -- line 62: "$(\rho y - 2\Omega C_{21})$" is changed to -- $(\rho y + 2\Omega C_{21})$ --

Column 81, line 37: "muliplier" is changed to -- multiplier --

Column 82, line 31: "$\omega q$" is changed to -- $\bar{\omega} q$ -- line 45: "$\omega r$" is changed to -- $\bar{\omega} r$ -- line 51: "$\bar{\omega} q'$", first occurrence to read -- $\bar{\omega} \rho'$ --.

Column 83, line 41: "muliplier" is changed to -- multiplier --

Column 84, line 53: "$\partial i e^D$" is changed to -- $\omega i e^D$ --

Column 86, line 63: delete "1"

Column 90, line 23: "reproduced" is changed to -- reproduce --

UNITED STATES PATENT AND TRADEMARK OFFICE
CERTIFICATE OF CORRECTION

PATENT NO. : 4,303,978
DATED : December 1, 1981
INVENTOR(S) : Jack C. H. Shaw, et al.

It is certified that error appears in the above-identified patent and that said Letters Patent are hereby corrected as shown below:

Column 94, lines 32 and 33: "1n" is changed to — In — lines 42 and 43: "1n" is changed to — In —

Column 99, line 9: "V1" is changed to — VI —

Column 103, line 64: insert — including inertial sensing means for sensing the angular rate and the linear — after "modules"

Column 105, line 66: "exposed" is changed to — expressed —

Column 107, line 62: "a" is changed to — the — (first occurance)

Column 108, line 28: "signals" is changed to — signal —

Column 109, line 36: "gyroscope" is changed to — gyroscopes —

Signed and Sealed this

Ninth Day of November 1982

[SEAL]

Attest:

GERALD J. MOSSINGHOFF

Attesting Officer    Commissioner of Patents and Trademarks